US012597880B2

(12) United States Patent
Pedlar et al.

(10) Patent No.: US 12,597,880 B2
(45) Date of Patent: Apr. 7, 2026

(54) FRAMES FOR PHOTOVOLTAIC MODULES AND MOUNTING FEATURES

(71) Applicant: Enstall US, Inc., Hayward, CA (US)

(72) Inventors: Roger Pedlar, Phoenix, AZ (US);
Bryan Chidester, Glendale, AZ (US);
Chase Remley, Litchfield Park, AZ
(US); Duane Menton, Vallejo, CA
(US); Joseph Armano, Andover, MA
(US); Lori Brock, Ipswich, MA (US);
Yann Schwarz, Oakland, CA (US); **Jon
Ash, Phoenix, AZ (US); Jan-Floris de
Graaf, Schalkhaar (NL); Aaron
Williamson**, Laveen, AZ (US);
Maarten Alexander Smit, Nijverdal
(NL)

(73) Assignee: Enstall US, Inc., Hayward, CA (US)

( * ) Notice: Subject to any disclaimer, the term of this
patent is extended or adjusted under 35
U.S.C. 154(b) by 0 days.

(21) Appl. No.: 19/270,232

(22) Filed: Jul. 15, 2025

(65) Prior Publication Data

US 2025/0385637 A1     Dec. 18, 2025

Related U.S. Application Data

(63) Continuation of application No. 19/268,948, filed on
Jul. 14, 2025, which is a continuation of application
No. 19/139,790, filed as application No.
PCT/US2024/038914 on Jul. 19, 2024.

(60) Provisional application No. 63/527,733, filed on Jul.
19, 2023, provisional application No. 63/595,263,
filed on Nov. 1, 2023.

(51) Int. Cl.
*H02S 20/23* (2014.01)
*H02S 20/30* (2014.01)

(52) U.S. Cl.
CPC .............. *H02S 20/23* (2014.12); *H02S 20/30*
(2014.12)

(58) Field of Classification Search
CPC .. H02S 20/23; H02S 20/30; F16B 2/20; F16B
2/205; F16B 2/22; F16B 2/243; F16B
2/245; F16B 2/246; F16B 5/06; F16B
5/0607
USPC ...... 248/228.6, 228.7, 231.71, 231.81, 316.7
See application file for complete search history.

(56) References Cited

U.S. PATENT DOCUMENTS

| | | | |
|---|---|---|---|
| 6,465,724 B1 | 10/2002 | Garvison et al. | |
| 6,959,517 B2 | 11/2005 | Poddany et al. | |
| 7,592,537 B1 | 9/2009 | West | |
| 7,774,998 B2 | 8/2010 | Aschenbrenner | |
| 8,176,693 B2 | 5/2012 | Abbott et al. | |
| 8,258,395 B2 | 9/2012 | Wares | |
| 8,424,255 B2 | 4/2013 | Lenox et al. | |

(Continued)

FOREIGN PATENT DOCUMENTS

| | | |
|---|---|---|
| CN | 202363497 U | 8/2012 |
| DE | 102011113289 B4 | 11/2015 |

(Continued)

*Primary Examiner* — Alfred J Wujciak
(74) *Attorney, Agent, or Firm* — The Webb Law Firm

(57) ABSTRACT

A frame for a photovoltaic module may include: a base
portion having an outer lip and a bottom surface while also
defining an opening configured to receive a first mounting
element therein; at least one leg extending from the base
portion; and a panel support portion extending from the at
least one leg and configured to secure a solar panel therein.
The outer lip and the at least one leg may define a cavity.

11 Claims, 164 Drawing Sheets

(56) References Cited

U.S. PATENT DOCUMENTS

| | | | |
|---|---|---|---|
| 8,567,134 B1 | 10/2013 | Grushkowitz et al. | |
| 8,640,400 B2 | 2/2014 | Liebendorfer | |
| 8,683,761 B2 | 4/2014 | Danning | |
| 8,806,813 B2 | 8/2014 | Plaisted et al. | |
| 8,943,765 B2 | 2/2015 | Danning et al. | |
| 8,991,114 B2 | 3/2015 | West | |
| 9,057,540 B2 * | 6/2015 | Buettner | F24S 25/20 |
| 9,154,074 B2 | 10/2015 | West et al. | |
| 9,314,904 B2 | 4/2016 | Veloso et al. | |
| 9,413,286 B2 | 8/2016 | Danning | |
| 9,447,801 B2 | 9/2016 | West | |
| D772,432 S | 11/2016 | West | |
| 9,660,569 B2 | 5/2017 | Zuritis | |
| 9,743,501 B2 | 8/2017 | Ciasulli et al. | |
| 9,777,948 B2 | 10/2017 | Braunstein et al. | |
| 9,813,015 B1 | 11/2017 | Kapla et al. | |
| 9,816,731 B2 | 11/2017 | West et al. | |
| 9,951,972 B2 | 4/2018 | Miyamoto et al. | |
| 10,103,688 B2 | 10/2018 | Rossi | |
| 10,298,172 B2 | 5/2019 | Oh et al. | |
| D859,967 S | 9/2019 | West | |
| 10,436,479 B2 | 10/2019 | Ito | |
| 10,536,110 B2 | 1/2020 | Grushkowitz et al. | |
| 10,630,232 B2 | 4/2020 | Schulte et al. | |
| 10,756,668 B2 | 8/2020 | Bamat et al. | |
| 10,873,288 B2 | 12/2020 | West et al. | |
| 10,935,282 B2 * | 3/2021 | Gorny | H10F 19/00 |
| 10,958,208 B2 | 3/2021 | Oh et al. | |
| 11,018,620 B2 | 5/2021 | Rossi et al. | |
| 11,056,997 B2 | 7/2021 | DeGraaff | |
| 11,223,318 B2 | 1/2022 | Gorny | |
| 11,418,145 B2 | 8/2022 | Bunea et al. | |
| 11,519,638 B2 * | 12/2022 | Gorny | F24S 25/67 |
| 11,594,998 B1 | 2/2023 | Kapla et al. | |
| 11,757,400 B1 * | 9/2023 | Jasmin | H02S 20/23 248/237 |
| 11,949,032 B2 | 4/2024 | Kapla et al. | |
| 12,034,398 B2 | 7/2024 | Wares et al. | |
| 12,119,779 B2 | 10/2024 | Wares et al. | |
| 12,132,439 B2 | 10/2024 | Braunstein et al. | |
| 12,231,076 B1 | 2/2025 | Jasmin et al. | |
| 12,249,949 B1 | 3/2025 | Jasmin et al. | |
| 12,283,915 B2 | 4/2025 | Rossi et al. | |
| 2004/0221524 A1 | 11/2004 | Poddany et al. | |
| 2010/0294340 A1 * | 11/2010 | Cunningham | F24S 80/40 136/251 |
| 2014/0339179 A1 * | 11/2014 | West | F24S 25/632 211/41.1 |
| 2015/0075590 A1 * | 3/2015 | West | H02S 30/10 361/679.01 |
| 2017/0366131 A1 | 12/2017 | Stearns et al. | |
| 2021/0159850 A1 | 5/2021 | Shakir et al. | |
| 2021/0180832 A1 | 6/2021 | Schuknecht et al. | |
| 2021/0297036 A1 | 9/2021 | Pretorius et al. | |
| 2022/0255498 A1 | 8/2022 | Gong et al. | |
| 2024/0075588 A1 | 3/2024 | Wares et al. | |
| 2024/0128388 A1 * | 4/2024 | Xu | F24S 25/65 |
| 2024/0154570 A1 | 5/2024 | Stephan et al. | |
| 2024/0297614 A1 | 9/2024 | Hafter et al. | |
| 2025/0015752 A1 | 1/2025 | Jiang | |

FOREIGN PATENT DOCUMENTS

| | | | |
|---|---|---|---|
| DE | 102023124063 A1 | 3/2025 | |
| JP | 3186674 U | 10/2013 | |
| JP | 5421898 B2 | 2/2024 | |
| WO | 2004079775 A2 | 9/2004 | |

* cited by examiner

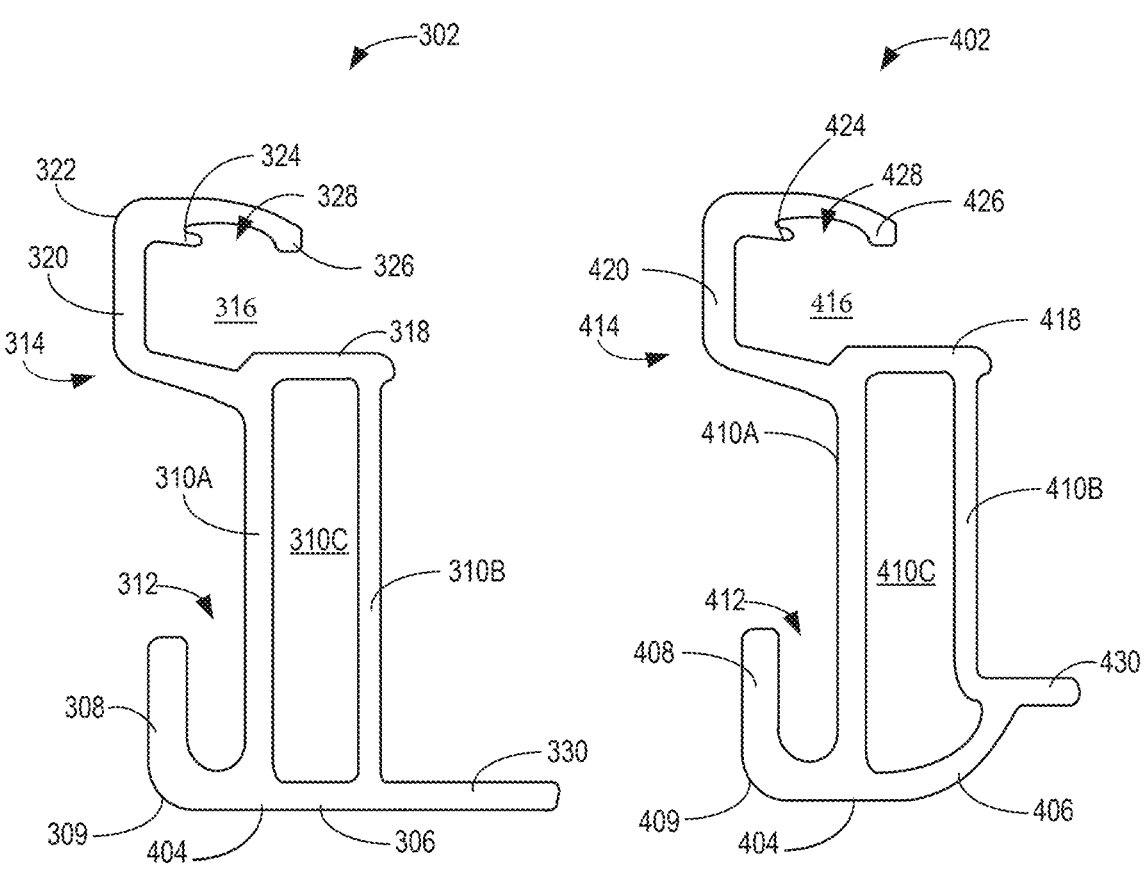
FIG. 3                    FIG. 4

1

FRAMES FOR PHOTOVOLTAIC MODULES AND MOUNTING FEATURES

CROSS REFERENCE TO RELATED APPLICATIONS

This application is a continuation of U.S. patent application Ser. No. 19/268,948, filed Jul. 14, 2025, which is a continuation of U.S. patent application Ser. No. 19/139,790, filed Jun. 16, 2025, which is the United States national phase of international application no. PCT/US24/38914, filed Jul. 19, 2024, and claims priority to U.S. Provisional Application No. 63/527,733, filed Jul. 19, 2023, and U.S. Provisional Application No. 63/595,263, filed Nov. 1, 2023, the disclosures of which are hereby incorporated by reference in their entireties.

BACKGROUND OF THE INVENTION

Field of the Invention

The present disclosure relates to frames for photovoltaic modules and support structures and other accessories for the modules and frames.

Description of Related Art

Photovoltaic modules are often used in large, multiple-module arrays. Some of these systems are used on buildings where space may be limited, creating a need to maximize the amount of space occupied by the modules. Such an arrangement creates the need to easily mount the modules within their frames so that the module and frame combination can be used effectively and efficiently within the system. Therefore, it is desirable to have frames for photovoltaic modules that promote a quick installation while efficiently using space and minimizing interference with modules and frames that are already installed or yet to be installed. It is also desirable to have mounting structures and other accessories that can be easily applied to surfaces, such as sloped and flat roofs with minimal installation steps, using the least amount of equipment as possible.

SUMMARY OF THE INVENTION

A frame for a photovoltaic module may include: a base portion having an outer lip and a bottom surface while also defining an opening configured to receive a first mounting element therein; at least one leg extending from the base portion; and a panel support portion extending from the at least one leg and configured to secure a solar panel therein. The outer lip and the at least one leg may define a cavity.

In some embodiments or aspects, the present disclosure may be represented by a first grouping of clauses as follows:

Clause 1. A frame for a photovoltaic module, the frame comprising: a base portion comprising an outer lip and a bottom surface, the base portion defining an opening configured to receive a first mounting element therein; at least one leg extending from the base portion; and a panel support portion extending from the at least one leg, the panel support portion configured to secure a solar panel therein, wherein the outer lip and the at least one leg define a cavity.

Clause 2. The frame of clause 1, wherein the base portion further comprises a rounded sidewall extending between the bottom surface and the outer lip, the rounded sidewall defining the opening.

Clause 3. The frame of clause 2, wherein the at least one leg extends from a midpoint of the rounded sidewall.

Clause 4, the frame of any of clauses 1-3, wherein the base portion further comprises at least one jaw extending at least partially into the opening.

Clause 5. The frame of clause 4, wherein the at least one jaw comprises two jaws, and wherein the two jaws extend into the opening from opposing sides.

Clause 6. The frame of clause 3, wherein the at least one leg comprises a first leg and a second leg, wherein the first leg extends from a midpoint of the rounded sidewall, and wherein the second leg extends from part of the base portion proximate to the rounded sidewall.

Clause 7. The frame of any of clauses 1-6, wherein the cavity is configured to receive a second mounting element therein.

Clause 8. The frame of clause 7, wherein the first mounting element and the second mounting element are parts of a mounting clamp.

Clause 9. A frame mounting assembly comprising: the frame of clause 8; and a mounting configured to mount the frame to a rail, the mounting clamp comprising: a base configured to be at least partially secured to a rail; a middle portion configured to be connected to the base, the middle portion comprising at least one extension, the at least one extension being configured to be received within the opening; a top portion configured to be connected to the base, the top portion comprising at least one mounting lip, the at least one mounting lip being configured to be received within the cavity.

Clause 10. The frame mounting assembly of clause 9, wherein the middle portion comprises at least one clamp support wing extending a distance beyond base and the top portion in the direction of the base of the frame, and wherein the extension is located at an end of the clamp support wing.

Clause 11. The frame mounting assembly of clause 10, further comprising a fastener, wherein the base defines a first aperture, wherein the top portion defines a second aperture, and wherein the first aperture and the second aperture are configured to receive the fastener therethrough.

Clause 12. The frame mounting assembly of clause 11, wherein the middle portion comprises a body defining a body opening therethrough and a pair of mating walls extending from opposing sides of the body opening, wherein the base comprises a channel, the channel at least partially defining the first aperture, and wherein the channel is configured to be received through the body opening.

Clause 13. The frame mounting assembly of clause 12, wherein the top portion defines a hollow extending from a bottom side thereof, the hollow being in communication with the second aperture and wherein the hollow is configured to receive at least a portion of the pair of mating walls and the channel therein.

Clause 14. A frame mounting assembly comprising: the frame of clause 8; and a wire router, the wire router comprising: a wire holder defining a wire securing space configured to hold wires therein; an elongated body extending from the wire holder, the elongated body being configured to extend around the base; and a securing extension extending from the elongated body, the securing extension being configured to extend at least partially into the opening.

Clause 15. The frame mounting assembly of clause 14, wherein the wire holder comprises a first sidewall, a second sidewall disposed a distance away from the first sidewall, and a connecting portion extending therebetween, and wherein at least a portion of the first sidewall abuts the at least one leg of the frame.

Clause 16. The frame mounting assembly of clause 15, wherein the elongated body extends around the base to secure the wire router to the frame.

Clause 17. The frame mounting assembly of clause 16, wherein the elongated body extends a distance along a top surface of the base, around an edge of the base, and a distance along a bottom surface of the base.

Clause 18. The frame mounting assembly of clause 17, wherein the securing extension comprises an upward extending portion and a downward extending portion, wherein the upward extending portion extends at least partially into the opening, and wherein the downward extending portion extends in the opposing direction.

Clause 19. The frame mounting assembly of clause 18, wherein the upward extending portion is configured to be wedged within the opening, thereby further securing the wire router to the frame.

Clause 20. The frame mounting assembly of clause 19, wherein the downward extending portion is configured to be deflected to disengage the upward extending portion from the opening.

A method of mounting a solar panel onto a support surface may include the steps of: mounting at least one first mounting component to at least one first support structure, the at least one first mounting component defining a first mounting space and a second mounting space; securing the at least one first support structure to a support surface; mounting at least one second mounting component to at least one second support structure, the at least one second mounting component defining a third mounting space and a fourth mounting space; securing a first frame of the solar panel module within the third mounting space; engaging a second frame of the solar panel module with the second mounting space; rotating the solar panel module so that the second frame rotates within the second mounting space, thereby securing the second frame within the second mounting space; and securing the at least one second support structure to the support surface.

The at least one first support structure and the at least one second support structure may both include: a base defining a slot; a pedestal configured to slide along the slots and be secured to the slots at a desired location; and a mounting fastener at least partially secured to the pedestals. The mounting fasteners may be configured to mount the at least one first mounting component to the at least one first support structure and to mount the at least one second mounting component to the at least one second support structure, and the mounting fasteners may be adjustable relative to the pedestals. The method may further include the step of sliding the pedestal of the at least one second support structure to allow the at least one second support structure to be secured to the support surface at a desired location.

The method may further include the step of securing the pedestal of the at least one second support structure to the slot. The at least one first support structure and the at least one second support structure may further include a pedestal fastener. The pedestals may define a pedestal aperture, and the pedestal fasteners may be configured to be received within the pedestal apertures and the slots to secure the pedestals at the desired locations. The method may further include the step of adjusting the mounting fastener on at least one of the at least one first support structure and the at least one second support structure to adjust the position of at least one of the at least one first mounting component and the at least one second mounting component. The pedestals may further define a mounting aperture configured to receive the mounting fasteners therein. The mounting apertures may extend in a direction that is orthogonal to the slots. The pedestal apertures may extend in a direction to define an acute angle with the mounting apertures.

The at least one first support structure and the at least one second support structure may further include a nut received within the slots, the nuts being configured to secure the pedestal fasteners to the slots. The slots may define a groove, and the nuts may be configured to be received and slide within the grooves. The at least one first support structure and the at least one second support structure may further include at least one base fastener, and the bases may define at least one base aperture configured to receive the at least one base fasteners therein to secure the base to the support surface. The at least one base apertures may include a plurality of base apertures, and the at least one base fasteners may include a plurality of base fasteners corresponding to the plurality of base apertures.

The bases may define a bottom surface area. A first portion of the plurality of base apertures may extend into the bases into a first portion of the plurality of base apertures in a direction that defines a first angle with the bottom surface areas, and a second portion of the plurality of base apertures may extend into a second portion of the plurality of base apertures so as to define a second angle with the bottom surface areas, and the second angles may be different from the first angles. The first angles may not be orthogonal, and the second angles may be orthogonal. The first portions of the plurality of base apertures may be disposed around an end of the slot. The second portions of the plurality of base apertures may be disposed on a side of the first portions of the plurality of base apertures opposite the slots.

The at least one first support structure and the at least one second support structure further comprise a pad disposed in the bases, the pads being made of a material such that the at least one base fasteners can extend through the pads to secure the bases to the support surface, and the pads may be configured to create a seal between the at least one first support structure and the at least one second support structure and the support surface. The at least one first support structure may include two first support structures, and the at least one mounting component may include two first mounting components corresponding to the two first support structures. The at least one second support structure may include two second support structures, and the at least one second mounting component may include two second mounting components corresponding to the two second support structures. The method may further include the step of engaging a skirt with at least a portion of the first mounting space.

In some embodiments or aspects, the present disclosure may be represented by a second grouping of clauses as follows:

Clause 1. A method of mounting a solar panel module onto a support surface, the method comprising the steps of: mounting at least one first mounting component to at least one first support structure, the at least one first mounting component defining a first mounting space and a second mounting space; securing the at least one first support structure to a support surface; mounting at least one second mounting component to at least one second support structure, the at least one second mounting component defining a third mounting space and a fourth mounting space; securing a first frame of the solar panel module within the third mounting space; engaging a second frame of the solar panel module with the second mounting space; rotating the solar panel module so that the second frame rotates within the second mounting space, thereby securing the second frame within the second mounting space; and securing the at least one second support structure to the support surface.

Clause 2. The method of clause 1, wherein the at least one first support structure and the at least one second support structure both comprise: a base defining a slot; a pedestal configured to slide along the slots and be secured to the slots at a desired location; and a mounting fastener at least partially secured to the pedestals, wherein the mounting fasteners are configured to mount the at least one first mounting component to the at least one first support struc- ture and to mount the at least one second mounting com- ponent to the at least one second support structure, and wherein the mounting fasteners are adjustable relative to the pedestals.

Clause 3. The method of clause 2, further comprising the step of sliding the pedestal of the at least one second support structure to allow the at least one second support structure to be secured to the support surface at a desired location.

Clause 4. The method of clause 3, further comprising the step of securing the pedestal of the at least one second support structure to the slot.

Clause 5. The method of clause 4, wherein the at least one first support structure and the at least one second support structure both further comprise a pedestal fastener, wherein the pedestals define a pedestal aperture and wherein the pedestal fasteners are configured to be received within the pedestal apertures and the slots to secure the pedestals at the desired locations.

Clause 6. The method of any of clauses 2-5, further comprising the step of adjusting the mounting fastener on at least one of the at least one first support structure and the at least one second support structure to adjust the position of at least one of the at least one first mounting component and the at least one second mounting component.

Clause 7. The method of clause 6, wherein the pedestals further define a mounting aperture configured to receive the mounting fasteners therein.

Clause 8. The method of clause 7 wherein the mounting apertures extend in a direction that is orthogonal to the slots.

Clause 9. The method of clause 8, wherein the pedestal apertures extend in a direction to define an acute angle with the mounting apertures.

Clause 10. The method of clause 4 or 5, wherein the at least one first support structure and the at least one second support structure further comprise a nut received within the slots, the nuts being configured to secure the pedestal fasteners to the slots.

Clause 11. The method of clause 10, wherein the slots define a groove, and the nuts are configured to be received and slide within the grooves.

Clause 12. The method of any of clauses 2-11, wherein the at least one first support structure and the at least one second support structure further comprise at least one base fastener, and wherein the bases define at least one base aperture configured to receive the at least one base fasteners therein to secure the base to the support surface.

Clause 13. The method of clause 12, wherein the at least one base apertures comprise a plurality of base apertures, and the at least one base fasteners comprise a plurality of base fasteners corresponding to the plurality of base aper- tures.

Clause 14. The method of clause 13, wherein the bases define a bottom surface area, wherein a first portion of the plurality of base apertures extends into a first portion of the plurality of base apertures in a direction that defines a first angle with the bottom surface areas, and a second portion of the plurality of base apertures extends into a second portion of the plurality of base apertures so as to define a second angle with the bottom surface areas, and wherein the second angles are different from the first angles.

Clause 15. The method of any of clause 14, wherein the first angles are not orthogonal, and wherein the second angles are orthogonal.

Clause 16. The method of clause 15, wherein the first portions of the plurality of base apertures are disposed around an end of the slots.

Clause 17. The method of clause 16, wherein the second portions of the plurality of base apertures are disposed on a side of the first portions of the plurality of base apertures opposite the slots.

Clause 18. The method of any of clauses 12-17, wherein the at least one first support structure and the at least one second support structure further comprise a pad disposed in the bases, the pads being made of a material such that the at least one base fasteners can extend through the pads to secure the bases to the support surface, and wherein the pads are configured to create a seal first support structure and the at least one second support structure and the support surface.

Clause 19. The method of any of clauses 1-18, wherein the at least one first support structure comprises two first support structures, wherein the at least one first mounting component comprises two first mounting components cor- responding to the two first support structures, wherein the at least one second support structure comprises two second support structures, and wherein the at least one second mounting component comprises two second mounting com- ponents corresponding to the two second support structures.

Clause 20. The method of any of clauses 1-19 further comprising the step of engaging a skirt with at least a portion of the first mounting space.

BRIEF DESCRIPTION OF THE DRAWING(S)

FIG. 3 is a front view of a frame for a photovoltaic module according to another embodiment or aspect of the present disclosure;

FIG. 4 is a front view of a frame for a photovoltaic module according to another embodiment or aspect of the present disclosure;

DESCRIPTION OF THE INVENTION

Figures 1, 2:
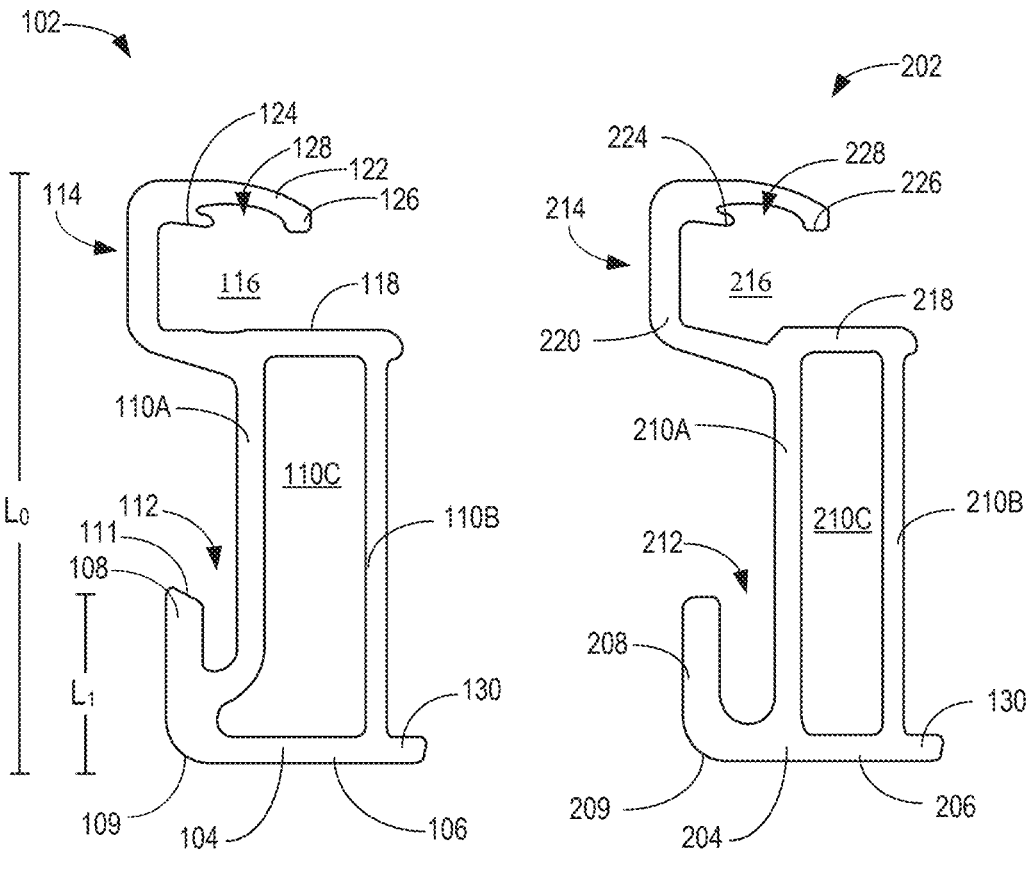
FIG. 1 is a front view of a frame for a photovoltaic module according to one embodiment or aspect of the present disclosure.
FIG. 2 is a front view of a frame for a photovoltaic module according to another embodiment or aspect of the present disclosure.

As used herein, the singular form of "a", "an", and "the" include plural referents unless the context clearly dictates otherwise.

Spatial or directional terms, such as "left", "right", "inner", "outer", "above", "below", "horizontal", "vertical" and the like, relate to the disclosure as shown in the drawing figures and are not to be considered as limiting as the disclosure can assume various alternative orientations.

The terms "first", "second", and the like are not intended to refer to any particular order or chronology, but refer to different conditions, properties, or elements.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

Introduction

The present disclosure is directed to a variety of features used in connection with solar panels to form solar panel modules and to arrange these modules efficiently and effectively in a desired location. Using the features discussed herein, multiple modules can be arranged in an array, or only one module can be supported in a specific location. Generally, solar panel frames are mounted or glued to a photovoltaic panel to form a solar panel module. To support the module, clamps and other mounting structures are used to secure the solar panel module in a desired location. The modules can be mounted to rails or railless systems, both of which will be discussed herein. The term "mounting structure" will be used throughout this disclosure, and it may be understood to mean a rail or a railless system. Depending on the context of each embodiment, the mounting structure will be evident. The modules can be mounted on different support surfaces such as flat roofs, sloped roofs, or different ground surfaces. While some of the disclosures provided herein may be discussed in connection with certain support surfaces or mounting features, one having skill in the art will realize that the disclosures are not limited by the examples in which they are discussed. Different mounting features can be used in different environments and with different frames or other features even if not explicitly mentioned with varying degrees of modification.

Solar Panel Module Frames

FIGS. 1-4, 8, and 114-116 show different embodiments of solar panel frames 102, 202, 302, 402, 802, 11402, 11602. Each embodiment has some similar features, which will be identified with some shared reference numerals. Some of these frames are shown later in this application in connection with additional features and accessories. While only one or two of the solar panel frames 102, 202, 302, 402, 802, 11402, 11602 may be shown in connection with these additional features and accessories, one having skill in the art will appreciate that all of the solar panel frames 102, 202, 302, 402, 802, 11402, 11602 can be used with each of the additional features and accessories shown in this disclosure.

It will be appreciated that each of the different solar panel frames 102, 202, 302, 402, 802, 11402, 11602 can be mounted to and used with a variety of different mounting features. In this disclosure, the solar panel frames 102, 202, 302, 402, 802, 11402, 11602 will be discussed in connection with different mounting clamps and other accessories. Only one solar panel frame 102, 202, 302, 402, 802, 11402, 11602 is shown in the drawings in connection with these other features. However, it is to be understood that the other frames 102, 202, 302, 402, 802, 11402, 11602 can still be used with those other features. In some instances, slight modifications to the frames 102, 202, 302, 402, 802, 11402, 11602 or the features may be required to make a certain frame 102, 202, 302, 402, 802, 11402, 11602 work with the other features, but those modifications will be apparent to one having skill in the art. However, if only one solar panel frame 102, 202, 302, 402, 802, 11402, 11602 is discussed in connection with a clamp, it does not preclude other frames 102, 202, 302, 402, 802, 11402, 11602 from also being used with that clamp.

Many of these clamps are mounted to a rail R that runs under multiple solar panels arranged in a solar panel array. The rails R are configured to receive clamps in order to mount one or more solar panels at different points of each rail R. Different clamps can be arranged on different rails R, with each being mounted to the same individual frame 102, 202, 302, 402, 802, 11402, 11602. The solar panel frames 102, 202, 302, 402, 802, 11402, 11602 can also be mounted to rail-less systems that may or may not include the clamps discussed in this disclosure. Examples of such rail-less systems are various types of roof attachments and rail free mounts. In some embodiments, these rail-less systems may support anywhere from one to four solar panel modules. When the solar panel frames 102, 202, 302, 402, 802, 11402, 11602 are mounted to systems that do not use the clamps covered in this disclosure, the mounts will include features that facilitate mounting of the solar panel frames 102, 202, 302, 402, 802, 11402, 11602. The mounting processes contemplated by this disclosure may or may not require tools to appropriately place an individual solar panel module within an array. The solar panel frames 102, 202, 302, 402, 802, 11402, 11602 may also be used in connection with metal roof mounts, such as seam clamps or corrugated roof mounts. The solar panel frames 102, 202, 302, 402, 802 shown and described in FIGS. 1-8 will now be discussed.

With reference to FIG. 1, solar panel frame 102 includes a base 104 that extends along the bottom of the frame 102. The base 104 includes a center portion 106, which is substantially flat, and an outer lip 108 extending from the center portion 106. As shown, the outer lip 108 curves upward some distance away from the center portion 106., thus forming an outer lip curved portion 109. The outer lip comprises a curved portion extending from the center portion 106 and a vertical portion extending upward from the curved portion which terminates in a distal end 111. In solar panel frame 102 the distal end 111 of the outer lip vertical portion is angled so as to form an acute angle with the outer face of the vertical portion of the outer lip 108. The curved portion 109 of the outer lip allows for a lower height of the distal end of the outer lip, when the solar panel module is being installed as will be discussed in further detail below. Similarly, the acute angle of the distal end of the vertical portion of the outer lip can lower the effective height of the outer lip above the mounting surface during installation. The angled distal end 111 of the vertical portion of the outer lip 108 is present in frame 102 and it is contemplated that the distal ends 211, 311, 411, 811, 11411, 11511 may also include an angled distal end. Legs 110A, 110B extend away from the base 104 in generally the same direction as the vertical portion of the outer lip 108. A first leg 110A extends from the outer lip 108, and the second leg 110B extends from the center portion 106. The first leg 110A and the outer lip 108 define a clamp cavity 112, which is a space between the two elements that is configured to receive a clamp or other solar panel mounting feature therein to secure the frame 102 within a solar panel array. The engagement between these features will be discussed below. The outer lip 108 can be shaped or angled so as to engage the clamp or mounting feature, thereby securing that feature on the outer lip and at least partially in the clamp cavity 112. The outer lip 108 may also be resilient so as to bend when being mounted to a clamp. The outer lip 108 may also provide an audible or tactile indication of engagement with the clamp. The legs 110A, 110B define a hollow center 110C therebetween. Although two legs 110A, 110B are shown, one having ordinary skill in the art will appreciate that any number of legs may be used so long as a panel support portion 114 is adequately supported above the base 106.

Still with reference to FIG. 1, solar panel frame 102 includes an inner base extension 130 that extends from the base 104 inwardly in an opposite direction from the outer lip 108. The base extension 130 may interact with features of various accessories and other structures to assist in the connection of the various other accessories and structures to the frame 102, as will be further explained below. The panel support portion 114 extends from and is supported by the legs 110A, 110B. The panel support portion 114 defines a panel cavity 116 that is arranged to receive a solar panel therein. The panel support portion 114 includes a panel support surface 118 for resting the solar panel thereon. The body that defines the panel support portion 114 extends across the legs 110A, 110B. The panel support surface 118 may be uneven so as to define a lip, a recess, or a bump, which can be used to secure the solar panel within the cavity 116. The panel support surface comprises a first portion that extends across and connects to the tops of the legs 110A, 110B and a second portion that extends outwardly from the outer leg 110A forming an obtuse angle with leg 110A. There is a curved transition between leg 110A and the second portion of the panel support surface 118. A sidewall 120 extends upwards from the panel support surface 118. There is a curved transition between the second portion of the panel support surface and the sidewall 120. A top wall 122 extends from the sidewall 120 generally parallel to the panel support surface 118. The top wall 122 includes an adhesive flare 124 and a panel lip 126 at a terminal end, which define an adhesive space 128 therebetween. The adhesive space 128 can hold an adhesive that can help to secure the solar panel within the cavity 116. The panel lip 126 may also help to retain the solar panel within the cavity 116 by providing an edge that can contain an adhesive and/or frictionally engage the solar panel.

With reference to FIG. 2, a second solar panel frame 202 is shown. This solar panel frame 202 includes the same features as the first solar panel frame 102, except the first leg 210A extends from the center portion 206, instead of the outer lip 208. This arrangement allows for a deeper clamp cavity 212 to be formed, which can accommodate different clamps or mounting features.

With reference to FIG. 3, a third solar panel frame 302 is shown. This solar panel frame 302, is similar to the second solar panel frame 202, in that the first leg 310A extends from the center portion 306. However, this solar panel 302 includes a flange 330 extending from the center portion 306 in a direction opposite that in which the outer lip 308 initially extends from the center portion 306. The flange 330 can engage with other mounting features or accessories such as end clamps or wire clamps, which will be discussed below. While the first solar panel frame 102 and the second solar panel frame 202 appear to show what may appear to be a flange extending beyond their respective second legs 110B, 210B, these extensions are shorter than the flange 330 shown in FIG. 3. These short extending portions 130, 230 of the bases 104, 204 that extend beyond the second legs 110B, 210B may still engage with certain mounting accessories that are discussed below. A flange 330 with a larger area may be used for certain clamping systems including fasteners and flange apertures that allow an installer to connect the frame 302 to a mounting structure from below.

With reference to FIG. 4, a fourth solar panel frame 402 is shown. This solar panel frame 402 includes a rounded center portion 406 along the base 404. This rounded center portion 406 means that the flange 430, if one is present, extends from the center portion 406 some distance above the bottom of the frame 402. The rounded center portion 406 allows for the frame 402 to more easily rock or rotate into position relative to a clamp or other mounting features. An example of this is the clamp and ramp mounting system 4400 shown in FIGS. 44-47. When used with the clamp and ramp mounting system 4400, the rounded center portion 406 also acts as a guide for rotating the frame within the clamp, and the flange 430 acts as a stop against the ramp, which allows for the module frame 402 to be better captured and held within the system.

Referring back to FIG. 1, it is contemplated that the outer lip 108 of the frame 102 is longer in length relative to the solar panel frame 102 than what is currently known in the art. For example, the length $L_0$ of the solar panel frame 102 from the base 104 to the portion of the top wall 122 farthest away from the base may range from 25-40 mm. (0.98-1.57 in.), and the outer lip 108 may have a length $L_1$ of 5-12 mm. (0.19-0.47 in.). In this example, the outer lip 108 ranges from 20-40% of the total length $L_0$ of the solar panel frame 102. In a particular example, the outer lip 108 may have a length $L_1$ of 8.89 mm. (0.35 in.). In other examples, the outer lip 108 may be even longer. These lengths and their ratios help the solar panel frame 102 have a more secure and easier connection with their respective clamps, which will be discussed below. It is to be understood that these lengths $L_0$, $L_1$ may also apply to the frames 202, 302, 402 and outer lips 208, 308, 408 of the other embodiments.

Figure 5:
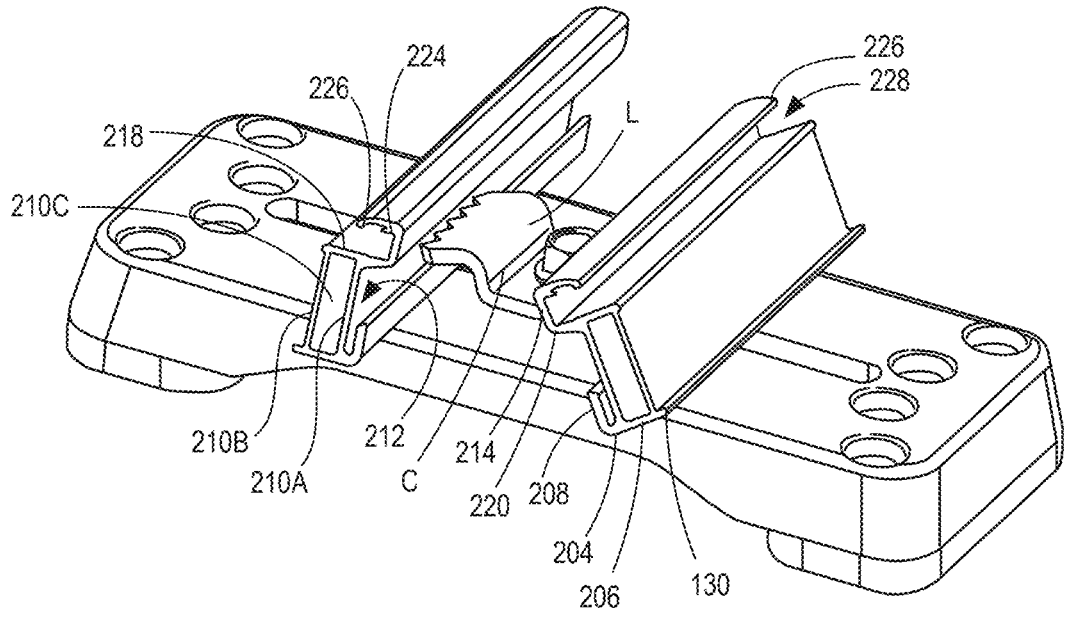
FIG. 5 is an exemplary perspective view of the frame of FIG. 1 being mounted to a clamp.
Figure 6:
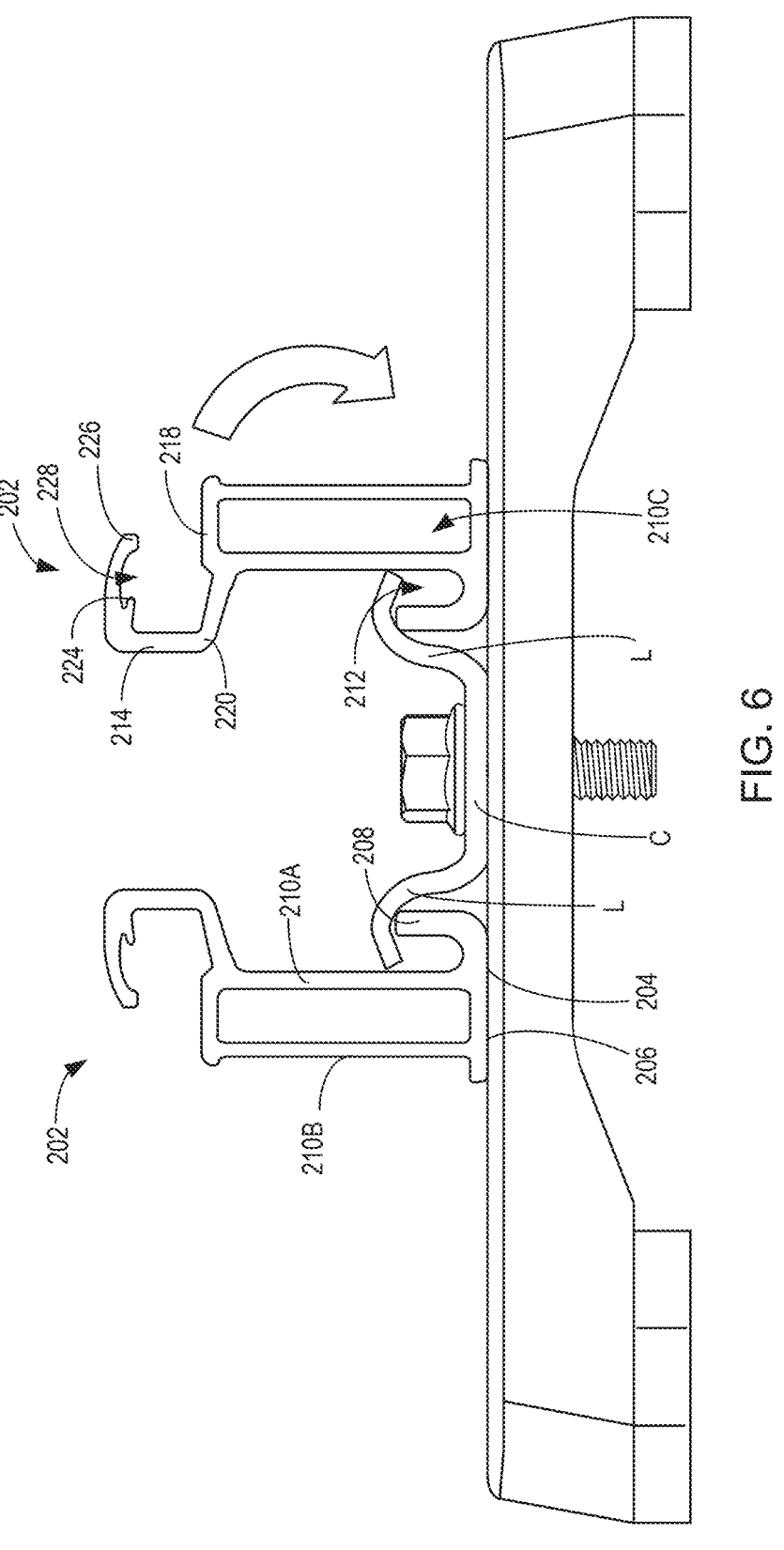
FIG. 6 is an exemplary front view of the frame of FIG. 1 being mounted to a clamp.
Figure 7:
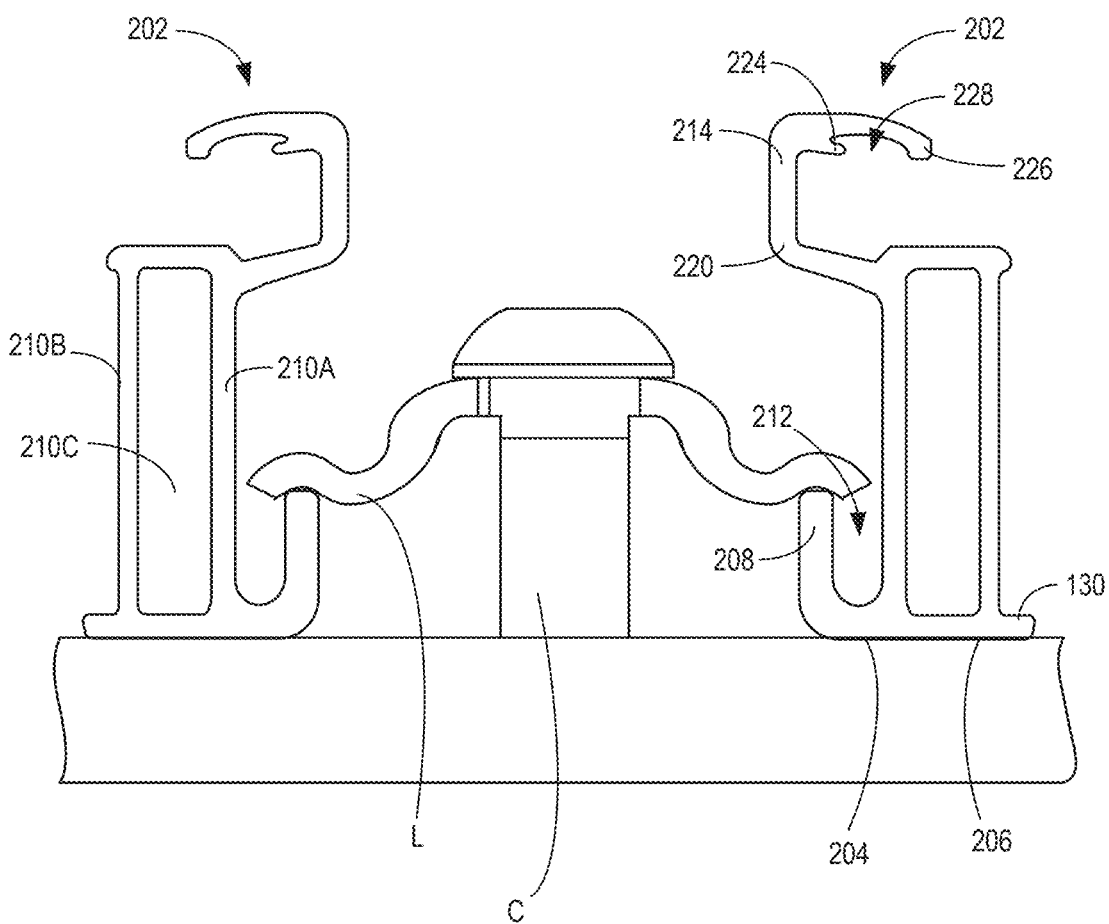
FIG. 7 is an exemplary front view of the frame of FIG. 2 mounted to a clamp.

With reference to FIGS. 5-7, a method of mounting the frame 102 to a clamp C will now be described. The clamp C is intended to be exemplary to generally describe the mounting process from the perspective of the frame 102. Specific mounting clamps that can be used with the frames discussed in this section will be discussed later. Solar panel frames 202, 302, 402, 11402, 11602 are mounted in a similar manner, and one having ordinary skill in the art will understand how to mount those frames 202, 302, 402, 11402, 11602 based on this disclosure. One will also appreciate that the frame 102 may be mounted to other features in a similar manner, some of which will be discussed below.

First, the frame 102 is tilted at an angle so that at least the end of the mounting lip L of the mounting clamp is received within the clamp cavity 112. Next, the frame 102 is rotated downward in the direction of the feature to which the mounting clamp C is connected. This rotation occurs until the bottom surface of the frame 102 fully contacts the feature to which the clamp C is connected. When rotating the frame 102, a snap or a clicking sound may occur as a result of contact between the mounting lip L and the tilted outer lip 108. Such a sound may be indicative of an engagement between the mounting lip L and the outer lip 108 and clamp cavity 112. Once engaged, the frame 102 can slide along mounting element in a direction into or out of the page when viewing FIG. 7, in order to adjust its placement within the solar panel array. To complete the mounting process, after the mounting lip L is received within the clamp cavity 112, the opposing side of the solar panel is then tilted downward. This opposing side is also connected to a frame 102 that can become engaged with its own clamp C to fully secure the solar panel in a desired location. When the mounting lip L is received within the clamp cavity 112, and the bottom surface of the frame fully contacts the mounting element, the mounting lip L fully engages the outer lip 108 and may apply a downward force to the frame 102 that serves to secure the frame 102 in place on the mounting element.

Figure 8:
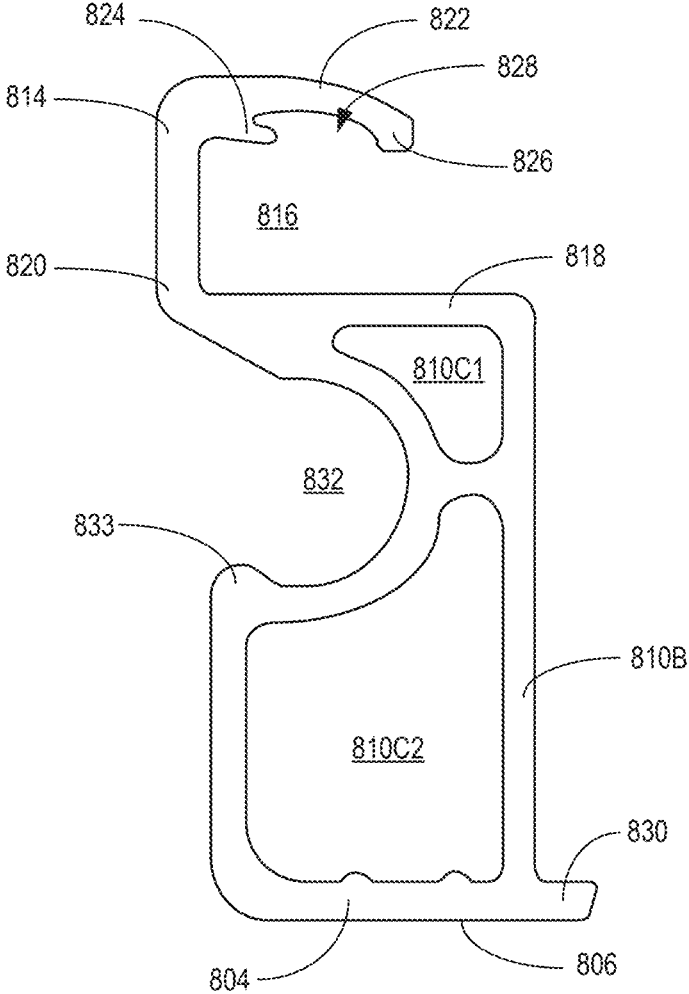
FIG. 8 is a front view of a frame for a photovoltaic module according to another embodiment or aspect of the present disclosure.

With reference to FIG. 8, a fifth solar panel frame 802 is shown. This solar panel frame 802 lacks an outer lip and has a clamp cavity 832 that is defined entirely by the first leg 810A. The clamp cavity 832 is semi-circular in shape, although other shapes may be used depending on the shape of the clamps that will mount in the clamp cavity 832. As shown, the clamp cavity 832 is raised so as to be closer to the solar panel support portion 814 than the base 804. However, other placements of the cavity 832 along the leg 810A will be appreciated. The top of the leg 810A and the bottom edge of the clamp cavity 832 define a convex lip 833 to be used to secure the frame 802 to a clamp, which will be discussed below. Extending from the first leg 810A at the location of the cavity 832 is a connecting portion 834 that extends from the first leg 810A to the second leg 810B. The connecting portion 834 improves the strength and durability of the frame 802. To further improve the strength of the frame 802, or any of the other frames 102, 202, 302, 402, 11402, 11602 discussed herein, the thicknesses of the frame portions may be increased. Due to the connecting portion 834 extending between the legs 810A, 810B, two hollow center portions 810C1, 810C2 are present.

Figure 9:
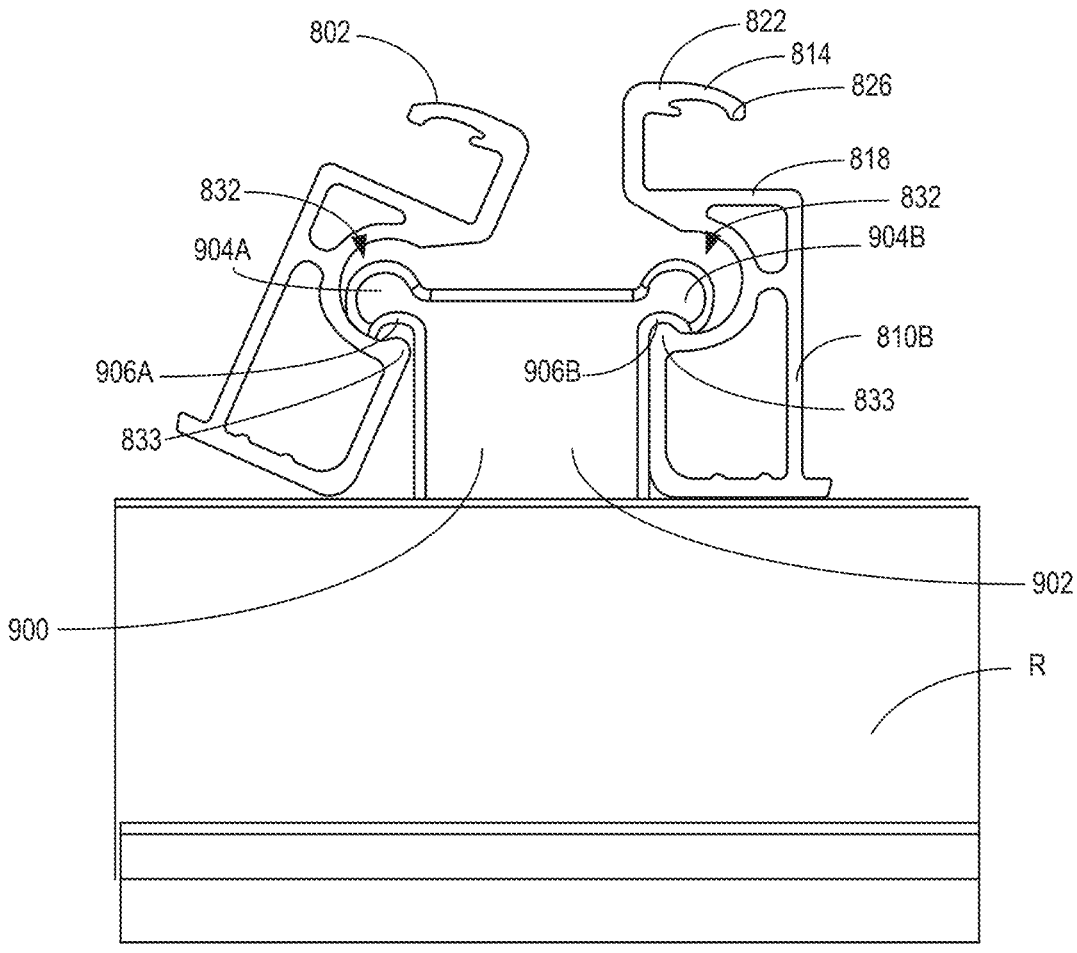
FIG. 9 is a front view of the frame of FIG. 8 being mounted to a clamp used in a solar panel system according to one embodiment or aspect of the present disclosure.

With reference to FIG. 9, the mounting of solar panel frame 802 to a clamp 900 is shown. The clamp 900 is connected to a support structure such as the rail R shown. The support structure could be a variety of mounts, rails or other structures that are configured to support an array of solar panels. The clamp 900 acts to securely and clampingly connect the solar panel to the rail R or other support structure. The clamp 900 includes a body 902 that is shown as being substantially quadrilateral. It is appreciated that the body 902 can take other shapes so long as its ability to mount to the solar panel frame 802 is present. Extending from opposing sides of the body are mounting lips 904A, 904B. The mounting lips 904A, 904B are rounded and shaped to fit within and configured to coordinate with the convex lips 833 and the concave cavities 832 formed in the first legs 810A of frame 802. The mounting lips 904A, 904B define a rounded concave recess 906A, 906B on the bottom surface thereof. The rounded concave recess 906A, 906B of the mounting lips 904A, 904B are configured to receive and interact with the convex lips 833 defined by the leg 810A and the cavity 832 to secure the solar panel frame 802 to the mounting structure. The mounting lips 904A, 904B and the clamp cavities 906A, 906B can have different shapes, so long as there is an engagement between the corresponding components which mount the frame 802 to the clamp 900. The mounting lips 904A may include teeth, ripples or other knurling features that help to facilitate bonding to the frame 802 within the clamp cavities 906A, 906B. Similar features may also be included in the clamp cavities 906A, 906B.

To clampingly mount the solar panel frame 802 to rail R using the clamp 900, the solar panel should be tilted or angled such that the frame 802 should be angled or rotated relative to the rail R or other support structure and the clamp 900. This lowers the convex lip 833 of the clamp 802 relative to its respective mounting lip 904A, 904B in such a way that the convex lip 833 or the bottom edge of the cavity 832 is able to pass under the mounting lips 904A, 904B. From here, the solar panel module can be lowered and the frame 802 can be rotated in the direction of the arrow shown in FIG. 6, so the bottom edge and convex lip 833 of the clamp cavity 832 is rotated around the mounting lip 904A and within the concave recess 906A of the mounting lip 904A. This rotation occurs until the outer surface of the first leg 510A contacts the nearest surface of the clamp body 902. The rotation raises the cavity 832 relative to the mounting lip 904A, which causes the convex lip 833 to contact and provide an upward force against the mounting lip 904A. This raises the mounting lip 904A to some degree and causes the mounting lip 904A to provide a clamping force that acts downwardly in opposition to the upward force created by the clamp cavity 906. This downward force helps to clamp the frame 802 into place relative to the clamp 900 and rail R. Both the solar panel frame 802 and the clamp body 902 should be shaped so that rotation of the solar panel frame 802 is stopped and full engagement between a single clamp cavity 906 and a single mounting lip 904A occurs when the solar panel held within the frame 802 is at its desired position within the array. As shown in FIGS. 6 and 7, this position occurs when the solar panel frame 802 is essentially upright on top of the rail R. Full engagement between two frames 802 and a single clamp 900 occurs when two solar panel frames 802 are upright on top of the rail, with their respective clamp cavities 906 engaged with the mounting lips 904A, 904B.

The upward force resulting from the rotation of the frame 802 against the clamp 900, and specifically against the mounting lips 904A, 904B, allows for a unique mounting process and methodology. The panel frames 802 may be installed into the clamps 900 after the clamps 900 are securely fixed and connected to the rails R or other support structures. This eliminates the need to place the panels in the correct location on the support structures or rails R before tightening the clamps. This allows easier access to the clamps 900 for tightening because the installer no longer needs to reach over the panel to tighten the clamps 900. Additionally, the mounting lips may be preset at a height above the rail R or other support structure such that the clamp 900 can be slidingly moved along the mounting structure toward a frame 802 that is already in its desired final location on the mounting structure. Here, an installer slides the clamp 900 along the mounting structure until one of the mounting lips 904A, 904B extends into the cavity 832, and the concave recesses 906A, 906B receives and captures their respective convex lip 833. Then, another panel can be installed and rotated into the clamp 900 as described above. This process can be repeated until all adjacent panels in a row or column have been installed. This additional methodology can improve the ease of installation, reduce the time and labor required to complete the installation, eliminate the use of tools to tighten fasteners and minimize the small parts and loose fasteners that can easily fall off the roof or other mounting surface and become lost.

Mounting Clamps

Figure 10:
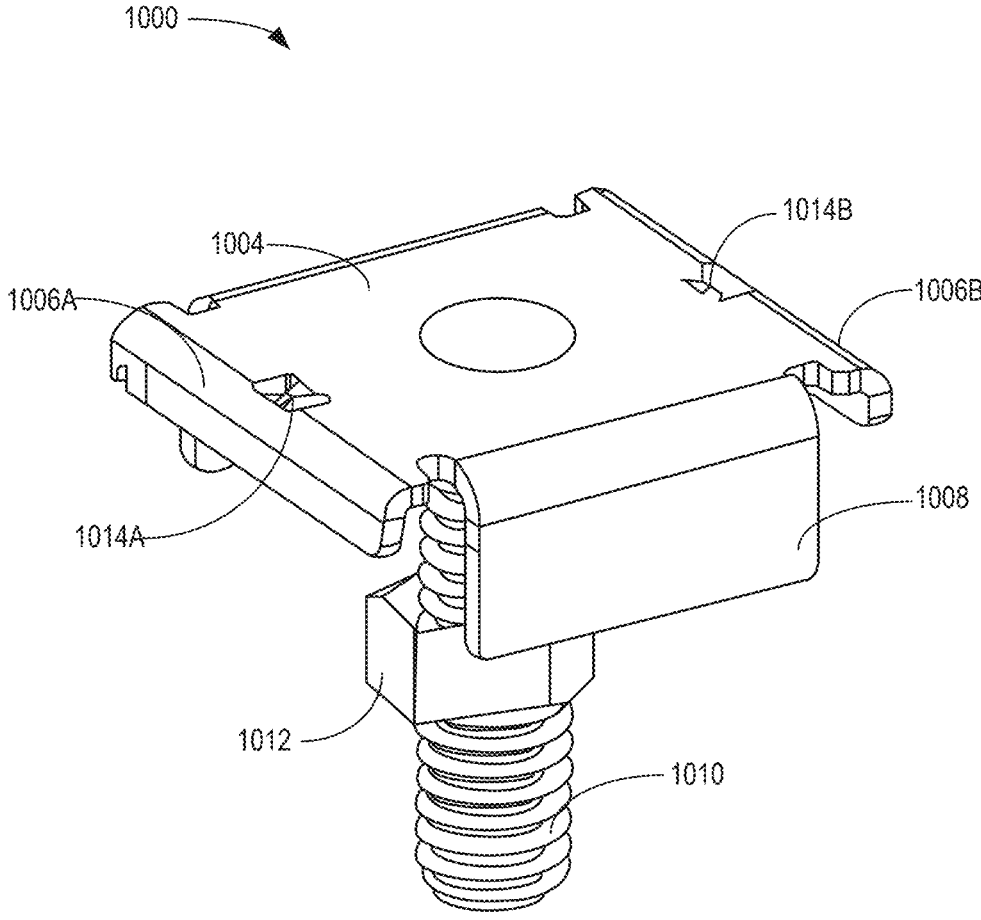
FIG. 10 is a perspective view of a mounting clamp according to one embodiment or aspect of the present disclosure.
Figure 11:
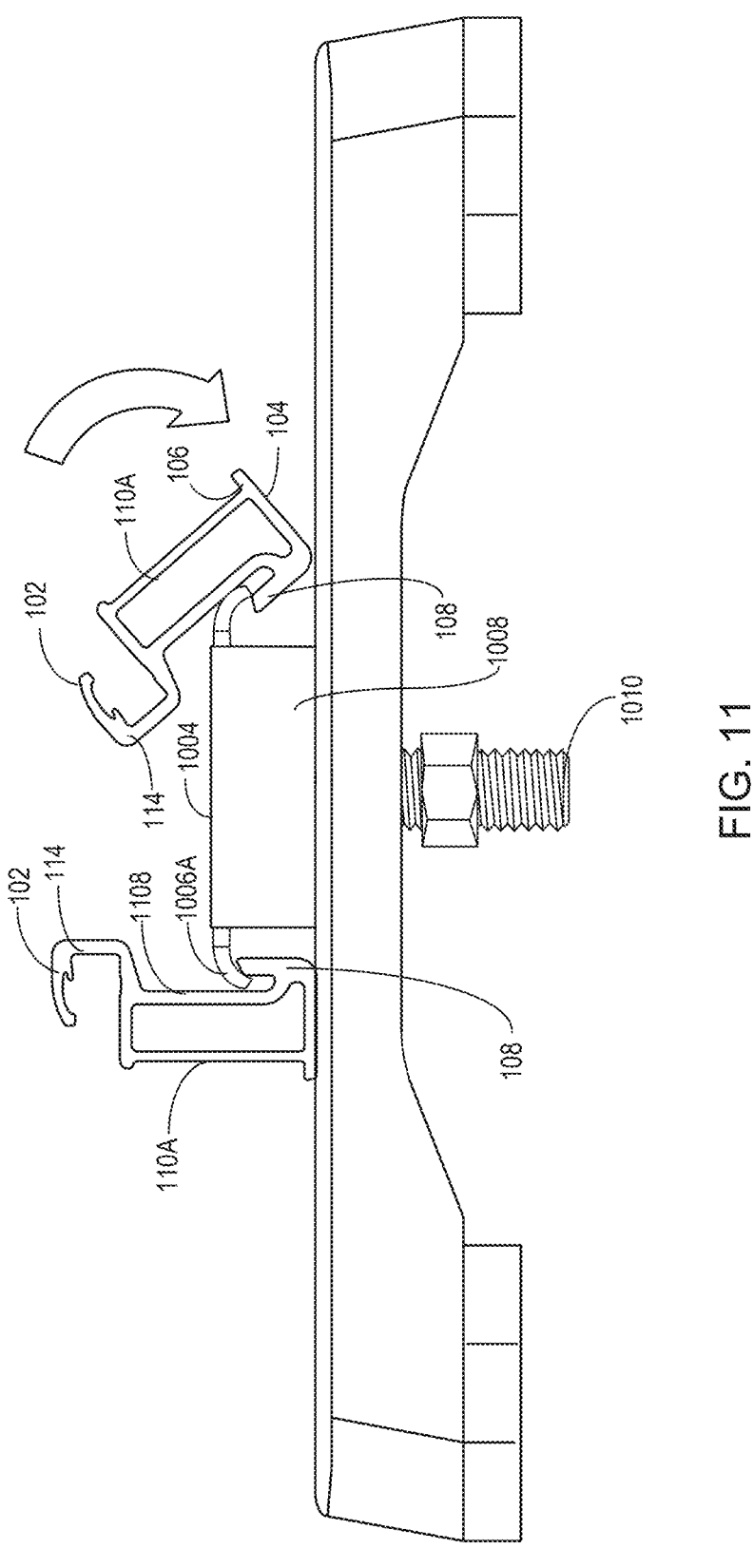
FIG. 11 is a front view of the frame of FIG. 1 being mounted to the mounting clamp of FIG. 10.
Figure 12:
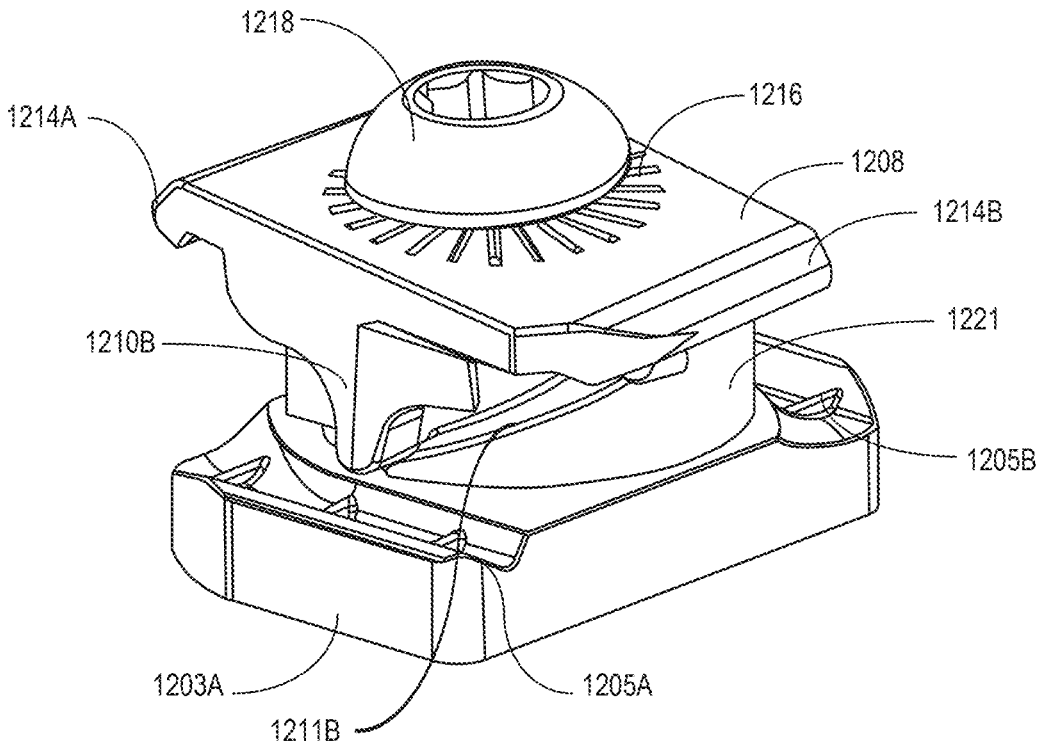
FIG. 12 is a perspective view of a mounting clamp according to one embodiment or aspect of the present disclosure.
Figure 13:
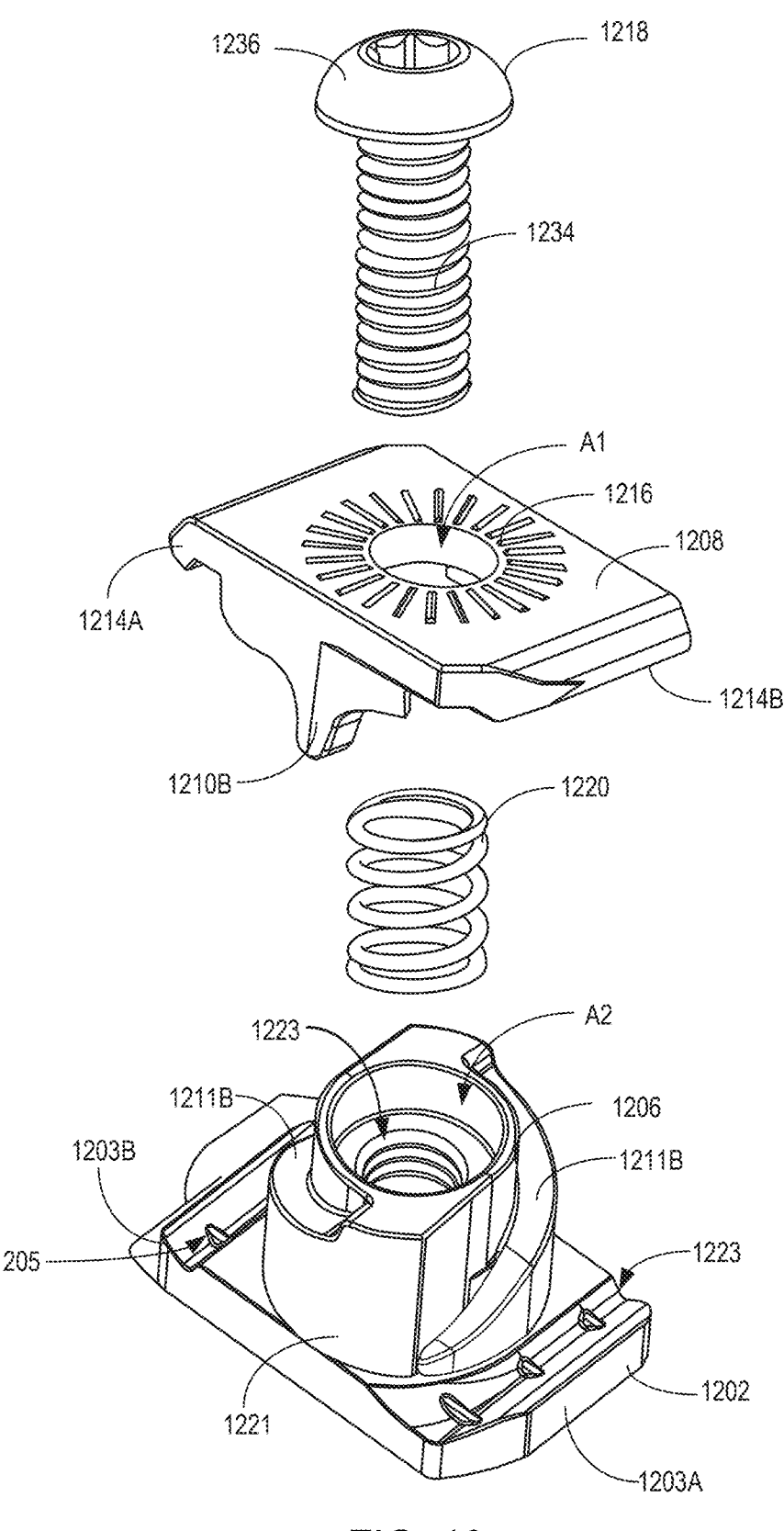
FIG. 13 is an exploded view of the mounting clamp of FIG. 12.
Figures 14, 15:
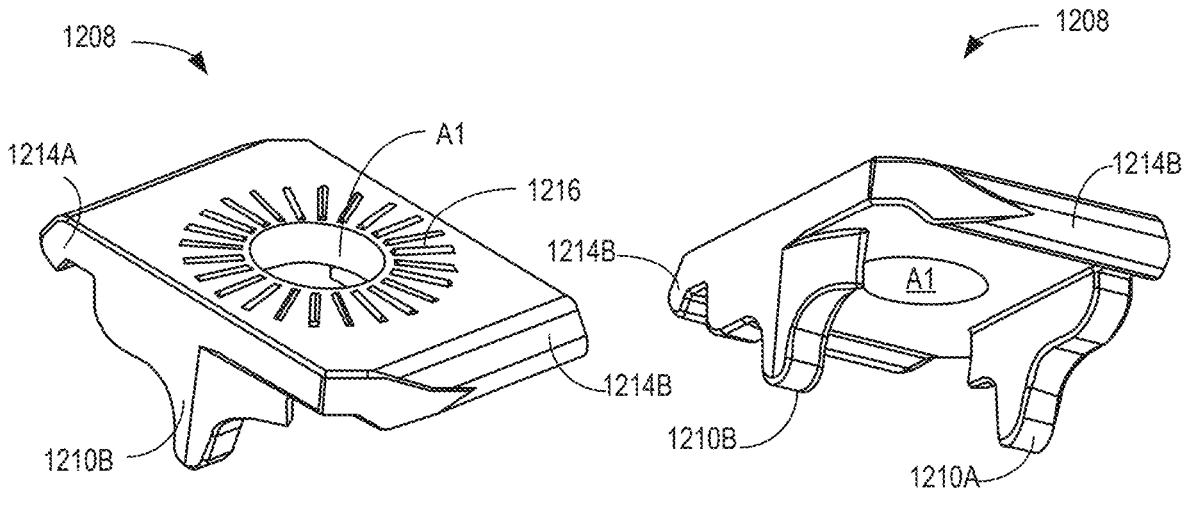
FIG. 14 is a first perspective view of a top portion of the mounting clamp of FIG. 12.
FIG. 15 is a second perspective view of the top portion of the mounting clamp of FIG. 12.
Figure 16:
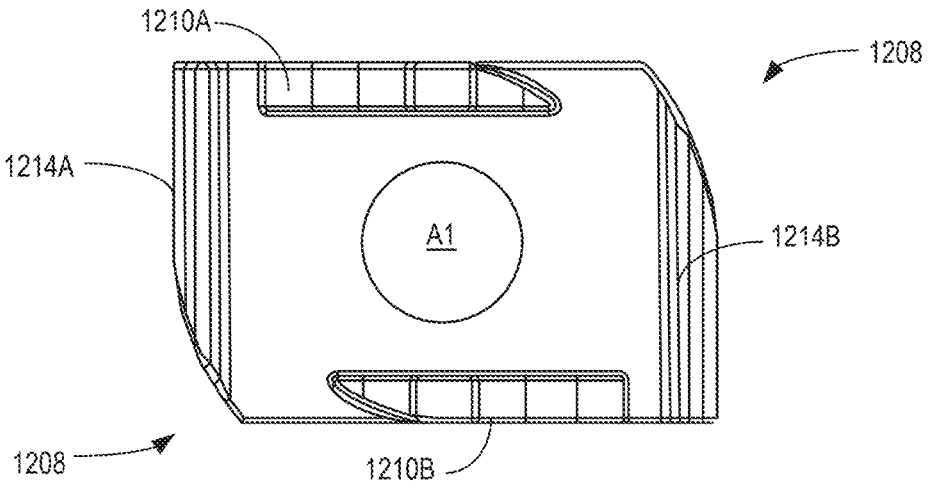
FIG. 16 is a bottom view of the top portion of the mounting clamp of FIG. 12.
Figure 17:
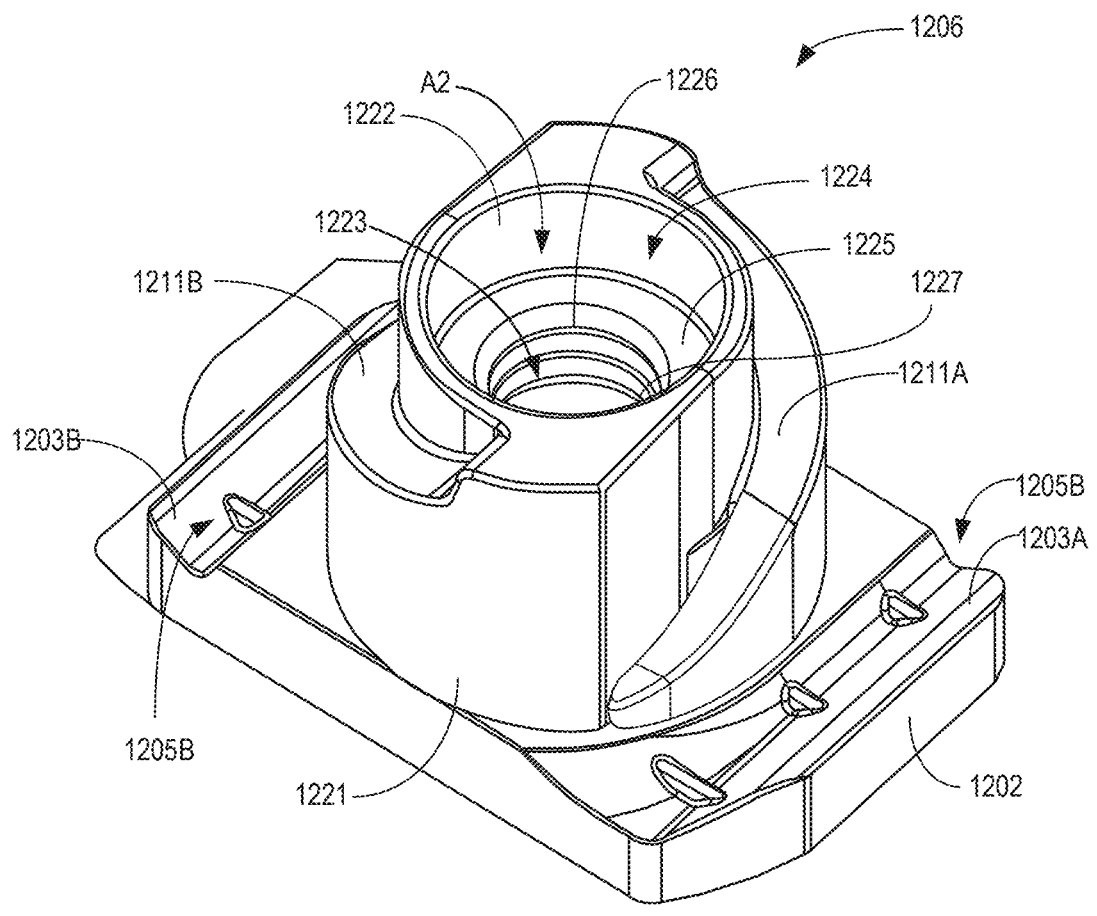
FIG. 17 is perspective view of a bottom portion of the mounting clamp of FIG. 12.
Figure 18:
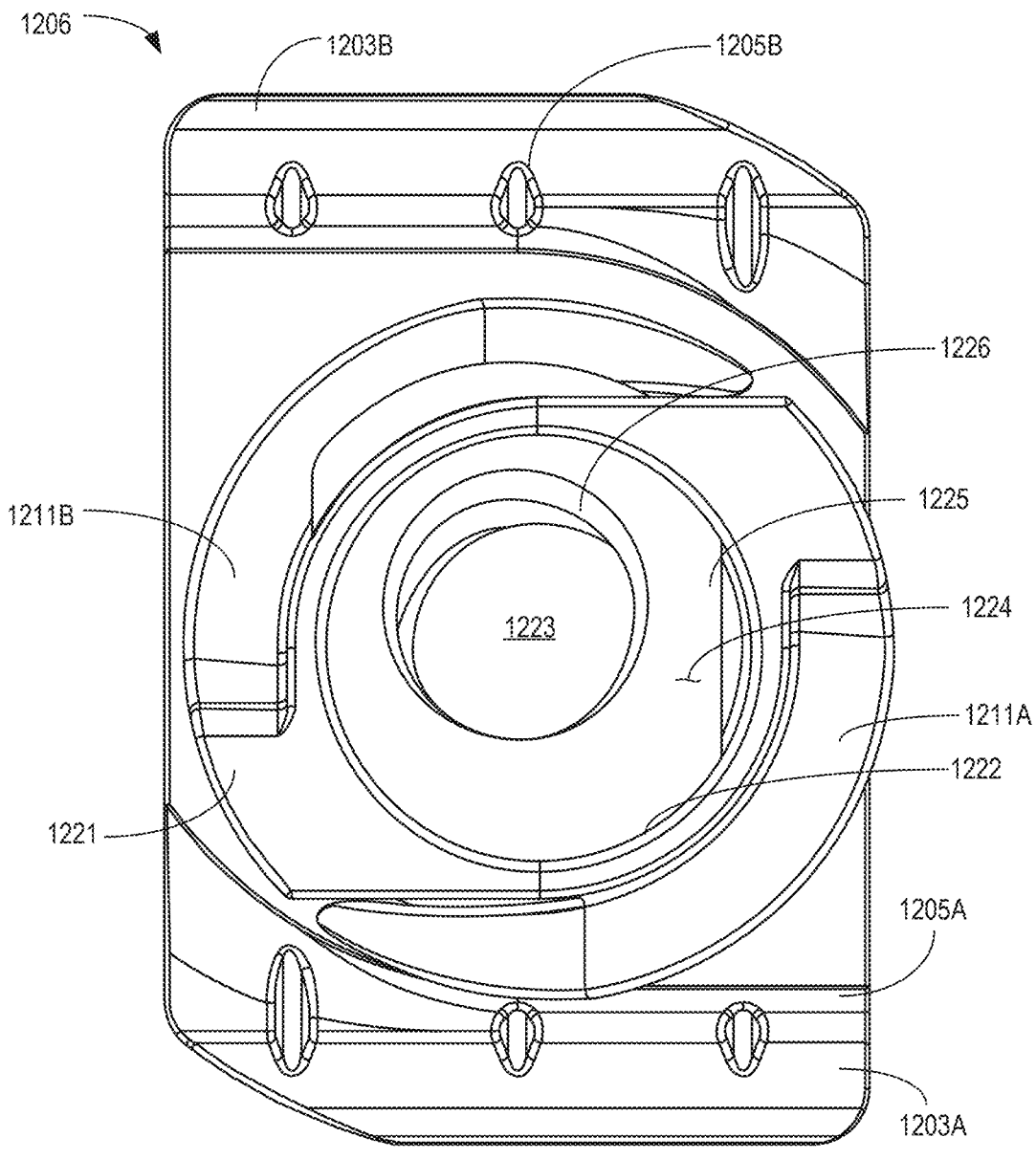
FIG. 18 is a top view of the bottom portion of the mounting clamp of FIG. 12.
Figure 19:
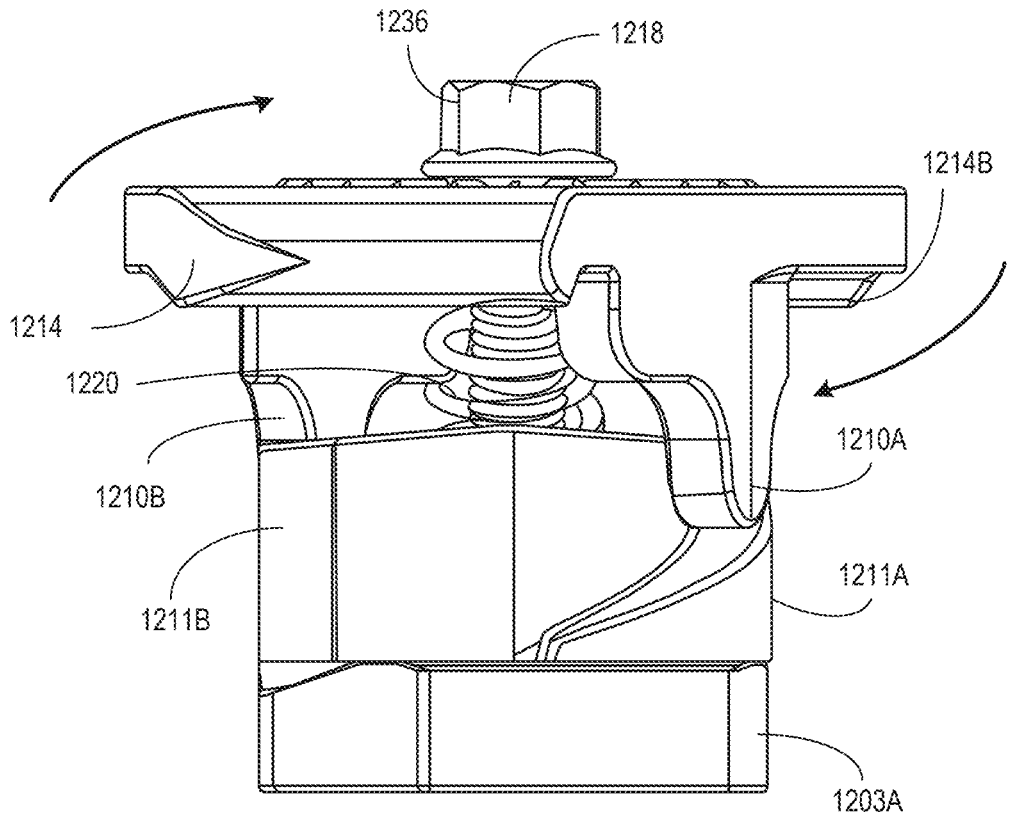
FIG. 19 is a front view of the mounting clamp of FIG. 12.

With reference to FIGS. 10 and 11 an underside fastening clamp 1000 is shown. The underside fastening clamp 1000 is shown engaging with the solar panel module frame 102 of FIG. 1, but one will understand that the other solar panel frames 202, 302, 402, 11402, 11602 can be used with the underside fastening clamp 1000 in a similar or identical manner. The underside fastening clamp 1000 has a body 1004 that is generally quadrilateral in shape. However, other shapes may be used. Extending from a first side of the body 1004 is a first mounting lip 1006A. Extending from a side of the body 1004, opposing the first side, is a second mounting lip 1006B. Both mounting lips 1006A, 1006B are shaped to be received by the clamp cavity 112 and engage with the outer lip 108 of the solar panel frame 102. The mounting lips 1006A, 1006B are shaped like hooks to engage with the outer lip 108 of the solar panel frame 102. This shape allows for the outer lip 108 or cavity 112 to have the audible or tactile engagement with the mounting lips 1006A, 1006B, which signals that the solar panel frame 1210 is mounted. On the last two sides of the clamp body 1004 are shields 1008. The shields 1008 extend lower from the body 1004 than the mounting lips 1006A, 1006B to provide cover for a fastener 1010. The shields 1008 act as spacers to fix the mounting lips 1006A, 1006B at the desired height above the mounting surface to enable the clamping function of the mounting lips 1006A, 1006B upon the panel frame 102.

The fastener 1010 is centrally located along the clamp body 1004 and extends from a bottom surface thereof. The fastener 1010 and the body 1004 may be fixed together such that they do not rotate independently of each other. A fastener nut 1012 is shown extending a bit from the top surface of the clamp body 1004 to indicate the fastener's 1010 location relative to the clamp body 1004. The fastener 1010 is arranged to allow for the underside fastening clamp 1000 to be mounted to a rail R, mounting structure, or other piece of equipment from below. A nut 1012 or other fastening device is applied to the fastener 1010 to tighten it into place against the mounting surface of the mounting structure to which the underside fastening clamp 1000 and the solar panel modules are mounted. By fastening the clamp 1000 from below, easy access to the mounting features, such as the nut 1012, can be achieved. The underside fastening clamp 1000 also includes grounding teeth 1014A, 1014B located on opposing sides of the body 1004. These teeth 1014A, 1014B bite into the outer lip 108 of the solar panel frame 102 to facilitate bonding and electrical grounding between the solar panel frame 102 and the underside fastening clamp 1000 and further to the mounting structure or rail R. It is also conceived that teeth could be added to the distal edges of the mounting lips 1006A, 1006B such that the teeth would bite into a surface of the lip 108, 208, 308, 408, 11408, 11608.

With reference to FIGS. 12-21, a mounting clamp 1200 is shown. The mounting clamp 1200 is a rotating clamp and may be referred to as such. The rotating clamp 1200 includes a base 1202, a channel 1206 extending from the base 1202, and a top portion 1208 that covers the channel 1206. The top portion 1208 defines an aperture A1, and the channel 1206 defines an aperture A2 that is aligned with aperture A1 in order to receive a fastener 1218 therethrough to connect the pieces. The fastener 1218 includes an elongated portion 1234 that is received through both apertures A1, A2 and a head 1236 that rests against the top portion 1208 around aperture A1. The fastener 1218 provides a downward force that holds the top portion 1208 against the channel 1206. A spring 1220 is held within the channel aperture A2 and fits around the fastener 1218. The spring 1220 contacts a bottom surface of the top portion 1208 and urges the top portion 1208 upwards against the force of the fastener 1218. The top portion 1208 and channel 1206 include complementary features that facilitate the operation of the rotating clamp 1200, which will be described in greater detail below.

The top portion 1208 includes a first mounting lip 1214A and a second mounting lip 1214B. The mounting lips 1214A, 1214B extend outwardly in opposing directions that are perpendicular to the axis defined by aperture A1. The mounting lips 1214A, 12014B, like the other mounting lips discussed up to this point, are configured to engage corresponding lips and cavities on solar panel frames. The top portion 1208 includes gripping ridges 1216 on a top surface that engage with the head of fastener 1218 to secure it into place when the elongated portion 1234 is received within the apertures A1, A2. The gripping ridges 1216 also serve to translate a rotational force from the fastener 1218 to the top portion 1208 as will be discussed below. The top portion has guides 1210A, 1210B that extend downward from the top surface. The guides 1210A, 1210B extend from opposing sides of the top portion 1208 that are adjacent to the mounting lips 1214A, 1214B. The guides 1210A, 1210B correspond to ramps 1211A, 1211B that are located on the channel 1206, which will now be discussed.

The channel 1206 includes a channel body 1221 about which the ramps 1211A, 1211B extend. The channel body 1221 defines aperture A2 and includes a sidewall 1222 that defines a fastener channel 1223 for receiving the elongated portion 1234 of the fastener 1218. The fastener channel 1223 includes a stepped space 1224, defined by a step 1225 and the sidewall 1222, and a threaded space 1226, below the stepped space 1224, where the sidewall 1222 is threaded for engaging corresponding threads on the fastener 1218. The stepped space 1224 has a diameter wider than that of the threaded space 1226. The stepped space 1224 provides greater space to hold the spring 1220. In particular, the spring 1220 may be supported by the step 1225, with the sidewall 1222 of the stepped space 1224 surrounding the spring 1220. In this arrangement, the stepped space 1224 is sized to support the spring 1220, and the threaded space 1226 is sized to engage the fastener 1218.

The channel 1206 may be formed integrally or keyed with the base 1202, meaning the channel 1206 and base 1202 cannot rotate relative to each other. The base 1202 is wide enough to be supported within a rail R, as partially shown in FIG. 21. The base 1202 includes base wings 1203A, 1203B that extend from opposing sides about the channel 1206. The ends of the base wings 1203A, 1203B define slots 1205A, 1205B that are configured to engage with portions of the rail R to further stabilize the rotating clamp 1200 within the rail R. Examples of these portions may be a corresponding groove or channel located within the rail R so that the base 1202 may function as a channel nut within the rail R.

Figure 20:
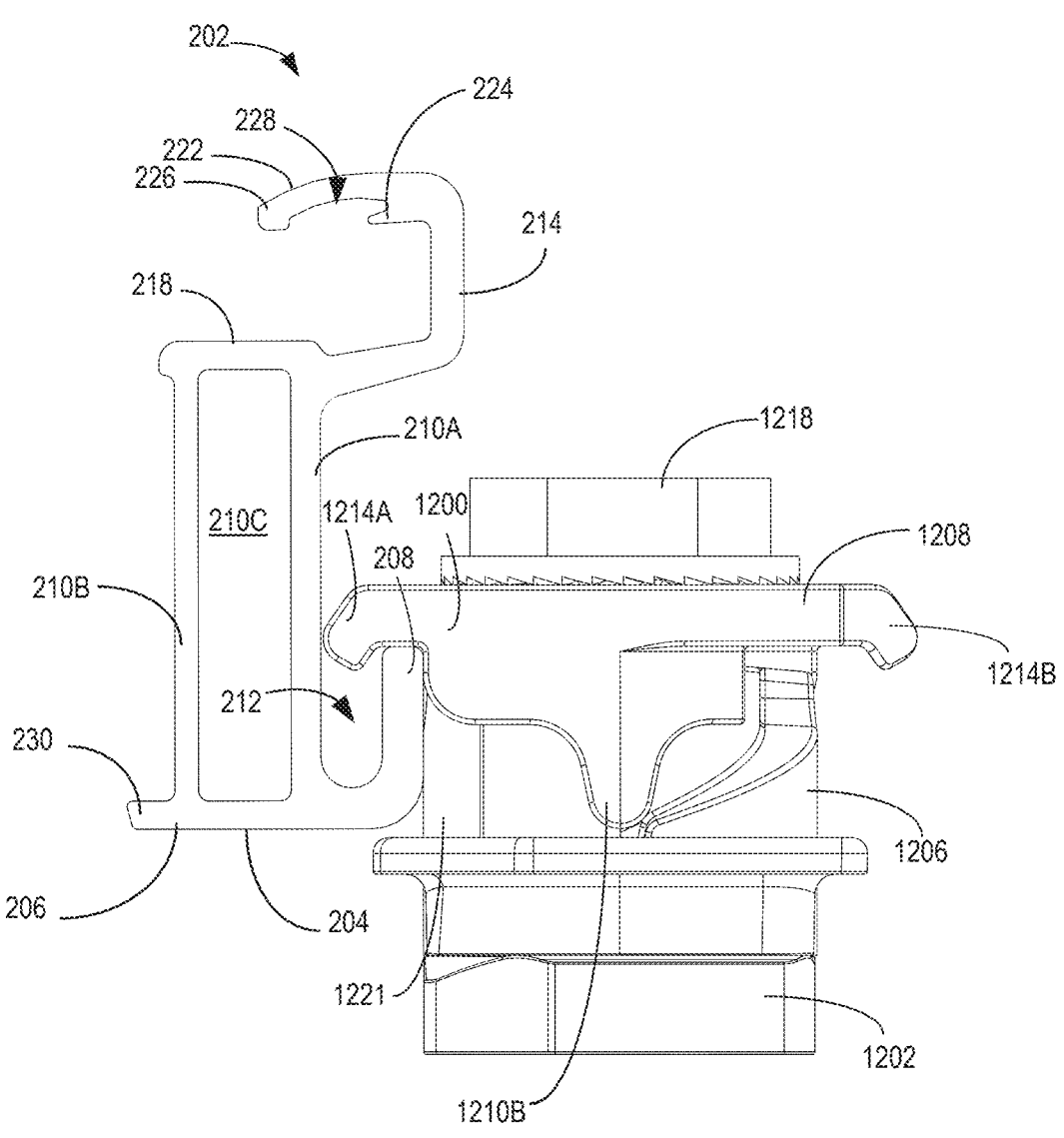
FIG. 20 is an exemplary side view of a solar panel frame mounted to the mounting clamp of FIG. 12.
Figure 21A:
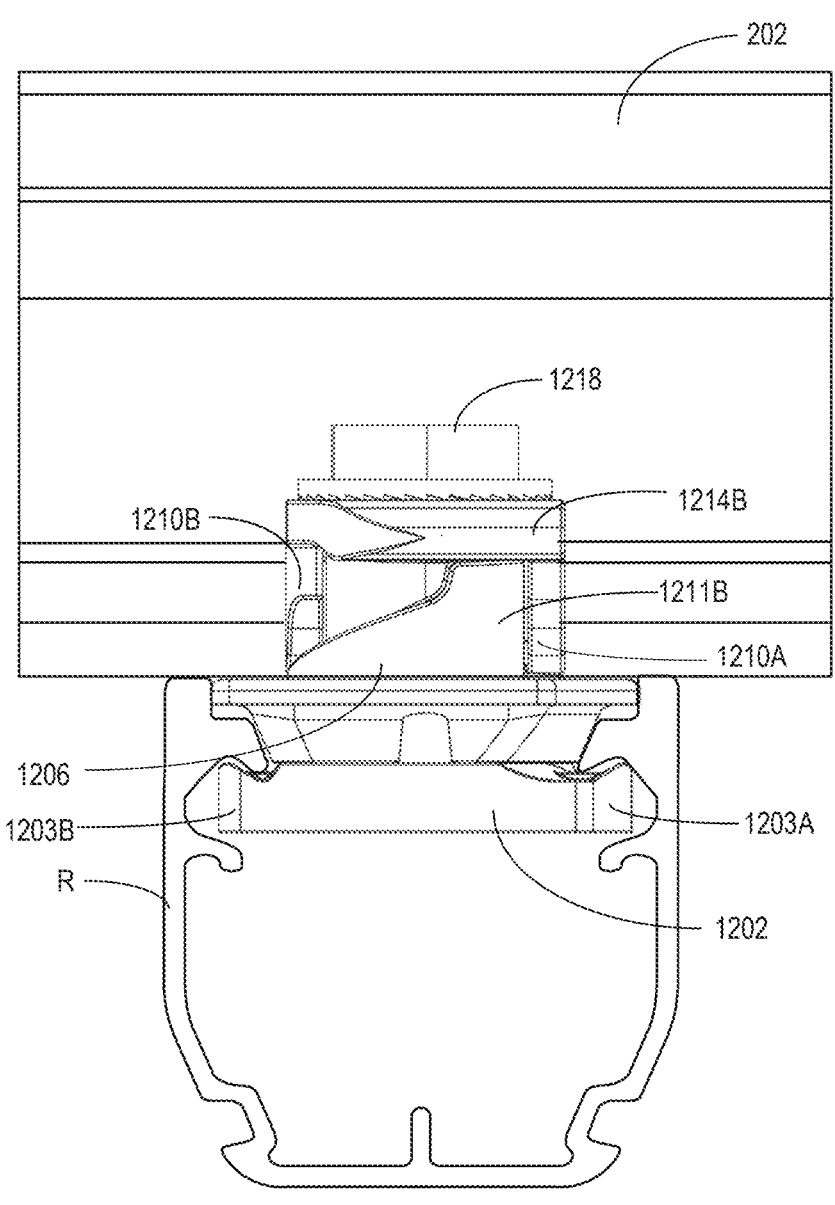
FIG. 21A is a side view of a solar panel frame and the mounting clamp of FIG. 12 applied to a mounting rail in a solar panel system.
Figure 21B:
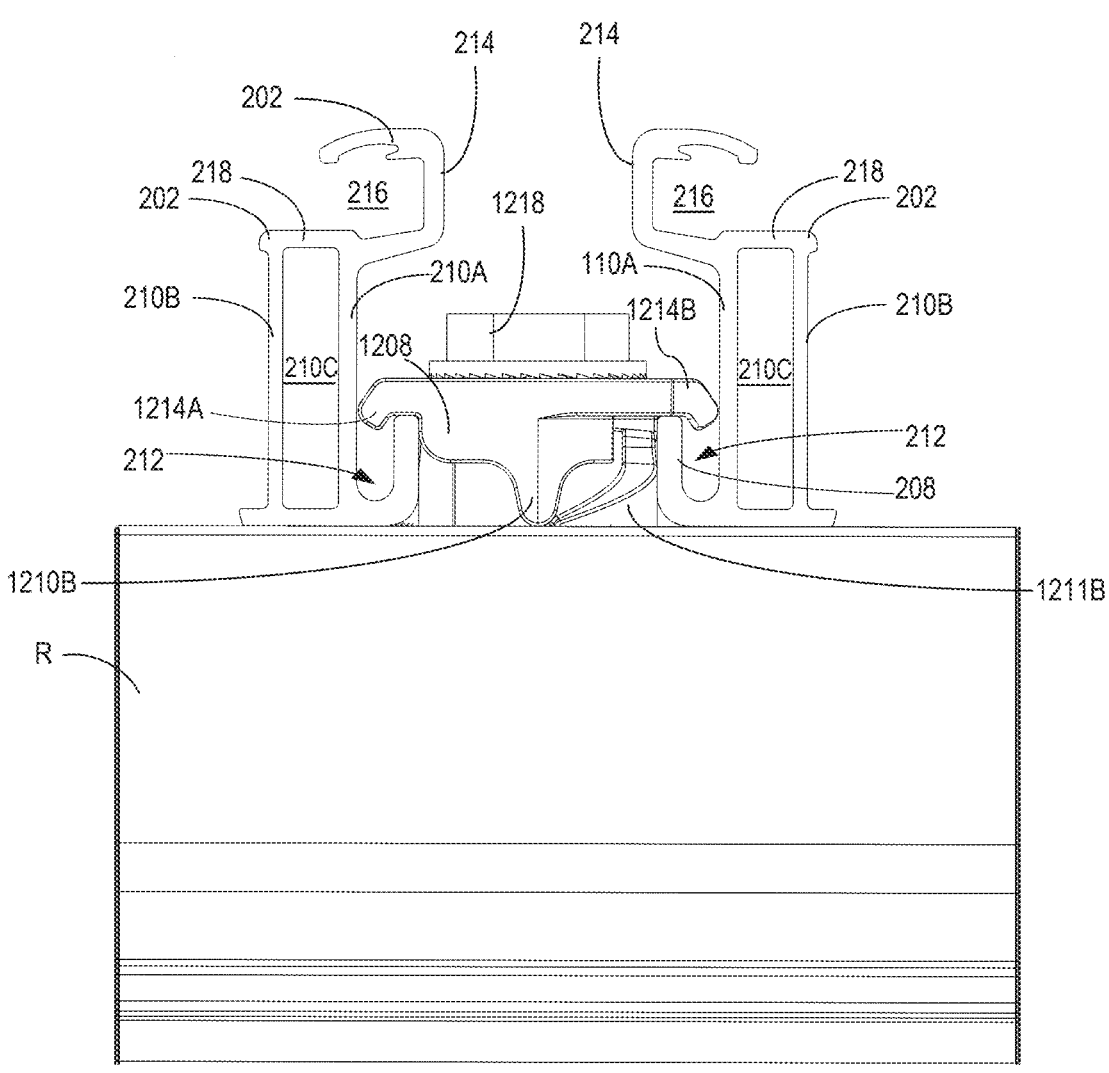
FIG. 21B is a front view of the solar panel frame and mounting clamp applied to the mounting rail in FIG. 12.
Figure 22:
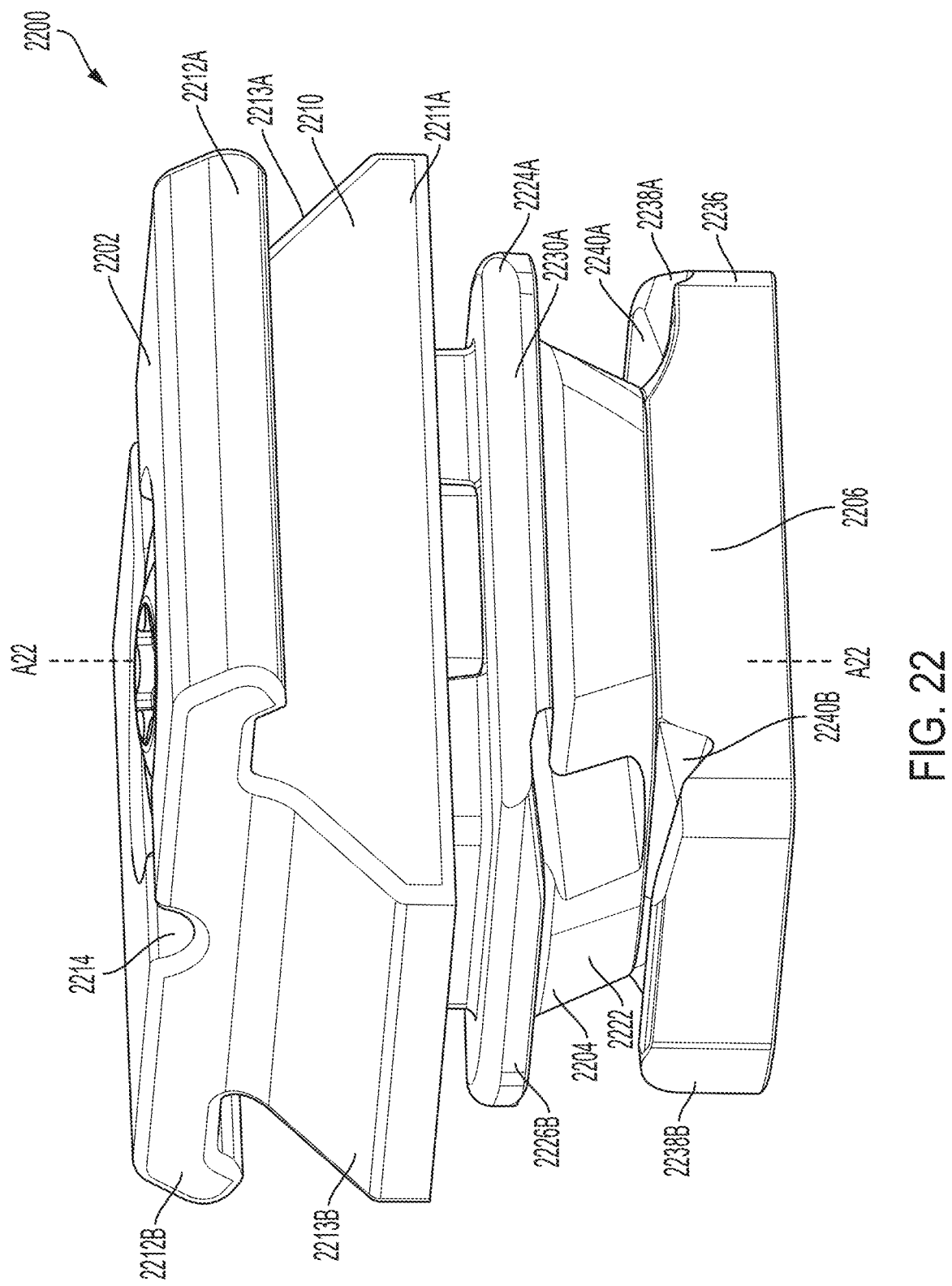
FIG. 22 is a perspective view of a mounting clamp according to one embodiment or aspect of the present disclosure.
Figure 23:
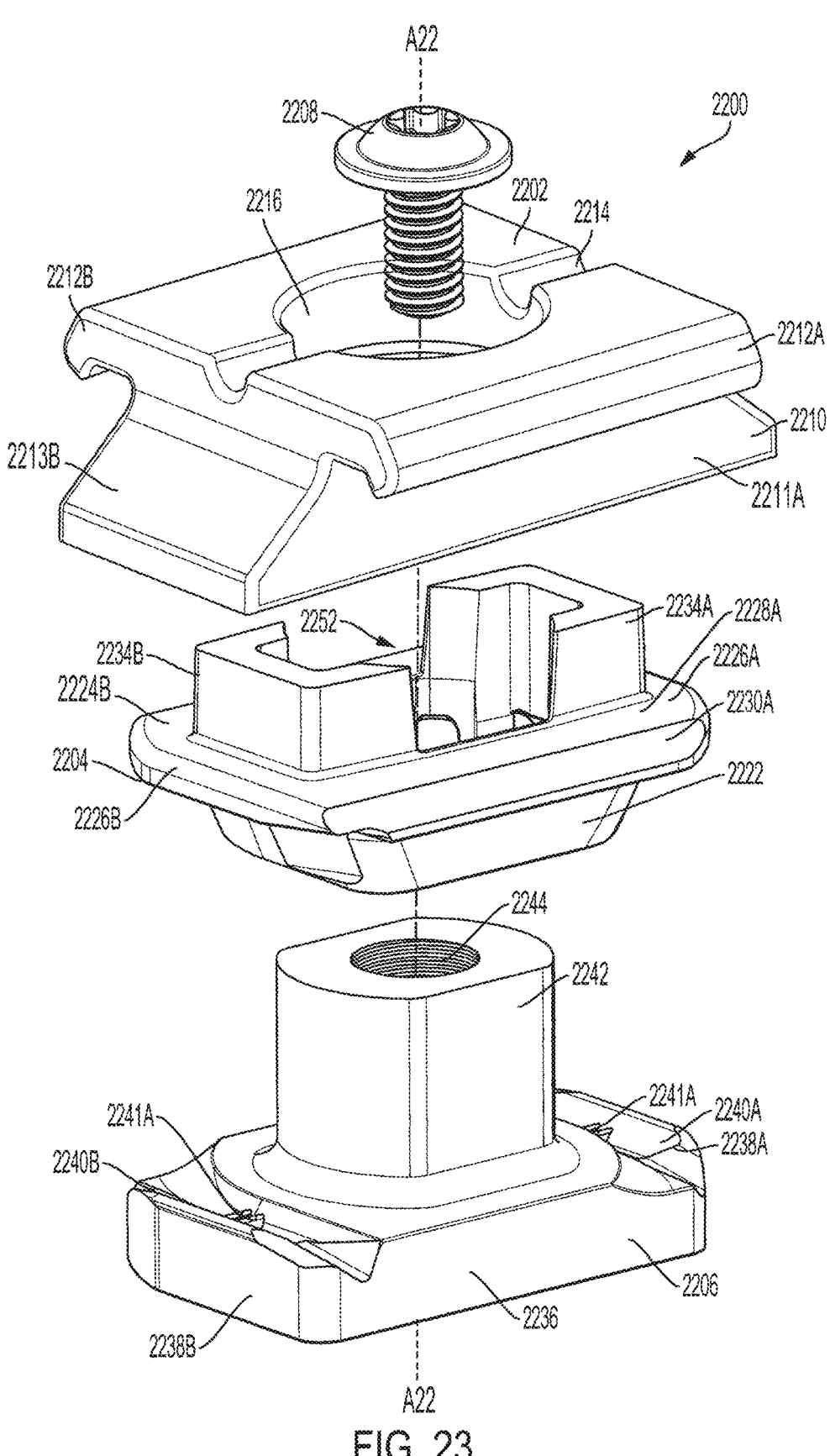
FIG. 23 is an exploded view of the mounting clamp of FIG. 22.
Figure 24:
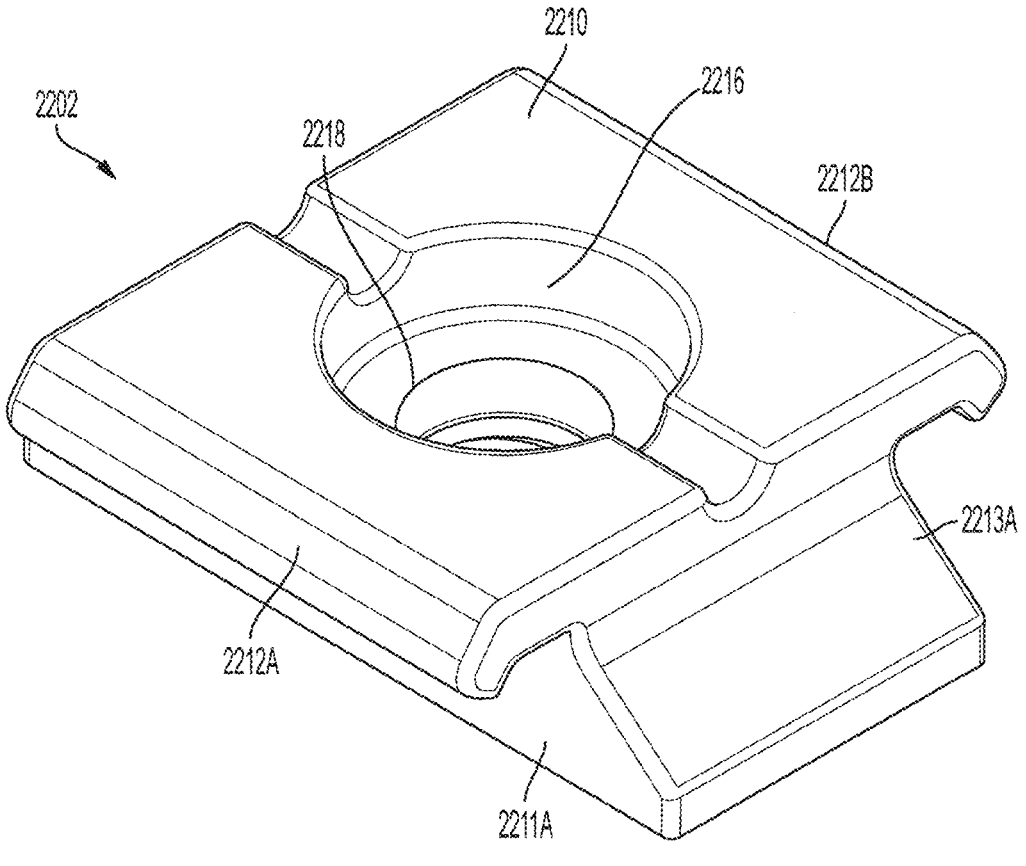
FIG. 24 is a perspective view of a top portion of the mounting clamp of FIG. 22.
Figure 25:
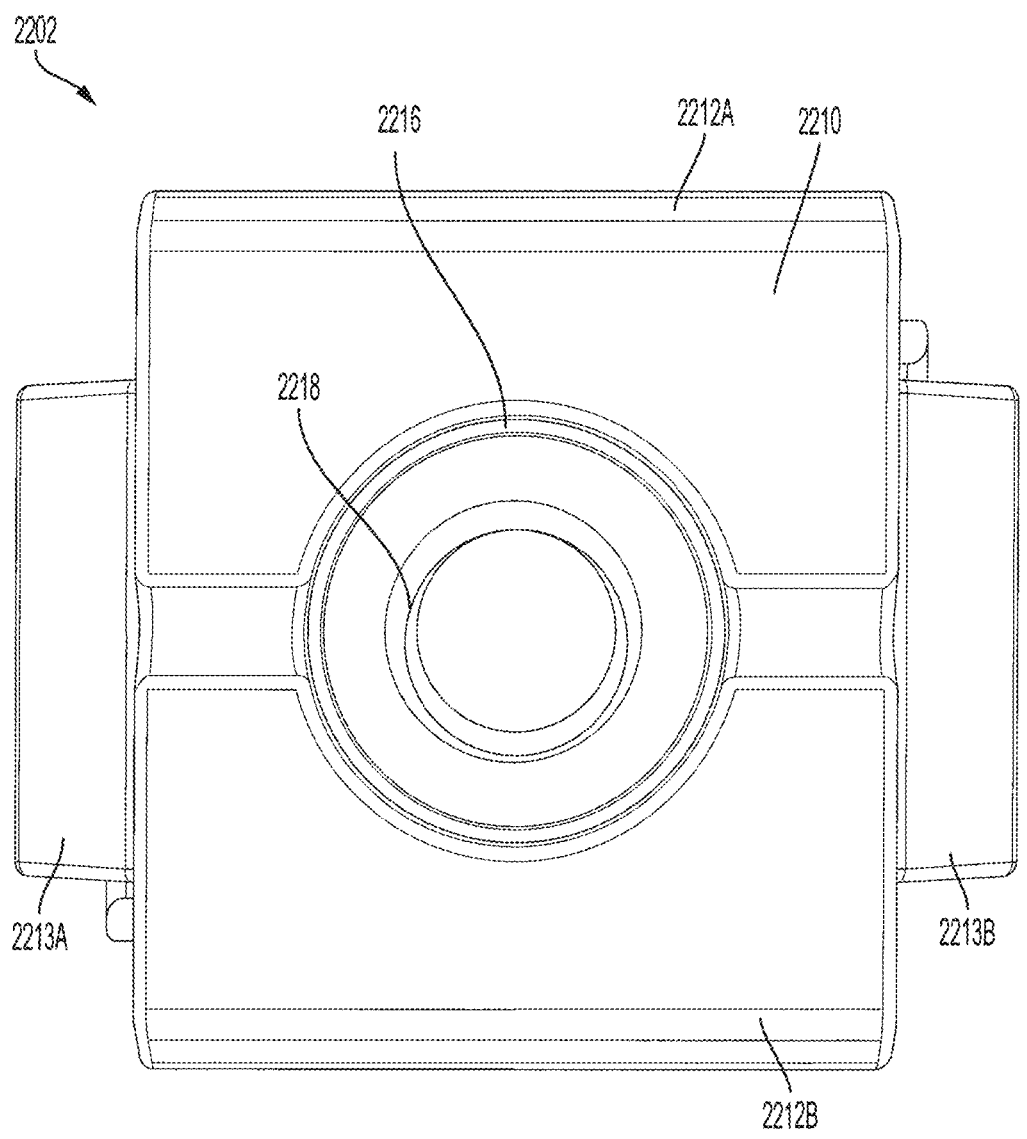
FIG. 25 is a top view of the top portion of the mounting clamp of FIG. 22.
Figure 26:
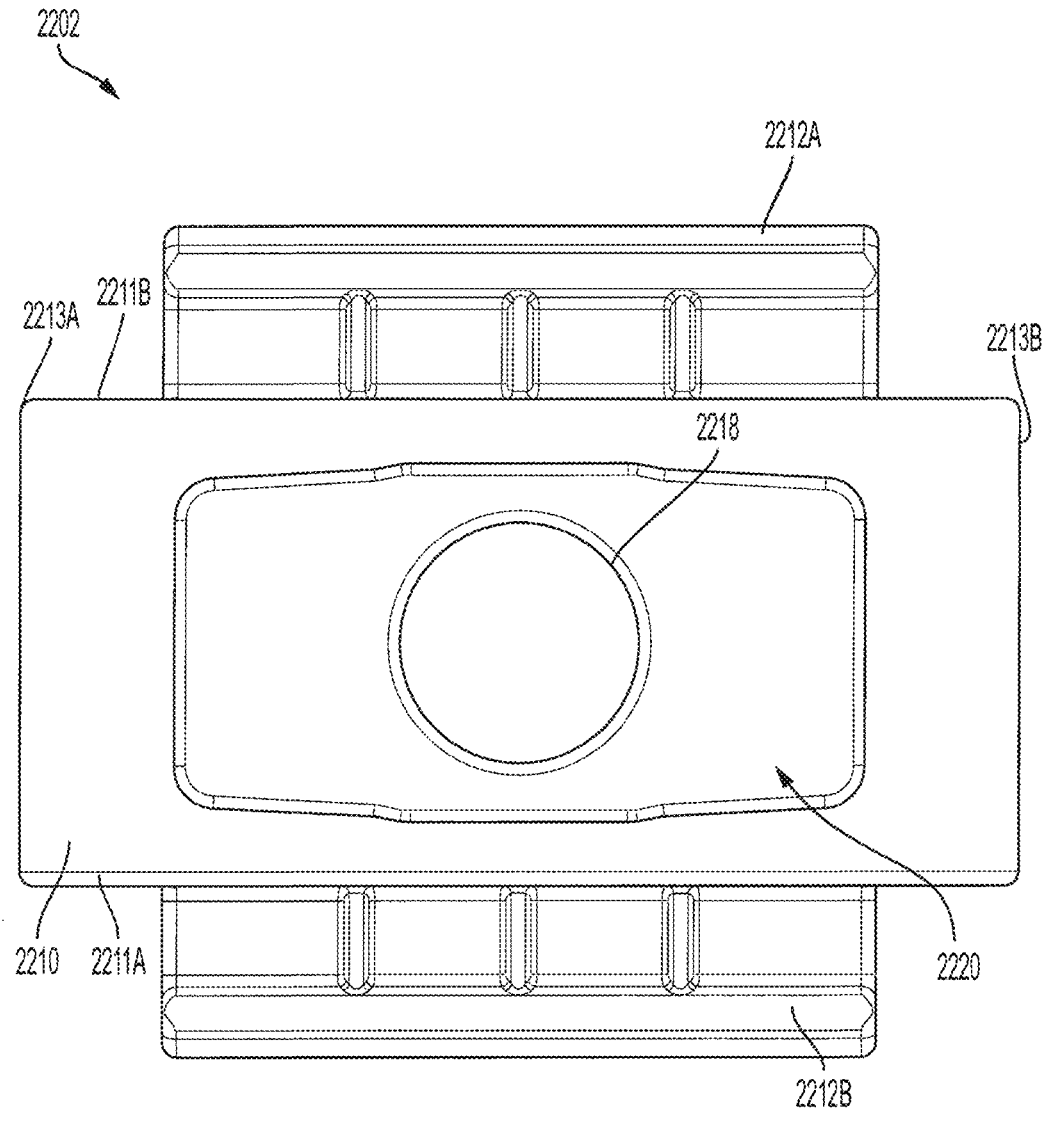
FIG. 26 is a bottom view of the top portion of the mounting clamp of FIG. 22.
Figure 27:
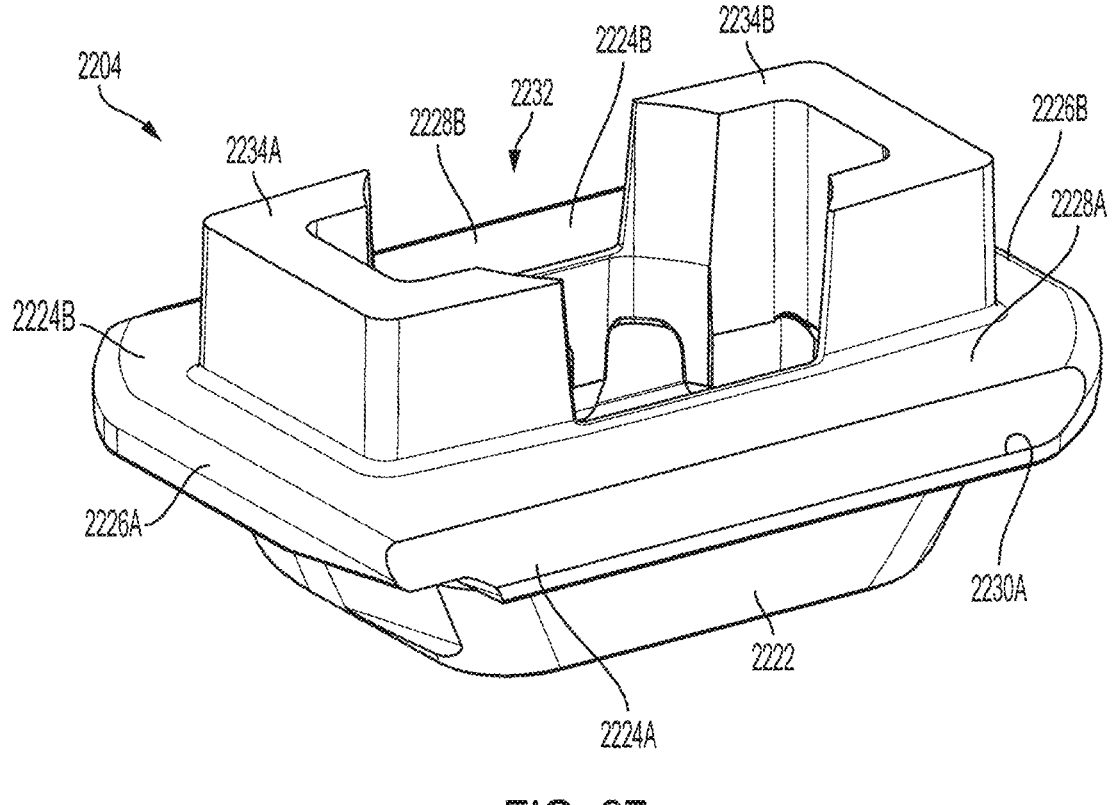
FIG. 27 is a perspective view of a middle portion of the mounting clamp of FIG. 22.
Figure 28:
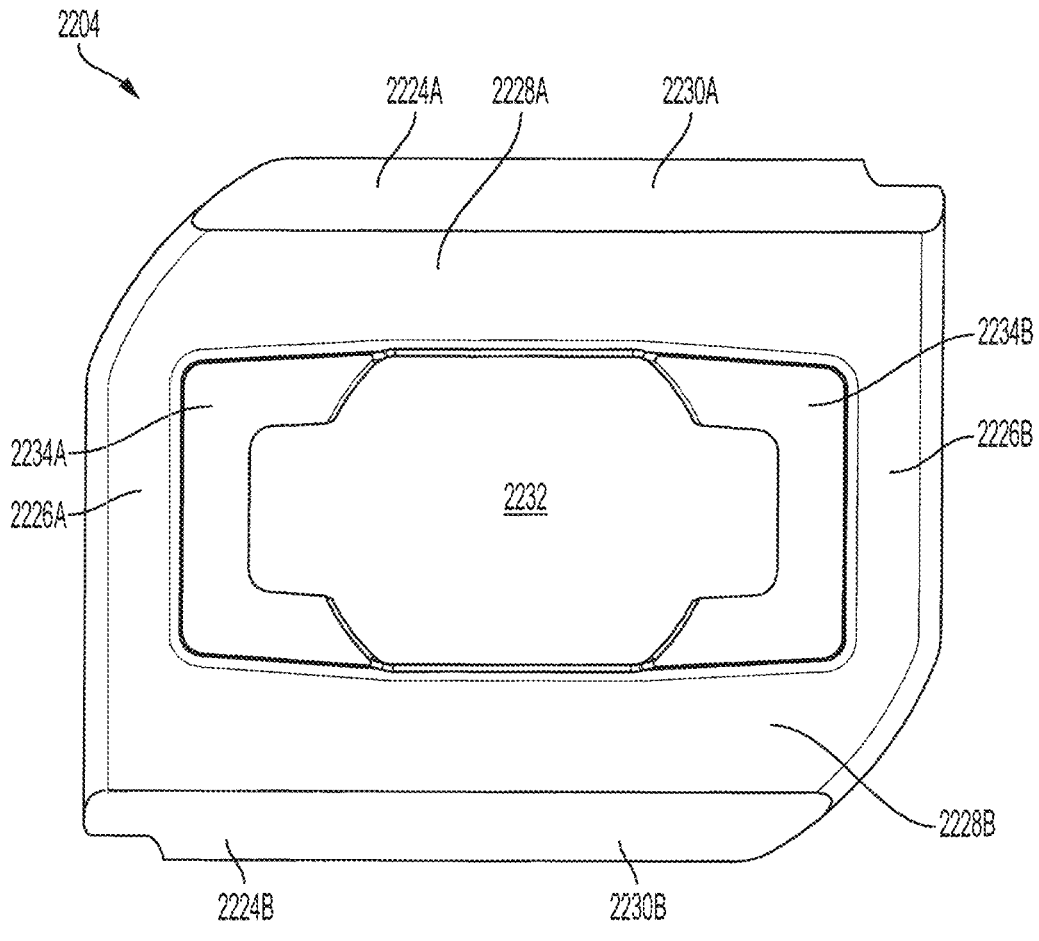
FIG. 28 is a top view of the middle portion of the mounting clamp of FIG. 22.
Figure 29:
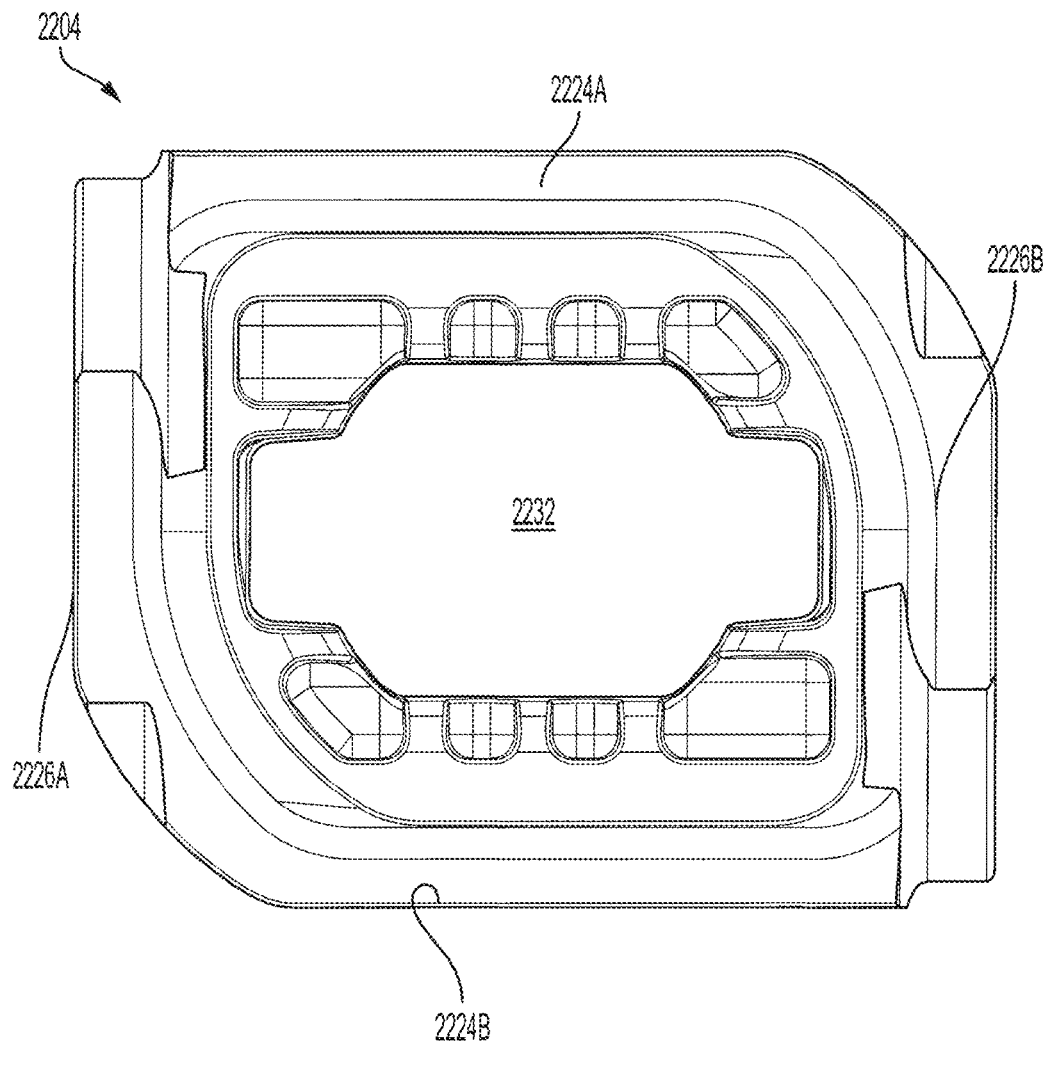
FIG. 29 is a bottom view of the middle portion of the mounting clamp of FIG. 22.
Figure 30:
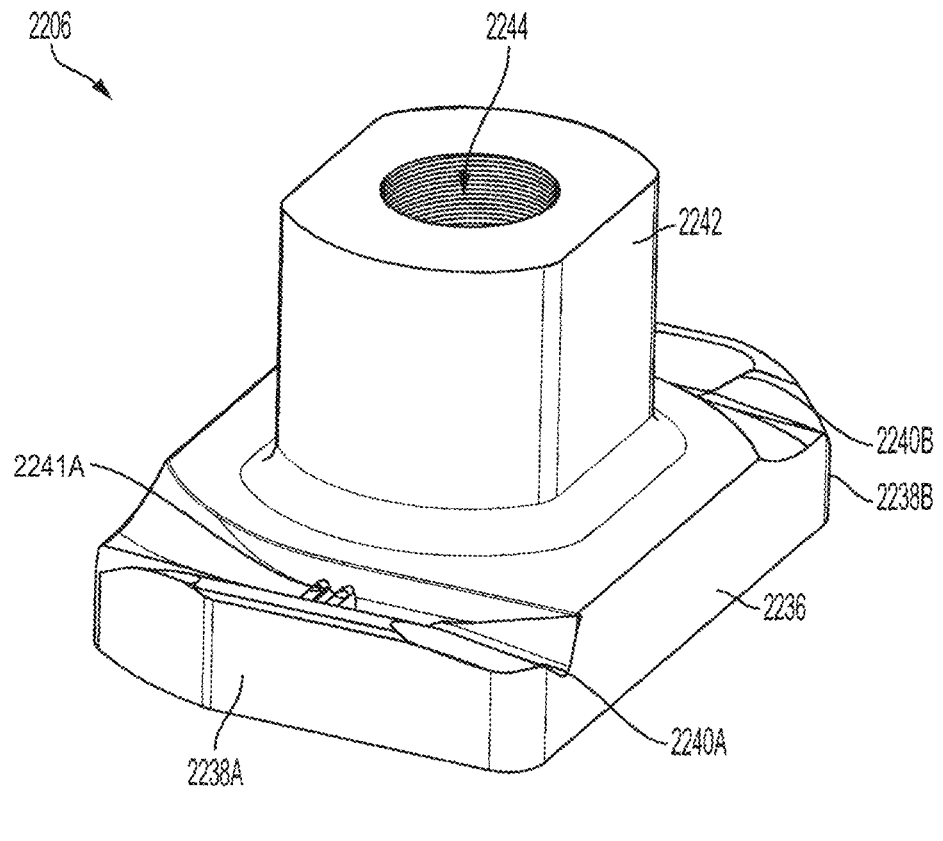
FIG. 30 is a perspective view of a bottom portion of the mounting clamp of FIG. 22.

The rotating clamp 1200 operates as a result of action between features of the channel 1206 and the top portion 1208. The first ramp 1211A and the second ramp 1211B extend around the channel body 1221. The ramps 1211A, 1211B may extend symmetrically around the channel body 1221 or asymmetrically, so long as they function as described herein. The ramps 1211A, 1211B increase in height circumferentially about the channel body 1221, until they terminate at approximately the same height as the highest surface of the channel body 1221. The first guide 1210A and the second guide 1210B correspond to the ramps 1211A, 1211B. As the fastener 1218 is tightened by rotating the elongated portion 1234 through the threaded space 1226 of the fastener channel 1223, the top portion 1208 is urged downward toward the base 1202 and the guides 1210A, 1210B engage the circumferentially sloping top surfaces of the ramps 1211A, 1211B which urges the top portion 1208 to rotate around the channel 1206. This downward force created by the tightening of the fastener 1218 acts against the upward force created by the spring 1220, which is discussed below. When the top portion 1208 is at its lowest position relative to the other elements of the clamp 1200 and the fastener 1218 is fully engaged with the threaded space 1226, the mounting lips 1214A, 1214B are arranged for proper engagement with one or more solar panel frames. This is identified as the engaged position and is shown in FIGS. 20-21B. In this engaged position, the first guide 1210A is proximate to the lowest point on the ramp 1211A, the second guide 1210B is proximate to the lowest point on the ramp 1211B and the top of the channel 1206 acts as a stop against the downward movement of the top portion 1208. The surfaces adjacent to the lowest points of the ramps 1211A, 1211B are typically flat, so that the top portion 1208 cannot rotate any lower relative to the channel 1206. In the engaged position, the top portion 1208 is held in place by the fastener 1218, with the gripping ridges 1216 providing anti-rotational forces to the head 1236 of the fastener 1218 to help keep it in place.

In the engaged position, the top portion 1208 is supported at the proper engagement height above the base 1202 and mounting surface when the bottom surface of the top portion 1208 contacts and is supported by the top surface of the channel body 1221. This determines the fixed height and rotational orientation of the top portion 1208 above the base 1202. In the engaged position, the mounting lips 1214A, 1214B extend outwardly from the top portion 1208 in a direction that is perpendicular to the direction in which the base wings 1203A, 1203B extend outwardly from the base 1202.

The perpendicular orientation between the mounting lips 1214A, 1214B and the base wings 1203A, 1203B allows the mounting lips 1214A, 1214B to engage the outer lips or cavity of preferably one or two and, conceivably, up to four solar panel frames, while the base wings 1203A, 1203B engage flanges of the mounting structure. As discussed in connection with mounting clamp 1000, the mounting structure may be a rail R, which is shown in FIGS. 21A and 21B. It is also conceived that the mounting structure could have flanges or other engaging portions oriented differently such that the relationship between the base wings 1203A, 1203B and the mounting lips 1214A, 1214B may be oriented in other directions than as shown in the figures. This may be desirable for mounting structures for shared rail or rail free mounting structures.

When installing the clamp 1200, the clamp 1200 comes preassembled in the engaged position, typically by the manufacturer and delivered to the installation site ready to install. The installer is able to insert the base 1202 into the open channel of the mounting structure by orienting the assembled clamp 1200 so that the base wings 1203 engage the mounting structure flanges. In this stable position within the rail R or mounting structure, the clamp 1200 is slideable along the groove or channel of the rail R. The installer then slides the clamp 1200 to its desired position within the rail R or mounting structure, where it is secured in place against the rail R. Then, an installer may rock or rotate a desired panel module, which includes one of the solar panel frames discussed above, as shown the solar panel frame 202 from FIG. 2 is used. The rocking engages the outer lip 208 with one of the mounting lips 1214A, 1214B on the rotating clamp 1200, with the base 1202 supported by the rail R or mounting feature. Mounting may also occur by sliding the clamp 1200 along the rail R or mounting structure to a location where the solar panel frame 202 is already in place. At that location, one mounting lip 1214A can engage an outer lip 208. Then, a second solar panel frame 202 may be attached by using the rocking and rotating method previously described.

To remove a solar panel module, the fastener 1218 is loosened. When the fastener 1218 is loosened, the spring force urges the top portion 1208 upwards. As the top portion 1208 is forced upward by the spring 1220, the gripping ridges 1216 engage serrations on the head 1236 of the fastener 1218 to facilitate the simultaneous rotation of the top portion 1208 and fastener 1218. Though not shown, the spring 1220 may be a torsional spring. The torsional spring 1220 additionally urges the reverse rotation of the top portion 1208. This rotation occurs as a result of the engagement between the guides 1210A, 1210B and the ramps 1211A, 1211B. The guides 1210A, 1210B rotate about the channel 1206 due to their contact with the ramps 1210A, 1210B. This disengages the mounting lips 1214A, 1214B from the outer lip 208 of the solar panel module frame 202, allowing for the solar panel module to be removed from the clamp 1200 and rail R.

When the top portion 1208 has been displaced relative to the channel 1206, so that the solar panel modules can be removed from the clamp 1200, the clamp 1200 is said to be in the disengaged position. This shown in FIG. 19. In the disengaged position, the mounting lips 1214A, 1214B extend in a direction that is no longer perpendicular or is generally parallel to the direction in which the base wings 1203A, 1203B extend from the base 1206. This transition between the engaged position and disengaged position allows maintenance to be performed on one or more solar panel modules in an array. To access a single solar panel module, the clamps located along one side of the module can have their respective fasteners 1218 loosened, so that the clamps 1200 transition from the engaged position to the disengaged position. Then, the single solar panel module can be pulled out of the solar panel array, as one side of that module is no longer clamped into place. To replace the solar panel module within the array, the frame 102 can be rocked and rotated into place against the clamps 1200 that are still in the engaged position, which are the clamps opposing the clamps 1200 that were transitioned into the disengaged position. When the solar panel module is in place against the rail R or mounting structure, the loosened fasteners 1218 can be tightened again, and the disengaged clamps 1200 move to their engaged position, engaging one of their mounting lips 1214A, 1214B with the solar panel frame 102.

With reference to FIGS. 22-33B, another embodiment of a rotating mounting clamp 2200 is shown. The clamp 2200 includes a top portion 2202, a middle portion 2204, and a base 2206. The top portion 2202, middle portion 2204, and base 2206 are aligned along a shared axis A22. A fastener 2208 is used to secure the top portion 2202, middle portion 2204, and base 2206 together, and the fastener 2208 is also aligned along the shared axis A22. The connection between the fastener 2208 and the other elements of the clamp 220 will be discussed in greater detail below.

As shown in FIGS. 22-26, the top portion 2202 includes a body 2210 that, as shown, generally has a cross-sectional shape of a trapezoidal pyramid in one direction, and a rectangular cross-sectional shape in another direction. The body 2210 includes two vertical sidewalls 2211A, 2211B and two angled sidewalls 2213A, 2213B. The angled sidewalls 2213A, 2213B extend outward a distance equal to or beyond features of the middle portion 2204 and base 2206. Extending from a top of the body 2210 are mounting lips 2212A, 2212B. The mounting lips 2212A, 2212B extend outwardly from the vertical sidewalls 2211A, 2211B in opposing directions that are perpendicular to the shared axis A22 of the clamp 2200. The mounting lips 2212A, 2212B, like the other mounting lips discussed up to this point, are configured to engage corresponding lips and cavities on solar panel frames.

Along a top surface of the body 2210 is a groove 2214, extending perpendicular to the shared axis A22 and parallel to the ends of the mounting lips 2212A, 2212B. In a central portion of the body 2210, along the groove 2214, a depression 2216 extends slightly partially into the body 2210. Within the depression 2216 is an aperture 2218 that extends through the body 2210 for receiving the fastener 2208 therein. The aperture 2218 may be threaded to facilitate engagement with the fastener 2208, or the aperture 2218 may not have thread and can be arranged as a clearance hole, so as to allow for some rotation of the top portion 2202 relative to the base 2206 which allows the clamp 2200 to be properly mounted to a first module frame 202 and then allows for a second module frame 202 to be subsequently mounted to the clamp 2200. The mounting will be discussed in greater detail below. This rotation may help to facilitate the installation of the clamp 2200, which will be discussed in greater detail below. The body 2210 also defines a hollow 2220 that extends from a bottom surface into the body 2210. The hollow 2220 is only accessible from the bottom surface and is configured to accept mating walls 2234A, 2234B, which are part of the middle portion 2204, and the channel 2242, which is part of the base 2206. This engagement helps facilitate the connection between the top portion 2202, middle portion 2204, and base 2206.

As shown in FIGS. 22, 23, and 27-29, the middle portion 2204 includes a body 2222. The body 2222 defines alignment flanges 2224A, 2224B and clamp support wings 2226A, 2226B. The alignment flanges 2224A, 2224B extend from opposing sides of the body 2222, and the clamp support wings 2226A, 2226B extend from the other two sides of the body 2222, also opposing each other. The alignment flanges 2224A, 2224B include a flat portion 2228A, 2228B, extending away from the body 2222 and terminate with a tapered portion 2230A, 2230B as they extend away from the body 2222. The alignment flanges 2224A, 2224B are used to arrange the clamp 2200 inside of a rail R, which will be discussed in greater detail below. The clamp support wings 2226A, 2226B have one elongated edge and one angled edge, extending in the direction of one of the alignment flanges 2224A, 2224B. The clamp support wings 2226A, 2226B are configured to help support the clamp 2200 when it is placed within the rail R, which will also be discussed below.

The alignment flanges 2224A, 2224B and the clamp support wings 2226A, 2226B at least partially define an opening 2232 that extends through the body 2222. The opening 2232 is shaped to receive the channel 2242 of the base 2206 therethrough. The features of the middle portion 2204, such as the mating walls 2234A, 2234B are arranged to prevent rotation of the channel 2242 and the base 2206 when the channel 2242 is received through the opening 2232 and the fastener 2208 is received through an aperture 2244 in the base 2206. As shown, the opening 2232 is rectangular, but other shapes can be used, so long as rotation of the channel 2242 is prevented. Also defining the opening 2232 are mating walls 2234A, 2234B. The mating walls 2234A, 2234B extend vertically upward from the body 2222, perpendicular to the top surfaces of alignment flanges 2224A, 2224B and clamp support wings 2226A, 2226B. The mating walls 2234A, 2234B are configured to be received within the hollow 2220 of the top portion 2210 to connect the middle portion 2204 to the top portion 2210. As shown, the mating walls 2234A, 2234B are C-shaped, with mating wall 2234A appearing as a forward-facing C and mating wall 2234B appearing as a backward-facing C. However, the mating walls 2234A, 2234B may take other shapes, so long as they allow for their engagement within the hollow 2220 of the top portion 2202. One part of each mating wall 2234A, 2234B extends along the length of the adjacent clamp support wing 2226A, 2226B, and two other portions extend partially along the length of the opposing alignment flanges 2224A, 2224B.

As shown in FIGS. 22, 23, 30 and 31, the base 2206 includes a body 2236. Extending from opposing sides of the body 2236 are base wings 2238A, 2238B. The ends of the base wings 2238A, 2238B define slots 2240A, 2240B that extend along the length of the wings 2238A, 2238B and are configured to engage with portions of the rail R to further stabilize the rotating clamp 2200 within the rail R. Examples of these portions may be a corresponding groove G or channel located within the rail R so that the base 2206 may function as a channel nut within the rail R. Bonding ridges 2241A, 2241B are located centrally within the slots 2240A, 2240B. As shown the bonding ridges 2241A, 2241B are disposed in pairs, with a first pair 2241A (identified by a single reference number) being disposed in the first slot 2240A, and a second pair 2241B (identified by a single reference number) being disposed in the second slot 2240B. The boding ridges 2241A, 2241B form a high point within their respective channels 2240A, 2240B, making it so that the channels 2240A, 2240B are not level and curve downward from the bonding ridges 2241A, 2241B along the length of the channels 2240A, 2240B. This allows for the base wings 2238A, 2238B to rock within the grooves G of the rail R, providing a degree of rotation to the clamp 2200. This rocking action enables the mounting of the clamp 2200, which will be discussed below. Extending upwards from the base wings 2238A, 2238B is the channel 2242. The channel defines the aperture 2244 that is configured to receive the fastener 2208 to connect the top portion 2202 to the base 2206. The aperture 2244 may be threaded to further secure the fastener 2208.

Figure 32:
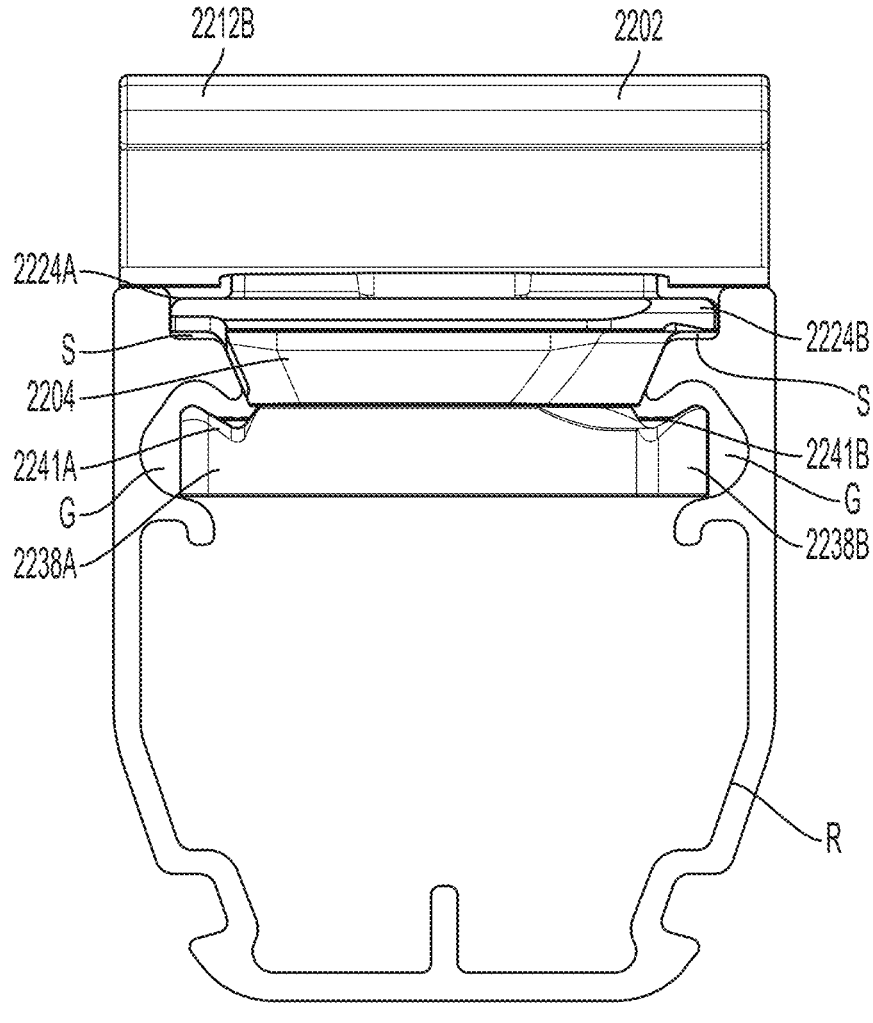
FIG. 32 is a side view of the mounting clamp of FIG. 22 mounted on a rail according to one embodiment or aspect of the present disclosure.
Figure 33A:
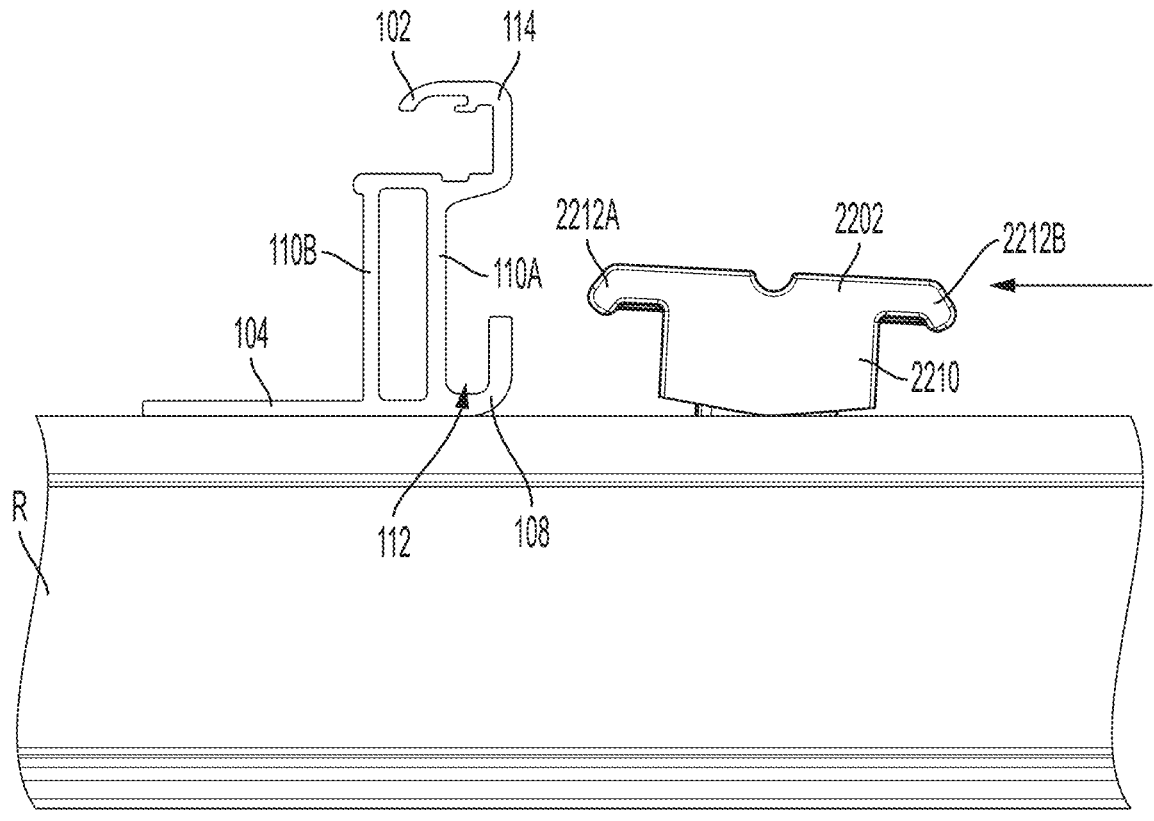
FIG. 33A is a side view of the mounting clamp of FIG. 22 mounted on a rail, showing one step in the mounting process.
Figure 33B:
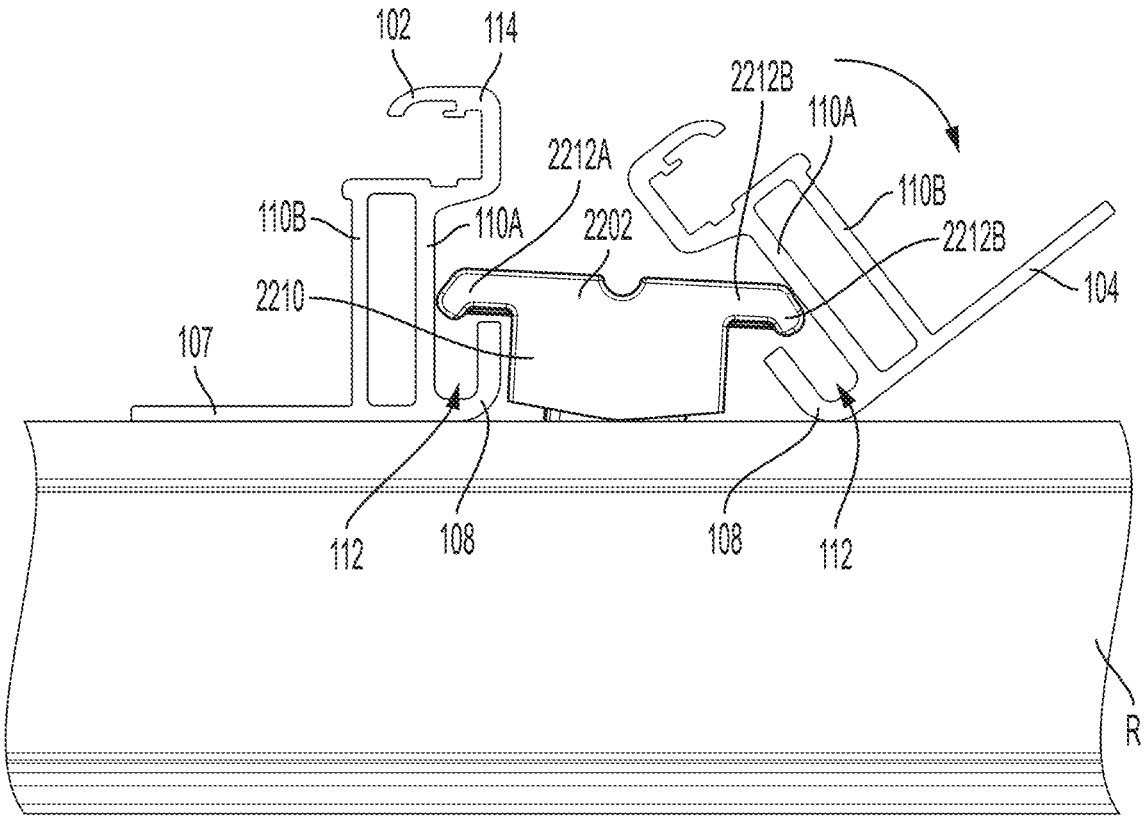
FIG. 33B is a side view of the mounting clamp of FIG. 22 mounted on a rail, showing another step in the mounting process.
Figure 34:
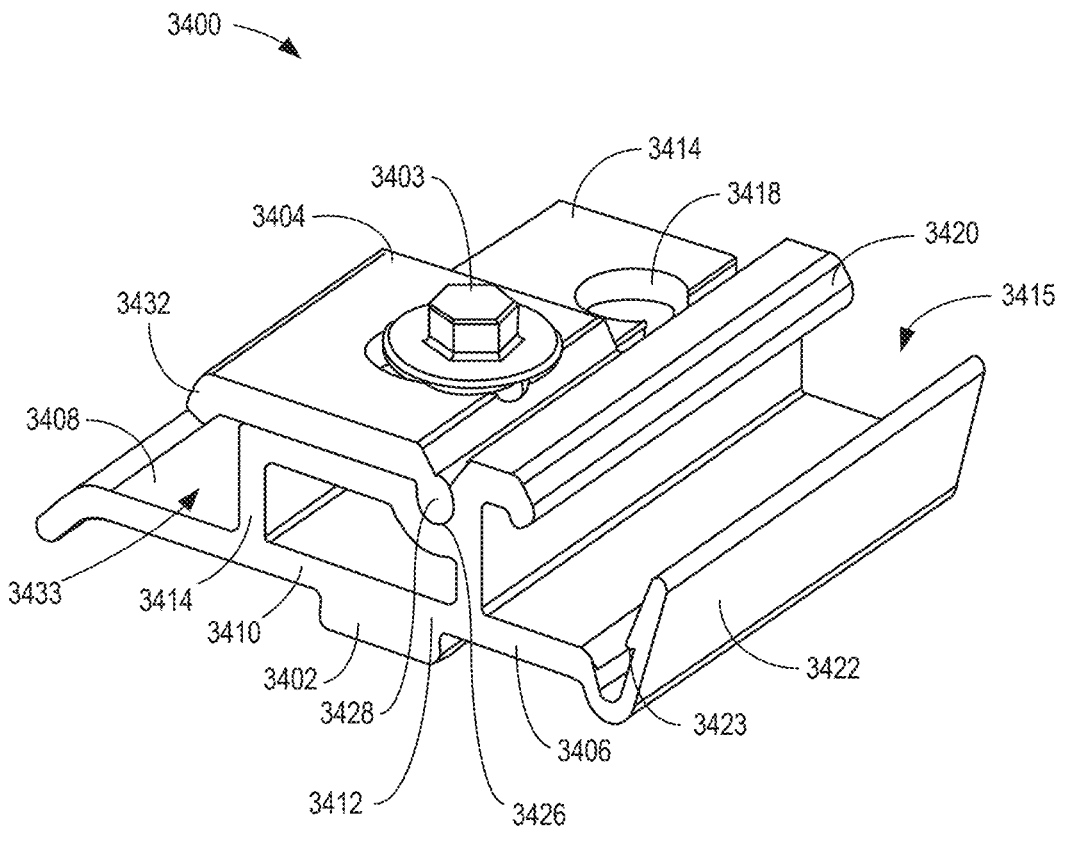
FIG. 34 is a perspective view of a mounting clamp according to one embodiment or aspect of the present disclosure.

With reference to FIGS. 32-33B, the mounting of the clamp 2200 will now be described. The clamp 2200 can be mounted in multiple ways. The first is that the clamp 2200 is aligned with an end of a rail R. The rail R defines grooves G and support surfaces S along opposing inner sides. At the end of the rail R, the base wings 2238A, 2238B are aligned within the grooves G, and the clamp support wings 2226A, 2226B are aligned on top of the support surfaces S. This alignment is shown in FIG. 32. From there, the clamp 2200 can slide along the rail R into place at its desired location. At that location, a first solar panel frame 202 is either placed on the rail or has already been placed on the rail (as is shown in FIG. 33A. The clamp 2200 may then slide further along the rail R and be rocked upward, so that first mounting lip 2212A is angled upward, allowing it to be placed over the outer lip 208 of the frame 202 to engage with the clamp cavity 212. This is shown in FIG. 33A. As noted above, the placement of the bonding ridges 2241A, 2241B within the channels 2238A, 2238B facilitates the rocking of the clamp 2200 to mount the clamp 2200 to the module frame 202. One way this happens is by creating space between the channels 2238A, 2238B and the top part of the groove G on both sides of the bonding ridges 2241A, 2241B. This space allows the base wings 2238A, 2238B to rock within the grooves G, which allows the top part 2202 of the clamp 2200 to be tilted, so the first mounting lip 2212A can be mounted within the clamp cavity 212. As mentioned above, the aperture 2218 in the top portion 2202 may lack threads for the fastener 2208, so that the top portion 2202 can be tilted upward to allow the mounting lip 2212A to more easily engage with the clamp cavity 212.

When the mounting lip 2212A is secured to the clamp cavity 212 a second frame 202 may be rotated into place by sliding the second frame 202, in a tilted orientation, along the rail R such that the outer lip 208 extends under the second mounting lip 2212B. This allows the clamp cavity 212 to engage with the second mounting lip 2212B as the second module is rotated down onto full engagement with the rail R and the second frame 202 is rotated from a tilted orientation to a flat orientation on the rail R. This rotation is shown in FIG. 33B. The height of the mounting lips 2212A, 2212B above the top of the rail R is defined by the assembled size of the clamp 2200 when the fastener 2208 is tightened securing the top portion 2202 to the base 2206 such that the hollow 2220 contacts the top of the channel 2242. This defines a distance between the mounting lips 2212A, 2212B and the base wings 2238A, 2238B and the position of the base wings 2238A, 2238B within the grooves G of the rail R. The height of the mounting lips 2212A, 2212B above the top of the rail R is sized such that when the second frame 202 is rotated from a tilted orientation to a flat orientation on the rail R, the outer lip 208 exerts an upward force on the mounting lips 2212A, 2212B effectively creating a clamping force on the first and second frames 202 between the top portion 2202 of the clamp 2200 and the top surface of the rail R. The clamping forces between the mounting lips 2212A, 2212B and the frames 202 act perpendicular to the direction of movement of the clamp 2200 within the rail R, so that the clamp 2200 is secured in its place within the rail R when the clamp 2200 is mounted to the frames 202. The clamp 2200 only needs to be placed into the rail R to mount the module frames 202.

A second method of mounting the clamp 2200 to the rail R and the frames 202 is similar to the first method, but this method involves sliding the clamp 2200 into the rail R from a vertical direction, perpendicular to the direction of the sliding movement of the clamp 2200 described above. The tapered ends 2230A, 2230B of the alignment flanges 2224A, 2224B allow for the clamp to 2200 enter the rail R from above. In this manner, the alignment flange 2224A, 2224B is angled downward into the rail R, and then enters the space between the grooves G and support surfaces S. From there, the clamp 2200 can be rotated within the rail R, so that the support wings 2226A, 2226B and the base wings 2238 are supported, respectively by the support surfaces S and grooves G of the rail. Once the clamp 2200 is placed within the rail R, the mounting method described above can continue.

To disengage the frames 202 from the clamps 2200, the fastener 2208 is loosened to allow the top part 2202 to be loosened or removed, which disengages the mounting lips 2212A, 2212B from their respective clamp cavities 212 so that the frames 202 can be removed.

In some instances, the clamp 2200 may be preassembled prior to use, meaning the fastener 2208 is arranged tightly against the top portion 2202. In this instance, the clamp 2200 is considered a toolless clamp, meaning tools are not needed to affix the clamp 2200 to the rail R and the relevant frames 102, 202, 302, 402,11400,11600. In other instances, the fastener 2208 may not be completely tightened against the top portion 2202 and the base 2206.

Figure 37:
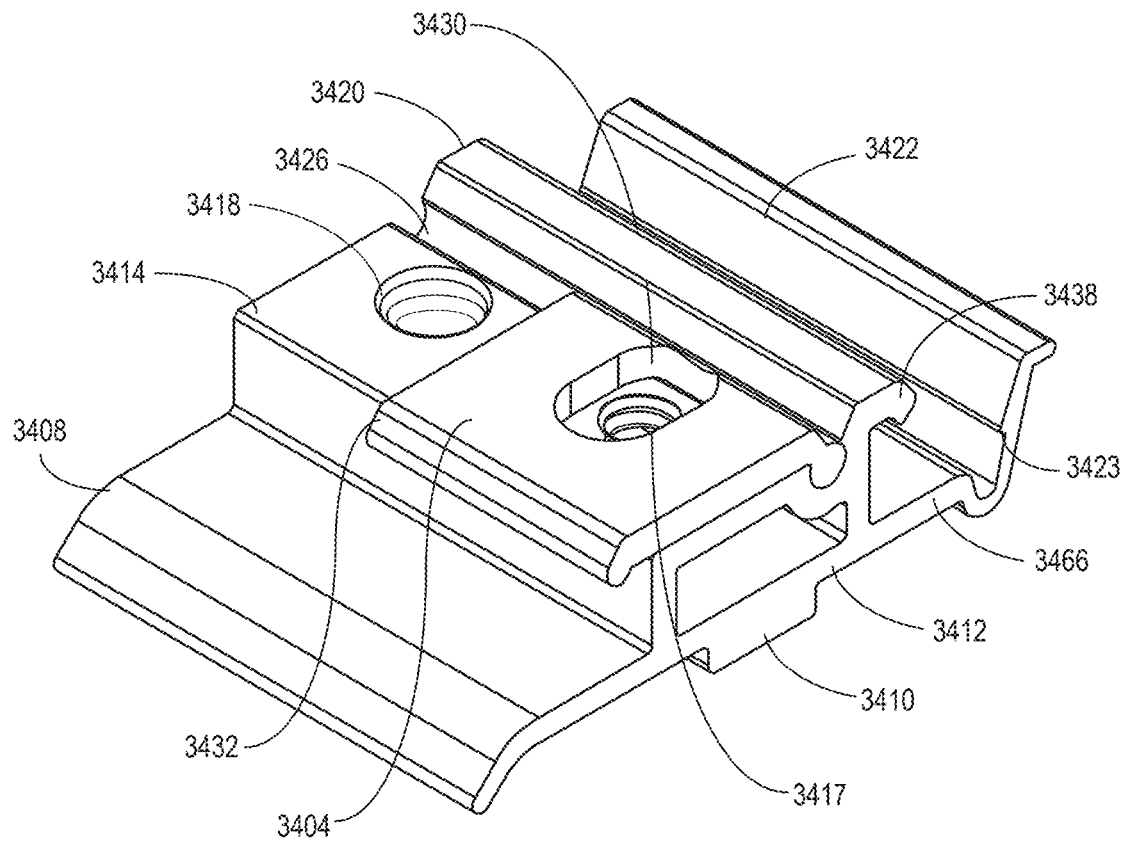
FIG. 37 is a perspective view of the mounting clamp of FIG. 34 without a fastener.
Figure 38:
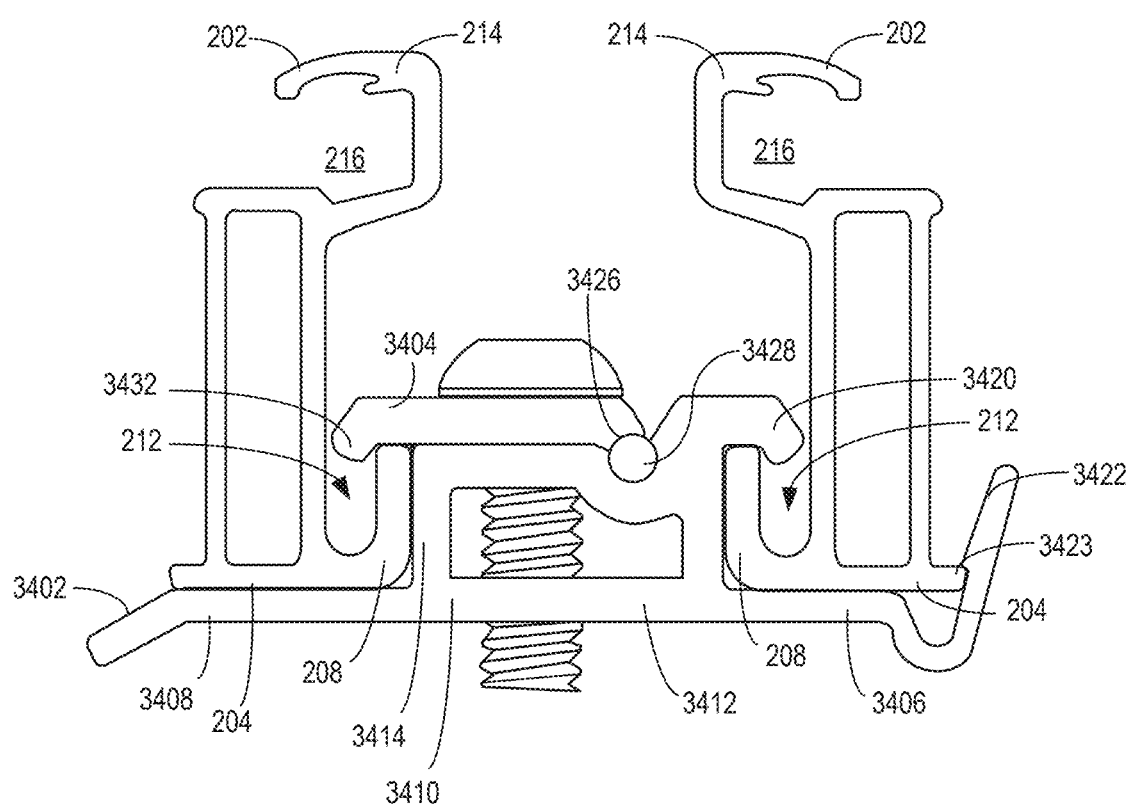
FIG. 38 is a front view of two solar panel module frames of FIG. 2 mounted to the mounting clamp of FIG. 34 in an engaged position.
Figure 39:
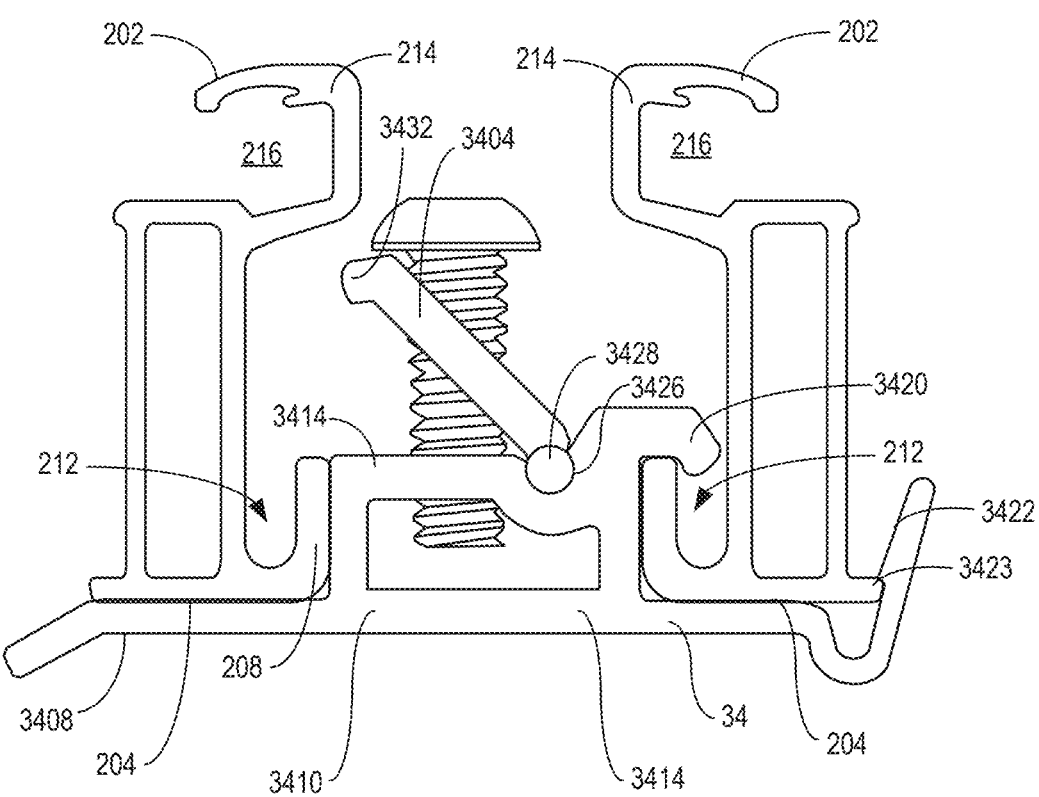
FIG. 39 is a front view of two solar panel module frames of FIG. 2 arranged relative to the mounting clamp of FIG. 34, with the mounting clamp in a disengaged position.
Figure 40:
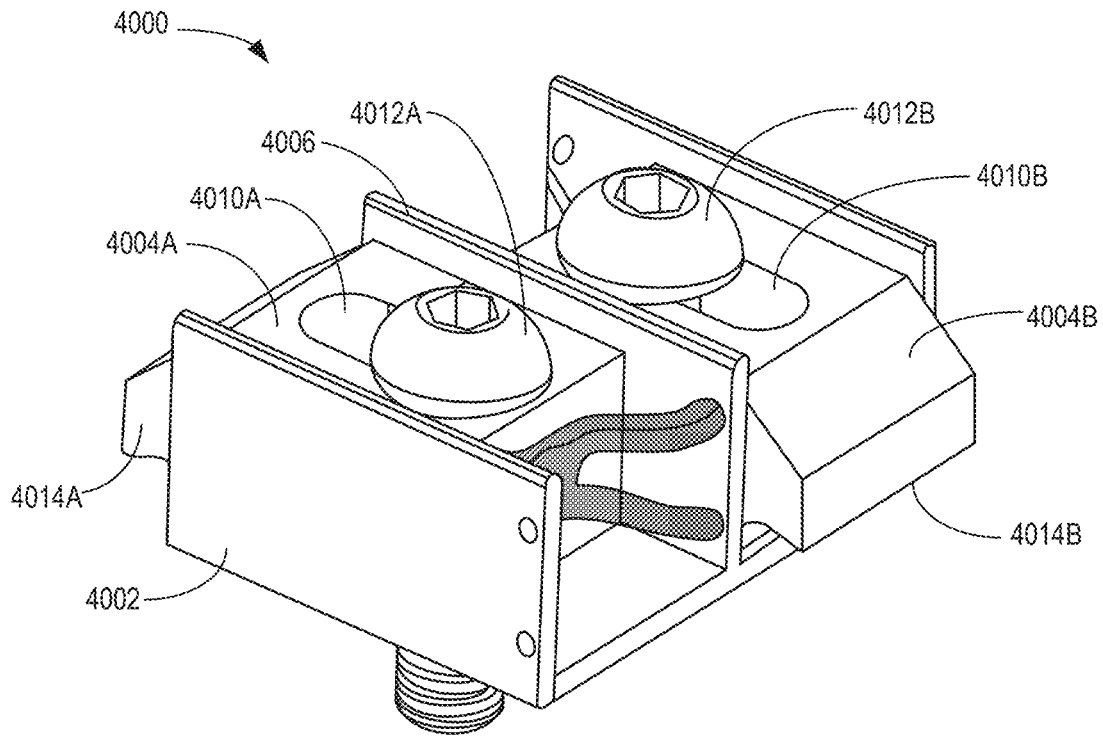
FIG. 40 is a perspective view of a mounting clamp according to one embodiment or aspect of the present disclosure.
Figure 41:
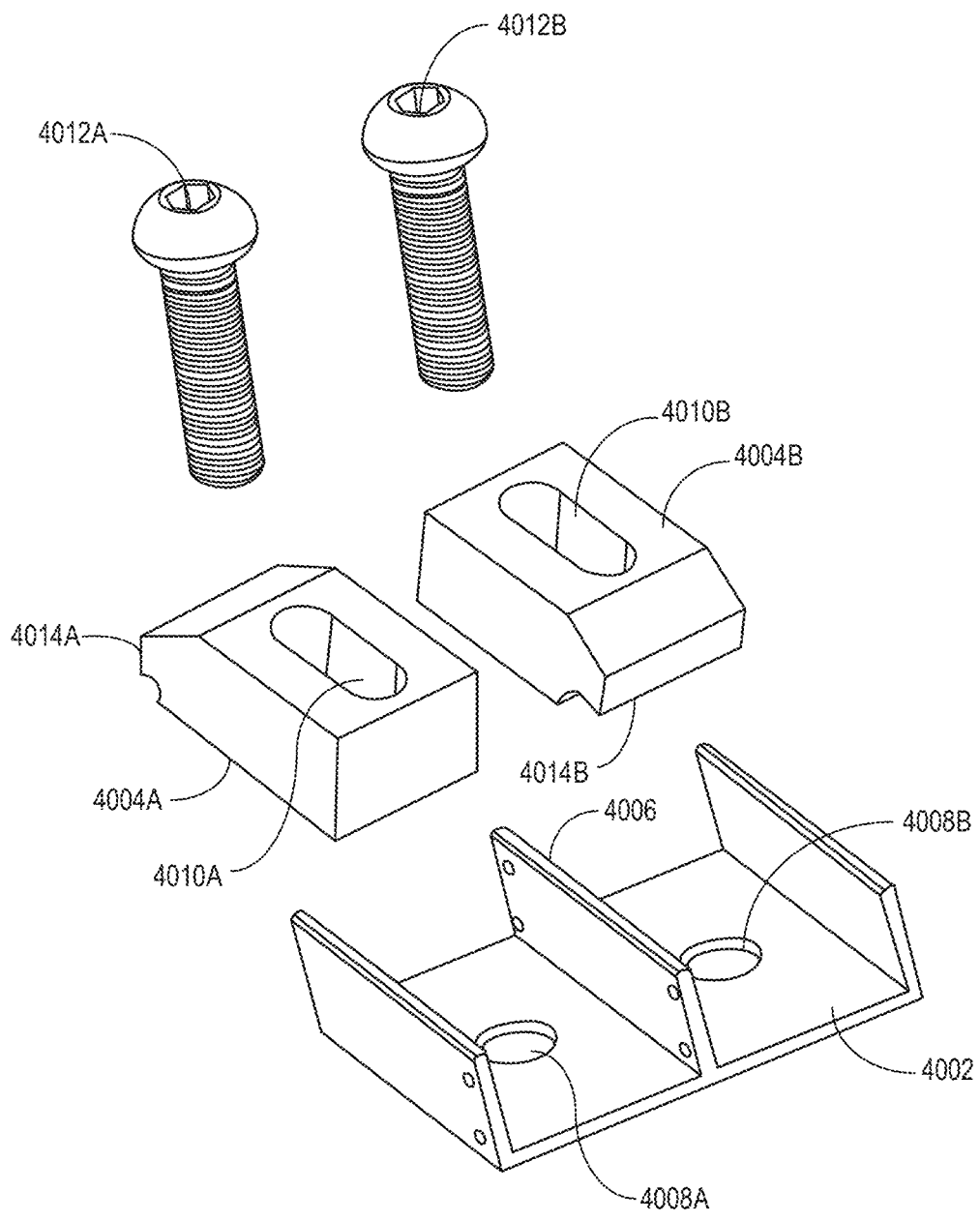
FIG. 41 is an exploded view of the mounting clamp of FIG. 40.

With reference to FIGS. 34-40 a mounting clamp 3400 is shown. The mounting clamp 3400 is a levered clamp 3400 and may be referred to as such. The levered clamp 3400 includes a base 3402 and a mounting lever 3404 that engage with and connects two solar panel frames 202 to the levered clamp 3400, which is shown in FIGS. 38 and 39. A fastener 3403 helps to connect the base 3402 and mounting lever 3404, so that the two solar panel frames can be engaged and connected to the levered clamp 3400. Although not shown, the levered clamp 3400 may also include a spring that is fit between the mounting lever 3404 and the base 3402 to urge the mounting lever 3404 upwards relative to the base 3402 as will become apparent below.

As shown in FIGS. 34-37, the base 3402 includes a first support flange 3406 for supporting the first solar panel frame and a second support flange 3408 for supporting the second solar panel frame. The support flanges 3406, 3408 extend in generally opposing directions. A center portion 3410 connects the two support flanges 3406, 3408. The center portion 3410 may include a lower connector 3412, extending across substantially the same plane as the two support flanges 3406, 3408 and an upper connector 3414 that has a U-shape that encompasses the lower connector 3412. The lower connector 3412 has an aperture 3416 and the upper connector 3414 has an aperture 3418. Both apertures 3416, 3418 are aligned to receive a mounting fastener therethrough to connect the levered clamp 3400 to a support structure, which is shown and described in connection with FIGS. 90-93. One or both apertures 3416, 3418 may be clearance holes to allow for some movement of the fastener when it is placed within the apertures 3416, 3418 to facilitate the mounting of the levered clamp 3400. As shown in FIG. 37, the upper connector 3414 includes an aperture 3417, which is used to accept another fastener 3403 to facilitate the fixation of the mounting lever 3404 to the base 3402 in the engaged configuration of the levered clamp 3400.

The upper connector 3414 defines a first mounting lip 3420 at an end thereof. The first mounting lip 3420 opposes the first support flange 3406 to define a first mounting space 3415 therebetween. The first mounting lip 3420 engages with the outer lip 208 of the solar panel frame 102, and the support flange 3406 supports the base 1212. The first mounting lip 3420 is shaped so that it fits around an end of the outer lip 3423422. The first mounting lip 3420 may be resilient to create the audible and tactile engagement with the outer lips 208. The first mounting lip 3420 is also shaped so as to hold the base 1212 of the solar panel 1210 substantially flat against the first support flange 3406. Extending from the first support flange 3406 is an angled flange 3422 that is generally J-shaped. The angled flange 3422 includes an edge 3423 that engages with the base 204 of the solar panel frame 202 to further assist in holding the solar panel frame 202 in place. The angled flange 3422 may also be resilient and provide a further tactile or audible indicator of a successful connection between the solar panel frame 102 and the levered clamp 3400. The angled flange 3422 may also be curved so as to define a space 3424 that is located below the base 3406. As shown, only the first surface 3406 includes the angled flange 3423422, but another angled flange may extend from the second surface 3408, providing a guide for the installation of the second panel frame 202.

The upper connector 3414 defines a socket 3426 proximate the first mounting lip 3420. The socket 3426 receiving a corresponding ball 3428 located at one end of the mounting lever 3404. The joint formed by the ball 3428 and socket 3426 allows for the mounting lever 3404 to rotate about the upper connector 3420. It is contemplated that other joints may be used in a similar manner, not only the ball and socket joint described here. The mounting lever 3404 also defines an aperture 3430 for receiving the fastener 3403. The aperture 3430 is aligned with aperture 3417 to further facilitate the connection between the mounting lever 3404 and base 3402. The mounting lever 3404 defines a second mounting lip 3432 that engages with the outer lip 208 in the same manner as the first mounting lip 3420. The second mounting lip 3432 opposes the second support flange 3408 define a second mounting space 3433. The rotation of the mounting lever 3404 about the base 3402 via the ball 3428 and socket 3426 action means the mounting lever 3404 can be displaceable between a disengaged state, where the second mounting lip 3432 is rotated away from the outer lip 208, as shown in FIG. 39, and an engaged state, where the second mounting lip 3432 opposes the second surface 3408 to engage the outer lip 208, as shown in FIG. 38. The rotation of the mounting lever 3404 means that the aperture 3430 in the mounting lever 3404 must be elongated to accept the otherwise obstructing fastener 3403. Aperture 3430 is therefore larger than the apertures 3416, 3417 within the base 3402.

The tightening and loosening of the fastener 3403 restricts or permits this rotation of the mounting lever 3404 and may facilitate engagement of the second mounting lip 2232 with the outer lip 1222. In other words, as the fastener 3403 is tightened within the apertures 3417, 2230, the mounting lever 3404 is forced downward and secured in the engaged state. When the fastener 3403 is loosened, it may be partially pulled out of the apertures 3417, 2230, raising the head of fastener 3403 above the mounting lever 3404 thereby permitting the mounting lever 3404 to move to the disengaged state.

An installation method for the levered clamp 3400 includes the levered clamp 3400 being attached preassembled to a mounting structure in the engaged state such as a roof attachment using the fastener, neither of which are shown, but will be discussed in greater detail in the Support Structure and Other Mounting Clamps Section. This entire mounting assembly is connected to a solar panel module frame 202 by inserting the first mounting lip 3420 into the clamp cavity 212 of the frame 202, rotating the clamp assembly 3400 downward relative to the frame 202 such that the first support flange 3406 moves toward the panel base 206 until the angled flange 3422 wraps around the inner side of the base 206 and the edge 3423 snaps onto the base flange 230. This connects the levered clamp 3400 to the first solar panel module frame 202. For the first panel in a series, row, or column of panels one may install entire mounting assemblies to two panel frames 202 on opposing sides of the solar panel module. Then, the solar panel modules having the mounting assemblies connected can be placed in the desired location on the rooftop or other installation surface and the mounting structures or roof attachments (not shown) can be fixed to the rooftop or other installation surface.

Subsequent panels in a column, row or series are prepared for installation by connecting two mounting assemblies (or three in cases where environmental loads require additional support) to a single first panel frame in the same manner described above. Then, a second panel frame base 204, that is opposite to the first panel frame already installed, is placed onto the second support flange 3408 at an angle, and the panel is moved towards the levered clamp 3400 thus inserting the second mounting lip 3432 into the clamp cavities 212. The solar panel module is then rotated down until the mounting assemblies that are connected to the opposite first panel frame land on the installation surface. When this occurs, the base 206, contacts the second support flange 3408 and the outer lip 208 is properly seated and secured below the second mounting lip 3432. This process is repeated until all the desired panels of a row, column or series are installed.

During the lifespan of a solar panel array it can happen that a single panel within the array will need to be replaced. The levered clamp 3400 facilitates the removal of a single module within an array without disturbing adjacent or other modules and only requires disengaging the levered clamps 3400 engaged with the side of the panel to be removed. To remove a single panel, the fasteners 34003 of the levered clamps 3400 engaged with the side of the panel to be removed are loosened until the mounting lever 3404 is able to rotate about the ball 3428 and socket 3426 joint to the disengaged position. Then the panel can be tilted out of the disengaged clamps 3400 and rotated out of the opposite levered clamps 3400 by withdrawing the base 206 from the support surface 3406 until the outer lip 208 is free from the clamping force of the mounting lip 3420 and the panel is removed. The replacement panel can then be installed in place by placing the solar panel frame 202 on the first support flange 3406 of a first levered clamp 3400, rotating the panel down until the opposite frame 202 lands on the second support surface 3408 of the opposing levered clamp 3400, and tightening the fastener 3403 until the mounting lip 3432 is secured in the mounting cavity 212 of the second opposing levered clamp 3400.

With reference to FIGS. 40-43, another mounting clamp 4000 is shown. The mounting clamp 4000 is a sliding clamp and may be referred to as such. The sliding clamp 4000 includes a base 4002 and two blocks 4004A, 4004B that are slidable within the base 4002. The base 4002 includes a divider 4006 to separate the blocks 4004A, 4004B within the base 4002. Apertures 4008A, 4008B are defined by the base 4002, with one aperture 4008A, 4008B being arranged on opposing sides of the divider 4006. Each block 4004A, 4004B has an aperture 4010A, 4010B that corresponds to apertures 4008A, 4008B in the base 4002. Aperture 4010A generally aligns with aperture 4008A, and aperture 4010B generally aligns with aperture 4008B. The aligned apertures 4008A, 4010A, 4008B, 4010B permit fasteners 4012A, 4012B to extend through one pair of aligned apertures 4008A, 4010A, 4008B, 4010B and connect the blocks 4004A, 4004B to the base 4002 and mounting structures below, an example of which is provided in FIGS. 42 and 43. The tightening of the fasteners 4012A, 4012B within the apertures 4008A, 4008B, 4010A, 4010B secure the blocks 4004A, 4004B to the base 4002, and the loosening of the fasteners 4012A, 4012B within the apertures 4008A, 4008B, 4010A, 4010B permit the blocks 4004A, 4004B to slide within the base 4002. Because the blocks 4004A, 4004B are designed to slide within the base 4002, the apertures 4010A, 2801B defined in the blocks 4004A, 4004B are elongated and wider than the apertures 4008A, 4008B that are defined by the base 4002. This allows the fasteners 4012A, 4012B to be loosened within or removed from apertures 4008A, 4008B, which permits the blocks 4004A, 4004B to slide in the base 4002 while maintaining the fasteners 4012A, 4012B within apertures 4010A, 4010B. When the blocks 4004A, 4004B are in their desired positions, the fasteners 4012A, 4012B can again be tightened within apertures 4008A, 4008B, again securing the blocks 4004A, 4004B to the base 4002.

Figure 42:
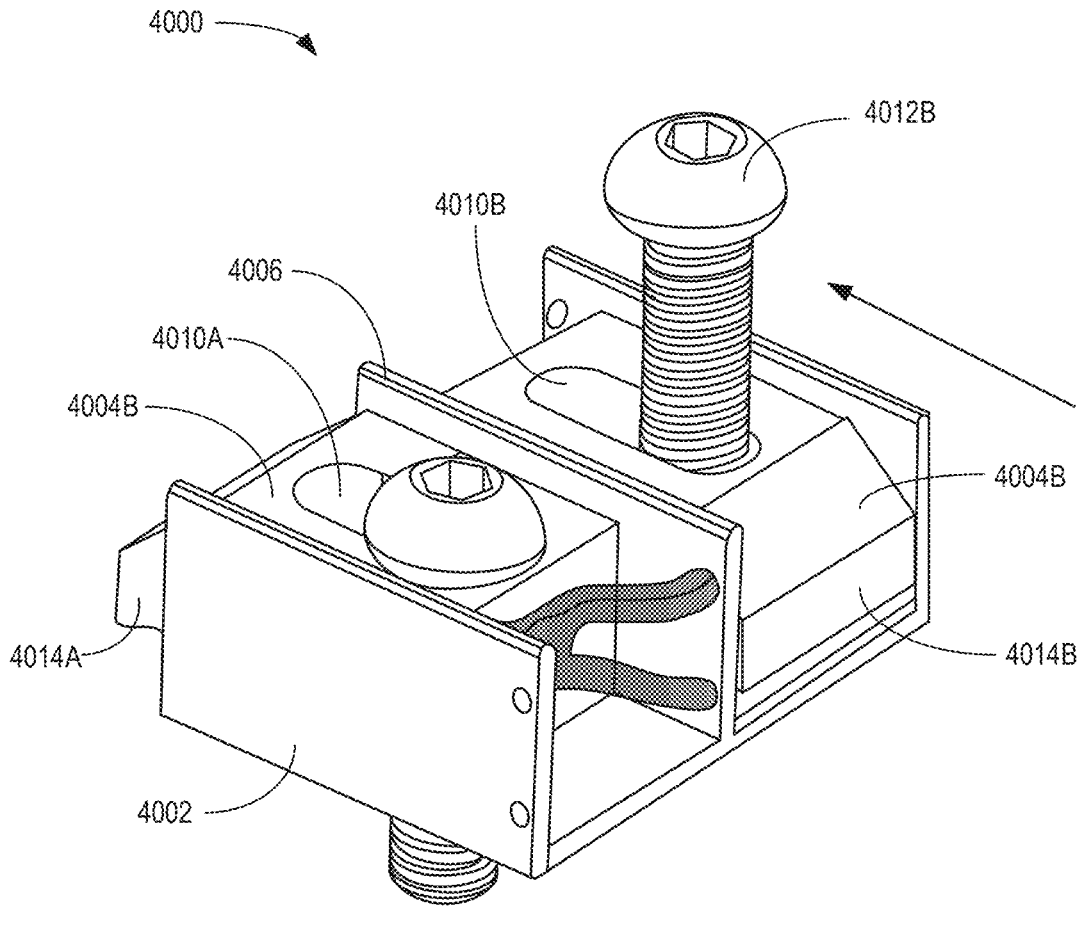
FIG. 42 is a perspective view of the mounting clamp of FIG. 40 having a first block in an engaged position and a second black in a disengaged position.
Figure 43:
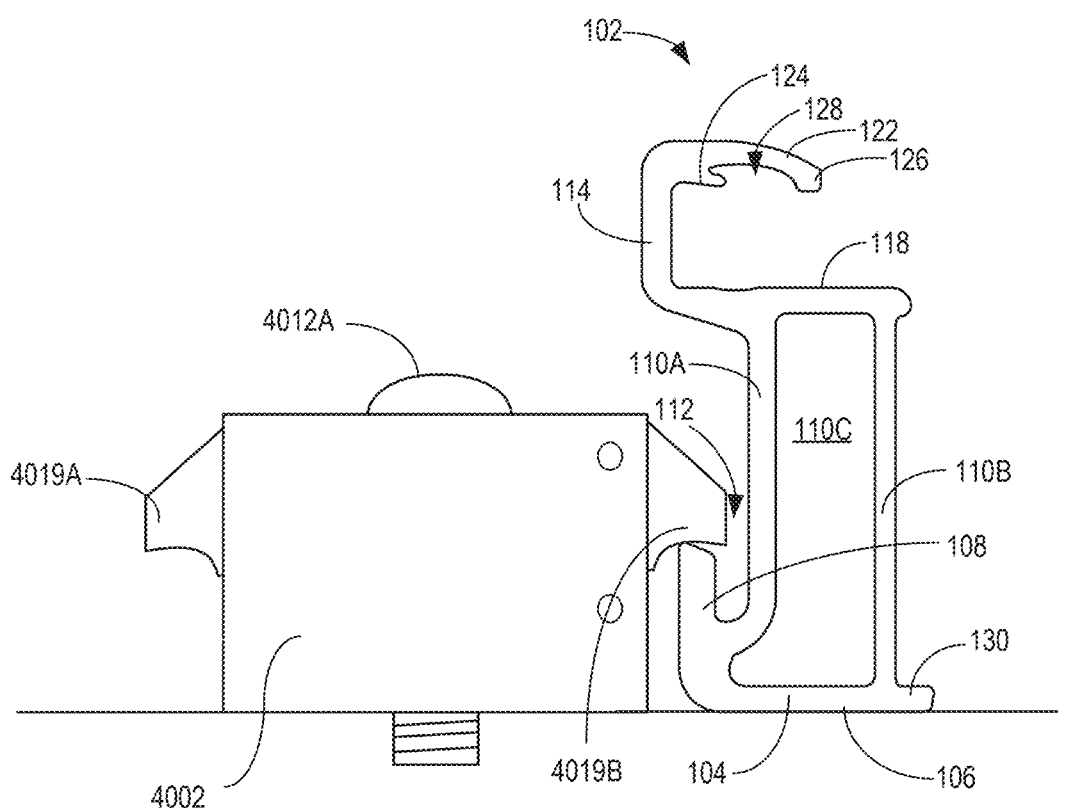
FIG. 43 is an exemplary front view of a solar panel module frame of FIG. 1 mounted to the mounting clamp of FIG. 40.
Figure 44:
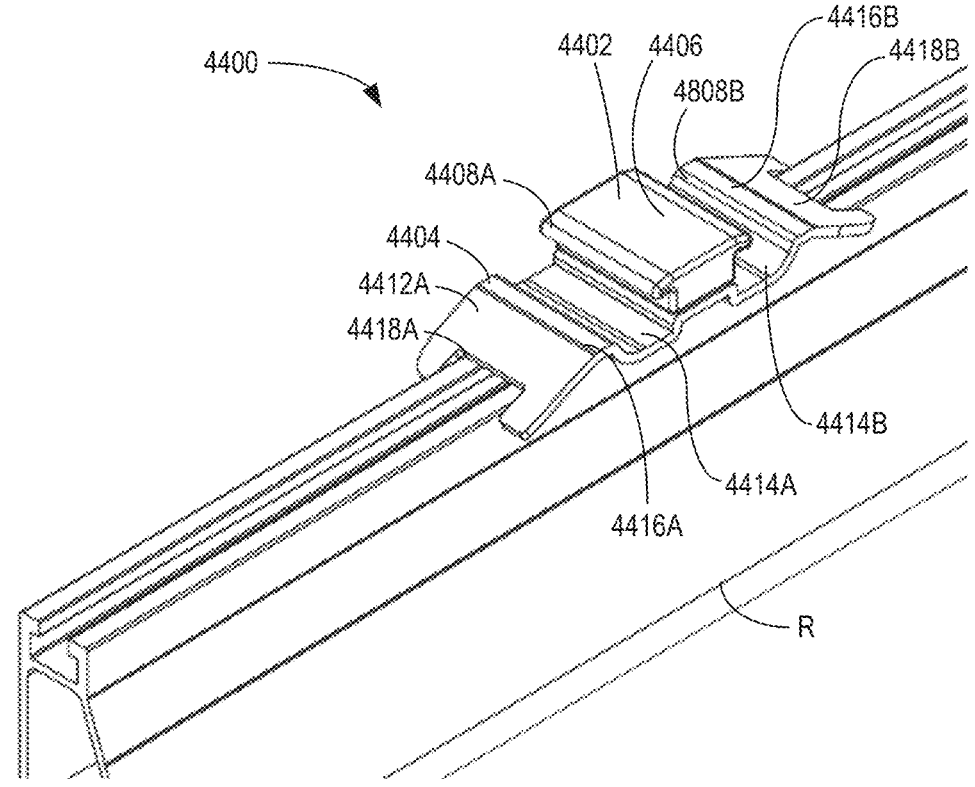
FIG. 44 is a perspective view of a mounting clamp according to one embodiment or aspect of the present disclosure.
Figure 45:
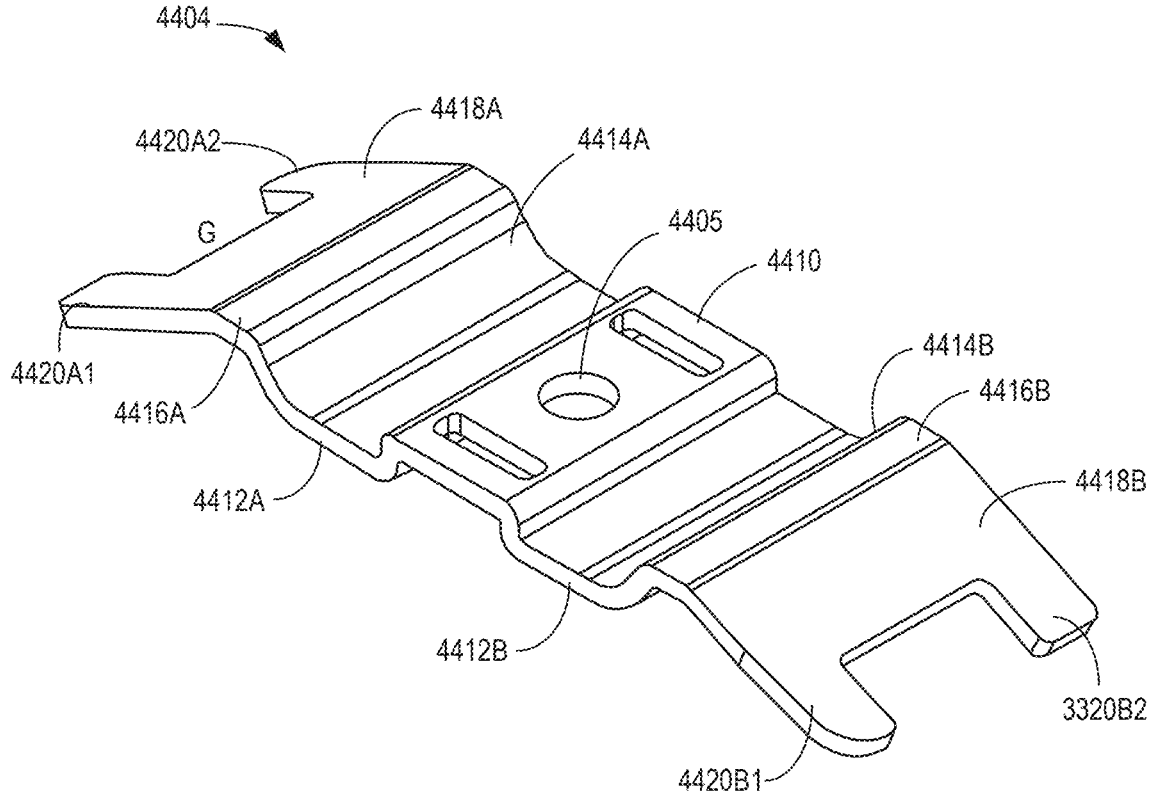
FIG. 45 is a perspective view of a ramp of the mounting clamp of FIG. 44.
Figure 46A:
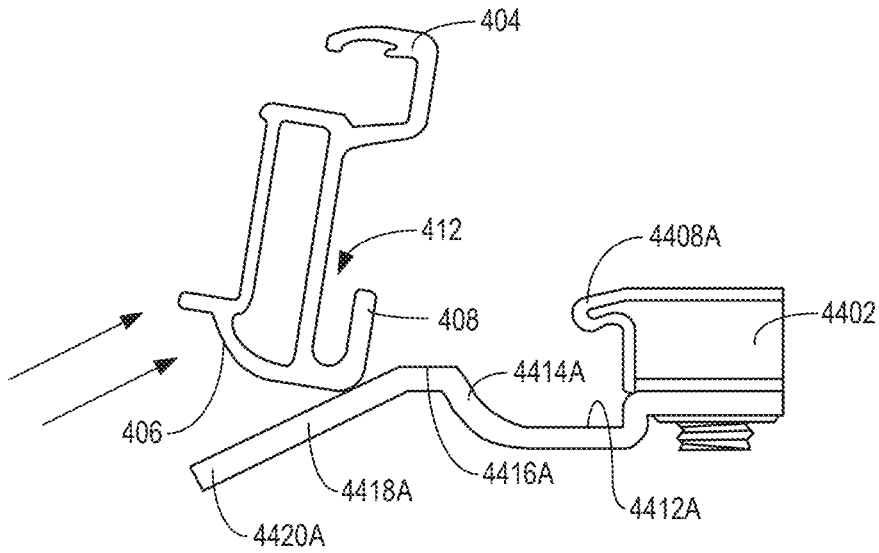
FIG. 46A is a front view of a solar panel module frame of FIG. 4 in the process of being mounted to the mounting clamp of FIG. 44.
Figure 46B:
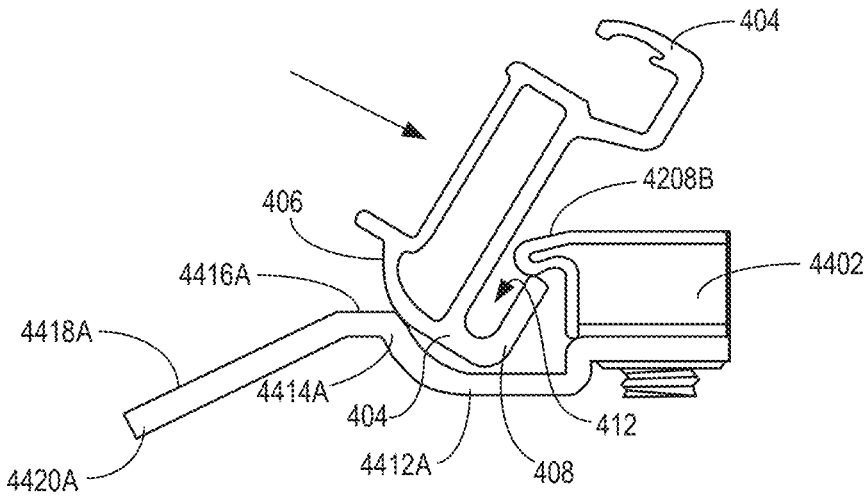
FIG. 46B is another front view of the solar panel module in the process of being mounted to the mounting clamp of FIG. 44.
Figure 47:
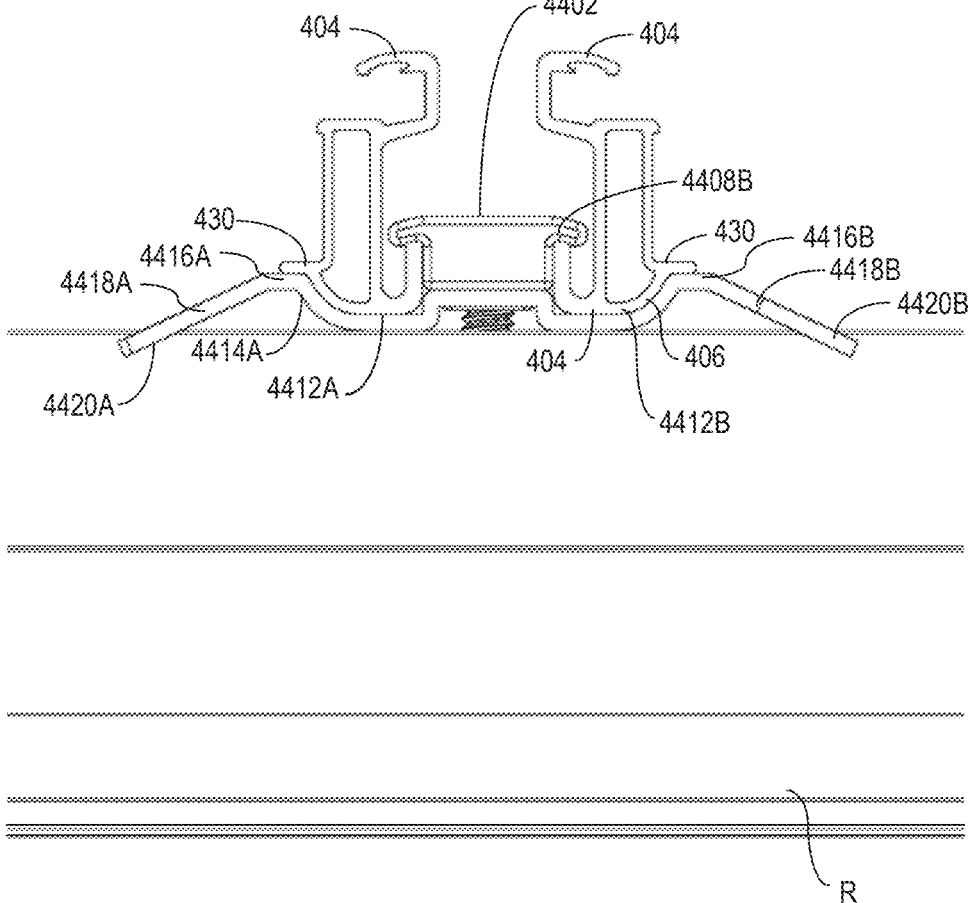
FIG. 47 is a front view of two solar panel module frames of FIG. 4 mounted to the mounting clamp of FIG. 44.
Figure 48:
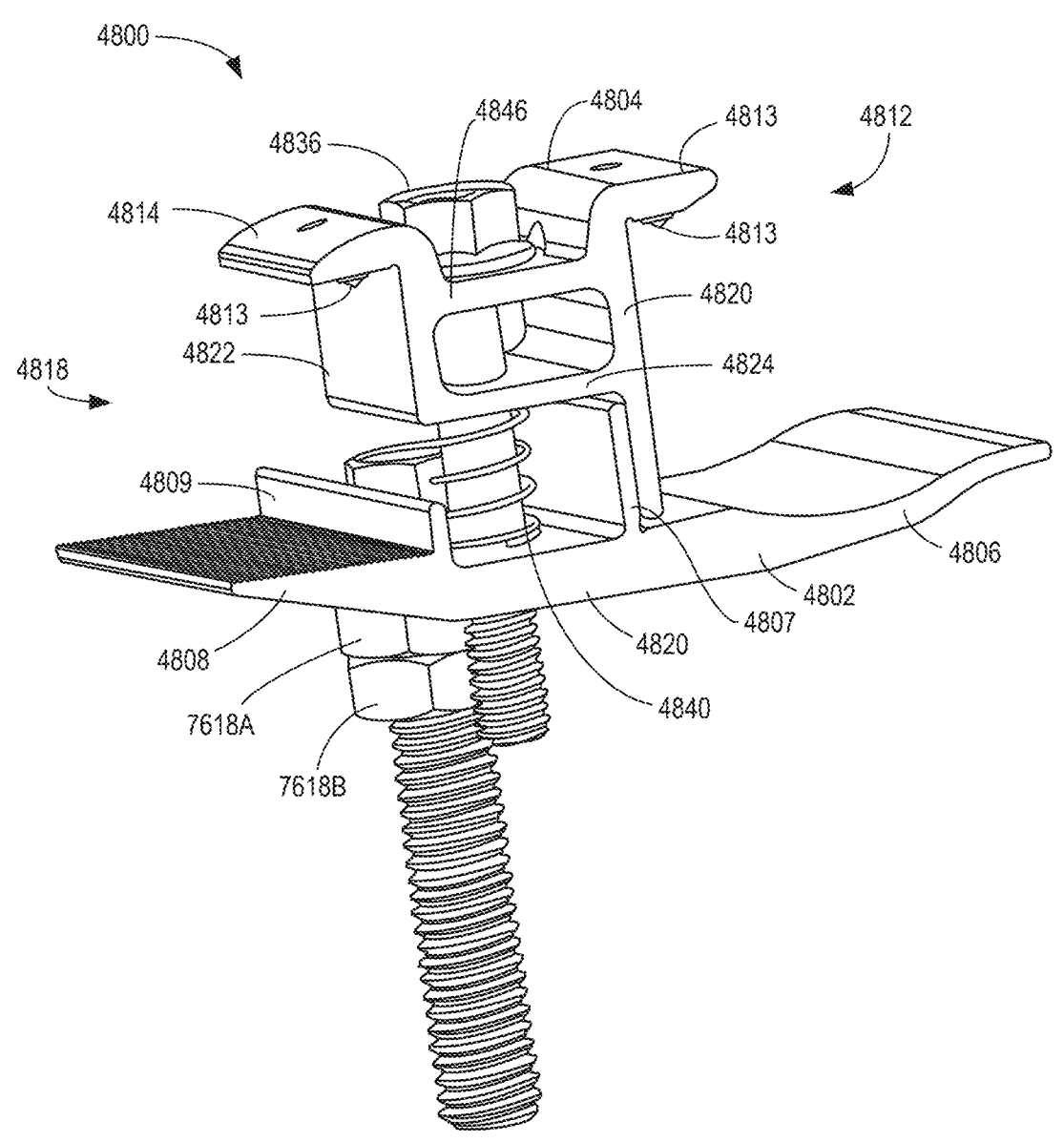
FIG. 48 is a perspective view of a mounting clamp according to one embodiment or aspect of the present disclosure.
Figure 49:
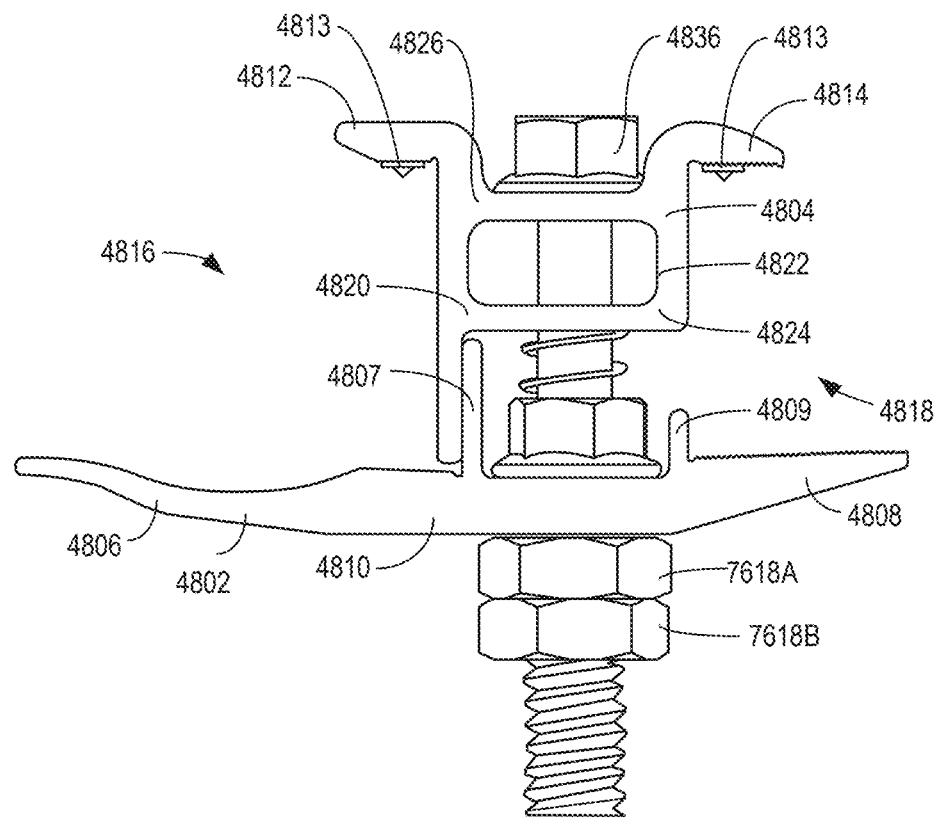
FIG. 49 is a front view of the mounting clamp of FIG. 48.
Figure 50:
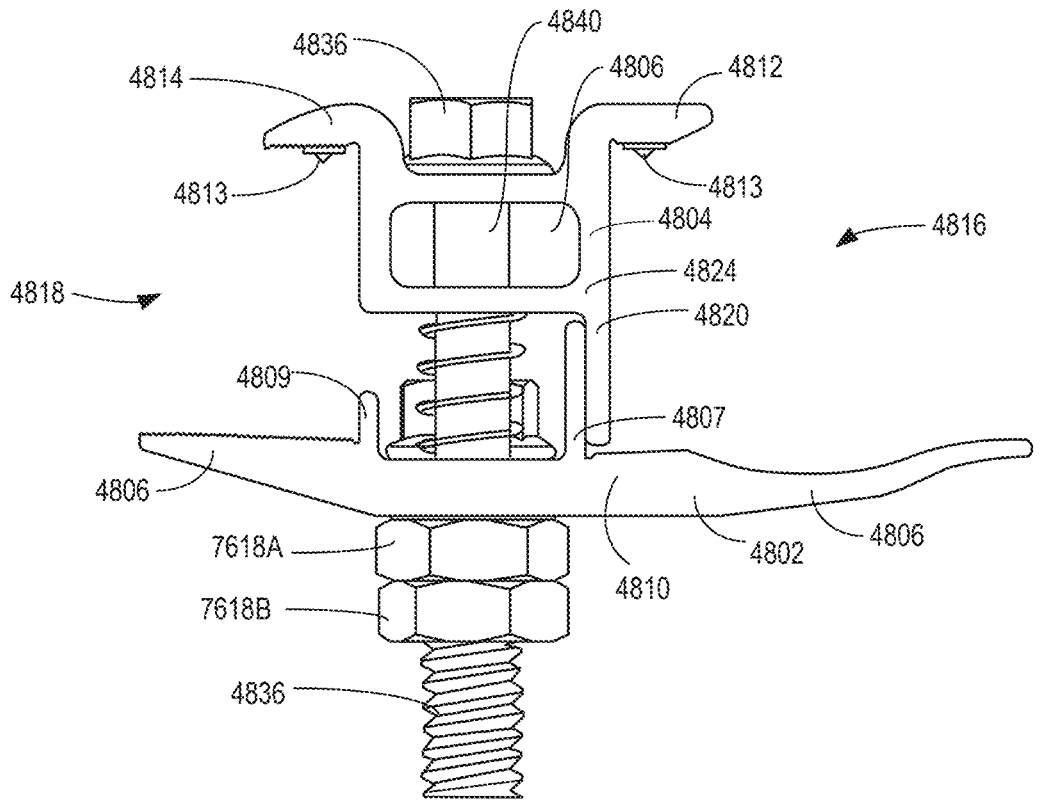
FIG. 50 is a back view of the mounting clamp of FIG. 48.
Figure 51:
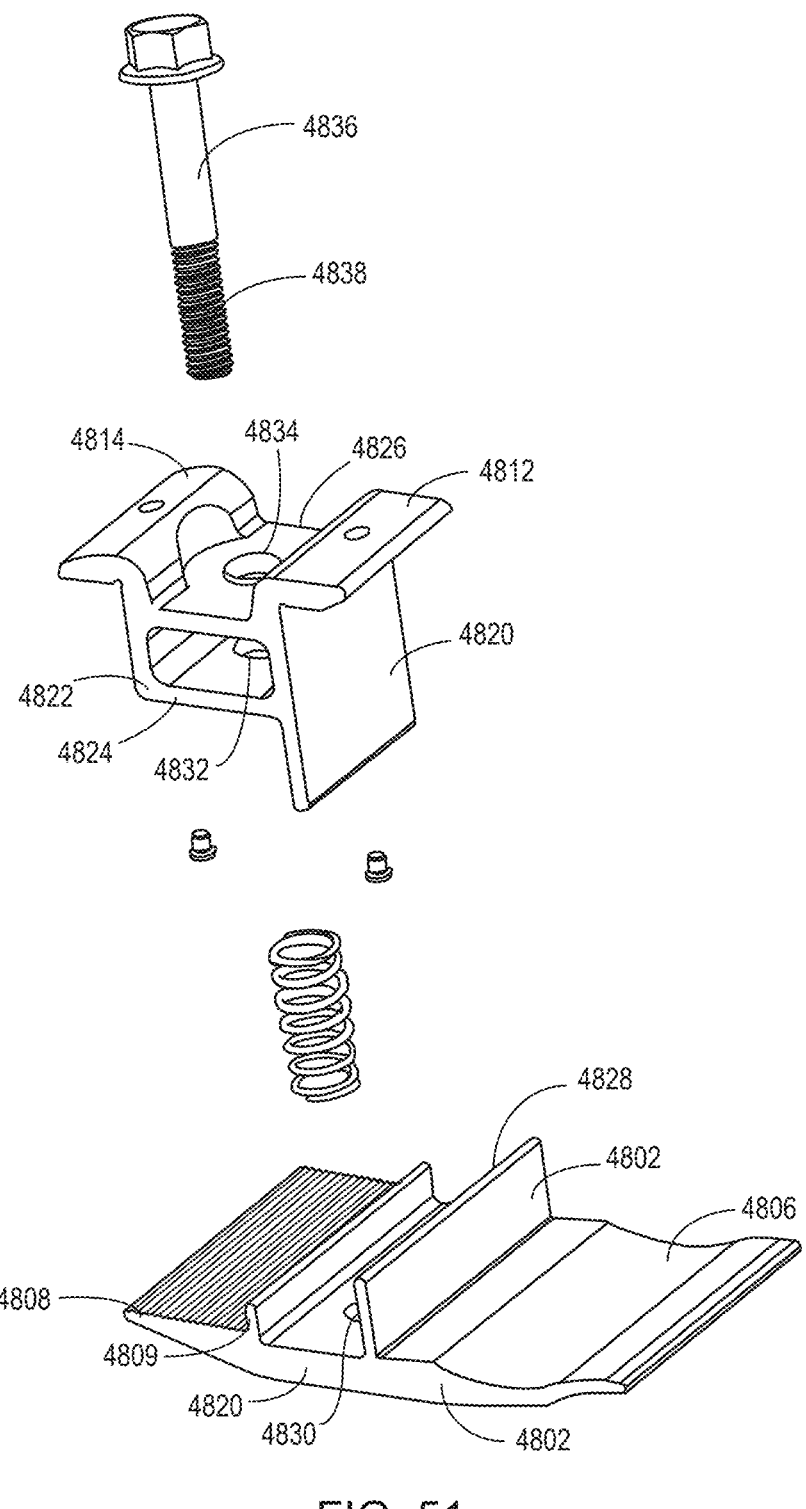
FIG. 51 is an exploded view of the mounting clamp of FIG. 48.
Figure 52:
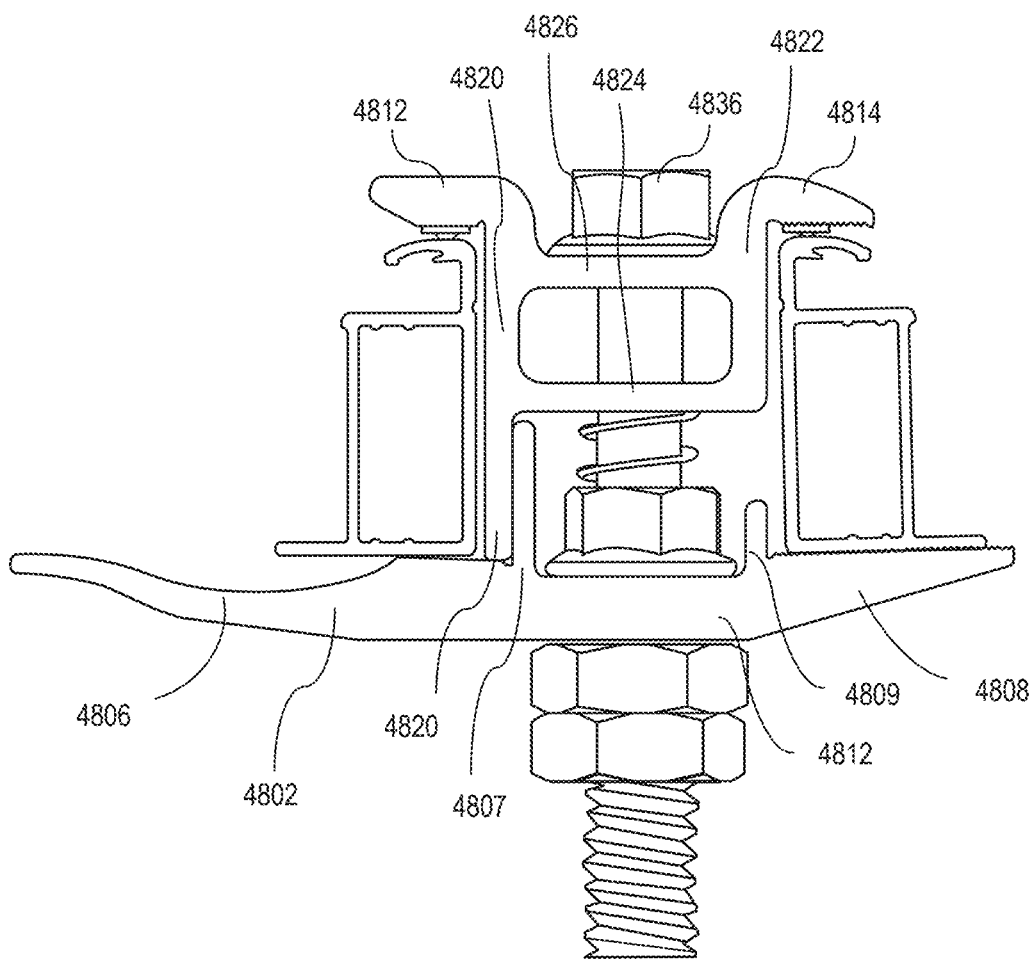
FIG. 52 is a front view of two standard solar panel module frames mounted to the mounting clamp of FIG. 48.
Figure 53:
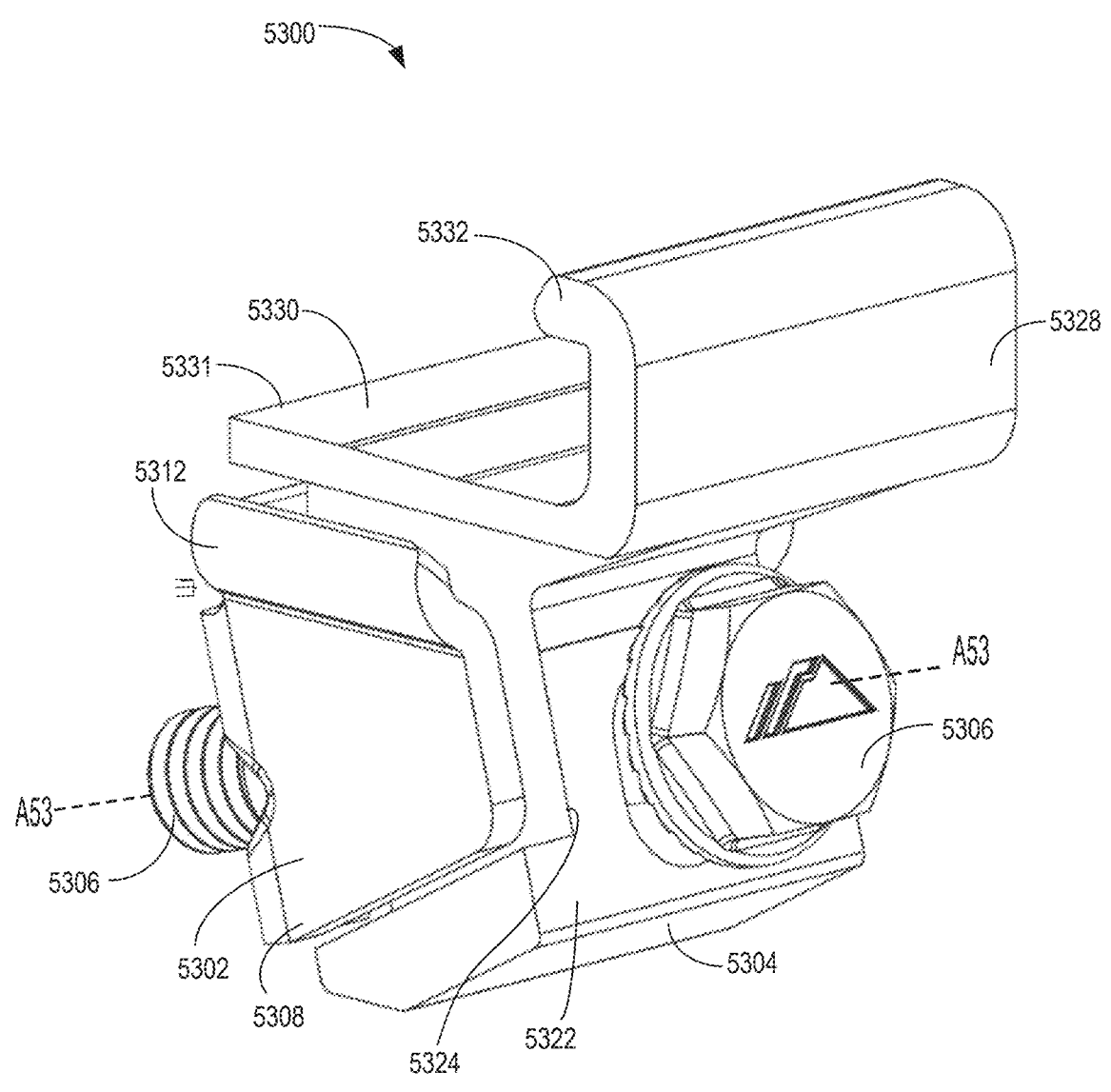
FIG. 53 is a perspective view of a hidden end clamp according to one embodiment or aspect of the present disclosure.
Figure 54:
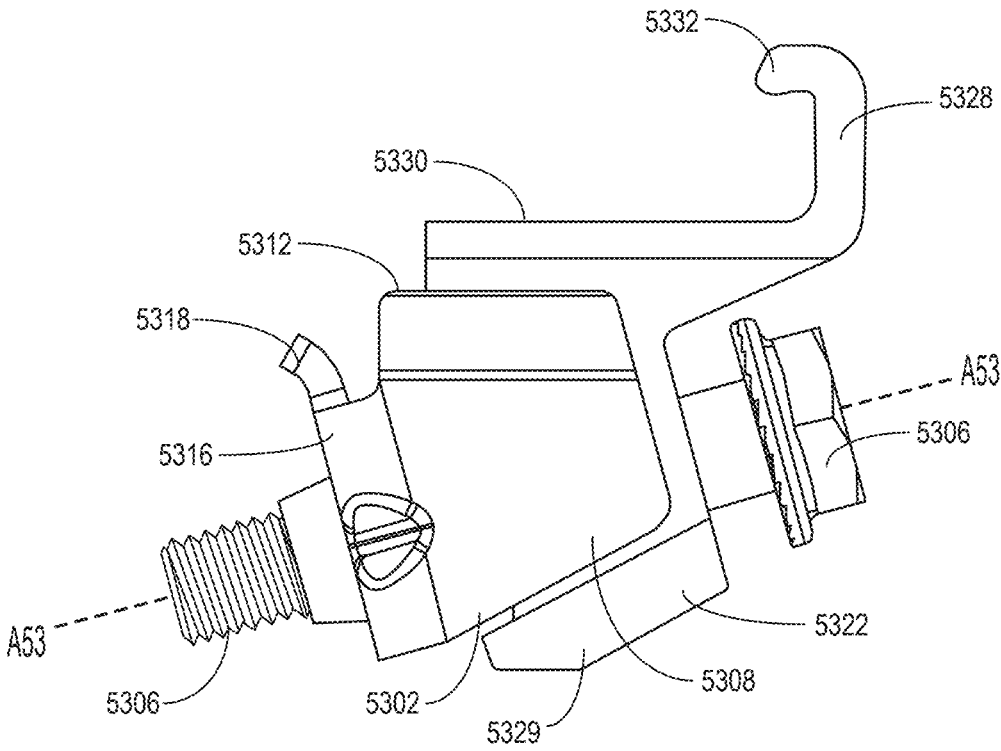
FIG. 54 is a front view of the hidden end clamp of FIG. 53.

The blocks 4004A, 4004B both have respective mounting lips 4014A, 4014B, which are used to engage with the solar panel frame(s) 102 that are to be mounted to the sliding clamp 4000. The mounting lips 4014A, 4014B are designed to engage with the outer lips and mounting cavities as discussed above in connection with the different embodiments of the solar panel frames. It is also understood that the mounting lips 4014A, 4014B can be used to mount additional solar panel frames or other accessories not disclosed in this application. The mounting lips 4014A, 4014B may also have teeth on their undersides to facilitate bonding with the mounted panel frame 1210. The sliding of the blocks 4004A, 4004B moves the blocks 4004A, 4004B between an engaged state, where the solar panel frames can be mounted to the sliding clamp 4000, and a disengaged state, where the solar panel frames can be removed from or otherwise disengaged with the sliding clamp 4000. The engaged state is shown in FIG. 43, and a partially disengaged state is shown in FIG. 42. Solar panel frames 102 can be mounted to the blocks 4004A, 4004B by snapping or rotating the frames into place relative to the blocks 4004A, 4004B when the blocks 4004A, 4004B are already in the engaged state, or the solar panel frames can be mounted to the blocks 4004A, 4004B by putting the frames into place when the blocks 4004A, 4004B are in the disengaged state and then sliding the blocks 4004A, 4004B into the engaged state. Removal of the frames occurs by sliding the blocks 4004A, 4004B from the engaged state to the disengaged state. In some embodiments, springs 4016A, 4016B can be applied to an end of the blocks 4004A, 4004B opposite the ends having the mounting lips 4014A, 4014B. The springs 4016A 4016B can bias the blocks 4004A, 4004B toward the engaged state. The sliding clamp 4000 can be incorporated in mounting systems similar to those described above regarding levered clamp 3400, rotating clamp 1200, levered clamp 3400, etc., and may incorporate the associated mounting and installation methods.

With reference to FIGS. 44-47, another mounting clamp 4400 is shown. Mounting clamp 4400 may be referred to as a clamp and ramp mounting assembly 4400. This assembly 4400 can be used in connection with solar panel module 402 because of the curved center portions 406. This assembly includes a clamp 4402 and a ramp 4404 that are both used to mount and secure a solar panel frame 404 within the assembly 4400. Both features have aligning apertures (only aperture 4405 of the ramp 4404 is shown) for receiving a fastener that mounts the clamp 4402, ramp 4404, and rail R together to secure the assembly 4400. The clamp 4402 includes a body 4406 that is shown as being substantially quadrilateral, although other body shapes may be used. The body 4406 includes a first mounting lip 4408A and a second mounting lip 4408B that extend from opposing sides of the body 4406. The mounting lips 4408A, 4408B engage with solar panel frames in a manner similar to what was discussed above in connection with FIGS. 9 and 10, using the ramp 4404 helps to engage the solar panel frames with the clamp 4402.

Figure 31:
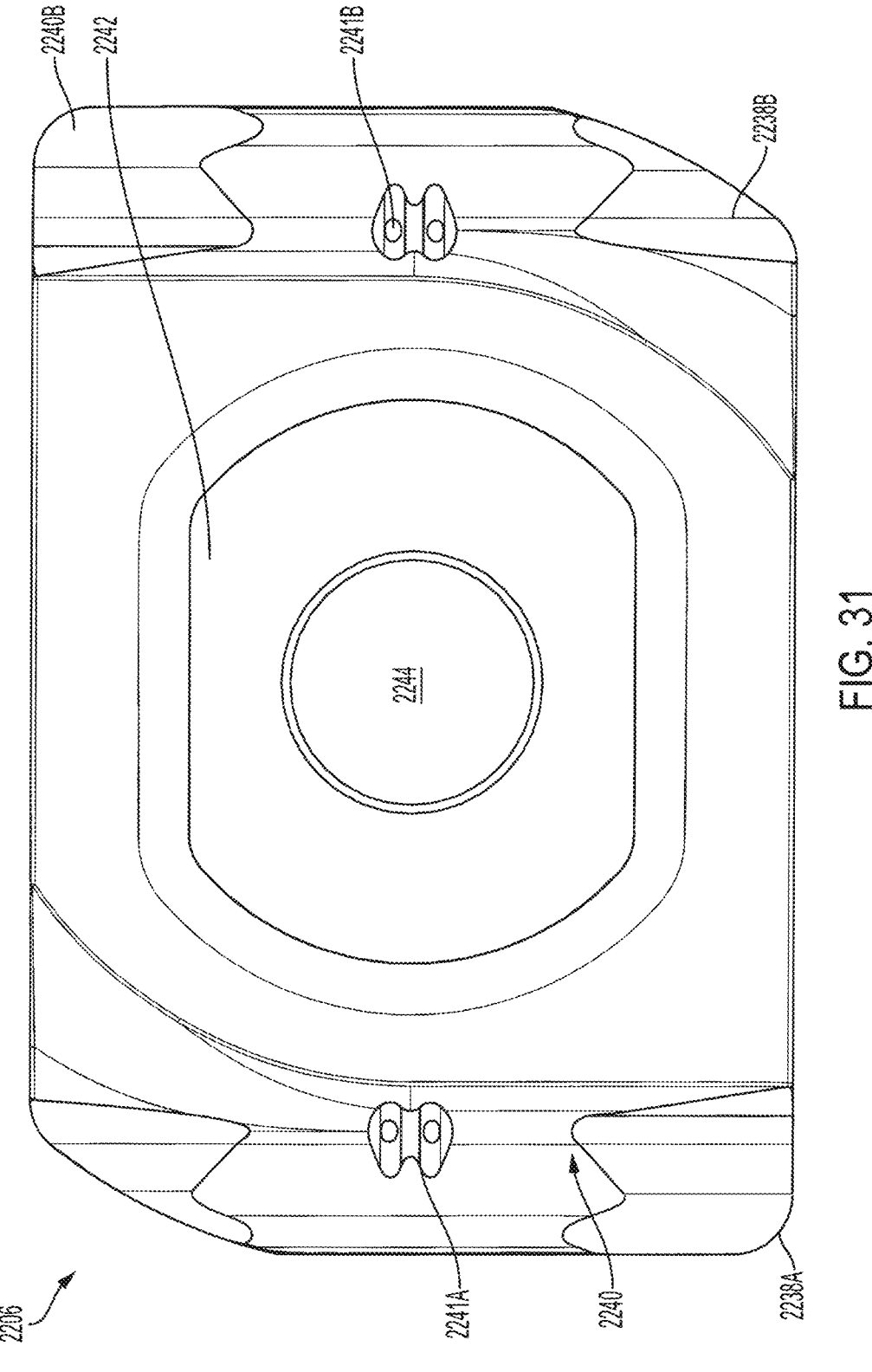
FIG. 31 is a top view of the bottom portion of the mounting clamp of FIG. 22.
Figure 35:
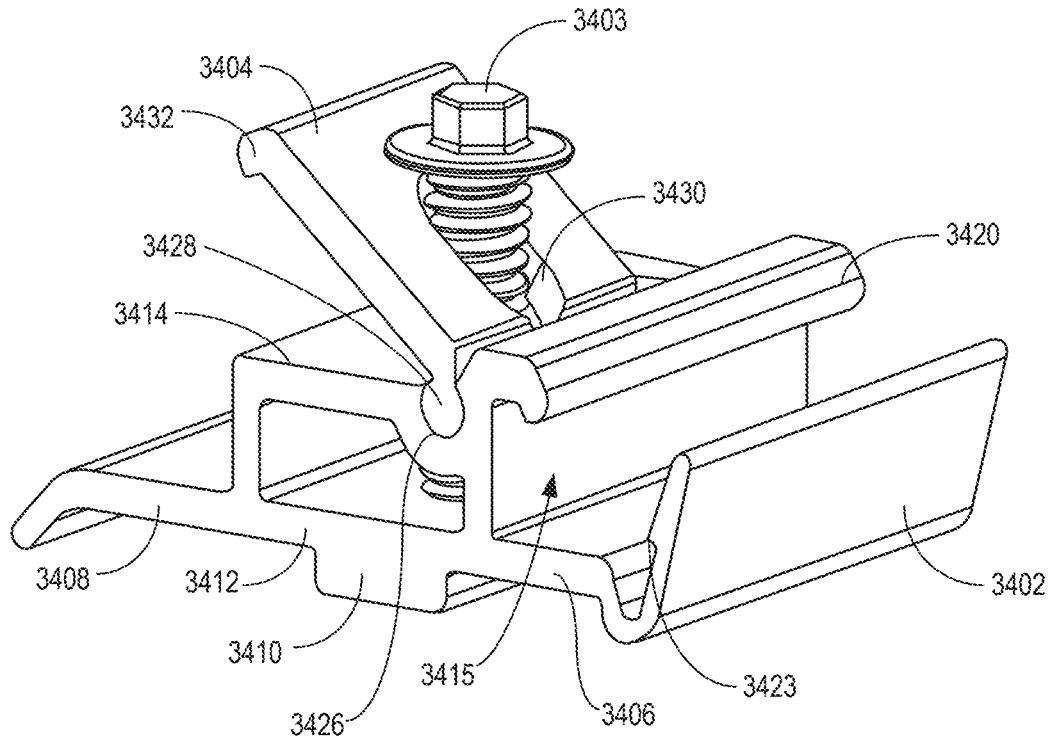
FIG. 35 is another perspective view of the mounting clamp of FIG. 34.
Figure 36:
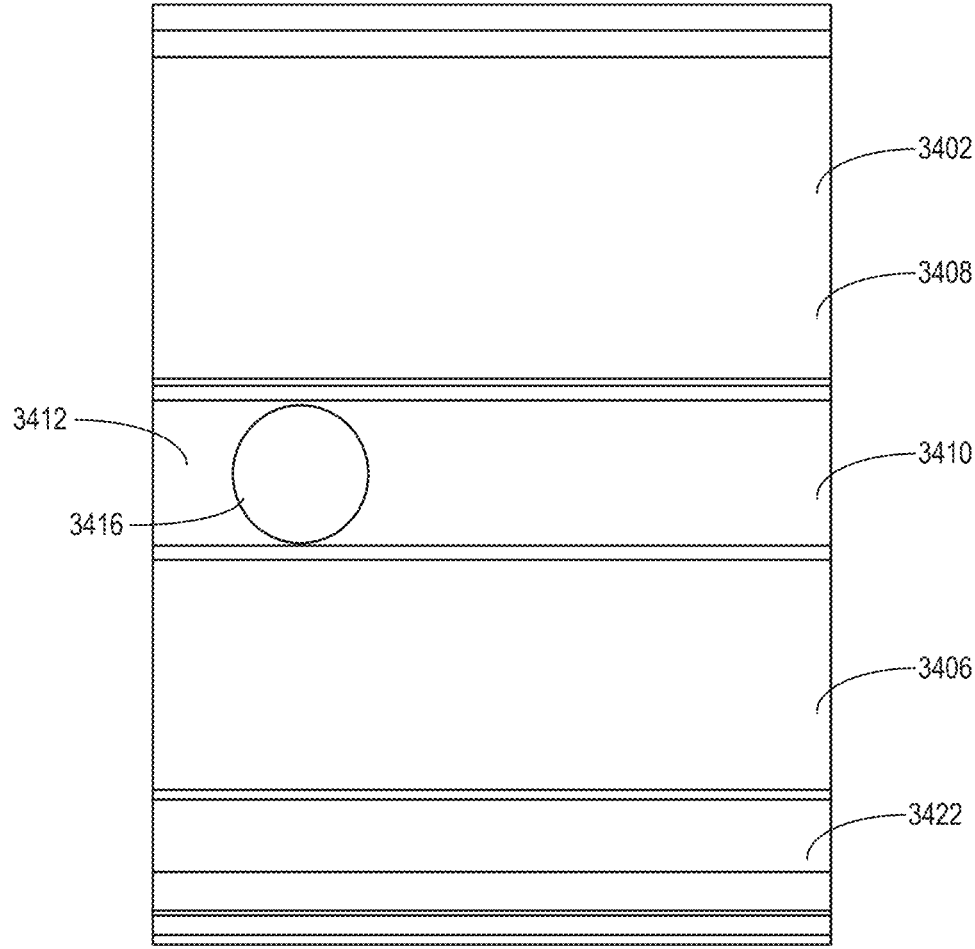
FIG. 36 is a bottom view of the mounting clamp of FIG. 34.

The ramp 4404 includes a center potion 4410 that is substantially flat and rectangular in shape with the aperture 4405 defined therein. Two side cavities are also shown. Extending from the center portion 4410 in opposing directions are support portions 4412A, 4412B. The support portions 4412A, 4412B are located a distance below the center portion 4410. The support portions 4412A, 4412B have a flat surface to support the base 404 and the flat bottom part of the outer lip 408 of the solar panel frame 402 as well as rounded ends 4414A, 4414B to support the rounded center potion 406 of the frame 402. Extending from the rounded ends 4414A, 4414B are peak surfaces 4416A, 4416B that are also substantially flat to support the flange 430 of the solar panel module frame 402. Extending from the peak surfaces 4416A, 4416B are ramp surfaces 4418A, 4418B that are angled downward relative to the flange surfaces 4416A, 2016B and the rail R. The ramp surfaces 4418A, 4418B terminate near an upper surface of the rail R, but include extensions 4420A1, 4420A2, 3220B1, 4420B2 that extend along opposing sides of the rail R, as shown in FIGS. 31 and 35. The extensions define gaps G1 therebetween, which are used to align the ramp 4404 on the rail R.

The arrangement of the ramp 4404 and the rounded center portion 406 of solar panel frame 402 relative to the rail R and clamp 4402 helps to mount the solar panel frame 402 to the clamp 4402. It also helps to keep the frame 402 secured within the ramp 4400. When installing the solar panel module, the panel frame 402 is tilted relative to the rails R or other mounting structure, with one panel frame 402 on the rails R and the opposing panel frame 402 held by the installer at a higher position for manipulating the panel into the system. The installer moves the opposing panel towards the clamp 4402, so that the frame 402 approaches the ramp 4418A or 4418B, and the bottom portion of the outer lip 408 slides up one of the ramp surfaces 4418A. As the frame 402 continues toward the clamp assembly 4400 the frame 402 passes over the peak surface 4416A, 4416B and into the space above the extending support surface 4412A, 4412B and below the mounting lips 4408A, 4408B. The movement of the frame 402 over the different surfaces 4418A, 4416A, 4414A effectively rotates the panel frame 402 such that the outer lip 408 is lower than the mounting lip 4408A. The installer then lowers the opposing solar panel frame 402 onto the mounting structure or rail R rotating the solar panel module, so that the outer lip 408 continues to rotate and comes into contact with the mounting lip 4408A and a clamping engagement with the mounting lip 4408A occurs. An opposite action can be taken to dismount the solar panel frame 402. When the solar panel frame 402 is located within the clamp and ramp mounting assembly 4400, the rounded surface 416 of the frame 402 acts as a stop against a rounded end 4414A of the ramp 4404. This helps to further secure the panel frame 402 within the ramp 4404, under the clamp 4402.

With reference to FIGS. 48-52, another mounting clamp 4800 is shown. The mounting clamp includes a base 4802 and a top portion 4804 arranged partially over the base 4802. The base 4802 includes a first support flange 4806 for supporting the first solar panel module frame and a second support flange 4808 for supporting the second solar panel module frame. The support flanges 4806, 4808 extend in generally opposing directions. A center portion 4810 connects the two support flanges 4806, 4808. Sidewalls 4807, 4809 extend from the base 4802 to separate the center portion 4810 from the support flanges 4806, 4808. Sidewall 4807 extends a first distance proximate support flange 4806, and sidewall 4809 extends a second distance proximate support flange 4808. As shown, sidewall 4807 extends a longer distance than sidewall 4809. Both of the support flanges 4806, 4808 can have different features to facilitate engagement with their respective solar panel frames. As shown, support flange 4806 includes a curved surface to facilitate the rotation of the solar panel frame relative to the mounting clamp 4800 when the solar panel frame is being mounted to the clamp 4800. Support flange 4808 includes a rough surface to grip a solar panel frame when it is engaged with the mounting clamp 4800.

The top portion 4804 is arranged partially over the base 4802 and includes a first clamping flange 4812, extending in one direction and opposing the first support flange 4806. The top portion 4804 also includes a second clamping flange 4814, extending opposite the first clamping flange 4812. The second clamping flange 4814 opposes the second support flange 4808. The clamping flanges 4812, 4814 may include features to connect or bond to the solar panel frames that to be engaged with the clamp 4800, such as bonding teeth 4813 that dig into the solar panel frame when mounted. The first support flange 4806 and the first clamping flange 4812 define a first mounting space 4816 therebetween, and the second support flange 4808 and the second clamping flange 4814 define a second mounting space 4818 therebetween. The mounting spaces 4816, 4818 are arranged to receive solar panel frames therebetween and to secure them to the mounting clamp 4800 for mounting in array or other solar panel system. The top portion 4804 also includes a sidewall 4820 extending downward proximate to the first clamping flange 4812 and a sidewall 4822 extending downward proximate to the second clamping flange 4814, with both sidewalls 4820, 4822 extending in the direction of the base 4802. As shown, sidewall 4820 extends in a direction of the base 4802 a distance farther than sidewall 4822. Sidewall 4820 is also adjacent to sidewall 4807. The sidewalls 4820, 4822 are connected by bridge portions 4824, 4826. Bridge portion 4824 extends from an end of sidewall 4822 and extends to a midpoint of sidewall 4820. Bridge portion 4826 extends between the sidewalls 4820, 4822 proximate the clamping flanges 4812, 4814. The bridge portions 4824, 4826 largely extend over the center portion 4810 of the base 4802 in a direction that is substantially parallel to the support flanges 4806, 4808. However, the top portion 4804 only extends over a portion of the center of the base 4802. This exposes part of the center portion 4810.

Figure 96:
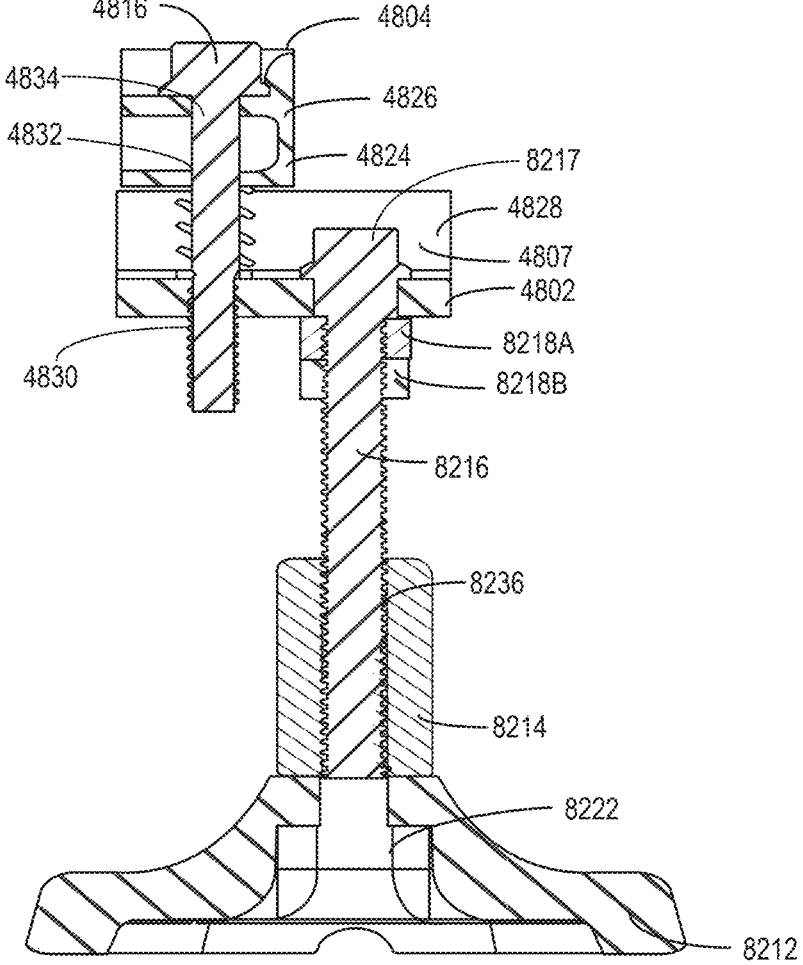
FIG. 96 is a cross-sectional side view of the mounting clamp and support structure of FIG. 95 taken along line B-B.

The part of the center portion 4810 that is exposed defines a mounting aperture 4828 (as shown in FIG. 96) that connects to a mounting fastener that will be described in greater detail below. The center portion 4810 also defines a connecting aperture 4830 (shown in FIGS. 51 and 96) adjacent to the mounting aperture 4828. Bridge portions 4824 4826 also define respective connecting apertures 4832, 4834. The connecting apertures 4830, 4832, 4834 are aligned and are arranged to receive a connecting fastener 4836 therethrough. The connecting fastener 4836 connects the base 4802 to the top portion 4804. The connecting fastener 4836 includes a threaded bottom portion 4838 that correspond to threads in connecting aperture 4830 to secure the connecting fastener 4836 to the base 4802. The other connecting apertures 4832, 4834 may be clearance apertures, or connecting aperture 4832 may also be threaded correspondingly to the threaded bottom portion 4838 of the connecting fastener 4836. A spring 4840 may be disposed around the top portion of the connecting fastener 4836.

Other Components

Figure 55:
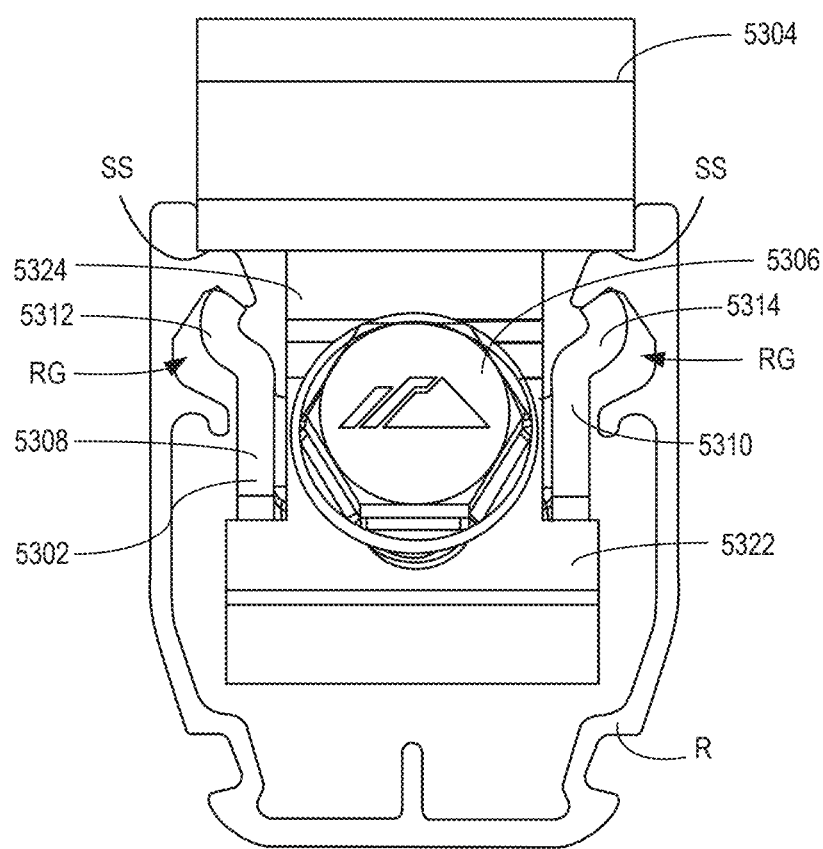
FIG. 55 is a side view of the hidden end clamp of FIG. 53 mounted to a rail.
Figure 56:
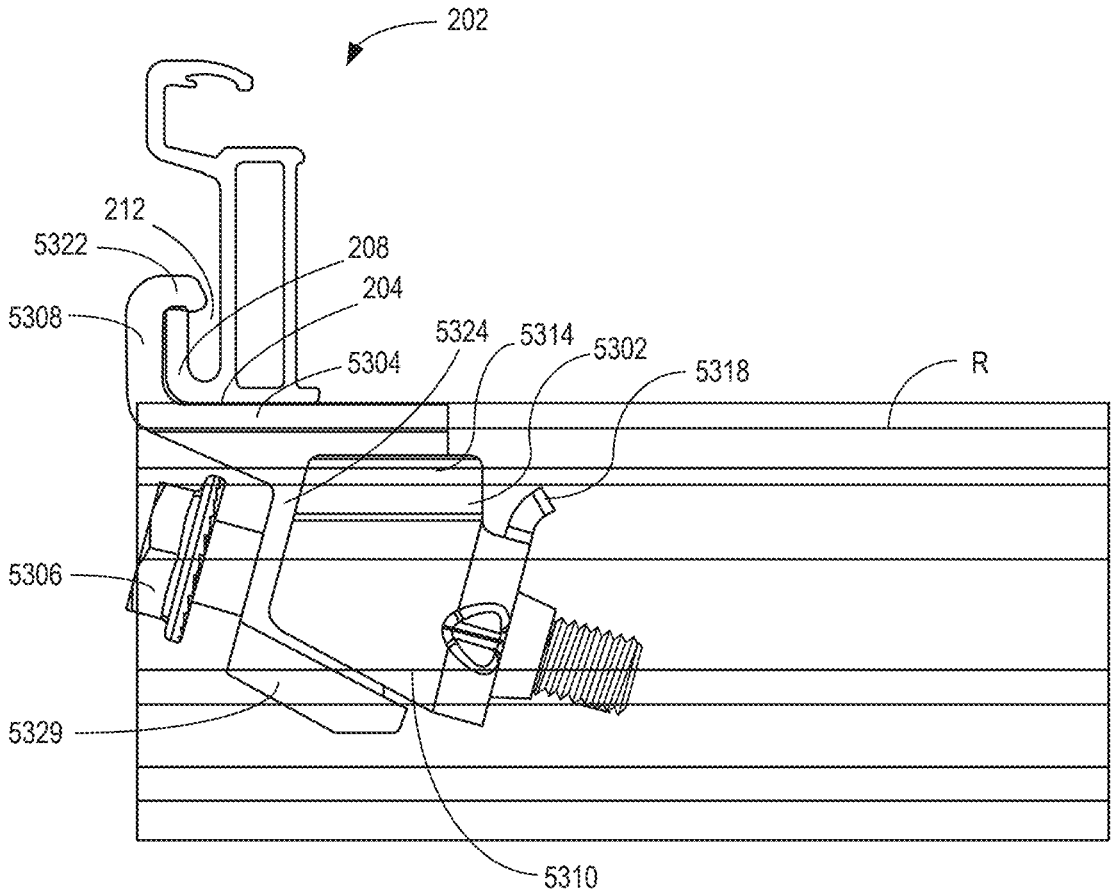
FIG. 56 is a front view of the hidden end clamp of FIG. 53 having a solar panel module frame of FIG. 2 mounted thereto.
Figure 57:
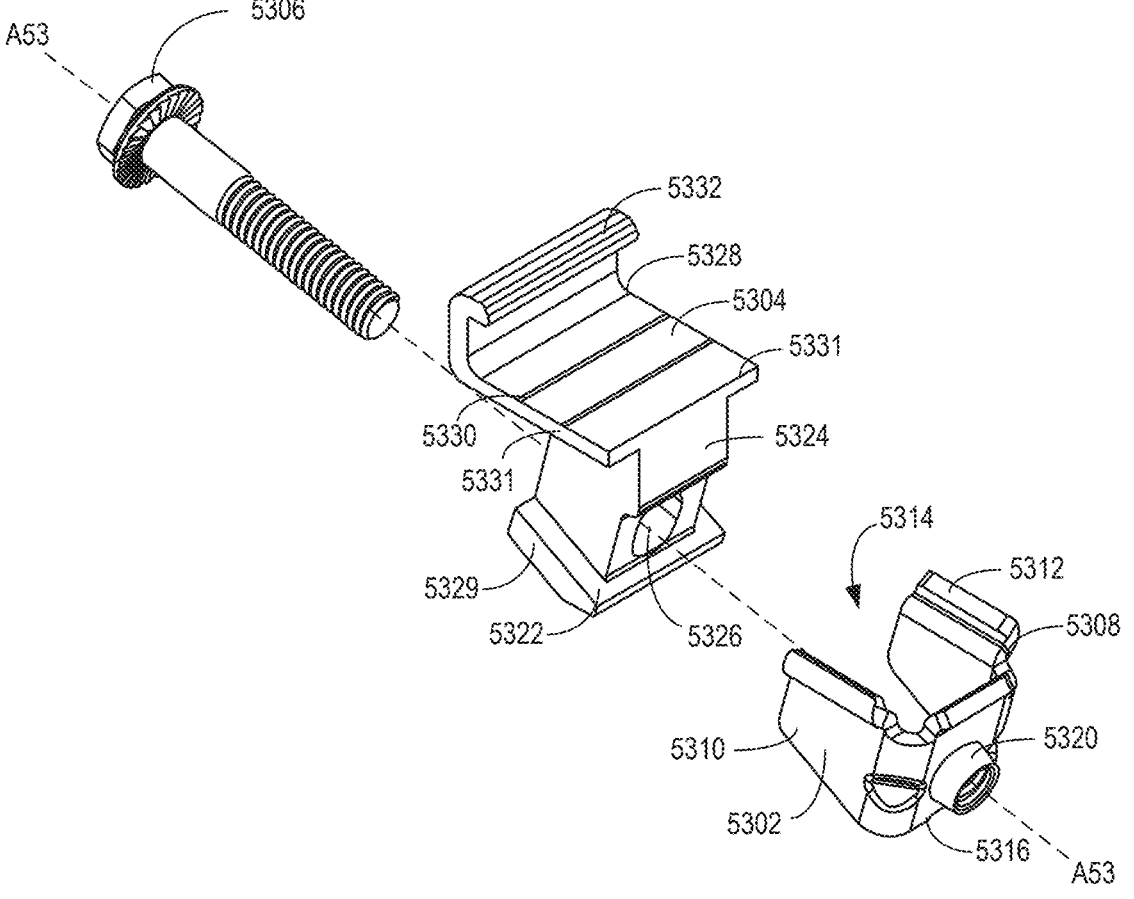
FIG. 57 is an exploded view of the hidden end clamp of FIG. 53.
Figure 58:
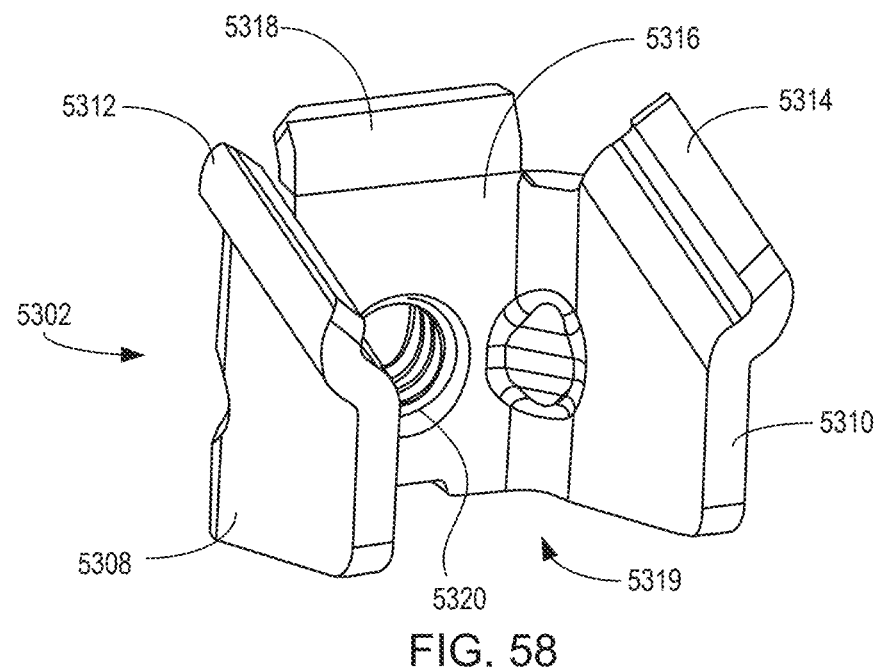
FIG. 58 is a first perspective view of the rail engaging portion of the hidden end clamp of FIG. 53.
Figure 59:
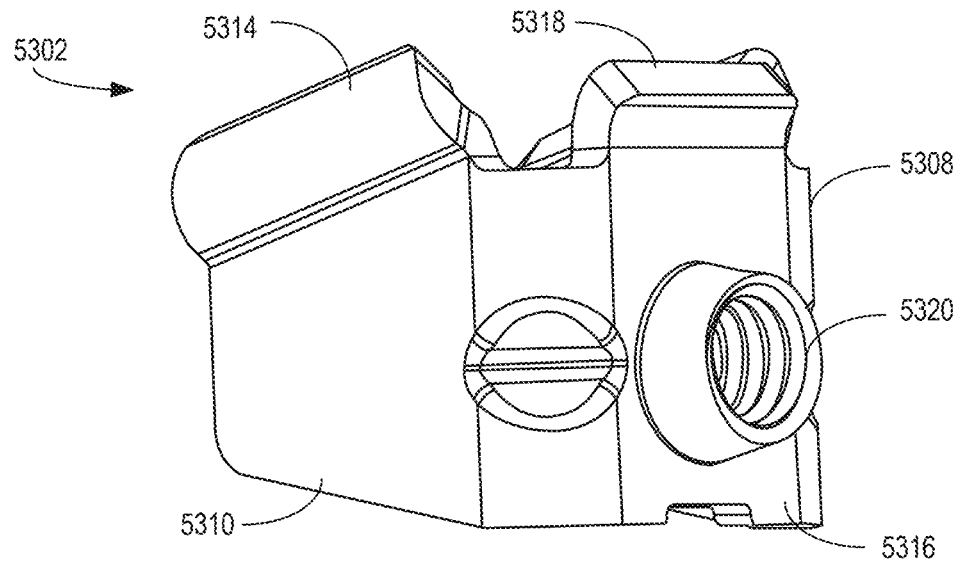
FIG. 59 is a second perspective view of the rail engaging portion of the hidden end clamp of FIG. 53.
Figure 60:
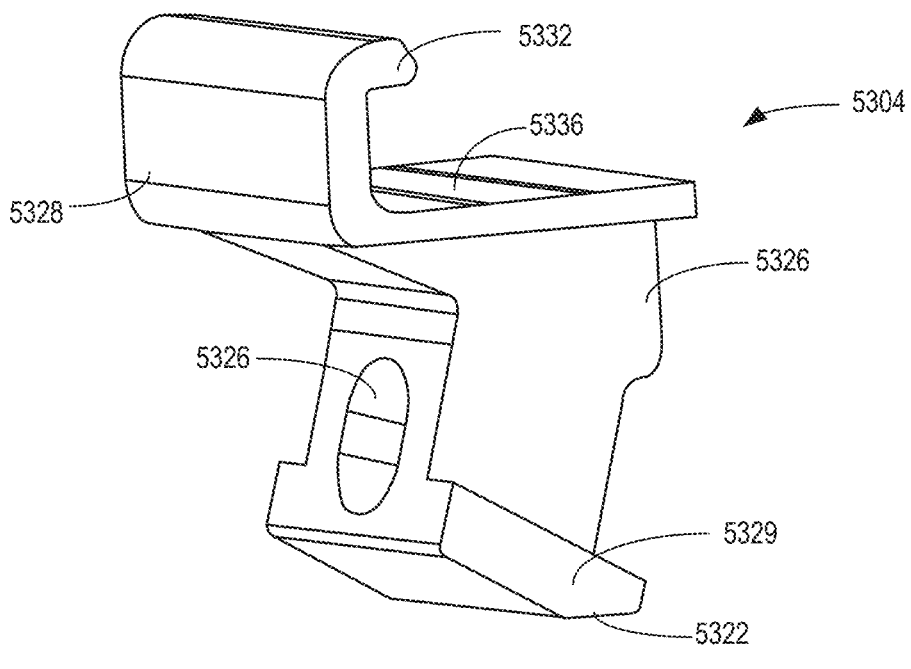
FIG. 60 is a first perspective view of a frame support portion of the hidden end clamp of FIG. 53.
Figure 61:
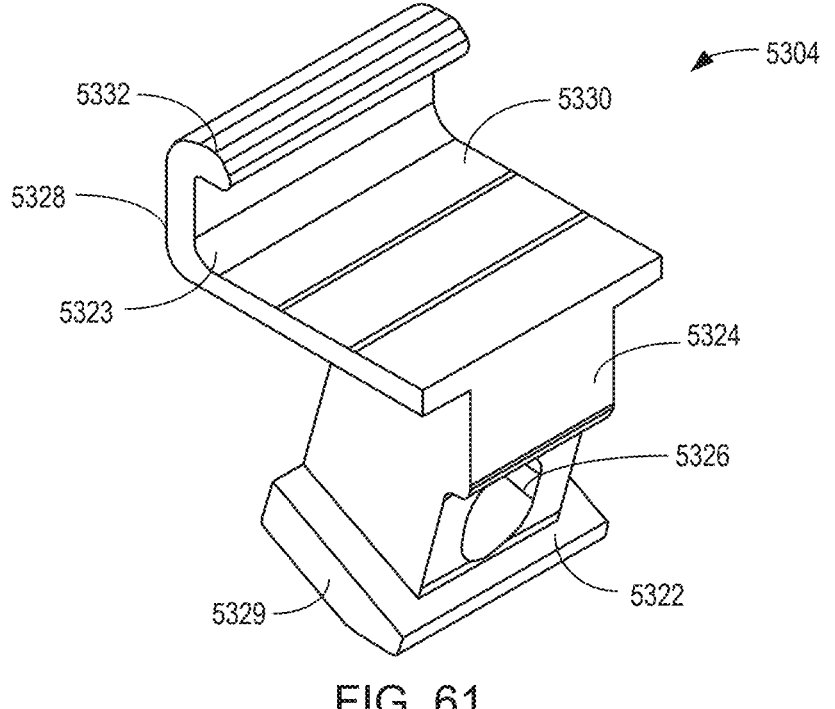
FIG. 61 is a second perspective view of a frame support portion of the hidden end clamp of FIG. 53.
Figure 62:
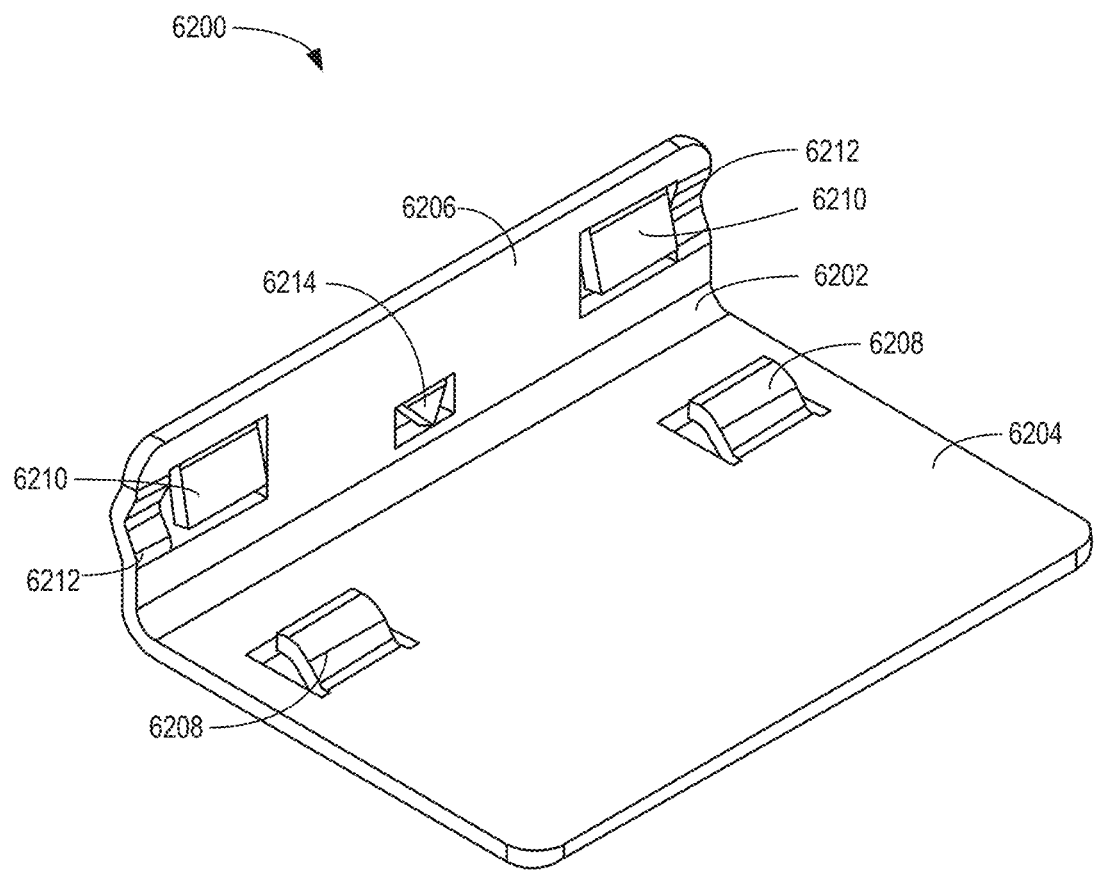
FIG. 62 is a perspective view of an accessory mount according to one embodiment or aspect of the present disclosure
Figure 63:
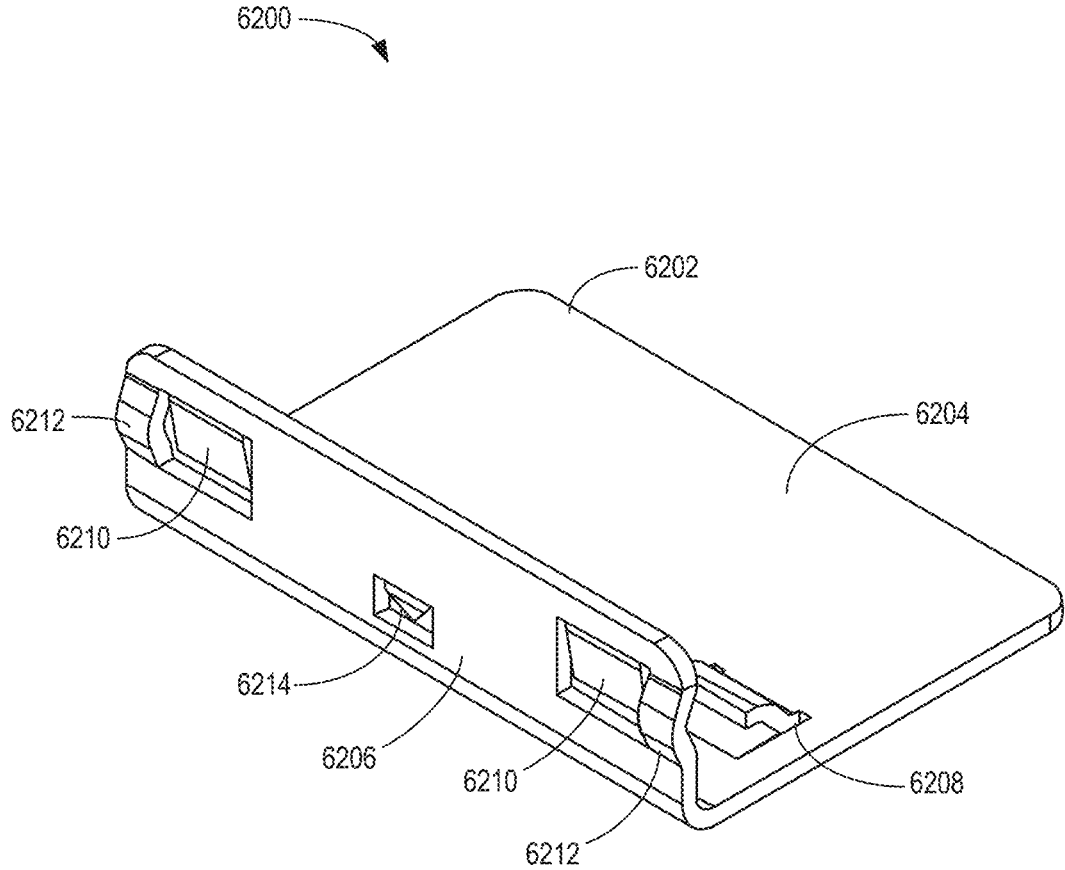
FIG. 63 is a perspective view of the accessory mount of FIG. 62.

With reference to FIGS. 53-61, a hidden end clamp 5300 for mounting a solar panel frame to an end of a rail R is shown. The hidden end clamp 5300 includes a rail engaging portion 5302, a frame engaging portion 5304, and a fastener 5306 for connecting the rail engaging portion 5302 and frame engaging portion 5304 together within the rail R. As shown in FIG. 56, the solar panel module frame 202 of FIG. 2 is mounted to the hidden end clamp 5300. It is understood that while the following discussion describes the clamping of frame 202 as is shown in FIG. 56, the other frames disclosed herein, including 102, 202, 302, 402, 11402, 11602 will also work with the hidden end clamp 5300.

As shown in FIGS. 53-59, the rail engaging portion 5302 includes a first sidewall 5308 and a second sidewall 5310. The first sidewall 5308 has a first rail flange 5312 that extends from a top surface and is curved relative to the first sidewall 5308. The second sidewall 5310 has a second rail flange 5314 that extends from a top surface and is curved relative to the second sidewall 5310. The rail flanges 5312, 5314 are arranged to be received in grooves RG defined in the sides of the rail R, as shown in FIG. 55. The engagement between the rail flanges 5312, 5314 and grooves G support the hidden end clamp 5300 within the rail R. A center piece 5316 extends between the first sidewall 5308 and second sidewall 5310, connecting the two sidewalls 5308, 5310 and defining a space 5319 that receives part of the frame engaging portion 5304. A flare 5318 extends from a top surface of the center piece 5316 and is curved relative to the center piece 5316. The flare 5318 may contact a portion of the frame engaging portion 5304 to provide some support thereto. The center piece 5316 may also include angled or ribbed portions that connect to the sidewalls 5308, 5310 at an angle less than ninety degrees thereto. The center piece 5316 also defines an aperture 5320 for receiving the fastener 5306. The aperture 5320 and fastener 5306 include corresponding threads. In other embodiments, other connection methods known to those having ordinary skill art may be used.

As shown in FIGS. 53-57, 60, and 61, the rail R defines grooves RG and support surfaces SS along opposing inner sides. The frame engaging portion 5304 includes a base 5322 and a body 5324 extending from the base 5322. The base 5322 includes side portions 5329 that extend beyond the body 5324 that support the first sidewall 5308 and second sidewall 5310 of the rail engaging portion 5302. The body 5324 extends from the base 5322 so that it is mostly received within the space 5319 defined by the first sidewall 5308, the second sidewall 5310, and the center piece 5316. The body 5324 defines a vertically elongated aperture 5326 that receives the fastener 5306. The aperture 5326 of the body 5324 is aligned with the aperture 5320 of the center piece 5316. Extending upward from the body 5324 is a frame support panel 5328 that includes a frame support surface 5330 for supporting the solar panel frame 102 thereon. When installed in the rail the frame support surface 5330 may be flush with or slightly above the top surface of the rail R thereby providing support for the solar panel module frame 202. This allows for the solar panel module frame 202 to be level relative to the top surface of the rail R. The frame support panel 5328 is angled relative to the body 5324, so that the frame support surface 5330 can be flush with the top of the rail R. The frame support member 5330 may also extend below the top surface of the rail R such that the frame support member 5330 does not support the frame 202. Instead, the top surface of the rail R supports the frame 202. Depending on the angle of the surface on which the rail R is mounted or other operating conditions, the frame support panel 5328 can be arranged to define different angles between the solar panel frame 202 and the rail R. The frame support panel 5328 also includes a mounting lip 5332 that extends upward from the frame support surface 5330. The mounting lip 5332 acts like the mounting lips previously described in this application.

Center piece 5316 includes threaded aperture 5320 and can act as a nut receiving aperture. The vertically elongated aperture 5326, threaded aperture 5320, and the fastener 5306 are concentrically aligned along an axis A53. Axis A53 extends along the length of the rail R where the hidden end clamp 5300 is located at a vertically offset angle such that the driving head of the fastener 5306 extends upwardly and can be easily accessed by a driving tool such as a drill or impact gun from above the top of the rail R.

The bottom surfaces of the sidewalls 5308, 5310 and the top surfaces of side portions 5329 are parallel to each other and angled relative to axis A53, such that these surfaces are not parallel with axis A53. As the fastener 5306 is tightened: (a) the frame engaging portion 5304 and the rail engaging portion 5302 are drawn together, (b) the bottom surfaces of the sidewalls 5308, 5310 and the top surfaces of the side portions 5329 slide across each other, (c) the fastener 5306 is able to move through the elongation of the aperture 5326, (d), the first and second rail flanges 5312, 5314 are urged upward against the top of the rail grooves RG, and (e) the side extensions 5331 of the frame support member 5330 are urged downward against the rail R support surfaces SS. Thus, the rail engaging portion 5302 and the frame engaging portion 5302 exert a clamping force on the rail grooves RG and the rail support surfaces SS and the hidden end clamp 5300 is secured to the rail R. In this way the hidden end clamp 5300 can be installed in and secured to the rail R without the solar panel module frame. This allows the installer to install the hidden end clamps first and then rock in the solar module frame 202 by tilting the solar panel, extending the outer lip 208 under the mounting lip 5332 then lowering the module such that the frame 202 is rotated and the outer lip 208 exerts an upward force against the mounting lip 5332.

Alternately the solar panel can be placed on the rail R first and then the hidden end clamp 5300 can slide along the rail R until the mounting lip 5332 extends over the outer lip 208 and engages the cavity 212. Then the fastener 4106 can be tightened and the hidden end clamp 5300 will be secured to the rail R and the frame 202 will be clamped securely to the rail R concurrently.

Figure 64:
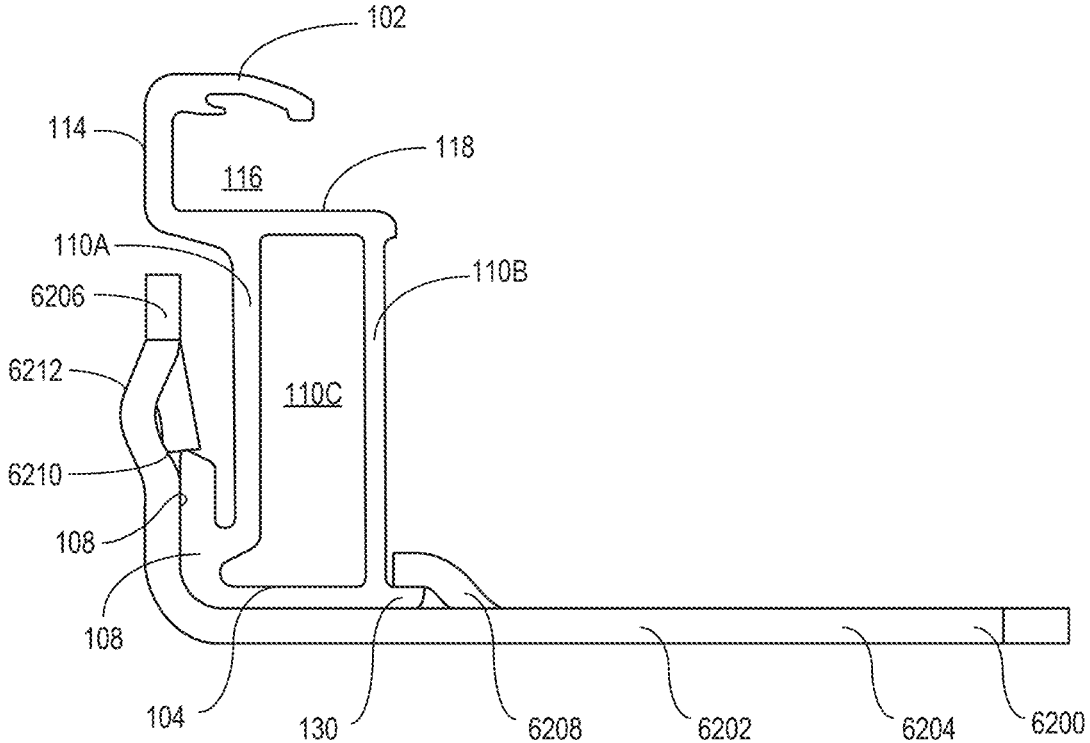
FIG. 64 is a front view of the accessory mount of FIG. 62 engaged with a solar panel module frame of FIG. 1.
Figure 65:
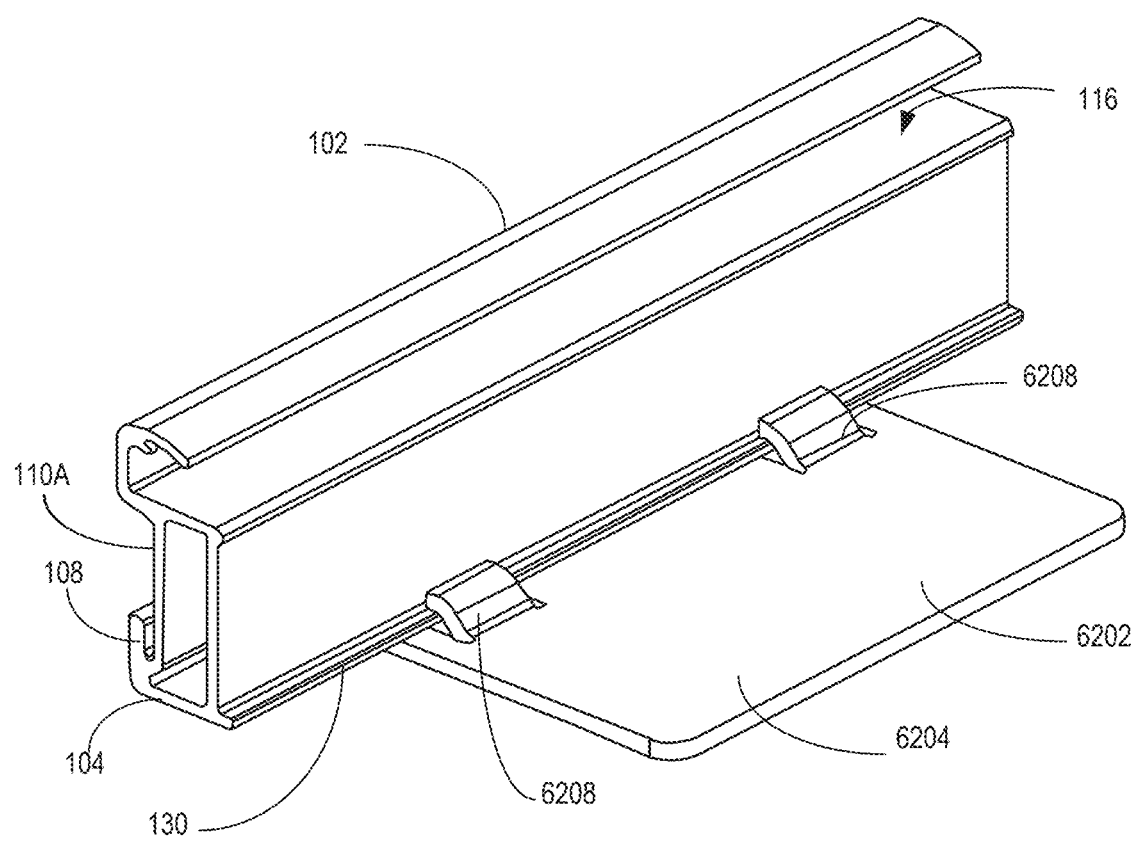
FIG. 65 is a first perspective view of the accessory mount and solar panel frame of FIG. 64.
Figure 66:
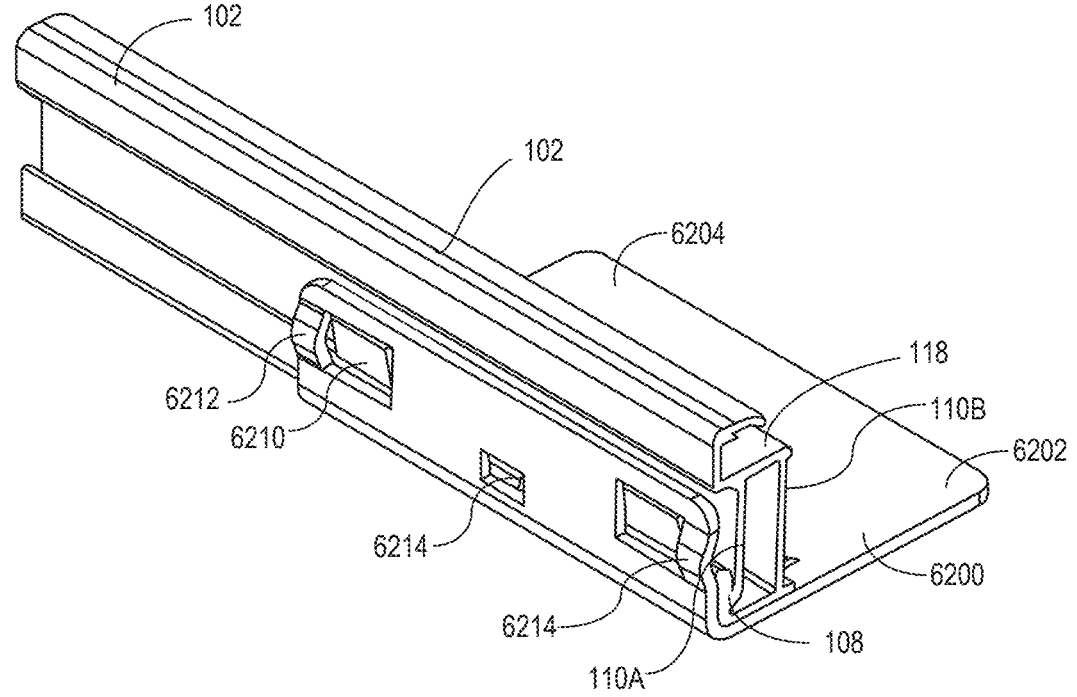
FIG. 66 is a second perspective view of the accessory mount and solar panel frame of FIG. 64.
Figure 67:
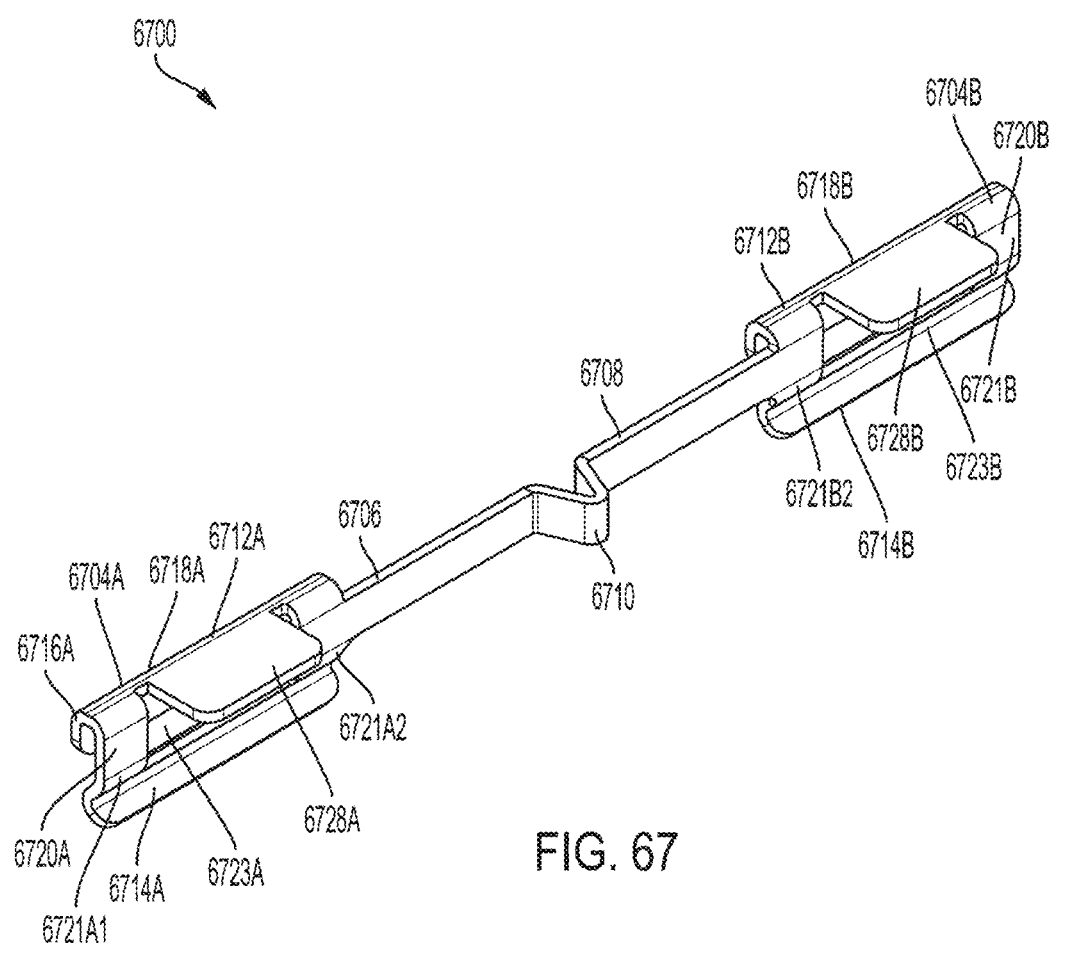
FIG. 67 is a first perspective view of a bonding jumper according to one embodiment or aspect of the present disclosure.
Figure 68:
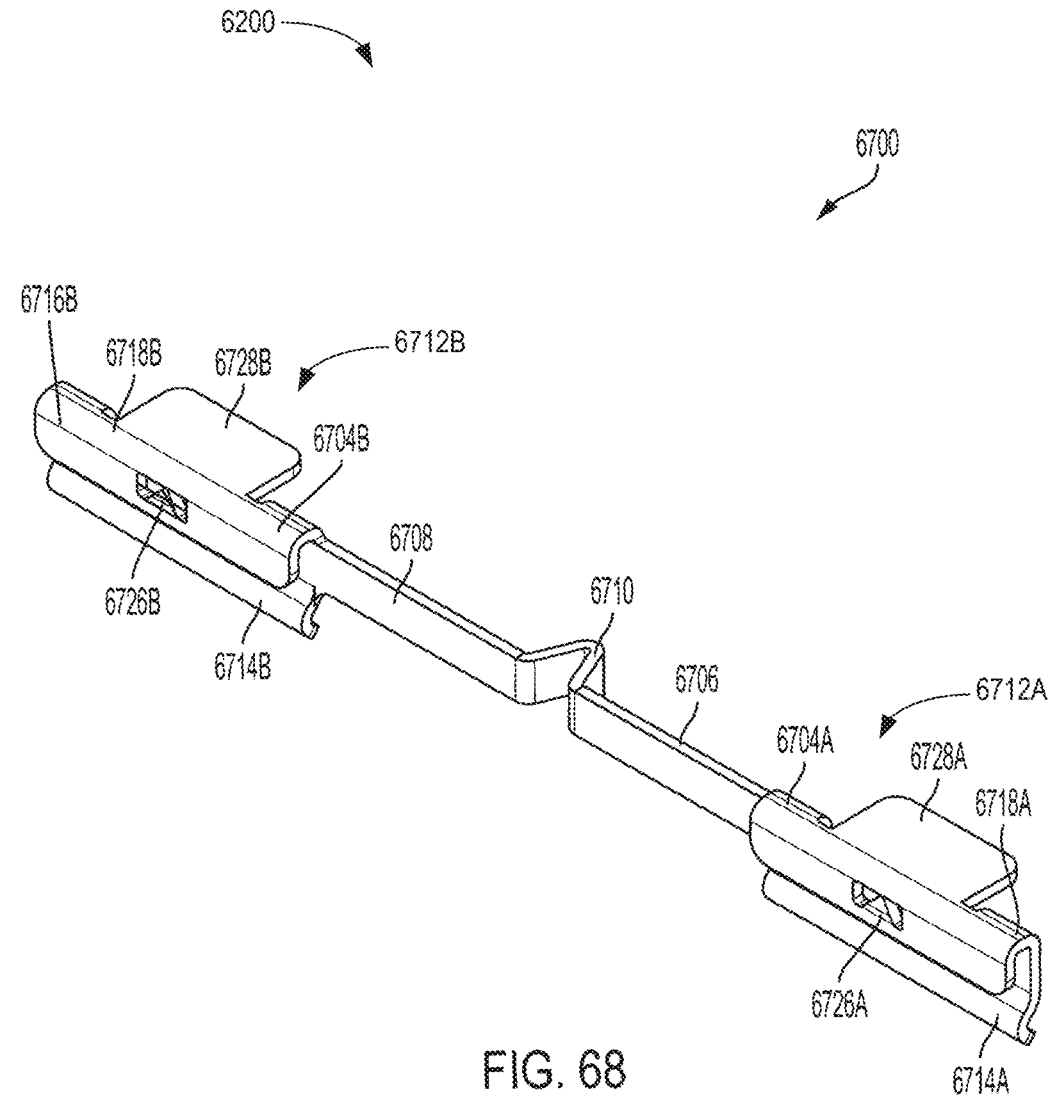
FIG. 68 is a second perspective view of the bonding jumper of FIG. 67.
Figure 69:
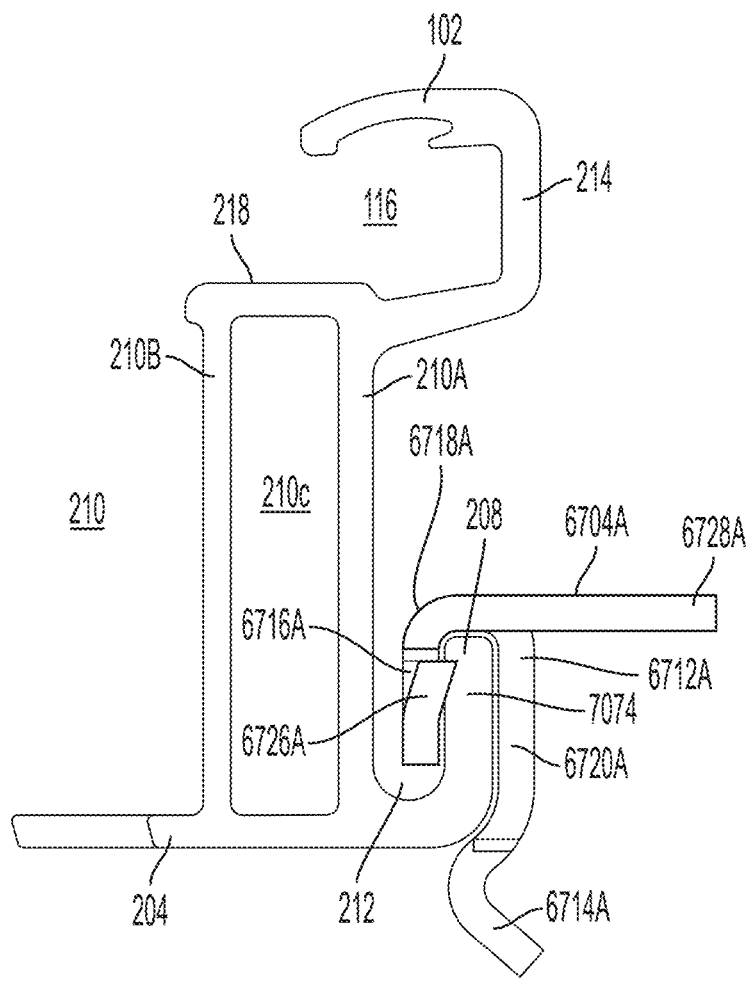
FIG. 69 is a front view of the bonding jumper of FIG. 67 connected to a solar panel module frame of FIG. 2.

With reference to FIGS. 63-66, an accessory mount 6200 is shown. The accessory mount 6200 can be used to support other features relative to the solar panel frame 102, including but not limited to module level power electronics, electrical controls or wire management devices or routers. The accessory mount 6200 includes a body 6202 having a first plate 6204 and a second plate 6206, between which a solar panel frame 102 can be placed, as shown in FIGS. 64-66. As shown, the first plate 6204 and the second plate 6206 define a substantially ninety degree angle that fits the solar panel frame 102 therein. The region on the body 6202 where the first plate 6204 and the second plate 6206 meet is rounded to fit the rounded outer lip 108 of the solar panel frame 102. Other shapes may be used to accommodate the shapes of other frame panels. The first plate 6204 includes attachment hooks 6208 that extend from the surface of the first plate 6202 to engage with the solar panel frame 202 at the base extension 130. The attachment hooks 6208 may have sharp points to form an electrical connection or a grounding connection between the attachment hooks 6208 and the solar panel frame 102. The second plate 6206 includes attachment lips 6210 that engage with the outer lip 108 of the solar panel frame 102. This engagement can be the same as that already described in this application. Near the attachment lips 6210, the second plate 6206 also defines handles 6212. The handles 6212 curve away from the part of the second plate 6206 that contacts the solar panel frame 102 so that a user can pull the handle to disengage the attachment lips 6210 from the outer lip 108. This action helps to disconnect the accessory mount 6200 from the solar panel frame 102. Although not shown, handles may also be used in connection with the first plate 6204. The second plate 6206 also includes a grounding tooth 6214 that is a sharp point that electrically connects and/or electrically bonds the solar panel frame 102 and accessory mount 6200. Although two attachment hooks 6208 and attachment lips 6210 and one grounding tooth 6214 is shown, it is understood that different numbers of these features may be defined in the accessory mount.

Although not shown, it is understood that first plate 6204 can include a threaded aperture or other features for attaching the MLPE or other accessory to the accessory mount 6200 as well as a grounding tooth for electrically connecting or bonding the accessory mount 6200 to the accessory. In a preferred embodiment (not shown) the accessory mount can be integrally incorporated into the housing body of the accessory. The accessory mount 6200 may also be aligned perpendicular to the way it is shown in the drawings. In other words, the second plate 6206 may extend parallel to the base 104 of the solar panel module frame 102 used with the accessory mount 6200.

Figure 70:
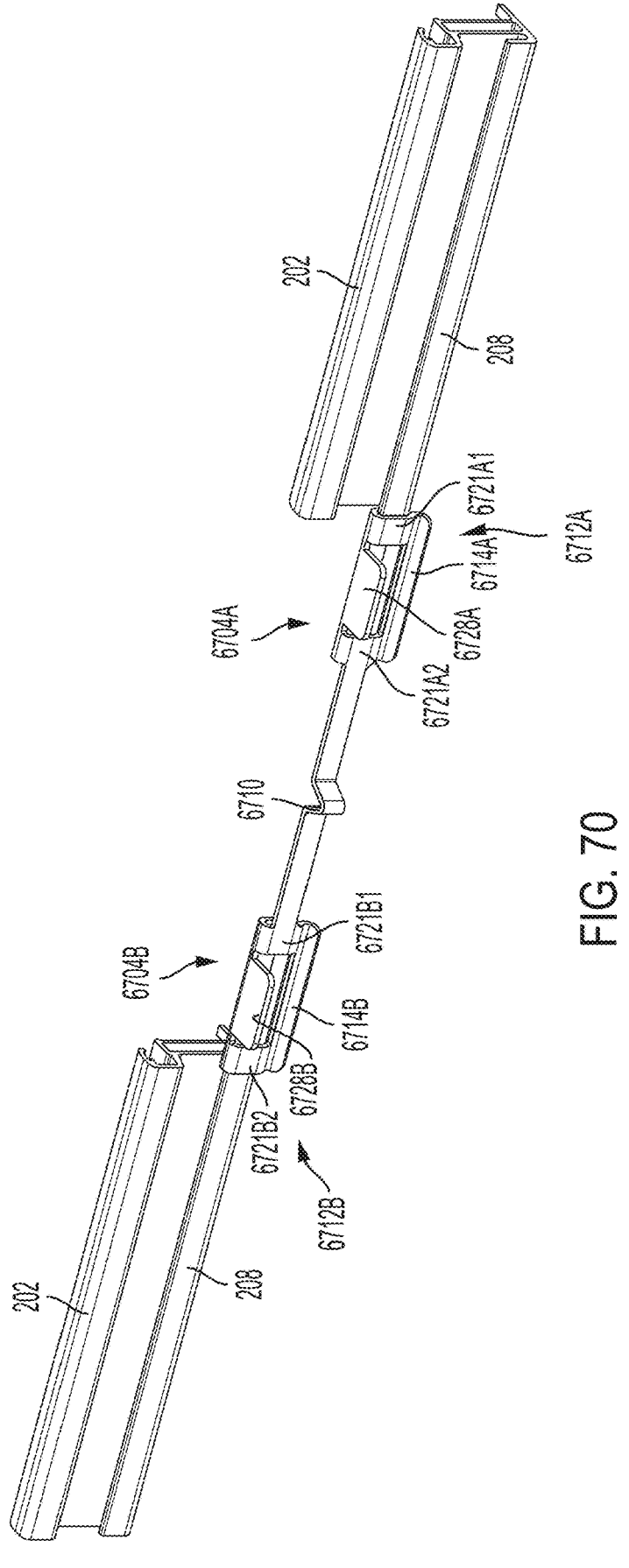
FIG. 70 is a perspective view of the bonding jumper of FIG. 67 connecting two solar panel module frames of FIG. 2.

With reference to FIGS. 67-70, a bonding jumper 6700 is shown. The bonding jumper 6700 is configured to electrically connect two adjacent frames 202, as shown in FIG. 70. The bonding jumper 6700 includes an elongated body 6702 and two frame receiving sections 6704A, 6704B at opposing ends of the elongated body 6702. The elongated body 6702 includes a first straight portion 6706 and a second straight portion 6708, connected by a bent portion 6710 therebetween. The bent portion 6710 defines an acute angle and is V-shaped. The bent portion 6710 provides flexibility in the length direction, which helps combat thermal expansion. However, additional shapes and arrangements may be used, so long as the functionality of the bonding jumper 6700 is maintained. The bent portion 6710 is located at a central location along the elongated body 6702, at adjacent ends of the straight portions 6706, 6708. The frame receiving sections 6704A, 6704B are located at the other ends of the straight portions 6706, 6708, opposing the end that is connected to the bent portion 6710.

The frame receiving sections 6704A, 6704B are identical and include the same features. These features will have the same element numbers in the figures. The features of only one frame receiving section 6704A will be described herein, and one will understand that the features are identical on the other frame receiving section 6704B. The frame receiving section 6704A includes a frame engaging portion 6712A that engages with a frame 202 and a curved bottom wall 6714A that partially wraps around and then curves away from the frame 202. The frame engaging portion 6712A includes a cavity sidewall 6716A, a lip topwall 6718A, and a lip sidewall 6720A. Together, these walls 6716A, 6718A, 6720A define a lip receiving space 6722A, in which the lip 108 of the frame 108 is held. To define the receiving space 6722A, the cavity sidewall 6716A, lip topwall 6718A, and lip sidewall 6720A form an upside down U-shape. In this configuration, the cavity sidewall 6716A is arranged to fit within the clamp cavity 212 against the outer lip 208 the lip topwall 6718A extends from the cavity sidewall 6716A over the top of the outer lip 208 and the lip sidewall 6720 extends from the lip topwall 6718A along the side of the outer lip 208 opposing the clamp cavity 212. The lip sidewall 6720A is made of a first part 6721A1 and a second part 6721A2, with an opening 6716 formed therebetween. The opening 6716 exposes part of the outer lip 108 when the bonding jumper 6700 is connected to the frame 202. The curved bottom wall 6714A extends from both parts 6721A1, 6721A2 of the lip sidewall 6720A and also extends along the entire length of the frame receiving section 6704A. The curved bottom wall 6714A extends first in a direction towards the frame 102, with part of the curved bottom wall 6714A wrapping around the bottom of the outer lip 108. Then, the curved bottom wall 6714A extends in a direction away from the frame 202.

The cavity sidewall 6716A includes a bonding tooth 6726A that is formed in the sidewall 6716A and is angled in the direction of the outer lip 208 in order to contact and penetrate an outer surface of the outer lip 208 when the bonding jumper 6700 is applied to the frame 202. This creates an electrical connection between the frame 202 and the bonding jumper 6700. This can be used to ground the solar panel module frame 202 in an assembly. The frame engaging portion 6712A also includes a flared panel 6728A that extends from the lip topwall 6718A above the opening 6716A. The flared panel 6728A extends straight outward from the lip topwall 6718A in a direction that is perpendicular to the cavity sidewall 6716A and the lip sidewall 6720A. It is contemplated, that the flared panel 6728A may extend in other, non-perpendicular, directions from the lip topwall 6718A.

To connect the bonding jumper 6700 to a frame 202, the cavity sidewall 6718A, lip topwall 6720A, and lip sidewall 6722A are slid into place around the outer lip 108, 208, 308, 408, by applying a downward force on the flared panel 6728A, so that the end of the solar panel module frame 202 is located somewhere within the lip receiving space 6724A. Then the outer lip 208 of a second frame 202 is slid into place within the second lip receiving space 6724B on the second frame receiving section 6704B. The bonding jumper 6700 is made of metal or another electrically conductive material to create an electrical connection between the two frames 102.

Figure 71:
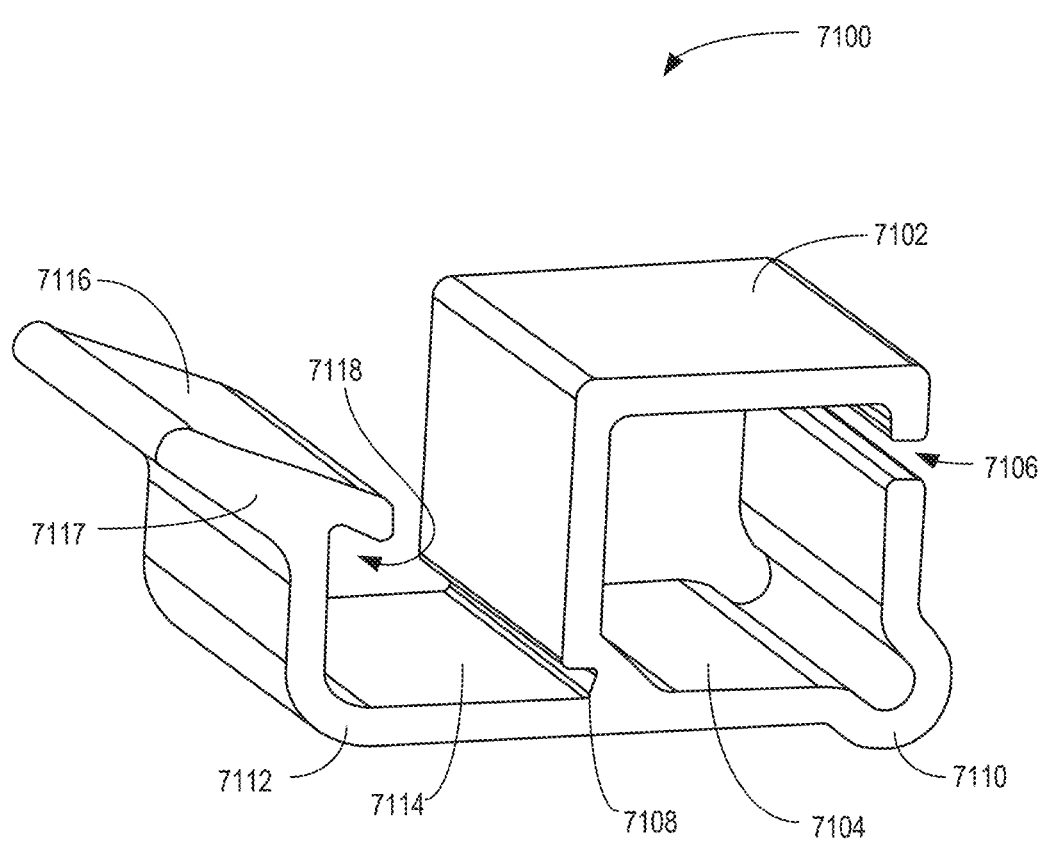
FIG. 71 is a perspective view of a wire router according to one embodiment or aspect of the present disclosure.
Figure 72:
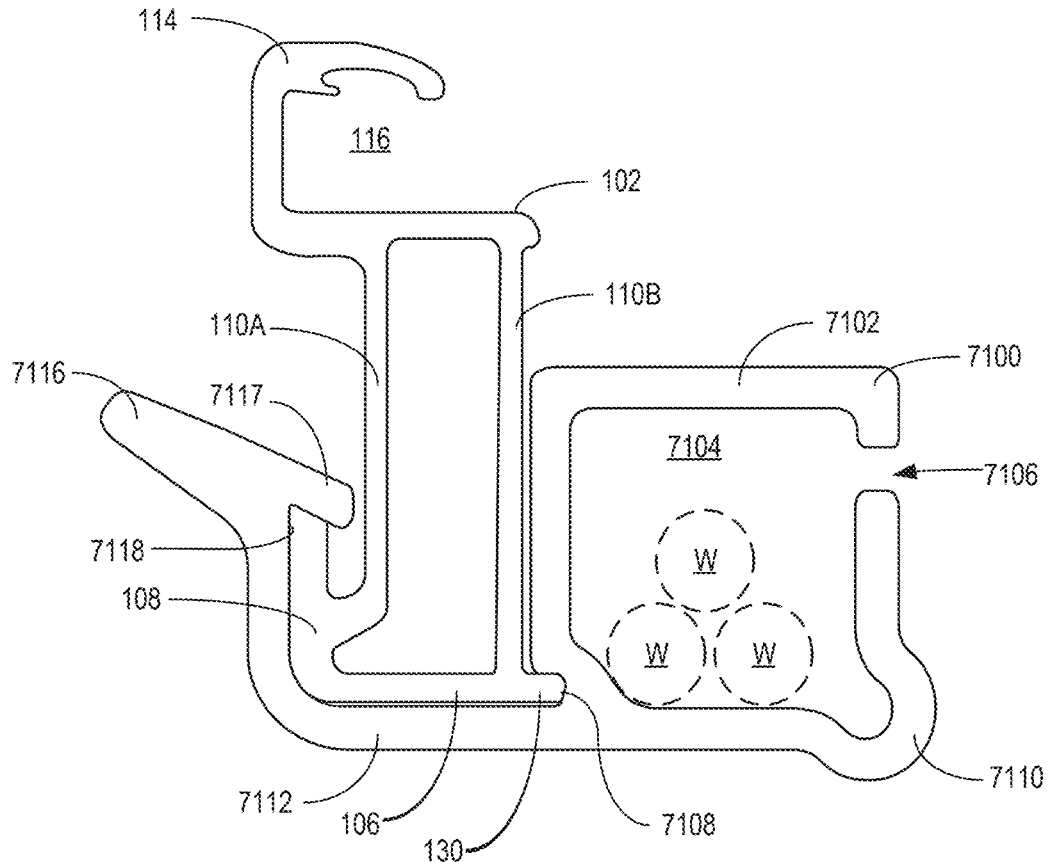
FIG. 72 is a front view of the wire router of FIG. 71 mounted to a solar panel module frame of FIG. 1.

With reference to FIGS. 71 and 72, a wire router 7100 is shown. The wire router 7100 includes a hollow body 7102 that is used for storing, routing, and organizing wires W relative to the solar panel frame 102. The hollow body 7102 defines a cavity 7104 in which the wires W are stored. The cavity 7104 can be sized to accommodate multiple wires including home run wires and wires traversing the array of photovoltaic panels and route them accordingly. The hollow body 7102 also defines a slot 7106 that is used to place wires into the cavity 7104. Diagonally from the slot 7106, the hollow body 7102 defines an indentation 7108 for receiving the base 104 of the solar panel frame 102. In some embodiments, a flange (not shown) may extend from the base 104 to fit within the indentation 7108. The hollow body 7102 also has a bulge 7110 extending from one corner. The bulge 7110 allows the outermost leg of the hollow body 7102 to be more flexible, so that it can be pulled away from the other features of the wire router 7100 to increase the size of the slot 7106. The bulge 7110 can also be used to separate one or more wires within the cavity 7104 for better organization. Although the hollow body 7102 is shown having a substantially square cross section, other shapes may be used.

Extending from the hollow body 7102 is a tail 7112. The tail defines a surface 7114 that engages with the base 104 of the solar panel frame 102. The surface 7114 may provide some support for the frame 202 in certain embodiments. The tail 7112 also has an upward extending portion 7115 extending upward from the support surface 7114. The upward extending portion 7115 contacts and extends along the upward extending portion of the outer lip 108 and terminates with a fin 7116 having a retaining lip portion 7117 defining a corner 7118 with the upward extending portion 7115. The corner 7118 engages the outer lip 108 of the solar panel frame 102. The engagement of the corner 7118 and the retaining lip portion 7117 with the outer lip 108 and the indentation 7108 with the base extension 130 secures the wire router 7100 about the solar panel frame 102. It is contemplated that the fin 7116, the retaining lip portion 7117, and the upward extending portion 7115 may be arranged in a number of ways so long as the outer lip 108 can engage with the corner 7118 as described in this application. The fin 7116 can be used as a lever to lift the retaining lip portion 7117 and remove the outer lip 108 from the corner 7118 thereby enabling the removal of the wire router from the panel frame 102, All of the elements of the wire router 7100 can be made of a resilient or bendable material to allow for the wires to be placed into the cavity 7104 and the wire router 7100 to fit about the solar panel frame 202.

Figure 73:
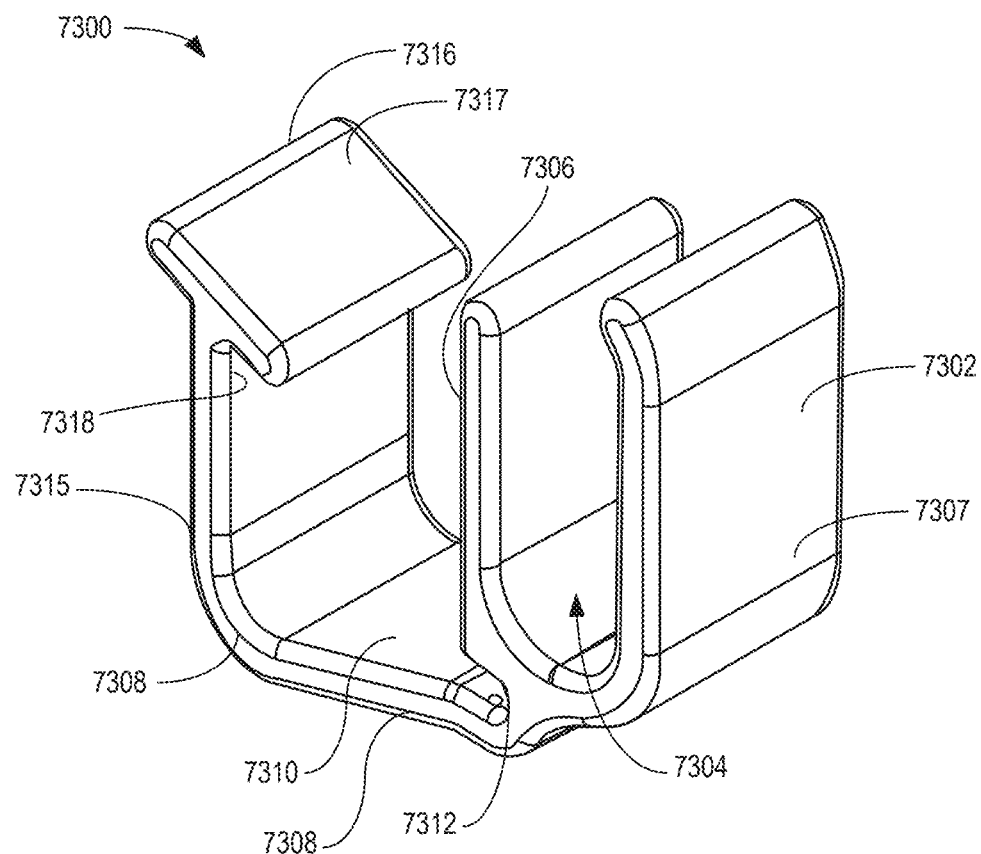
FIG. 73 is a perspective view of a wire clip according to one embodiment or aspect of the present disclosure.
Figure 74:
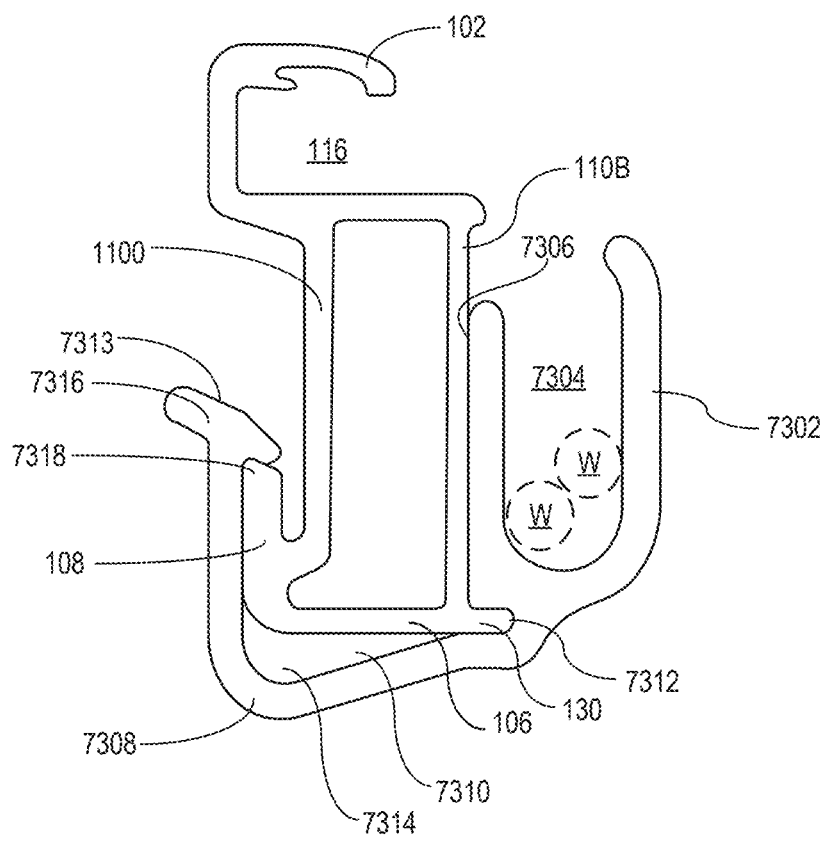
FIG. 74 is a front view of the wire clip of FIG. 73 mounted to the solar panel module frame of FIG. 1.
Figure 75:
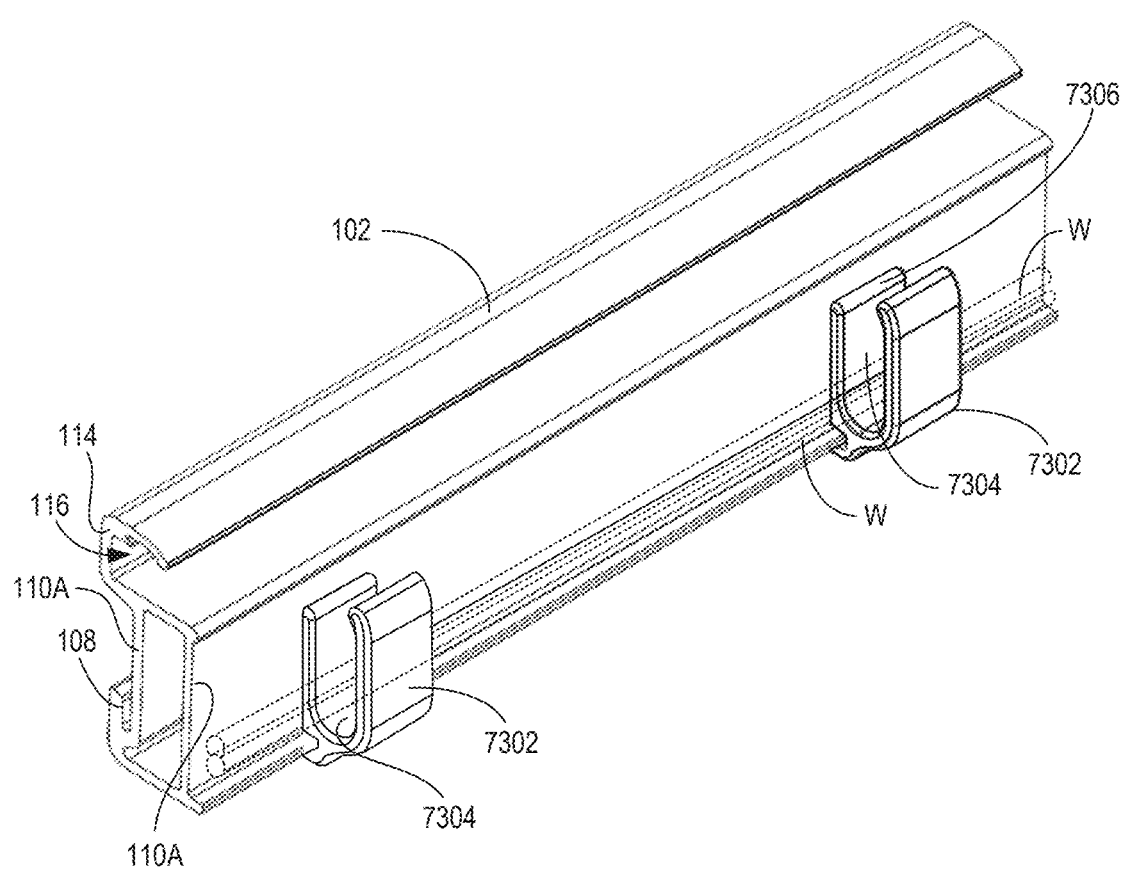
FIG. 75 is a perspective view of two wire clips of FIG. 73 mounted to a solar panel module frame of FIG. 1.
Figure 76:
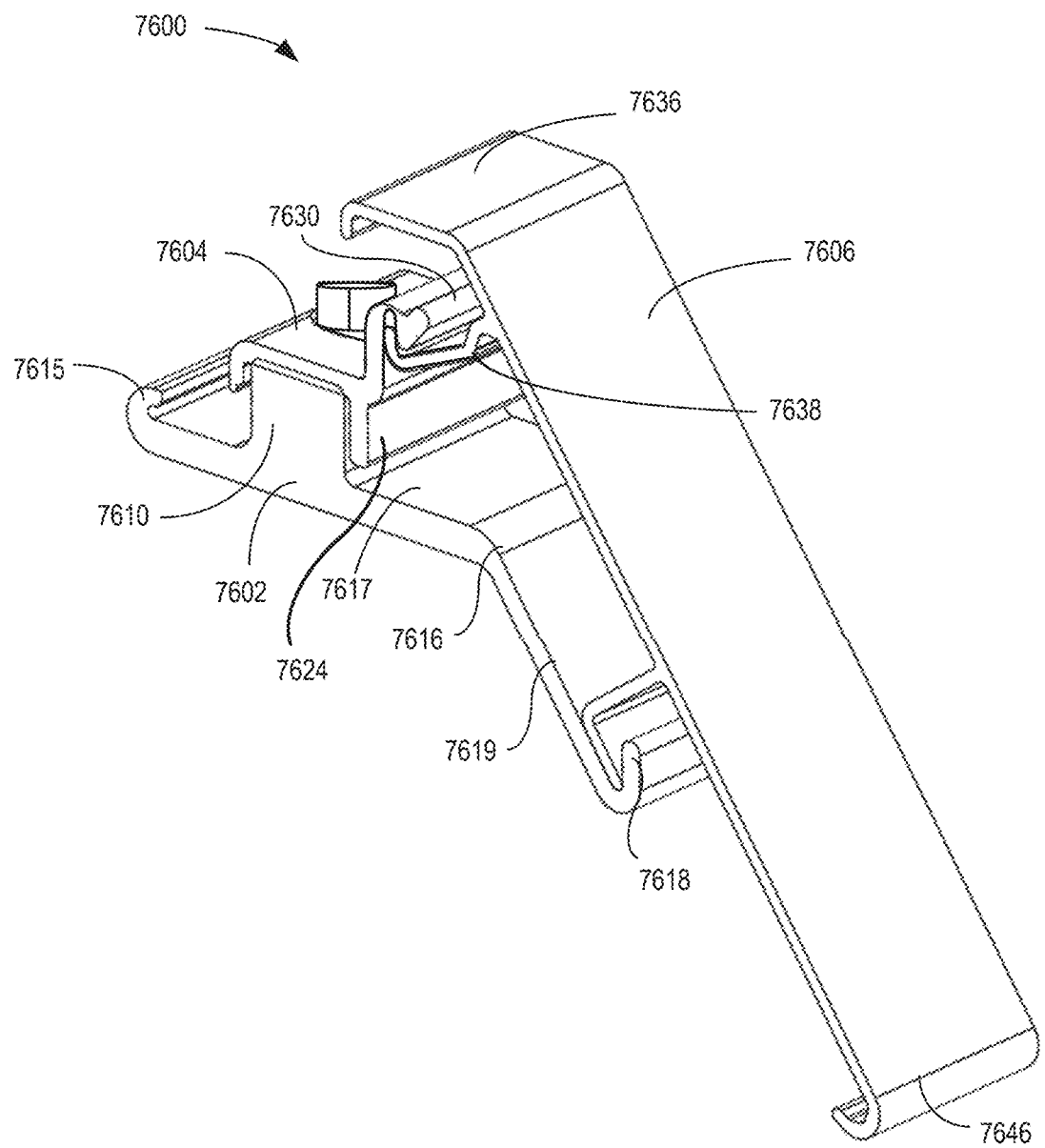
FIG. 76 is a perspective view of a skirt assembly according to one embodiment or aspect of the present disclosure.
Figure 77:
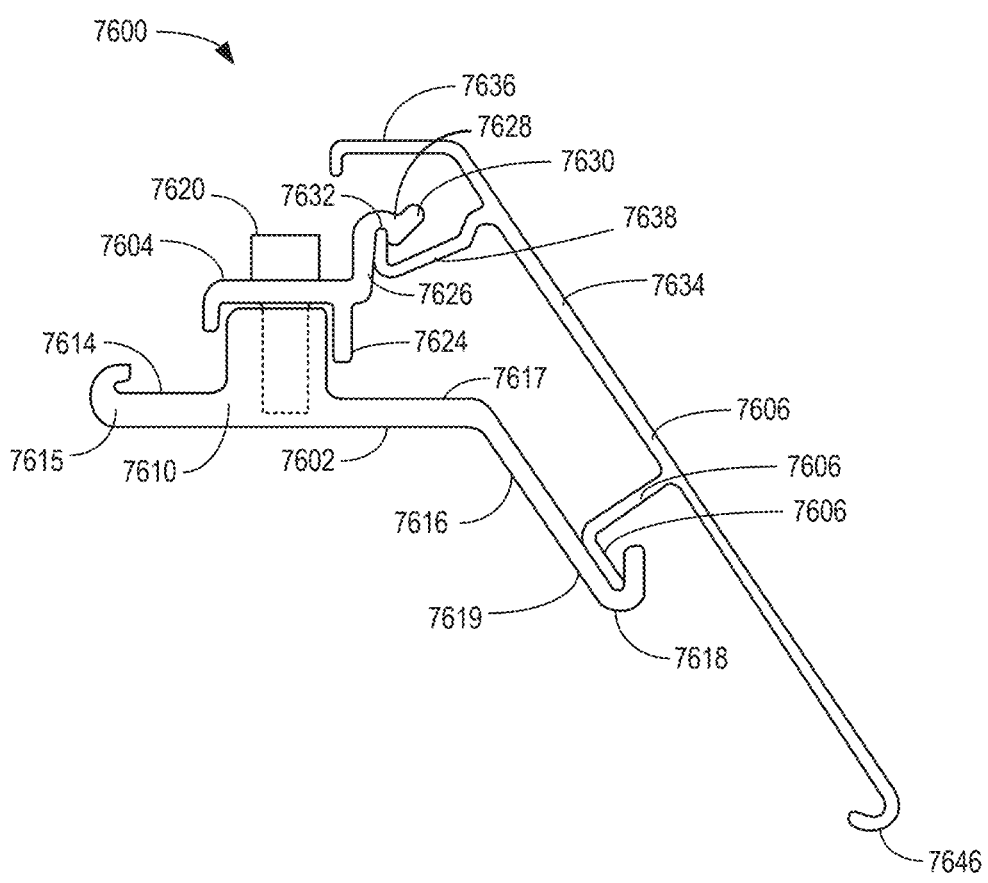
FIG. 77 is a front view of the skirt assembly of FIG. 76.
Figure 78:
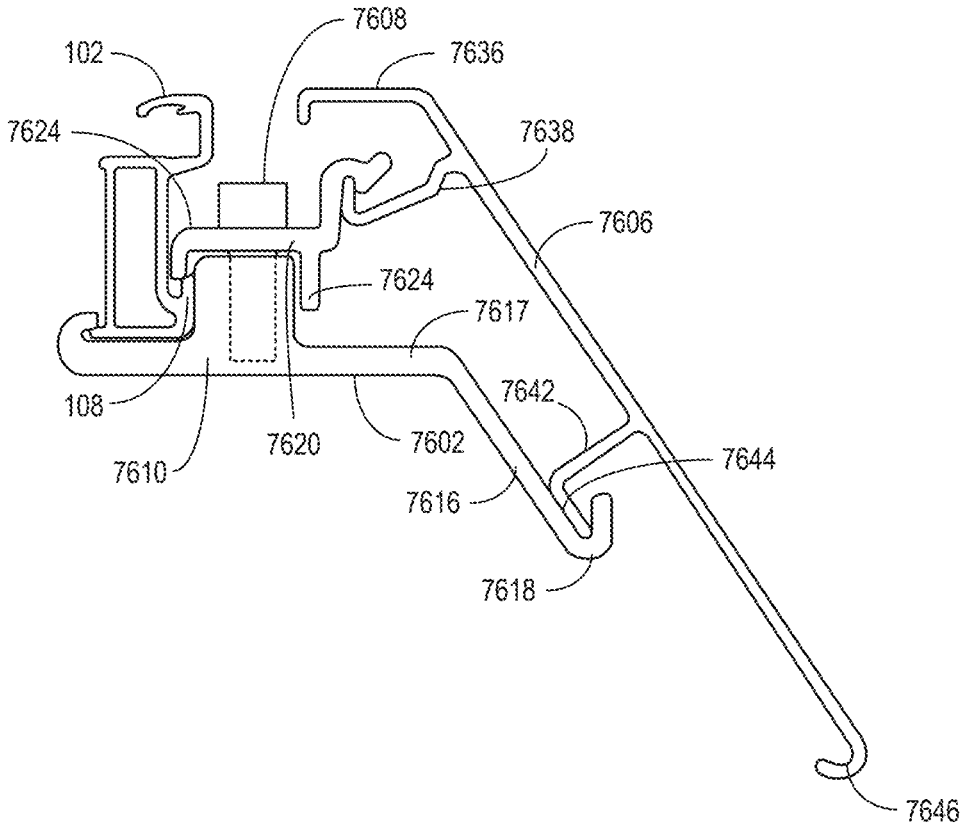
FIG. 78 is a front view of the skirt assembly of FIG. 76 with the solar panel module frame of FIG. 1 mounted thereto.
Figure 79:
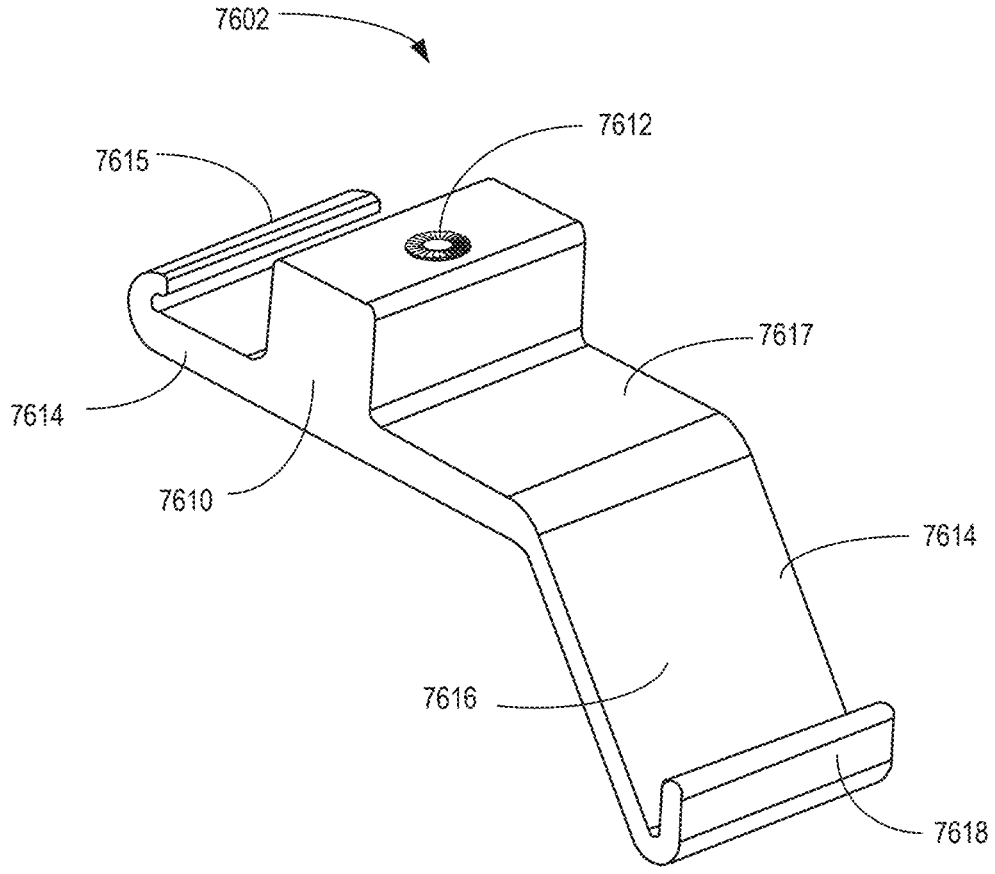
FIG. 79 is a perspective view of a base of the skirt assembly of FIG. 76.
Figure 80:
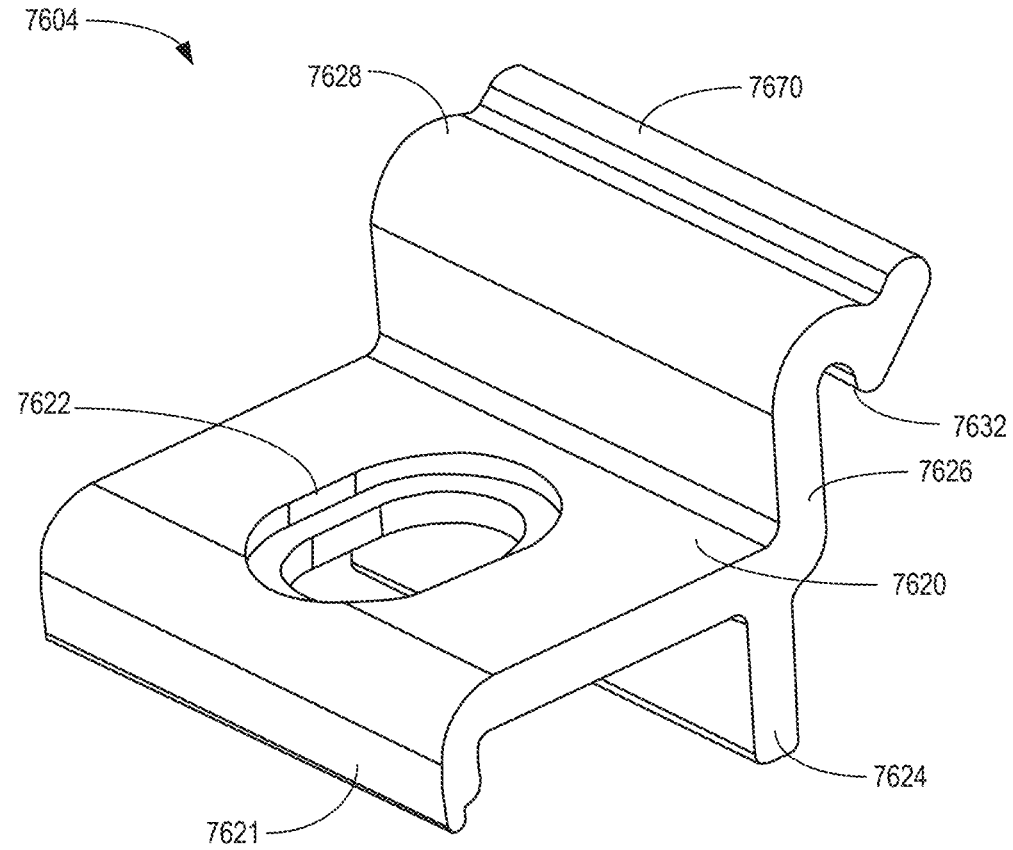
FIG. 80 is a perspective view of a connecting piece of the skirt assembly of FIG. 76.
Figure 81:
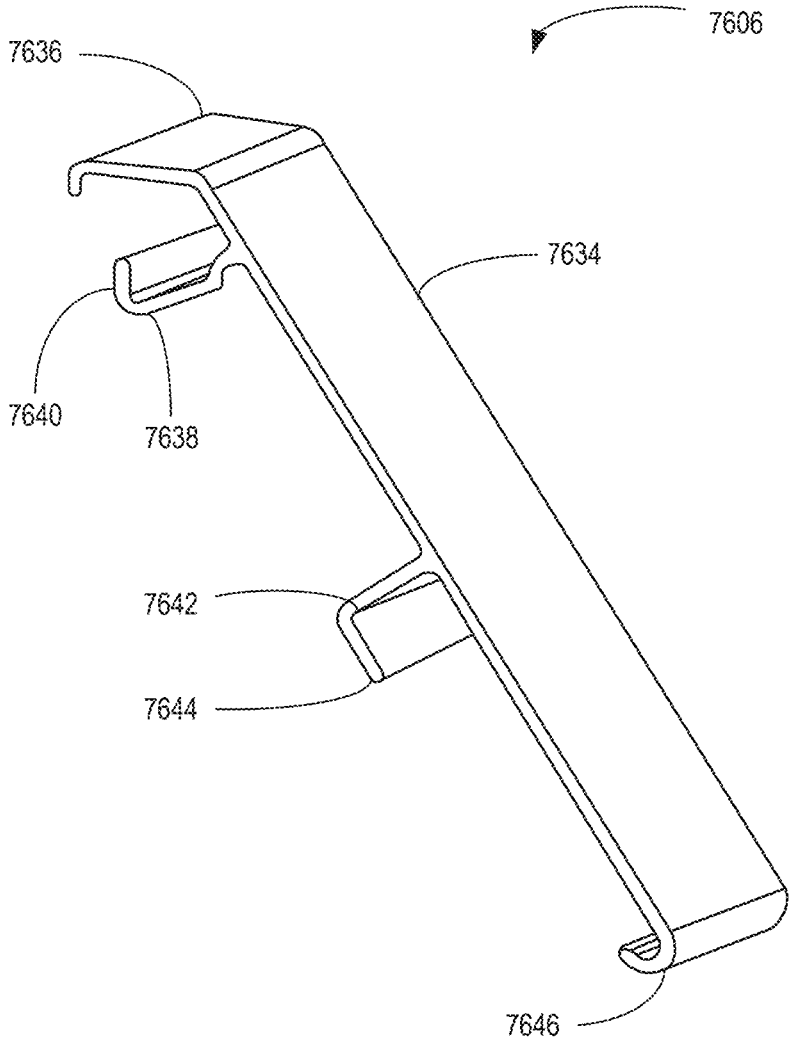
FIG. 81 is a perspective view of a skirt of the skirt assembly of FIG. 76.

With reference to FIGS. 73-75, a wire clip 7300 is shown. The wire clip 7300 includes a body 7301 that defines a U-shaped channel 7302 in which wires can be organized relative to a solar panel. The U-shaped channel 7302 defines a U-shaped cavity 7304 for storing the wires between a contact wall 7306 that is arranged to contact and extend along a leg 110B, etc. of solar panel module frame 102 and an opposing wall 7307. Although the contact wall 7306 and the opposing wall 7307 are arranged to form the U-shaped cavity 7304, it is contemplated that the walls 7306, 7307 may take other shapes to hold the wires in the cavity 7304.

Extending from the U-shaped channel 7302 is a tail 7308. The tail 7308 includes a top surface 7310 that defines an indentation 7312 along with the portion of the contact wall 7306 opposing the bottom surface 7310. The indentation 7312 is arranged to fit the flange 130 of the solar panel frame 202 therein. The tail 7308 extends at a downward angle away from the U-shaped channel 7304 so that it defines a space 7314 with the base 104 of the solar panel module frame 102. This space 7314 can also be used to store and organize wires relative to the solar panel module frame 102. An upward extending portion 7315 extends from the tail 7308 and contacts the upward extending portion of the outer lip 108 of the solar panel module frame 102. The upward extending portion 7315 terminates with a fin 7316 that includes a retaining lip portion 7317. The retaining lip portion 7317 defines a corner 7318 with the upward extending portion 7315. The retaining lip portion 7317 and the corner 7318 engage the outer lip 108 of the solar panel module frame 102. The engagement of the corner 7318 with the outer lip 108 and the indentation 7312 with the base 104 secures the wire clip 7300 about the solar panel module frame 102. It is contemplated that the fin 7316, the retaining lip portion 7317, and the upward extending portion 7315 may be arranged in a number of ways so long as the outer lip 108 or clamp cavity 112 can engage with the retaining lip portion 7317 and the corner 7318 as described in this application. The fin 7316 can be pressed downward thereby acting as a lever to withdraw the retaining lip 7317 portion from the outer lip 108 and removing the outer lip 108 from the corner 7318 allowing the removal of the wire clip 7300 from the solar panel module frame 102. All of the elements of the wire clip 7300 can be made of a resilient or bendable material to allow for the wires to be placed into the U-shaped cavity 7304 and the wire clip 7300 to fit about the solar panel module frame 102.

With reference to FIGS. 76-81, a skirt assembly 7600 is shown. The skirt assembly 7600 includes a base 7602, a connecting piece 7604, and a skirt 7606. Generally, the base 7602 is engaged with a solar panel frame 102 and the connecting piece 7604 is mounted to the base 7602, so that the skirt 7606 can connect to both the base 7602 and the connecting piece 7604. A fastener 7608 connects the connecting piece 7604 to the base 7602. A spring (not shown) is placed about the fastener 7608 to urge the fastener 7608 upward or downward from within the base 7602. This action on the fastener 7608 either urges the connecting piece 7604 upward or downward. If urged upward, the connecting piece 7004 is moved away from the base 7602, which will allow for a solar panel module frame 102 to be more easily mounted to the skirt assembly 7600. If urged downward, the connecting piece is arranged more securely against the base 7602, requiring a user to physical move the connecting piece 7604 before mounting the module solar panel frame 102 to the assembly 7600.

The base 7602 includes a body 7610 that defines an aperture 7612 for receiving the fastener 7608. The body 7610 is centrally located relative to the other features of the base 7602. Although it is generally a rectangular prism or a cube, the body 7610 may take other shapes so long as the base 7602 can still connect to the connecting piece 7604. A shelf 7614 extends from the body 7610 in a first direction. The shelf 7614 includes a surface to engage with the base 104 of the solar panel frame 102 as well as a lip 7615 that is used to engage the flange 130. The shelf 7614 and an upwardly extending surface of the body 7610 can be arranged to engage with the outer lip 108 of the solar panel module frame 102. The upwardly extending surface of the body 7610 can directly contact the vertically extending portion of the outer lip 108. As shown, the body 7610 and the horizontal shelf 7614 define a corner that is complementary to the outer lip 108 and the base 104. A bent portion 7616 extends from the body. The bent portion 7616 includes a flat portion 7617, extending in a direction opposite that of the shelf 7614, and an angled portion 7619 extending downward at an angle relative to the flat portion 7617. The angled portion 7619 terminates with a hook 7618 that is used to engage the skirt 7606, which will be described below.

The connecting piece 7604 generally fits atop the body 7610 of the base 7602. The connecting piece 7604 includes a body 7620 that extends over the top surface of the body 7610. The connecting piece body 7620 has an attachment lip 7621 that extends over a side of the body 7610 so that the outer lip 108 of the solar panel module frame 102 can be connected to the connecting piece 7604. The body 7620 defines an aperture 7622 that is elongated to allow for some horizontal movement of the connecting piece 7604 when it is attached to the base body 7610. Extending downwardly from the body 7620 adjacent to the side of the body 7610, opposite the side that is adjacent to the attachment lip 7621, is a downward leg 7624 that helps to secure and/or align the connecting piece 7604 to the body 7610. Extending upward from the body 7620 and opposite to the downward leg 7624 is an upward leg 7626. The upward leg has a rounded end 7628 that terminates with a tab 7630. The tab 7630, rounded end 7628, and part of the upward leg 7626 define a hook 7632 that is configured to engage with part of the skirt 7606, which will now be described.

The skirt 7606 includes an elongated body 7634 that extends along the entire length of the skirt 7606. The elongated body 7634 is shaped, so that, when the skirt 7606 is fully mounted, the elongated body 7634 can provide a cover for wires, other electronic features, mounts accessories and other structures that are used with the solar panel system. The elongated body 7634 may also provide a sleek, clean and visually appealing look at the edges of the solar panel array. Extending from the top end of the elongated body 7634 is an upper flange 7636. The upper flange 7636 reduces the exposure of the base 7602 when the skirt 7606 is applied to the base 7602 and includes a hooked end that can be used to mount the skirt 7606 to certain features of the solar panel system. These features are not shown herein, but one having skill in the art may appreciate how those features may be used given the description of other, similar features discussed in connection with the skirt assembly 7600. Extending from the elongated body 7634 at a distance below the upper flange 7636 is a first midflange 7638. The first midflange 7638 extends at an angle relative to the elongated body 7634 and terminates with a hook 7640. The hook 7640 is curved to fit within the hook 7632 defined between the tab 7630, rounded end 7628, and the upward leg 7626 of the connecting piece 7604. As shown, the hook 7640 extends straight upward relative to the other features of the skirt assembly 7600, as shown in the drawings. Based on the sloped nature of roofs where these features may be applied, one having skill in the art will recognize the relative direction of the hook 7640 with respect to the other features described herein. However, the hook 7640 may extend in other directions given the inclination and arrangement of the hook 7632 and other features relative to a sloped roof or other mounting surface. Extending from the elongated body at a distance below the first midflange 7638 is a second midflange 7642. The second midflange terminates with a hook 7644. The hook 7644 engages with the hook 7618 at the end of the bent portion 7616 of the base 7602. As shown, the hook 7640 extends substantially parallel to the elongated body 7634. However, the hook 7640 may extend in other directions given the inclination and arrangement of hook 7618. The elongated body 7634 terminates with an end hook 7646.

The assembly of the skirt assembly 7600 will now be described. First, the connecting piece 7604 is placed on the base 7602, with aperture 7622 aligned with aperture 7612, so that the fastener 7608 can be inserted, thereby connecting the connecting piece 7604 to the base 7602. The counterbore on the aperture 7622 and the aperture 7622 are elongated, allowing for some lateral movement of the connecting piece 7604 along the top of the body 7610. The assembly of the fastener 7608, spring (not shown), connecting piece 7604, and the base 7602 may be performed during the manufacturing of the skirt assembly 7600 or at any point prior to delivery. The distance the fastener head extends above the connecting piece 7604 may be preset. The preset height and the elongated nature of the aperture 7622 allow the attachment lip 7621 to be tilted upward relative to the body 7610 and over the outer lip 108 of the frame 102. This is achieved by pulling back and downward on the tab 7630, which acts as a lever for the connecting piece 7604. This lever action is assisted by the spring extending about the fastener 7608. The spring is located between the head of the fastener 7608 and the connecting piece 7604 and urges the connecting piece toward the base 7602. This urging of the connecting piece 7604 toward the base 7602 by the spring allows the assembly 7600 to be placed on the frame 102 and held in place without tightening the fastener 7608. The attachment lip 7621 then may be aligned relative to the outer lip 108, and/or clamp cavity 112 of the solar panel frame 102. Then the tab 7630 is pulled back and released to allow the outer lip 108 to be engaged with the attachment lip 7621. With this arrangement, the skirt 7606 can be mounted by snapping its hooks 7640, 7644 into place in the hook 7632 and the hook 7618.

First, the second midflange 7642 engages the assembly 7600 by inserting the hook 7644 into the hook 7618. Then, the skirt is rotated moving the top flange 7636 toward the assembly 7600 and the solar panel module frame 102. This places the hook 7640 engagement with the bottom surface of the tab 7630, which forces the connecting piece 7604 upward until the rounded end 7628 extends over the hook 7640 and the connecting piece 7604 snaps downward capturing the hook 7640 within the hook 7632. Then the fastener 7608 is tightened and the skirt 7606 and the assembly 7600 are secured to the frame 102. All of the elements of the skirt assembly 7600 can be made of resilient and bendable material to help facilitate the different connections described herein. When the skirt 7606 is in place, the upper flange 7636 covers part of the base 7602 and connecting piece 7604, so that only the fastener 7608 is exposed, which allows for an installer to access the fastener 7608. The extension of the upper flange 7636 over the base 7602 and connecting piece 7604 protects those elements and some of the features below those elements from adverse weather or snow build up.

While solar panel module frames 102 and 202 were primarily discussed in connection the mounting clamps discussed in this section, one will understand that the other module frames disclosed herein may be used with the aforementioned features with little to no modification of the clamps or the frames.

Support Structure and Other Mounting Clamps

FIGS. 82A-110 show a support structure 8200 is shown individually and connected to various module clamps, some of which have been discussed previously. The support structure 8200 and its associated features are used for mounting a solar panel to a support surface. The support surface can be a roof or other structure over which solar panels are arranged. Typically, multiple support structures 8200 are used to support a single solar panel, and a single support structure 8200 is arranged to support portions of two solar panels arranged within a greater array. The support structures 8200 can also be used to mount a single solar panel in instances where only one panel is used.

With reference to FIGS. 82A-89, the support structure has a base 8212 and a pedestal 8214 with a mounting fastener 8216 arranged to support a mounting component, which are discussed below. The pedestal 8214 is mounted and moveable relative to the base 8212, and the mounting fastener 8216 is mounted relative to the pedestal 8214. In the embodiment shown in FIG. 82A, the mounting fastener 8216 is moveable relative to the pedestal 8214 within a mounting aperture 8236 defined within the pedestal 8214. The mounting aperture 8236 can be considered a first aperture. Here, the mounting fastener 8216 and mounting aperture 8236 have corresponding threads to facilitate movement, and the mounting fastener 8216 has a head 8217 that allows the fastener 8616 to be screwed up and down relative to the aperture 8236. In the embodiment shown in FIG. 82B, the mounting fastener 8216 is received within the mounting aperture 8236, but the fastener 8216 is not moveable within the aperture 8236. A sleeve (not numbered) and/or a barrel nut (not numbered) may extend below the head 8217 to facilitate additional connections, which will be discussed below, for example, in connection with FIGS. 103-106. Additional features may be used with the fastener 8216, which will also be discussed below, for example, in connection with FIGS. 94-97. In this embodiment, a nut or a bolt head is located on an end of the mounting fastener 8216, which engages with an end of the mounting aperture 8236 or other part of the pedestal 14 to prevent movement.

The base 8212 defines a slot 8222 in or on which the pedestal 8214 moves. The pedestal 8214 can slide along and within the slot 8222 in the direction identified by arrow P in FIGS. 82A and 82B. Extensions 8846A, 8846B extends from the pedestal 8214 into the slot 8222, to align the pedestal 8214 properly within the slot 8222. A groove 8228 is defined within the slot 8222, and the groove 8228 may receive the extension 8846 to secure the pedestal 8214 to the slot 8222. As shown, the extension 8846 extends from a space around the pedestal aperture 8238. However, the extension 8846 may extend from any area along the bottom of the pedestal 8214, and any number of extensions may be used. In some instances, the extension 8846 may extend from a side of the pedestal 8214 and engage with the sidewalls of the slot 8222.

A pedestal fastener 8224 and a sliding nut 8234 secure the pedestal 8214 at a desired location along the slot 8222. The pedestal fastener 8224 is shown as a screw, but can be other fasteners known in the art. The pedestal 8214 defines a pedestal aperture 8238 to receive the pedestal fastener 8224. The pedestal aperture 8238 can be considered a second aperture. The pedestal fastener 8224 may have threads that correspond to those on the pedestal aperture 8238 to secure the pedestal fastener 8224 to the pedestal 8214. The sliding nut 8234 is also disposed within the slot 8222 to receive the pedestal fastener 8224, so that the fastener 8224 can secure the pedestal 8214 in a desired location. The sliding nut 8234 can also have threads corresponding to those on the pedestal fastener 8224 and in the pedestal aperture 8238 to facilitate the connection. By tightening the pedestal fastener 8224 within the pedestal aperture 8238 and the sliding nut 8234, the pedestal 8214 is secured into place at a desired location with a friction fit and is unable to slide or otherwise move along or within the slot 8222. Loosening the pedestal fastener 8224 decreases the force applied to the pedestal 8214, which allows the pedestal 8214 and sliding nut 8234 to slide within the slot 8222. This allows the pedestal 8214 to be secured at a different location along the slot 8222 to help with installation. The slot 8222 defines a groove 76288228 that can receive or otherwise engage with the sliding nut 8234 to keep the sliding nut 8234 secured and slidable within the slot 8222.

The fasteners 8216, 8224 and apertures 8236, 8238 can be arranged at different angles relative to the slot 8222 and the base 8212 to facilitate the mounting of the pedestal 8214 to the base 8212. As shown, the mounting aperture 8236 is arranged orthogonally to the slot 8222, and the pedestal aperture 8238 is arranged so as to define an acute angle with the mounting aperture 8236. This also forms both an obtuse angle and an acute angle with the slot 8222. The orthogonal angle defined between the mounting aperture 8236 and the slot 8222 allows for the mounting fastener 8216 to be raised and lowered in a substantially vertical manner relative to the base 8212, which allows for the height of solar panel modules to be adjusted after installation of the support structure essentially normal to the roof plane. In embodiments where the mounting fastener 8216 is fixed, the orthogonal arrangement still allows for the nut or other feature supporting the mounting component on the mounting fastener 8216 to be raised or lowered to adjust the height of the mounting component in a direction that is normal to the roof plane. The pedestal 8214 includes a cylindrical body 8248 that contains the mounting aperture 8236 and an extending body 8250 that extends from the cylindrical body 8248 that contains the pedestal aperture 8238. The extending body 8250 generally takes the shape of a right triangle when viewed in the direction of its extension from the cylindrical body 8248. However, the extending body 8250 may take other shapes that allow for the pedestal 8214 to engage with the slot 8222.

The base 8212 is secured to a support surface by a plurality of base fasteners 8226. As shown, the base fasteners 8226 are screws, but other fasteners known in the art may be used. The base fasteners 8226 are received within base apertures 8240A 8204B. Base apertures 8240A 8240B can be considered third apertures. The base apertures 8240A 8240B extend through the base 8212 and allow the base fasteners 8226 to secure the base 8212 to the support surface on which the base is mounted. The base apertures 8240A 8240B are generally arranged proximate an end of the slot 8222. In particular, the base 8212 defines a foot 8242 and a toe 8244. The foot 8242 includes the base apertures 8240A 8240B, and the toe 8244 extends from the foot 8242. The slot 8222 extends from the foot 8242 and along the toe 8244. As shown, there are three base apertures 8240A surrounding an end of the slot 8222 on the foot 8242 of the base 8212. These base apertures 8240A are arranged extending into the base 8212 at a non-orthogonal angle. The base apertures 8240A may also define an acute angle with the direction of the mounting aperture 8236 and mounting fastener 8216.

As shown, there are two base apertures 8240B arranged proximate an outer edge of the base 8212 relative to base apertures 8240A. These base apertures 8240B are located farther away from the slot 8222 relative to the base apertures 8240A. In other words, one or more of the base apertures 8240A may be disposed between the slot 8222 and base apertures 8240B. Base apertures 8240B extend straight into the base 8212 so as to define an orthogonal angle with a bottom surface area of the base 8212. The base apertures 8240B also extend parallel to the mounting aperture 824836. The different angles of the base apertures 8240A, 8240B allows for a more secure connection between the base 8212 and the support surface. As shown, there are five base apertures 8240, with three base apertures 8240A extending at a non-orthogonal angle relative to the base 8212 and two base apertures 8240B extending at an orthogonal angle relative to the base 8212. It will be appreciated that the base apertures 8240A 8240B can be arranged in a variety of ways about the base 8212 with each base aperture 8240A 8240B extending at different or identical angles into the base 8212 relative to the base 8212, the bottom surface area defined by the base 8212, or other features are discussed herein.

Depending on how and when a specific support structure 8200 is installed, it may be desirable to engage the base fasteners 8226 with one type of base aperture 8240A, 8240B before the other. In some instances, the base fasteners 8226 are first fastened to all of base apertures 8240A before being fastened to base apertures 8240B. By connecting the base 8212 to the support surface in this manner, the connection of the fasteners 8226 creates forces that act on the base 8212 in directions that are normal and parallel to the support surface, as defined by the angle of the apertures 8240A. These forces urge the base 8212 and support structure 8200 in the direction defined by the apertures 8240A. The force applied in the parallel direction acts on the mounting components connected to the support structure 8200 and urges the mounting components against the solar panel module to which they are mounted. This provides additional force to secure the solar panel module in place against its respective mounting components and support structures 8200. After fasteners 8226 have been secured to apertures 8240A, fasteners 8226 are then secured to apertures 8240B. The application of fasteners 8226 to apertures 8240B provides additional forces to secure the base 8212 to the support surface.

In other instances, the base fasteners 8226 are first fastened to base apertures 8240B and then fastened to apertures 8240A. By connecting the base 8212 to the support surface in this manner, the fasteners 8226 applied to base apertures 8240B apply a force that acts in a direction that is normal to the support surface, securing the base 8212 directly against the support surface. This ensures that the base 8212 and the support structure 8200 are secured normally to the support surface before fasteners 8226 are applied to apertures 8240A, which minimizes the horizontal urging of the base 8212 that is created by the engagement between the fasteners 8226 and apertures 8240A. The application of the base fasteners 8226 to the base apertures 8240A, 8240B and the order in which they are applied will be discussed in greater detail below.

A pad 8230 is disposed on an underside of the base 8212 to prevent water from leaking into or past the support surface due to the drilling of the base fasteners 8226 into the support surface. The pad 8230 can be made of a material that creates a seal between the base 8212 and the support surface, which prevents water from traveling through the holes through which the base fasteners 8226 extend. Instead of forming a seal, the pad 8230 may also create a barrier that makes it difficult for water to enter the holes created by the fasteners 8226. In some instances, the pad 8230 may not form a perfect seal, but it will prevent enough water from seeping through the support surface so that it cannot damage the support surface or items located beyond the support surface. When the support surface is a shingled roof, the pad 8230 may be shaped and sized so as to fit a single shingle or shingle course.

FIGS. 90-111 show different mounting components and their use with the support structure will now be described. In a first example, with reference to FIGS. 90-93, the levered clamp 3400 of FIGS. 34-39 is shown attached to the support structure 8200 shown in FIG. 82A. This support structure 8200 includes a head 8217 on the mounting fastener 8216 that allows the fastener 7616 to be raised or lowered relative to the pedestal 8214. To secure the levered clamp 3400 to the mounting fastener 8216, a nut 8218 is secured to the mounting fastener 8216, and apertures 3416, 3418 are aligned with the mounting fastener 8216, so that the mounting fastener 8216 is received within the apertures 3416, 3418. The nut 8218 supports the levered clamp 3400 on the mounting fastener 8216. Although a nut 8218 is shown, other securing mechanisms, such as a bar extending through the mounting fastener 8216, a washer, or another threaded bolt, may be used.

Figure 92:
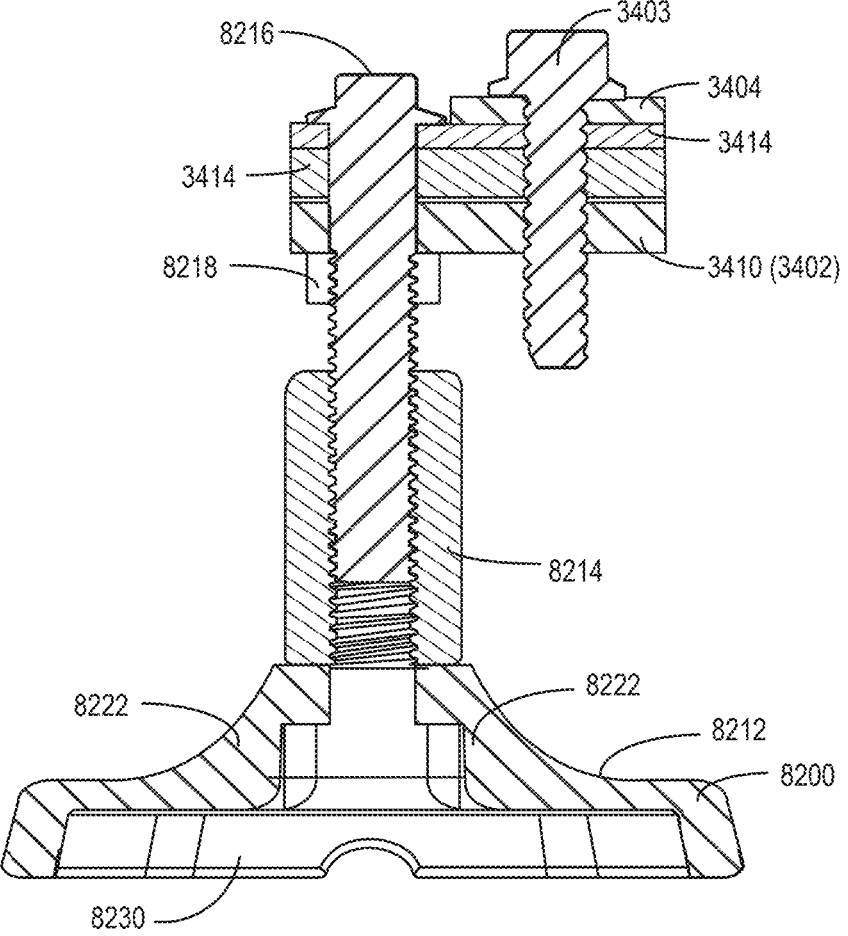
FIG. 92 is a cross-sectional side view of the mounting clamp and support structure of FIG. 90 taken along line A-A.
Figure 93:
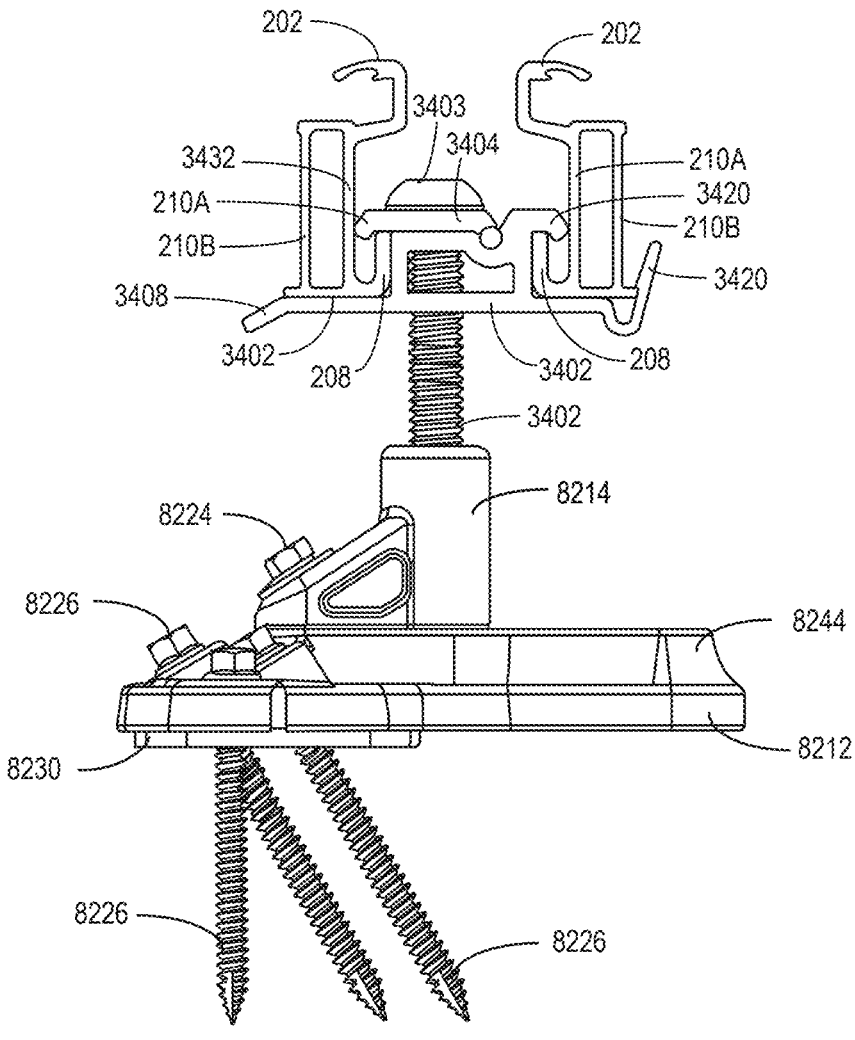
FIG. 93 is a front view of the mounting clamp and support structure of FIG. 90 with two solar panel module frames of FIG. 2 mounted thereto.
Figure 94:
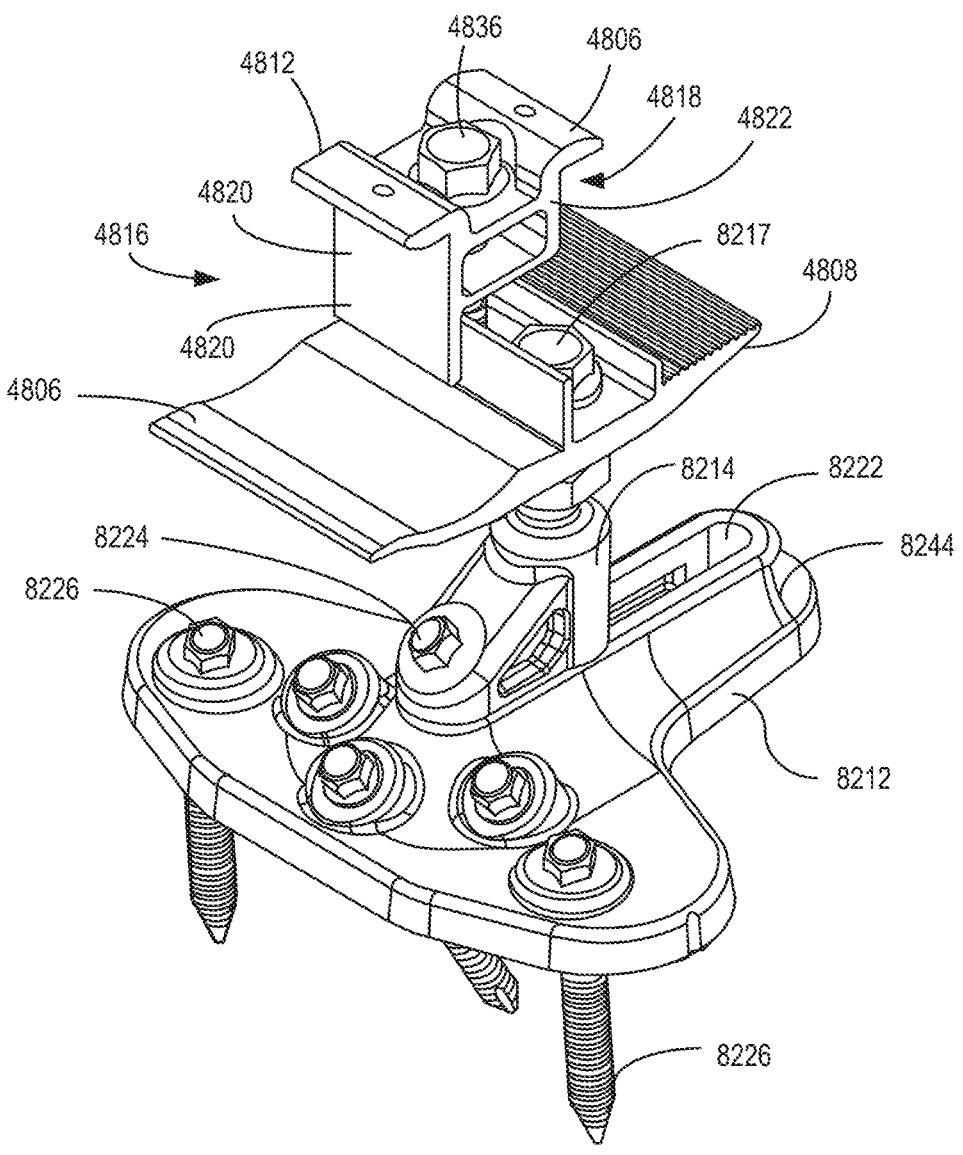
FIG. 94 is a perspective view of the mounting clamp of FIG. 48 mounted to the support structure of FIG. 82B.

As shown in FIGS. 92 and 93, the mounting fastener 8216 includes a head portion 8217, a threaded portion 8221 and a straight shaft portion 8219 therebetween. The straight shaft portion 8219 has a greater outside diameter than the threaded portion 8221. The nut 8218 is tightened against the bottom of the straight shaft 8219. The head portion 8217 sits above the top surface of the upper connector 3414 and the nut 8218 sits below the bottom surface of the base 3402, identified in FIG. 92 as the center portion 3410, and the straight shaft 8219 is received by the apertures 8216, 8218 which are unthreaded clearance apertures. The straight shaft 8219 has a length that is greater than the height of the clamp base 3402 that extends from the bottom surface of the clamp base 3402 to the top surface of the upper connector 3414. This allows the mounting fastener 8216 to rotate freely within the clamp 3400 and for a drill or other tool to move the mounting fastener 8216 up and down within the mounting aperture 8236. If the levered fastener 3403 is in the engaged position, a solar panel module can be rocked into place between the second mounting lip 3432 and the second support flange 3408. Further installation of the support structure 8200 and the levered clamp 3400 will be discussed below.

Figure 82A:
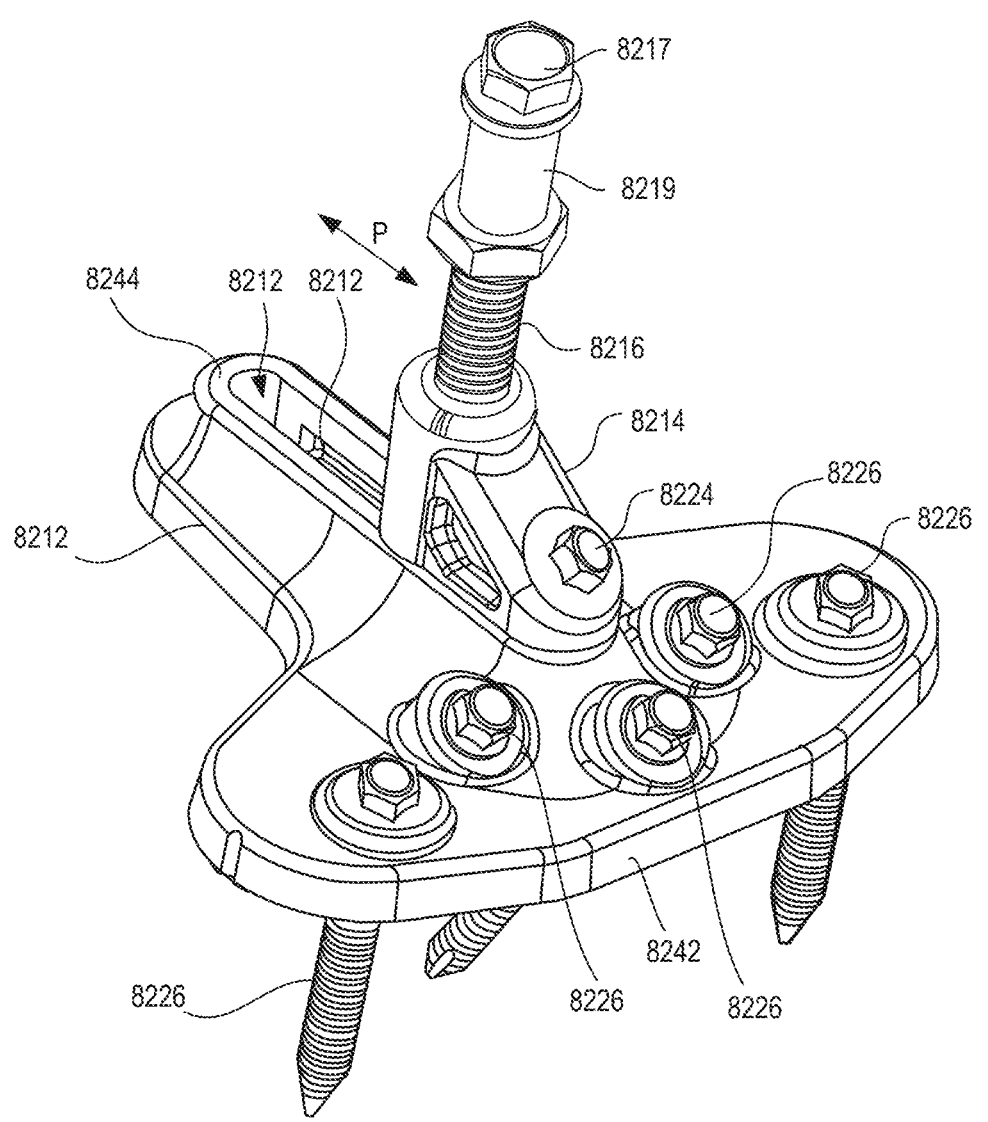
FIG. 82A is a perspective view of a support structure according to one embodiment or aspect of the present disclosure.
Figure 82B:
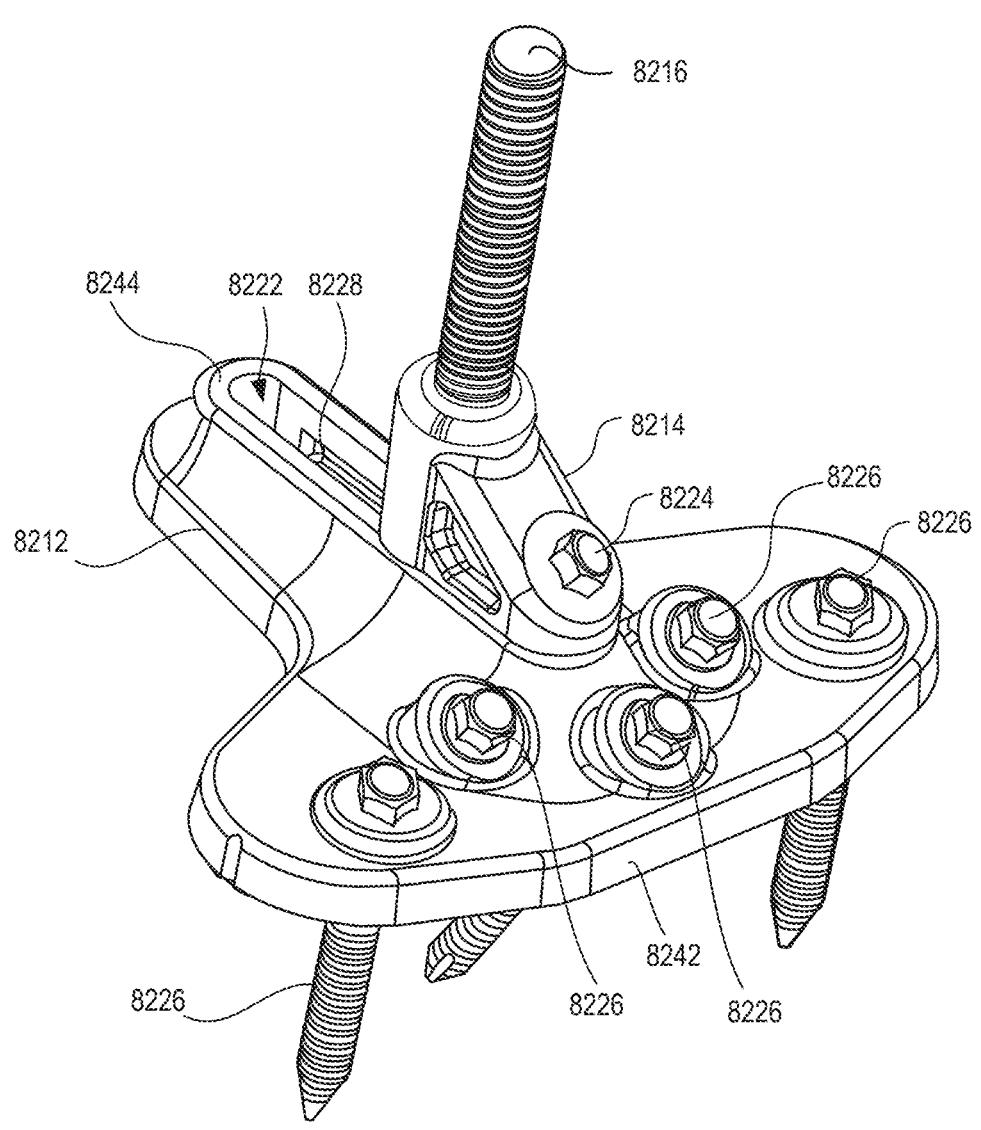
FIG. 82B is a perspective view of a support structure according to one embodiment or aspect of the present disclosure
Figure 83:
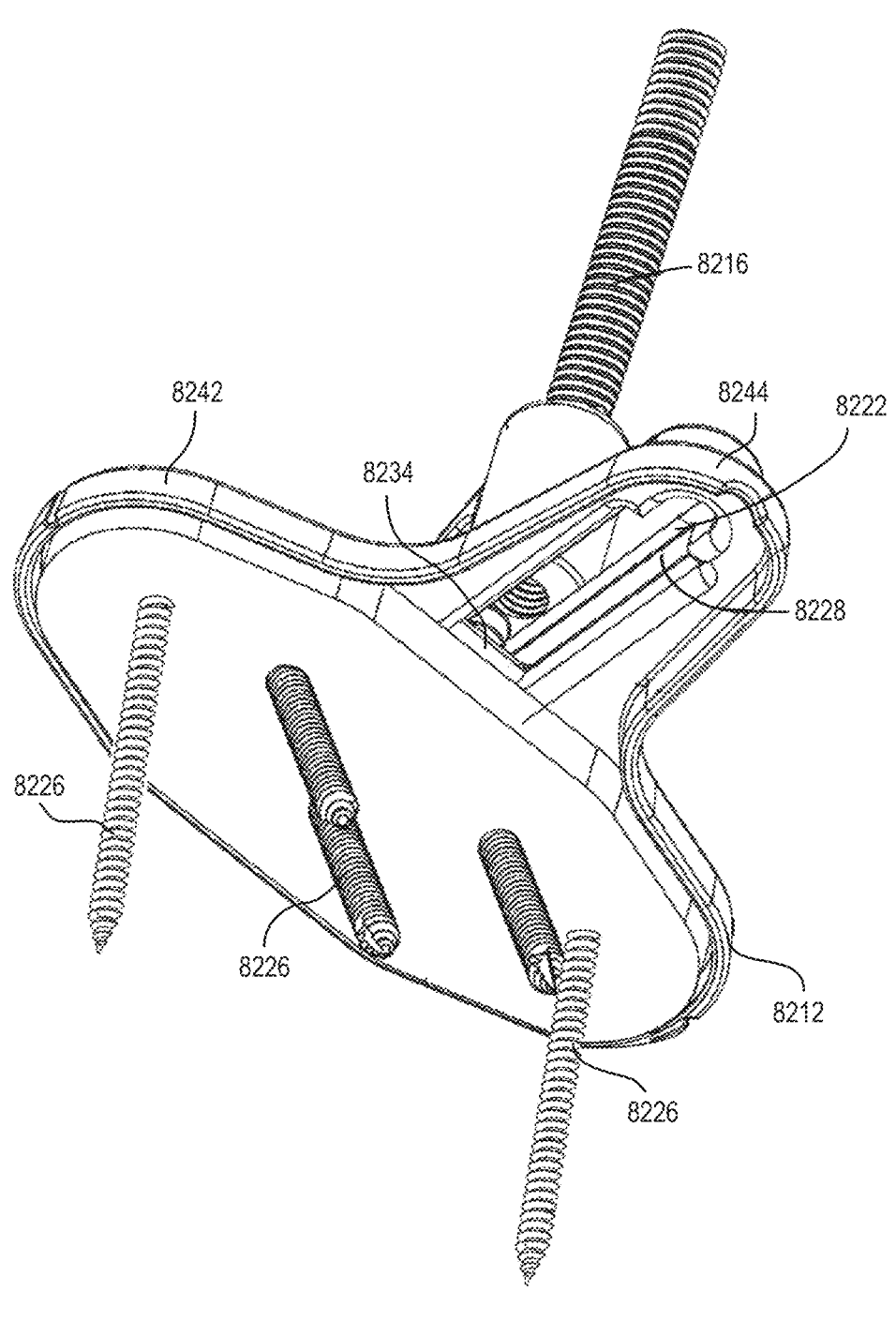
FIG. 83 is a bottom perspective view of the support structure of FIGS. 82A and 82B.
Figure 84:
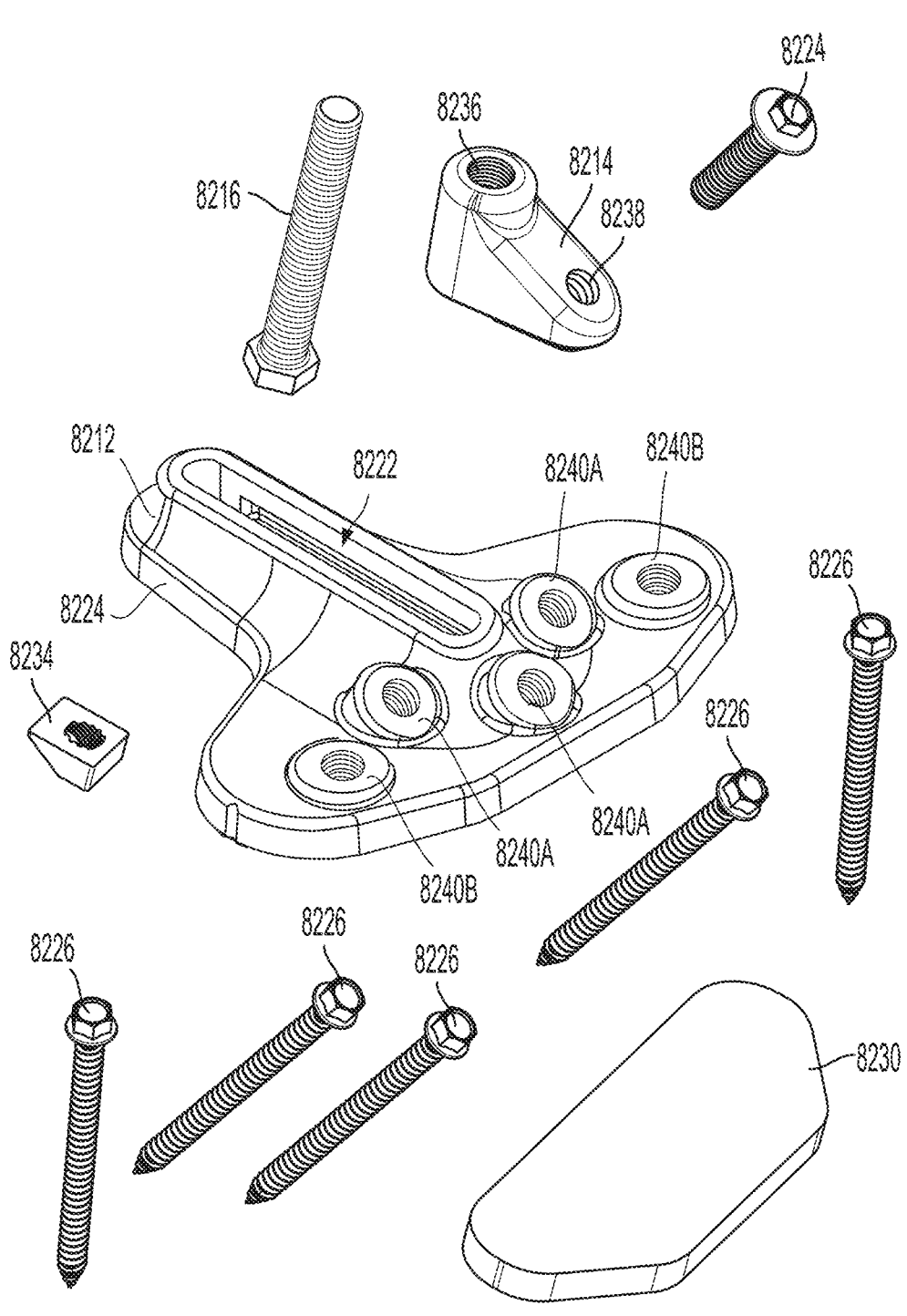
FIG. 84 is an exploded view of the support structure of FIG. 82A.
Figure 85:
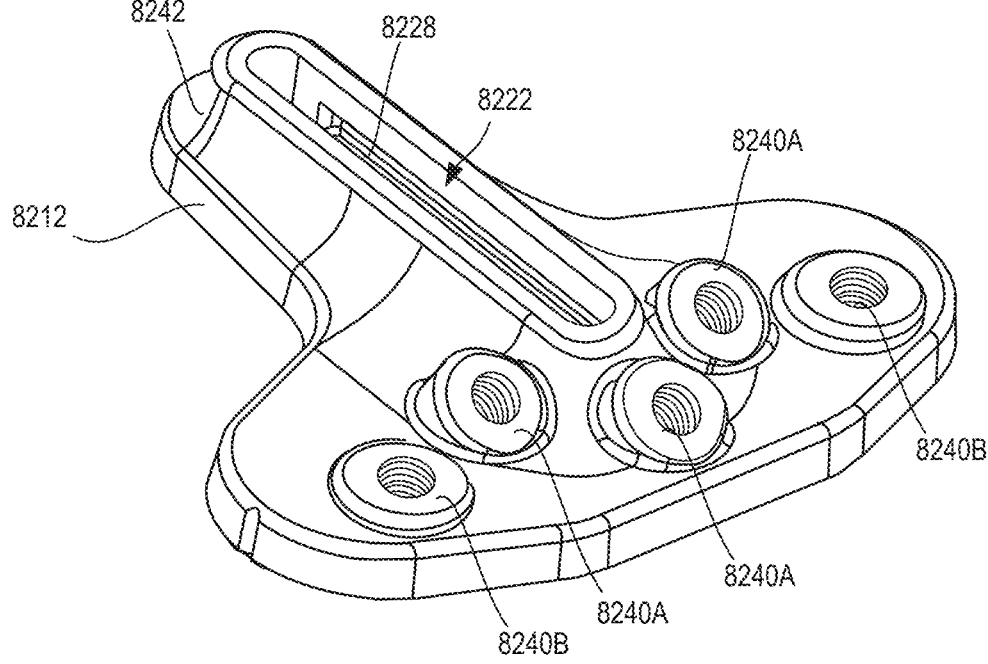
FIG. 85 is a top perspective view of the base of the support structure of FIGS. 82A and 82B.
Figure 86:
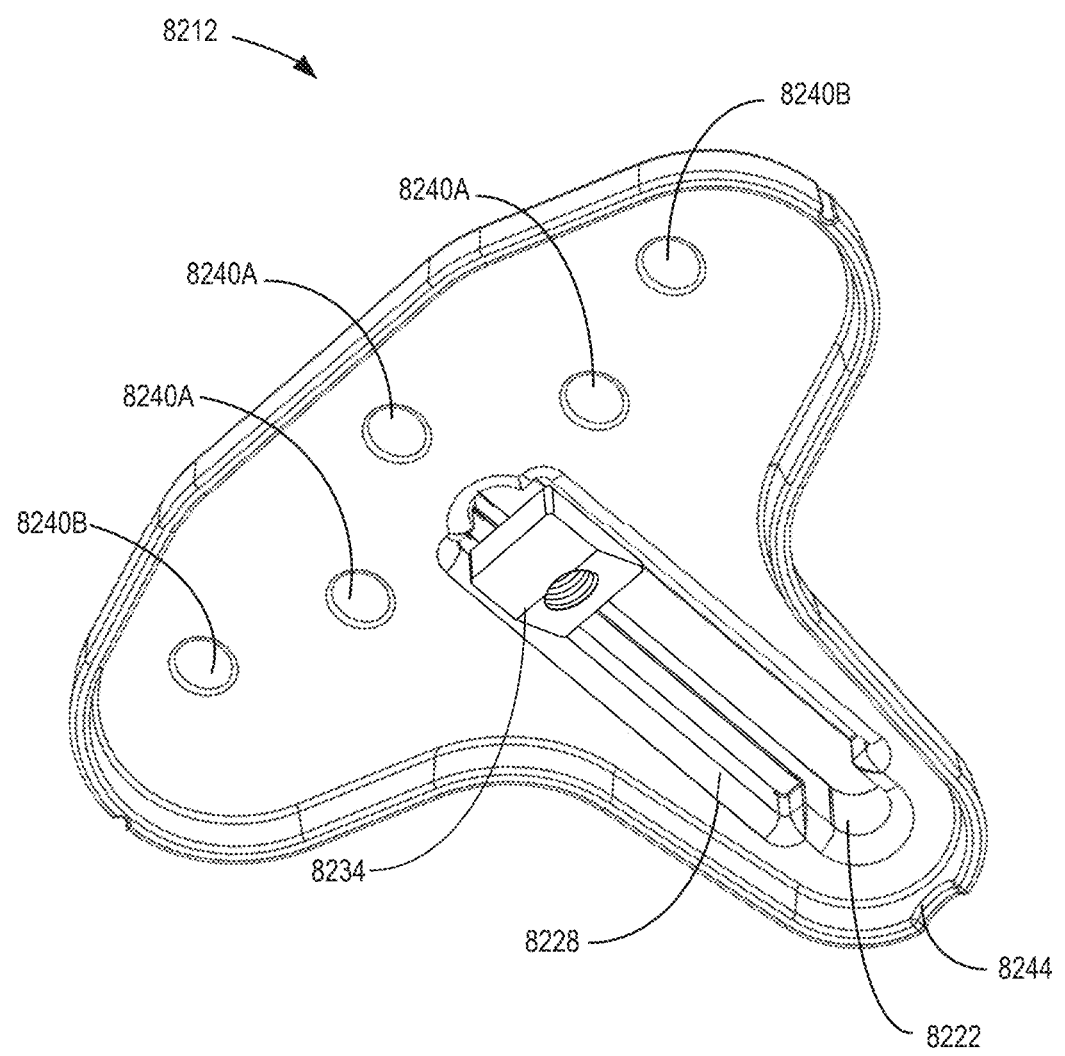
FIG. 86 is a bottom perspective view of the base of FIG. 85.
Figure 87:
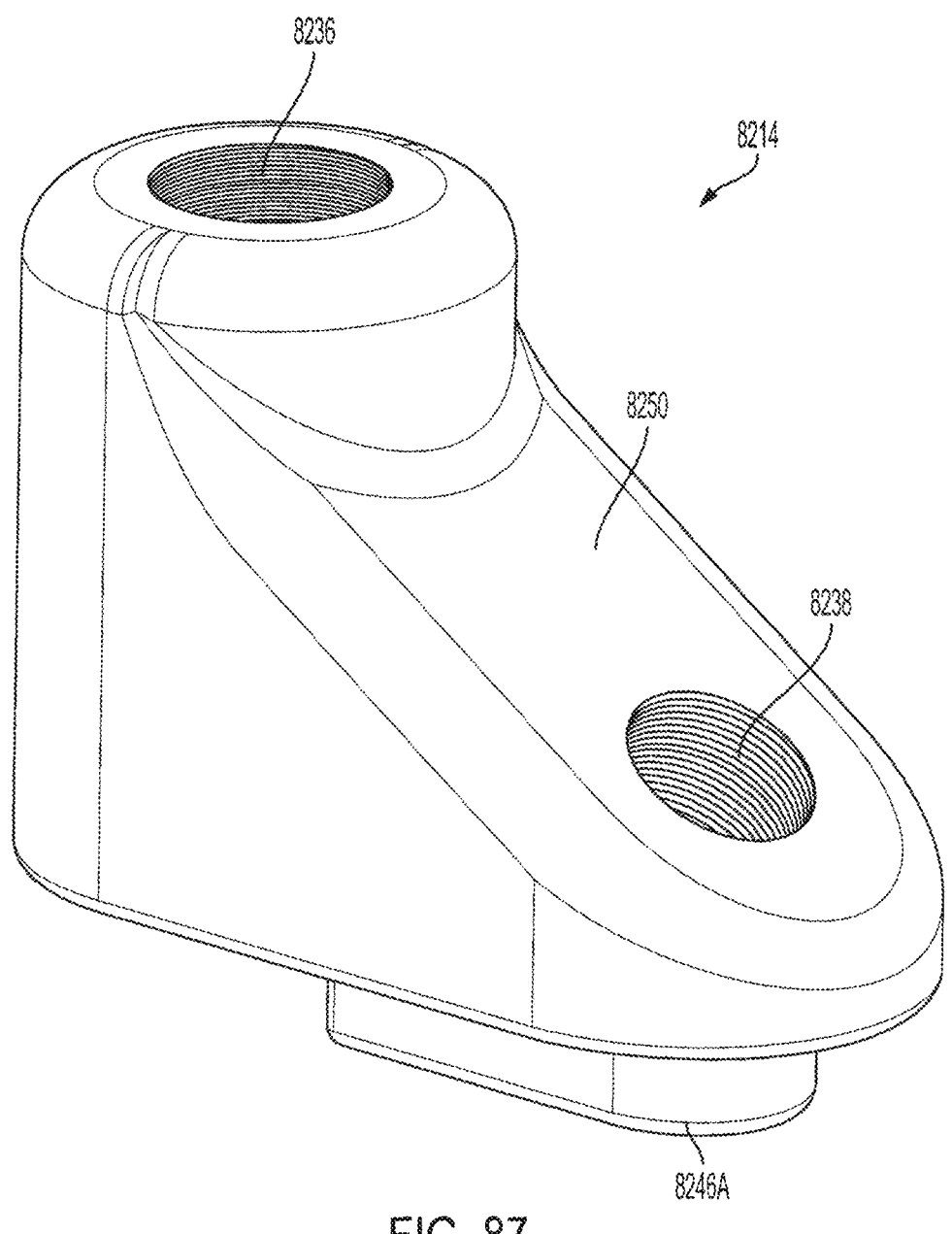
FIG. 87 is a top perspective view of a pedestal of the support structure of FIGS. 82A and 82B.
Figure 88:
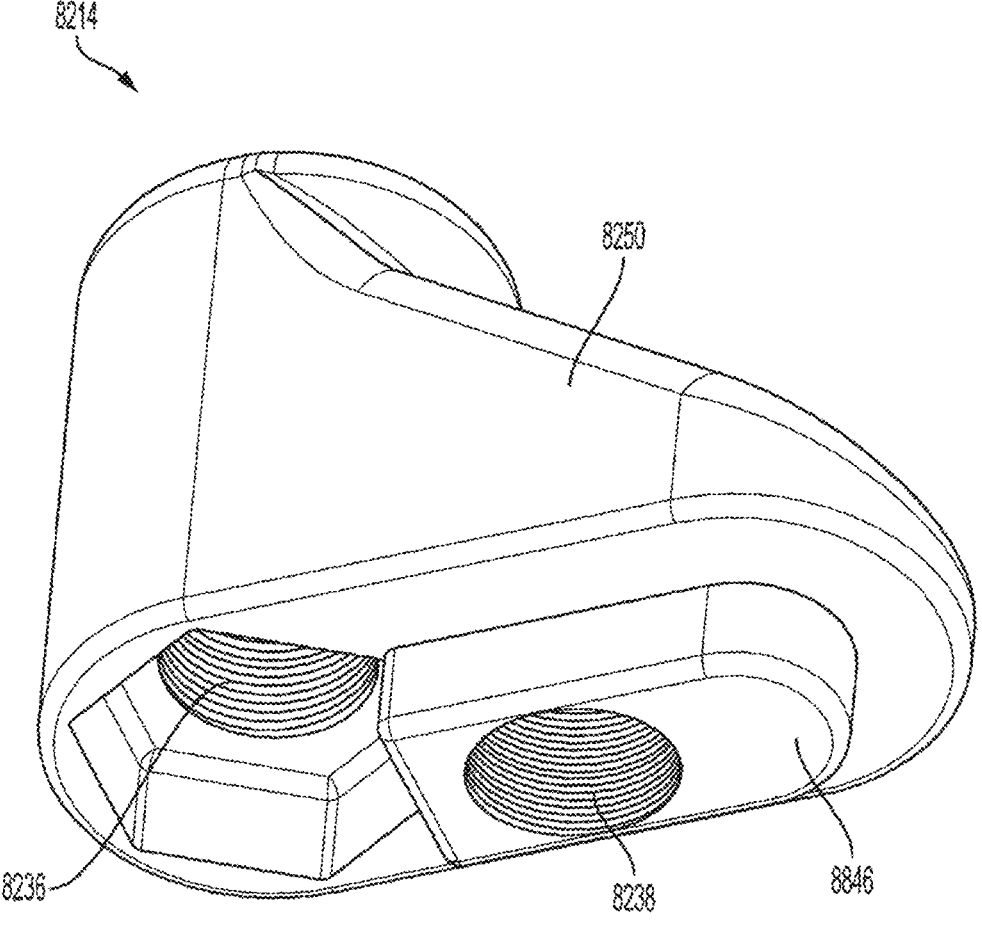
FIG. 88 is a bottom perspective view of the pedestal of FIG. 87.
Figure 89:
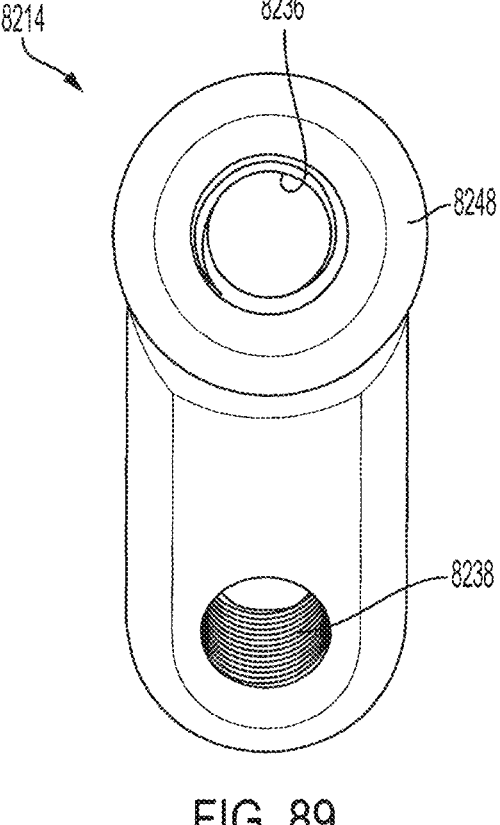
FIG. 89 is a top view of the pedestal of FIG. 87.
Figure 90:
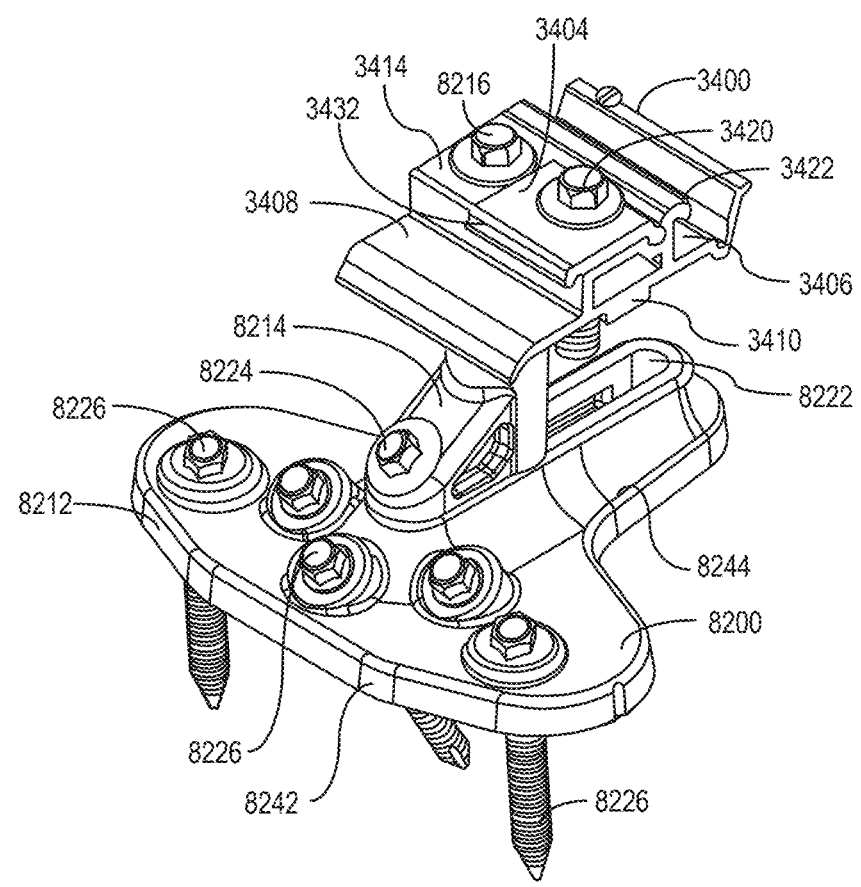
FIG. 90 is a perspective view of the mounting clamp of FIG. 34 mounted to the support structure of FIG. 82A.
Figure 91:
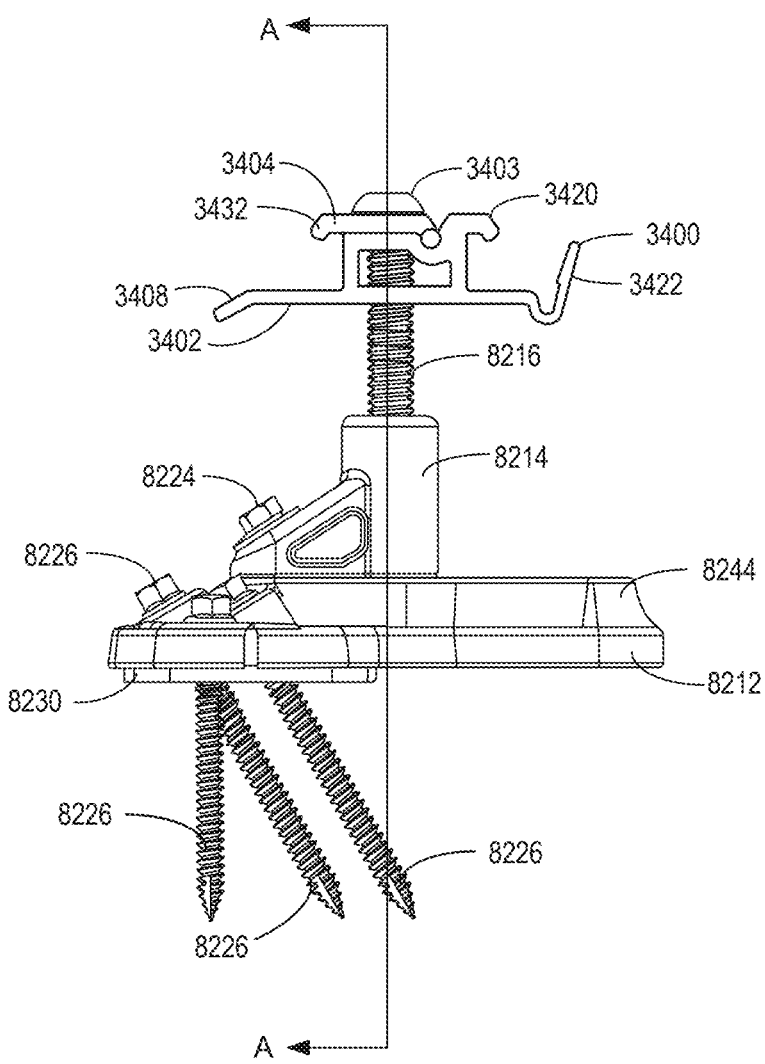
FIG. 91 is a front view of the mounting clamp and support structure of FIG. 90.
Figure 97:
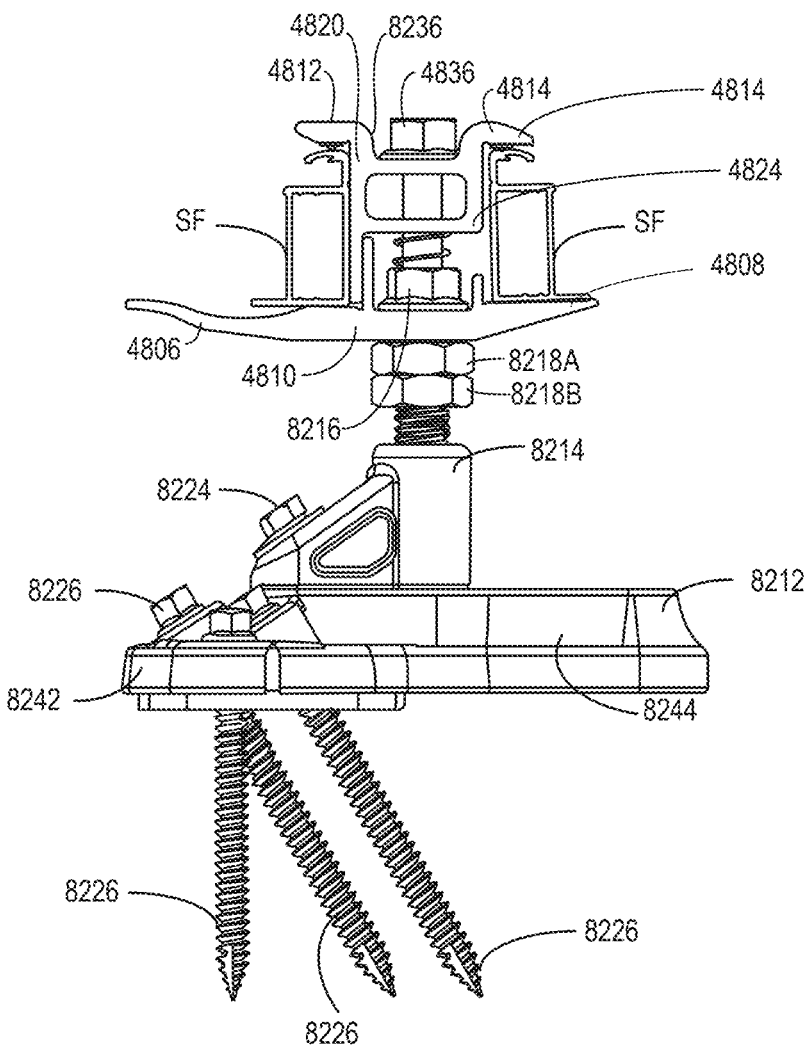
FIG. 97 is a front view of the mounting clamp and support structure of FIG. 94 with two standard solar panel module frames mounted thereto.
Figure 98:
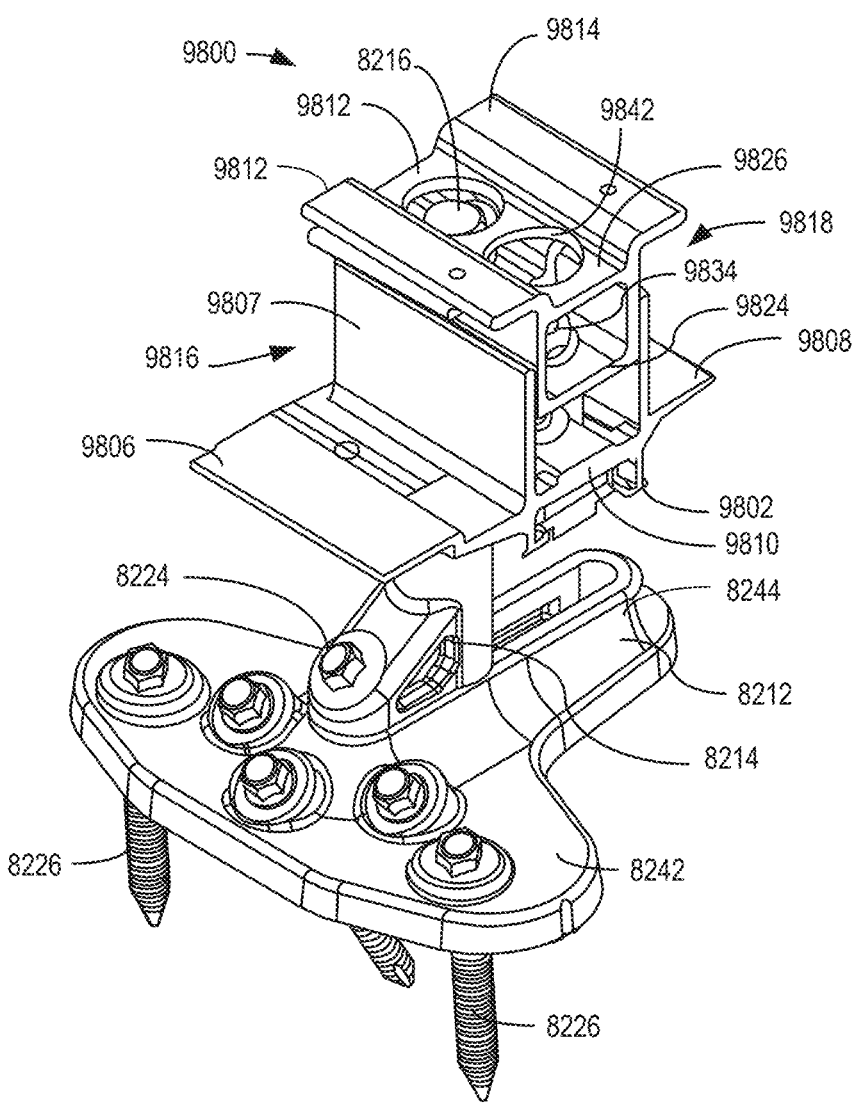
FIG. 98 is a perspective view of a mounting clamp mounted to the support structure of FIG. 82B according to one embodiment or aspect of the present disclosure.
Figure 99:
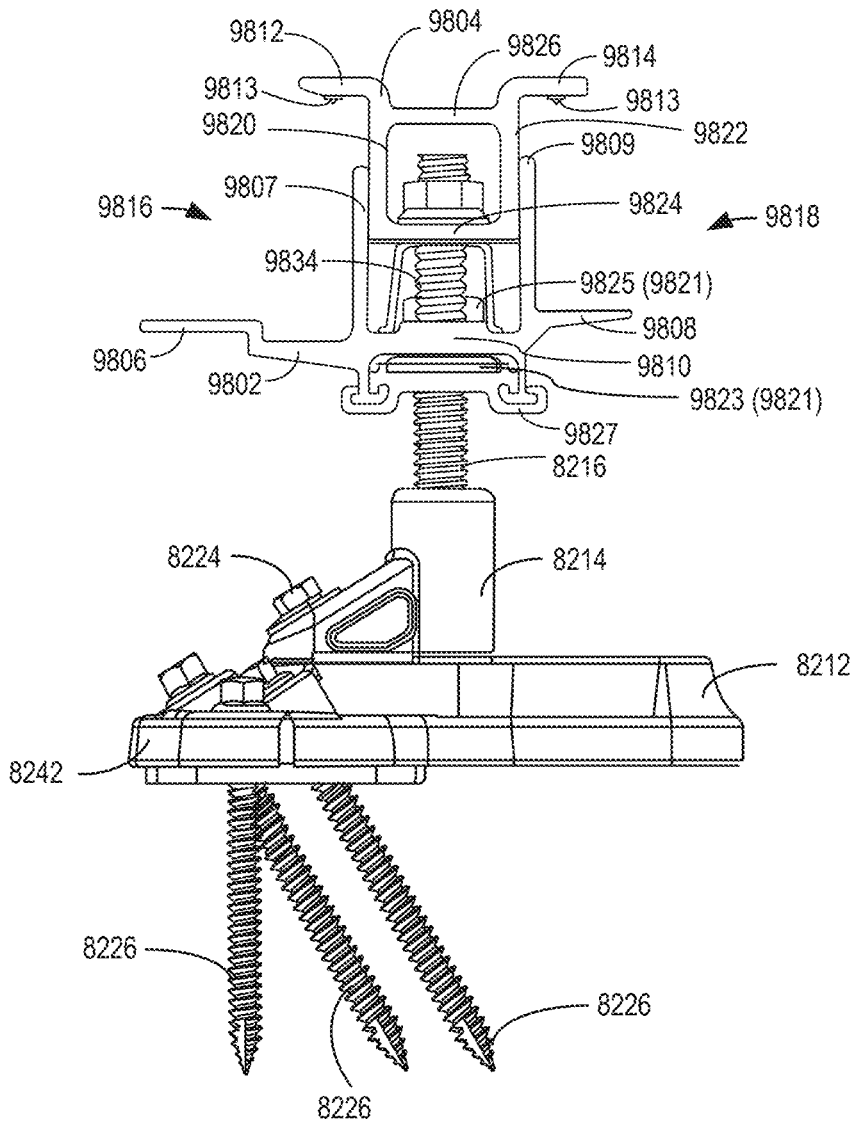
FIG. 99 is a front view of the mounting clamp and support structure of FIG. 98.
Figure 100:
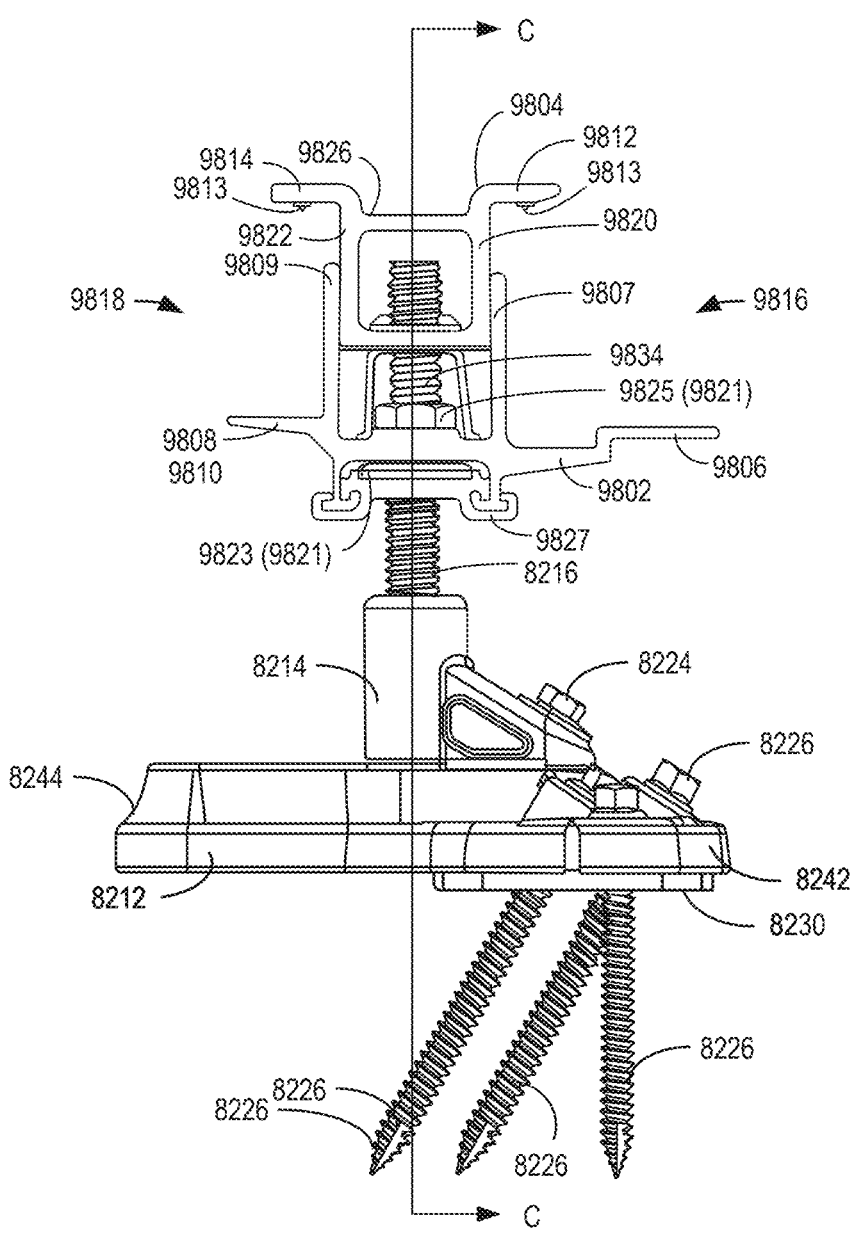
FIG. 100 is a back view of the mounting clamp and support structure of FIG. 98.

In a second example, with reference to FIGS. 94-97, the mounting clamp 4800 of FIGS. 48-52 is shown attached to the support structure 8200 shown in FIG. 82A. The support structure 8200 also includes a head 8217 on the mounting fastener 8216 that allows the fastener 7616 to be raised or lowered relative to the pedestal 8214. To secure the mounting clamp 4800 to the mounting fastener 8216, two nuts 8218A, 8218B are tightened against each other locking them in place and securing them to the mounting fastener 8216, and the mounting aperture 4828 is aligned with the mounting fastener 8216, so that the fastener 8216 is received within the mounting aperture 4828. The mounting fastener head portion 8217 sits above the top surface of the base 4802 and the locked nuts 8218A, 8218B sit below the bottom surface of the base 4802 and the fastener 6616 is received within the mounting aperture 4828 which is an unthreaded clearance aperture. The distance between the bottom of the head portion 8217 and the top of the locked nuts 8218A, 8218B is greater than the height of the clamp base 8202 from the bottom surface to the top surface of the base 8202. This allows the mounting fastener 8216 to rotate freely within the clamp 4800 and for a drill or other tool to move the mounting fastener 8216 up and down within the mounting aperture 8236 without rotating the clamp 4800. Once the base 4802 is secured, a solar panel module can be rocked into place within either of the mounting spaces 4816, 4818. FIG. 97 shows two standard solar panel module frames SF secured within the mounting spaces 4816, 4818.

In a third example, with reference to FIGS. 98-102, another mounting clamp 9800 is shown attached to the support structure 8200 shown in FIG. 82A. The clamp 9800 includes a base 9802 and a top portion 9804 connected to or at least partially received within the base 9802. The base 9802 includes support flanges 9806, 9808 extending from opposing sides to support a solar panel frame that is mounted to the clamp 9800. A center portion 9810 extends between the support flanges 9206, 9208. Sidewalls 9807, 9809 extend upward from the base 9802 in a region between one of the support flanges 9806, 9808 and the center portion 9810. The top portion 9804 is arranged over the base 9802 and includes a first clamping flange 9812, extending in one direction and opposing the first support flange 9806. The top portion 9804 also includes a second clamping flange 9814, extending opposite the first clamping flange 9812. The second clamping flange 9814 opposes the second support flange 9808.

The clamping flanges 9812, 9814 may include features to connect or bond to the solar panel frames that to be engaged with the clamp 9800. The first support flange 9806 and the first clamping flange 9812 define a first mounting space 9816 therebetween, and the second support flange 9808 and the second clamping flange 9814 define a second mounting space 9818 therebetween. The mounting spaces 9816, 9818 are arranged to receive solar panel frames therebetween and to secure them to the clamp 9800 for mounting in array or other solar panel system. The top portion also includes sidewalls 9820, 9822 extending from the clamping flanges 9812, 9814 toward the base 9802. Connecting portions 9824, 9826 extend between the sidewalls 9820, 9822.

The base 9802 defines a connecting aperture 9830, and the connecting portion 9822 defines a connecting aperture 9832 that is aligned with connecting aperture 9830. These apertures 9830, 9832 are aligned to receive a connecting fastener 9834 therethrough. The connecting fastener 9834 connects the top portion 9804 to the clamp base 9802. The connecting apertures 9830, 9832 and the connecting fastener 9834 may have corresponding threads to facilitate this connection. In some embodiments, only connecting aperture 9830 and connecting fastener 9834 may have corresponding threads. The connecting fastener 9834 can be adjusted to move the top portion 9804 relative to the base 9802, which will change the relative arrangement of features of both the base 9802 and top portion 9804.

Figure 101:
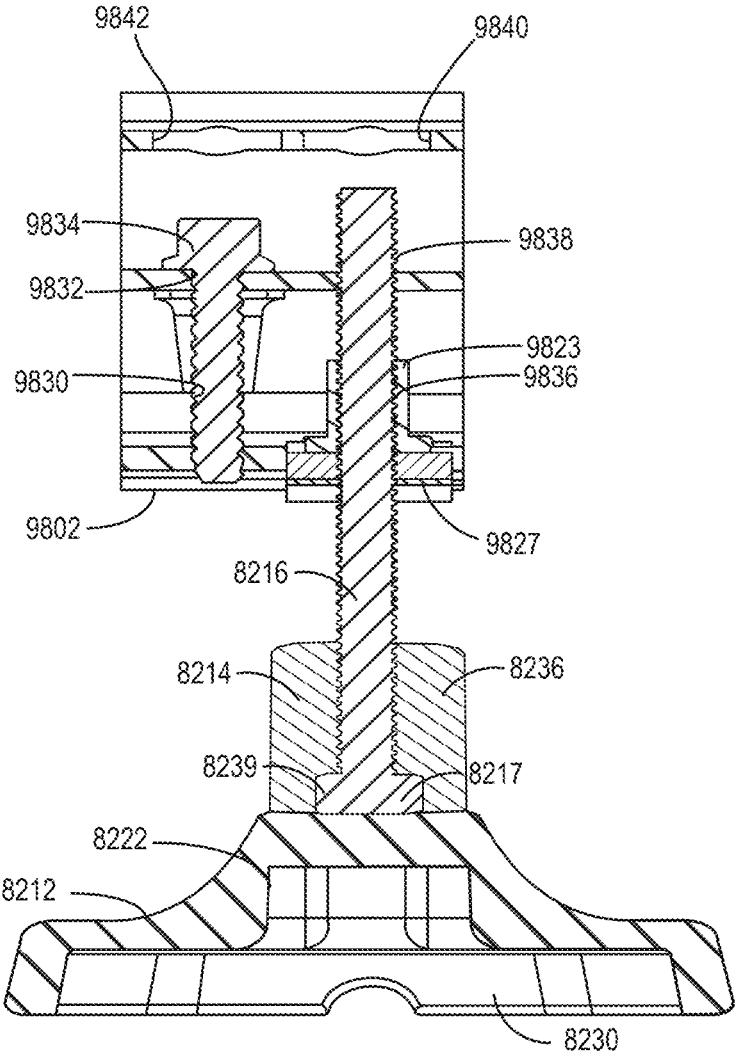
FIG. 101 is a cross-sectional side view of the mounting clamp and support structure of FIG. 100 taken along line C-C.
Figure 102:
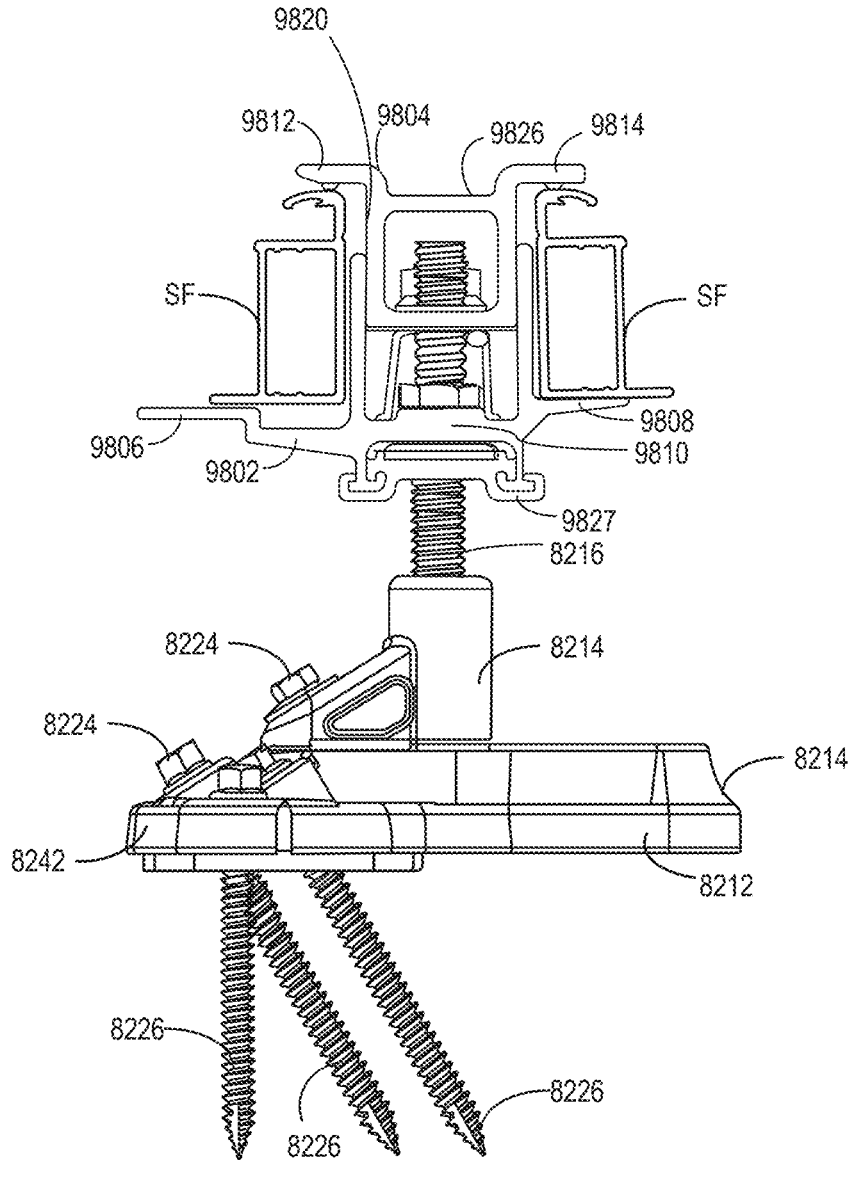
FIG. 102 is a front view of the mounting clamp and support structure of FIG. 100 with two standard solar panel module frames mounted thereto.
Figure 103:
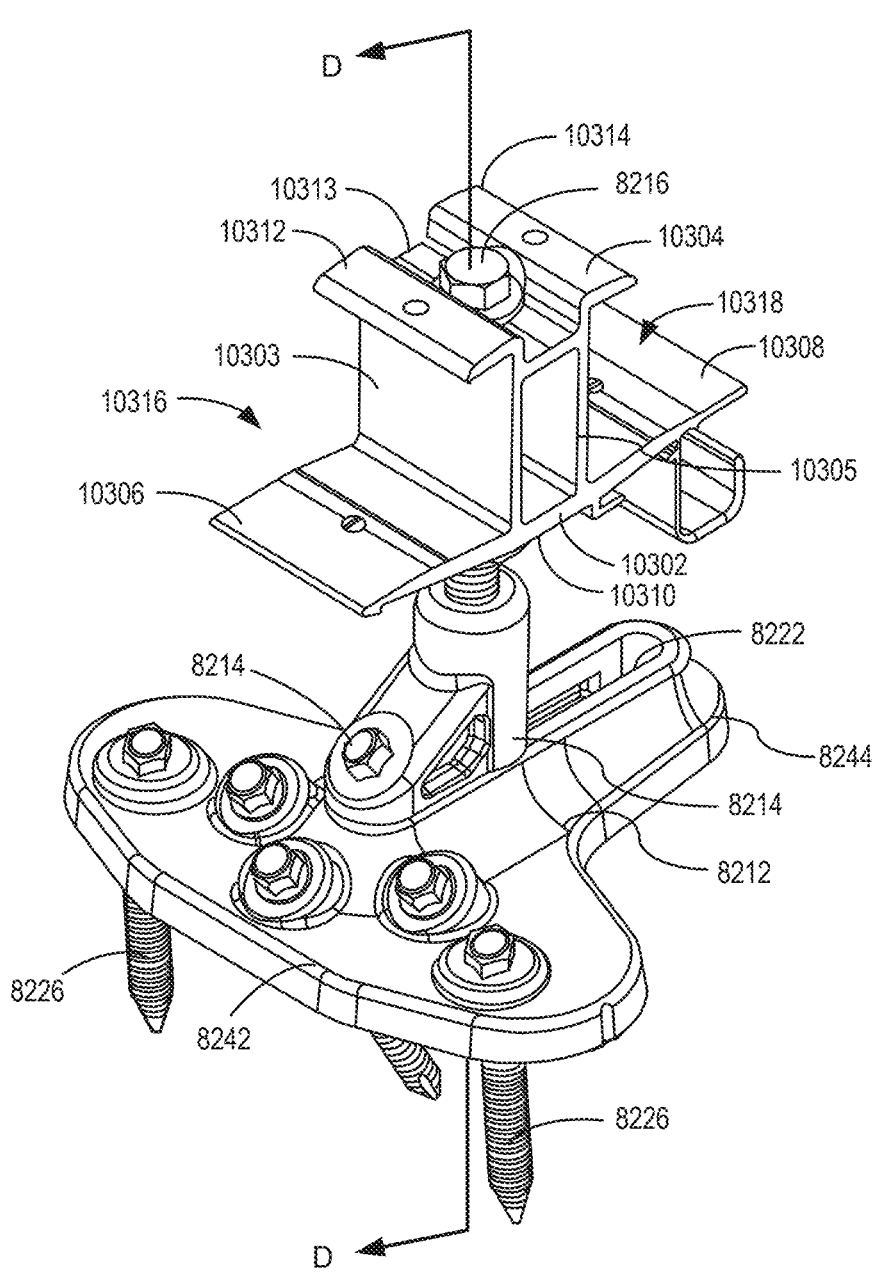
FIG. 103 is a perspective view of a mounting clamp mounted to the support structure of FIG. 82A according to one embodiment or aspect of the present disclosure.
Figure 104:
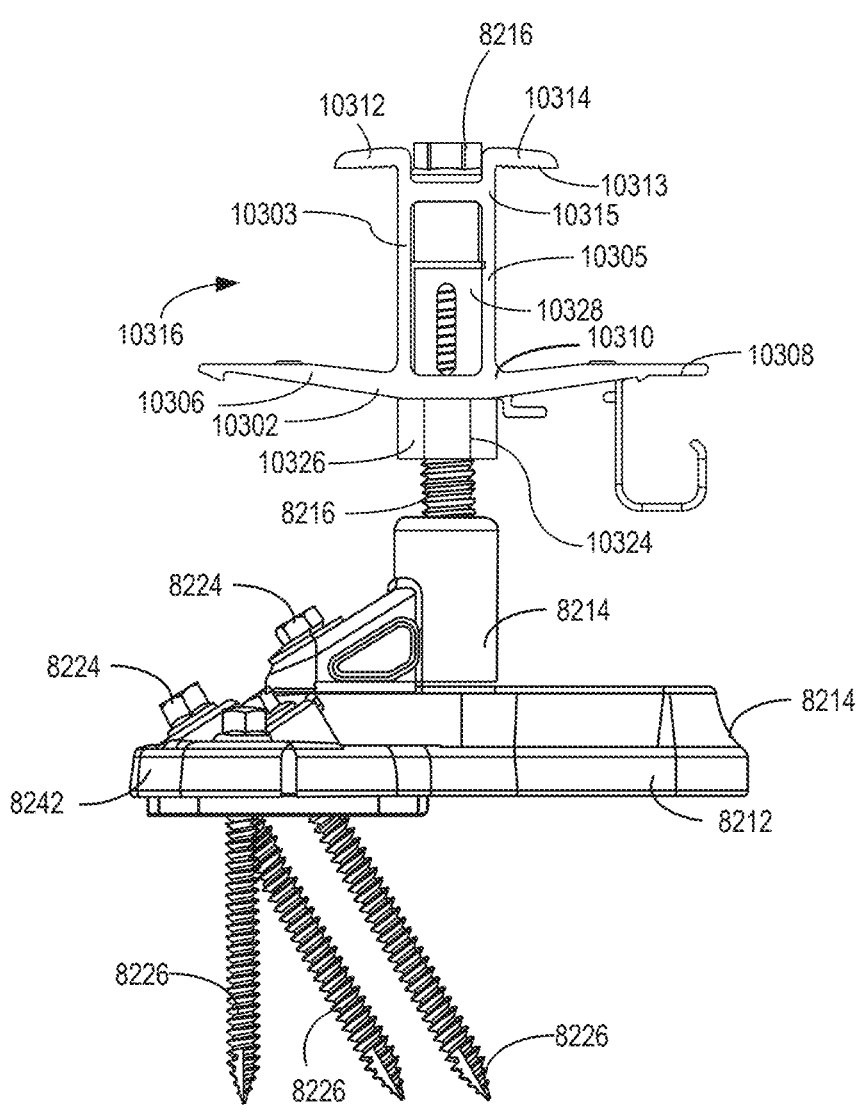
FIG. 104 is a front view of the mounting clamp and support structure of FIG. 103.

In this embodiment, the mounting fastener 8216 is fixed within the pedestal 8214 and is unable to rotate or move up and down. As shown in FIG. 101, the pedestal 8214 includes a hexagonal recess 8239 extending upward from the bottom surface of the pedestal 8214. This recess 8239 receives a hexagonal head 8223 of the fastener 8216 and prevents the rotation of the fastener 8216 within the pedestal 8214. The shapes of the recess 8239 and the head 8223 are hexagonal but other shapes, such as a square or any other shape can be used, so long as the recess and head have cooperating shapes that prevent movement of the fastener 8216 within the pedestal 8214. Other methods for restricting this movement are also considered such as pinning the fastener 8216 to the pedestal or using cooperating threads on the aperture 8236.

The base 9802 defines a mounting aperture 9836, and the top portion 9804 defines a mounting aperture 9838 that is aligned with mounting aperture 9836. The mounting apertures 9836, 9838 are clearance apertures and are arranged to receive the mounting fastener 8216, so that the clamp 9800 can be connected to the support structure 8200. A flanged extended hex nut 9821 is provided on the mounting fastener 8216 includes a flange 9823 and a hexagonal portion 1925. The flanged extended hex nut 1921 and is arranged such that a flange 1923 is located below and supports the base 9802 of the clamp 9800. When the mounting fastener 8216 is received within the mounting apertures 9836, 9838, the hex nut 9821 supports the base 9802 on the mounting fastener 8216. The hex nut 9821 is arranged so that the flange 9823 extends radially beyond the hexagonal portion 9825. The mounting aperture 9836 is sized as a clearance hole for the hexagonal portion 9825, which allows the hex nut to 9821 spin and rotate within the aperture 9836. The flange 9823 is larger than the aperture 9836 and thus supports the clamp base 9802 from below. The hex nut 9821 and mounting fastener 8216 can have corresponding threads, so that the hex nut 9821 can be engaged with the fastener 8216 and rotated clockwise and counterclockwise. This enables the flange 9823 to be adjusted up and down along the fastener 8216 thereby adjusting the height of the clamp base above the base 8212 and support surface or roof and in turn, thereby adjusting the position of the clamp 9800 while maintaining the orientation of the clamp 9800. As shown, the clamp 9800 may also include a supporting portion 9827 that is connected to a lower portion of the base 9802. The supporting portion 9827 may be used to provide support a lower side of the flange 9823 to facilitate the aforementioned adjustment. In other embodiments, the supporting portion 9827 may not be used.

The top portion 9804 further defines access apertures 9840, 9842, located above and aligned with the connecting apertures 9830, 9832 and mounting apertures 9836, 9838 as shown in FIG. 101. The access apertures 9840, 9842 are provided to allow a user to access the mounting fastener 8216 and connecting fastener 9834 to adjust those features as necessary. In some embodiments, the fasteners 8216, 9812 can be adjusted with a drill (not shown) that has one or more interchangeable heads that can mate with the ends of the mounting fastener 8216 and the connecting fastener 9834 to rotate those pieces within and to adjust the clamp 9800.

In a fourth example, with reference to FIGS. 103-106, a mounting component 10300 is shown. The mounting component 10300 is a singular piece, with a bottom portion 10302, center walls 10303, 10305 extending from the bottom portion 10302, and a top portion 10304 extending from the center walls 10303, 10305. The bottom portion 10302 includes support flanges 10306, 10308 extending in opposing directions to support solar panel frames thereon. A center portion 10310 extends between and connects the support flanges 10306, 10308. The top portion 10304 includes a first clamping flange 10312, extending in one direction and opposing the first support flange 10306. The top portion 8204 also includes a second clamping flange 10314, extending in a direction opposite the first clamping flange 10312. The second clamping flange 10314 opposes the second support flange 10308. A center portion 10315 extends between and connects the clamping flanges 10312, 10314.

The clamping flanges 10312, 10314 may include features 10313 to connect or bond to the solar panel frames that to be engaged with the clamp 10300. The first support flange 10306 and the first clamping flange 10312 define a first mounting space 10316 therebetween, and the second support flange 10308 and the second clamping flange 10314 define a second mounting space 10318 therebetween. The mounting spaces 10316, 10318 are arranged to receive solar panel frames therebetween and to secure them to the clamp 9800 for mounting in array or other solar panel system.

Center portion 10310 defines a mounting aperture 10320, and center portion 10315 defines a mounting aperture 10322. The mounting apertures 10320, 10322 are aligned and are arranged to receive the mounting fastener 8216 therein. To arrange the mounting component 10300 on the mounting fastener 8216, a barrel nut 10324 is connected to the mounting fastener 8216 and extends along a length thereof. The barrel portion 10326 of the barrel nut 10324 is threaded to connect to the mounting fastener 8216, and an extension 10328 extends over the mounting fastener 8216 in a direction away from the base 8212. The mounting apertures 10320, 10322 are clearance apertures, so that the extension 10328 fits within at least the first mounting aperture 10320, and the bottom portion 10308 rests on the barrel portion 10326 for support.

Figure 105:
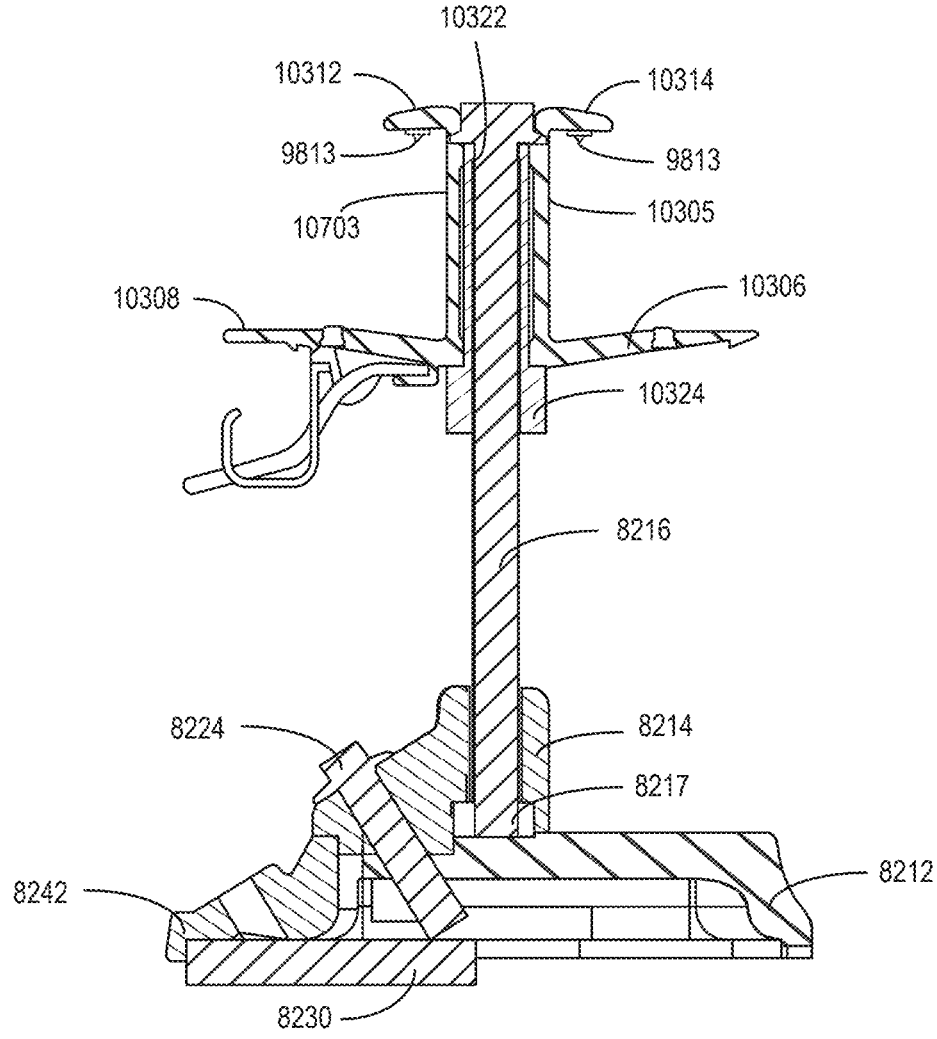
FIG. 105 is a cross-sectional front view of the mounting clamp and support structure of FIG. 103 taken along line D-D.
Figure 106:
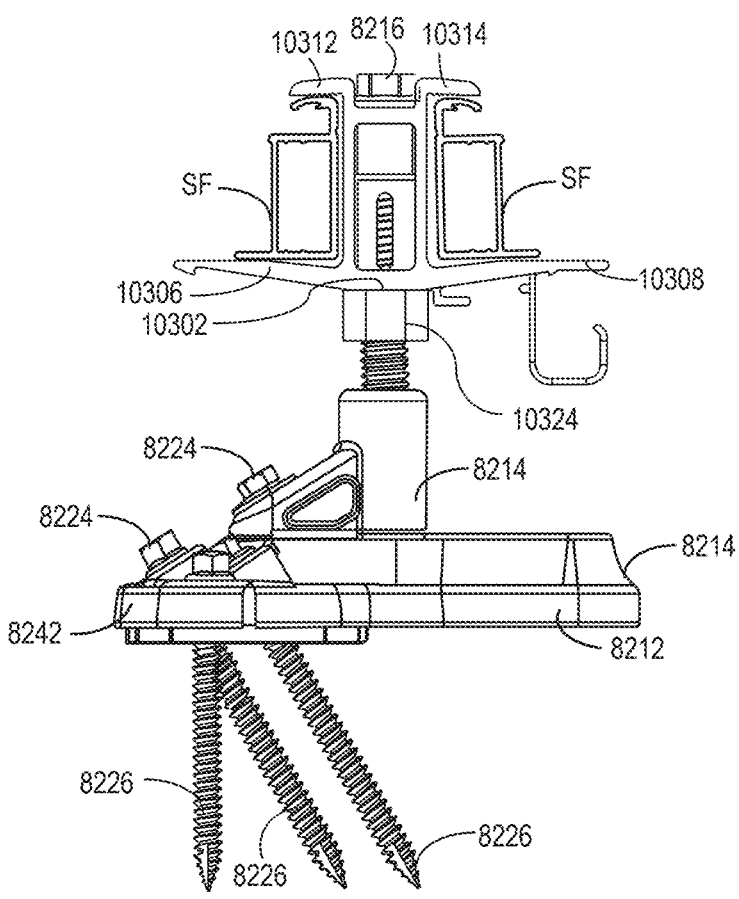
FIG. 106 is a side view of the mounting clamp and support structure of FIG. 103 with two standard solar panel module frames mounted thereto.
Figure 107:
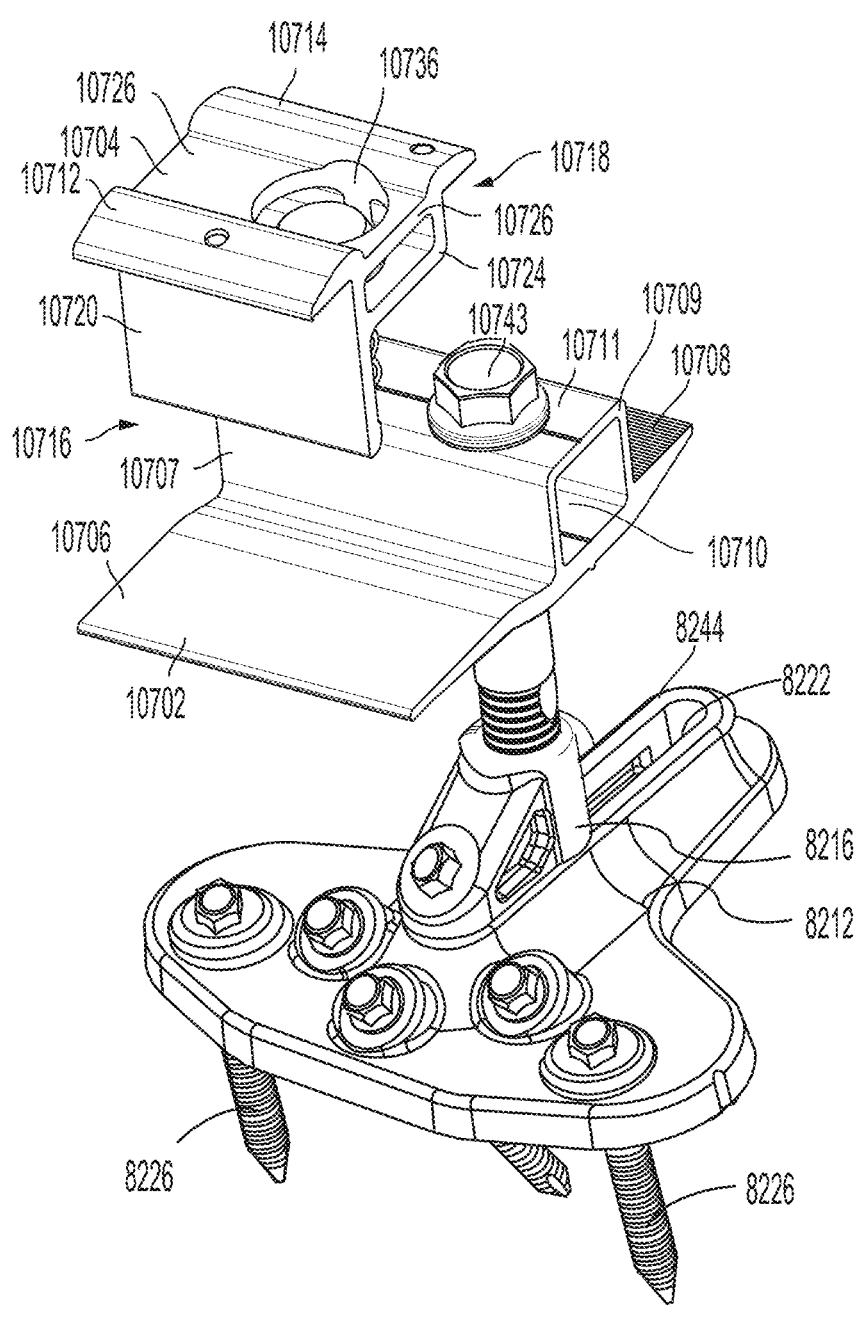
FIG. 107 is a perspective view of a mounting clamp mounted to the support structure shown in FIG. 82A according to another embodiment or aspect of the present disclosure.
Figure 108:
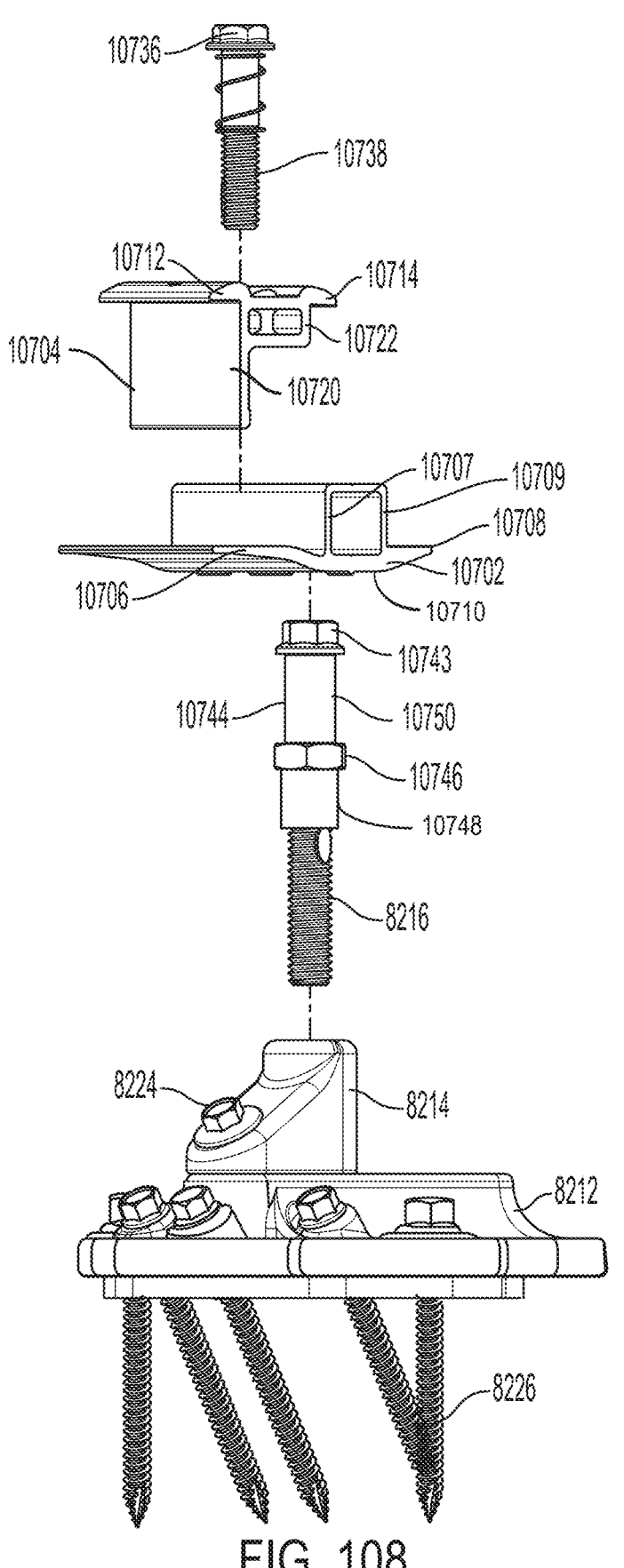
FIG. 108 is an exploded view of the mounting clamp and support structure of FIG. 107.
Figure 109:
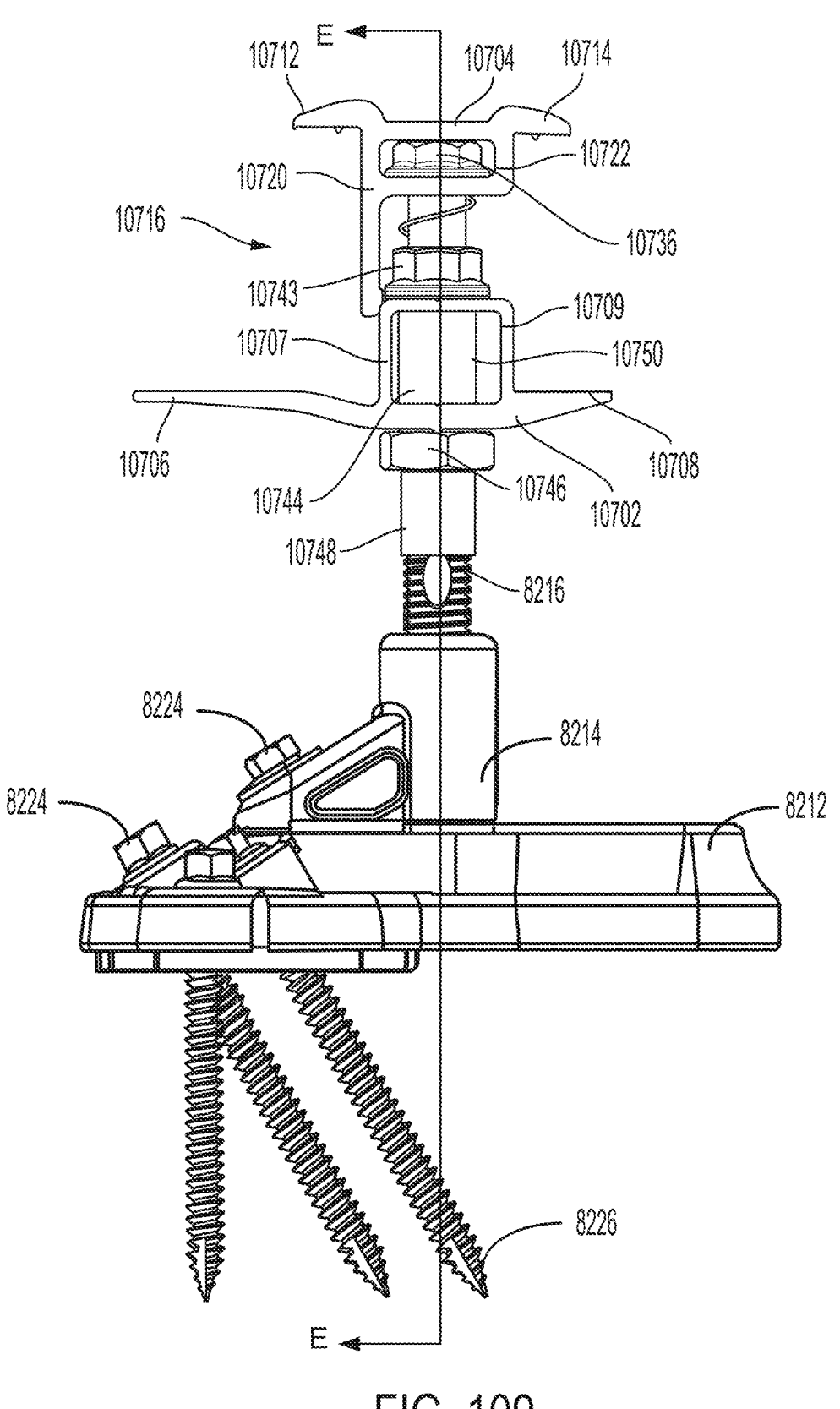
FIG. 109 is a front view of the mounting clamp and support structure of FIG. 107.

In this embodiment, the mounting fastener 8216 is fixed within the pedestal 8214 and is unable to rotate or move up and down. As shown in FIG. 105, the pedestal 8214 includes a hexagonal recess 8239 extending upward from the bottom surface of the pedestal 8214. This recess 8239 receives a hexagonal head 8223 of the fastener 8216 and prevents the rotation of the fastener 8216 within the pedestal 8214. The shapes of the recess 8239 and the head 8223 are hexagonal but other shapes, such as square or any other shape, can be used so long as the recess 8239 and head 8223 have cooperating shapes that prevent movement of the fastener 8216 within the pedestal 8214. Other methods for restricting this movement are also considered such as pinning the fastener 8216 to the pedestal, cooperating threads on the aperture 8236, or chemical epoxy.

In a fifth example, with reference to FIGS. 107-111, another mounting component 10700 is shown. This mounting component 10700 includes a base 10702 and a top portion 10704 arranged over the base 10702. As shown, the top portion 10704 is only arranged over part of the base 10702. The base 10702 includes support flanges 10706, 10708 extending from opposing sides to support a solar panel frame that is mounted to the clamp 10700. A center portion 10710 extends between the support flanges 10706, 10708. Sidewalls 10707, 10709 extend upward from the center portion 10710, and a shelf 10711 extends between and connects the sidewalls 10707. The sidewalls 10707, 10709, and shelf 10711 define a space 10713, and each of these elements extend along an entire width W of the base 10702. The top portion 10704 is supported by the shelf 10711 along part of the width W.

The top portion 10704 includes a first clamping flange 10712, extending in one direction and opposing the first support flange 10706. The top portion 10704 also includes a second clamping flange 10714, extending opposite the first clamping flange 10712. The second clamping flange 10714 opposes the second support flange 10708. The clamping flanges 10712, 10714 may include features to connect or bond to the solar panel frames that to be engaged with the clamp 10700. The first support flange 10706 and the first clamping flange 10712 define a first mounting space 10716 therebetween, and the second support flange 10708 and the second clamping flange 10714 define a second mounting space 10718 therebetween. The mounting spaces 10716, 10718 are arranged to receive solar panel frames therebetween to secure them to the clamp 10700 for mounting in an array or other solar panel system. The top portion 10704 also includes sidewalls 10720, 10722 extending from the clamping flanges 10712, 10714 in the direction of the base 10702. Sidewall 10720 begins proximate the first clamping flange 10712 and extends a distance so that it terminates at or close to support flange 10706, covering sidewall 10707. Sidewall 10722 extends a distance so that it terminates at or close to the shelf 10711, leaving sidewall 10709 exposed. It is contemplated that other lengths may be used. Connecting pieces 10724, 10726 extend between the sidewalls 1072010722. When the top portion 10704 is assembled with the base 10702, the connecting piece 10724 rests on the shelf 10711, and connecting piece 10726 extends between the sidewalls 10720, 10722 proximate the clamping flanges 10712, 10714.

Figure 110:
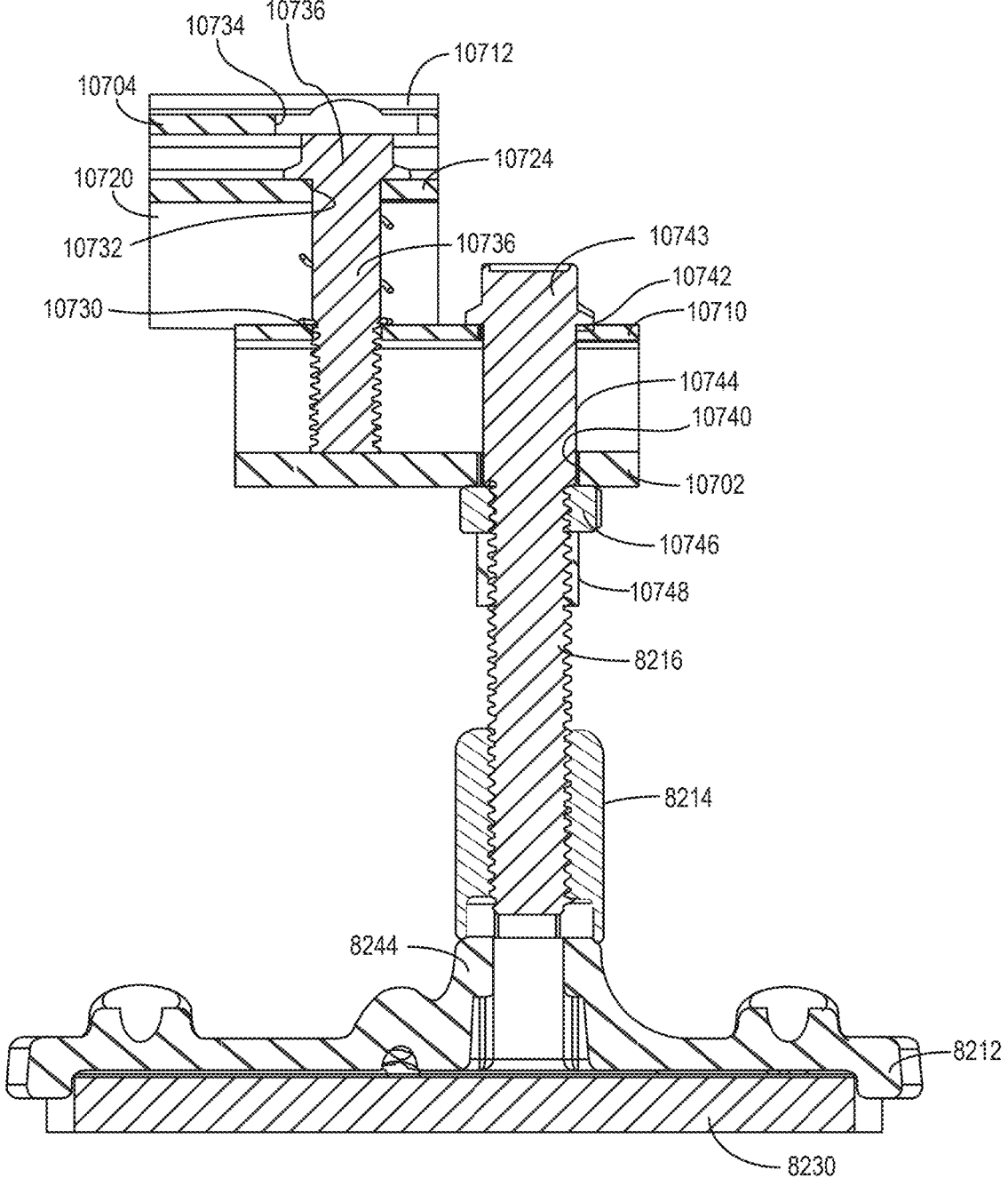
FIG. 110 is a cross-sectional side view of the mounting clamp and support structure of FIG. 109 taken along line E-E.
Figure 111:
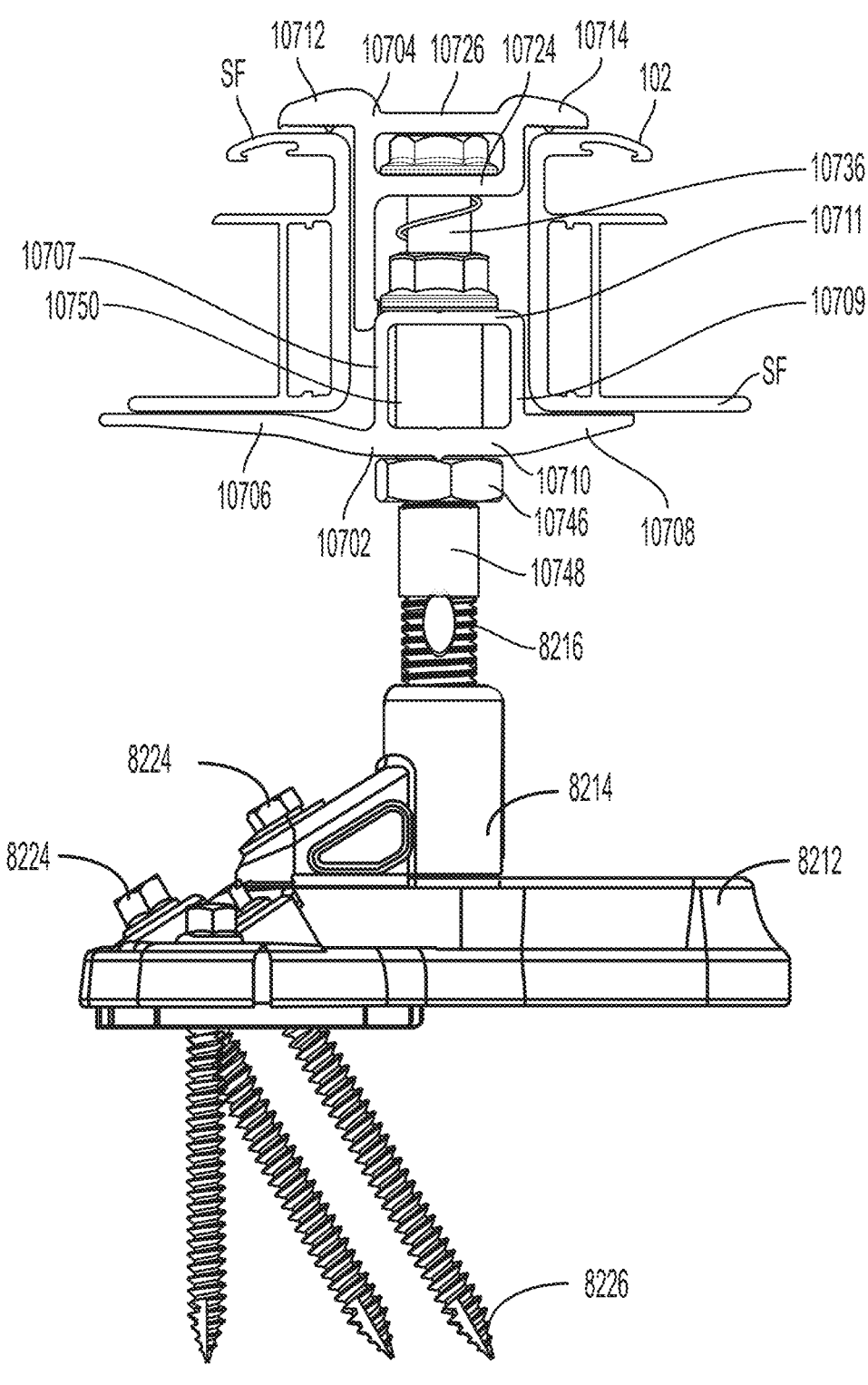
FIG. 111 is a front view of the mounting clamp and support structure of FIG. 109 with two standard solar panel module frames mounted thereto.

As shown in FIG. 110, the shelf 10711 defines a first connecting aperture 10730, the first connecting piece 10724 defines a second connecting aperture 10732, and the second connecting piece 10726 defines a third connecting aperture 10734. Each of these connecting apertures 10730, 10732, 10734 are aligned to receive a connecting fastener 10736 therethrough. The connecting fastener 10736 includes a threaded portion 10738 that mates with corresponding threads in connecting aperture 10730. Connecting apertures 10732, 10734 may also have corresponding threads, or they may be clearance holes for the connecting for the connecting fastener 10736. This arrangement secures the top portion 10704 to the base 10702.

The center portion 10710 defines a first mounting aperture 10740, and the shelf 10711 defines a second mounting aperture 10742. The mounting apertures 10740, 10742 are arranged to receive the mounting fastener 8216 therethrough. One or both of the mounting apertures 10740, 10742 may be clearance apertures. To facilitate this connection, a sleeve 10744 is provided to extend over the mounting fastener 8216. Sleeve 10744 comprises an upper sleeve portion 10750, a lower sleeve portion 10748, and an integral nut portion 10746 therebetween. The sleeve nut 10744 includes a sleeve nut 10746 that is threaded, so that the sleeve 10720 can be secured to the mounting fastener 8216. The sleeve nut 10746 has a diameter that is larger than mounting aperture 10740, ensuring that the base 10702 will rest against the nut portion 10747 when installed. A lower sleeve portion 10748 is arranged to be located outside of the base 10702, extending in the direction of the base 8212. An upper sleeve portion 10750 of the sleeve 10744 is arranged to be located inside of the base 10702, extending through at least the first mounting aperture 10740 and terminating beyond or proximate to the second mounting aperture 10742. The length of the upper sleeve portion 10750 is greater that the height of the base 10702 that is measured from the bottom surface of the center portion 10710 to the top surface of the shelf 10711. The top end of the upper sleeve portion 10750 defines a threaded aperture configured to receive a driving fastener 10743. The driving fastener 10743 comprises a threaded portion that is received by the threaded aperture in the top end of the upper sleeve portion 10750 and a flanged driving head 8217. The flange of the driving head has a diameter that is greater than the diameter of aperture 10742. The driving fastener 10743 is fixed to the upper sleeve portion 10750 by securely tightening the driving fastener 10743 into the upper sleeve portion 10750 and or using Loctite or similar adhesive.

The sleeve nut 10746 may be located at a midpoint of the sleeve 10744 and demarcates the lower sleeve 10748 from the upper sleeve 10750. Exemplary methods of installing and adjusting one or more mounting components 10700 will now be described.

Figure 95:
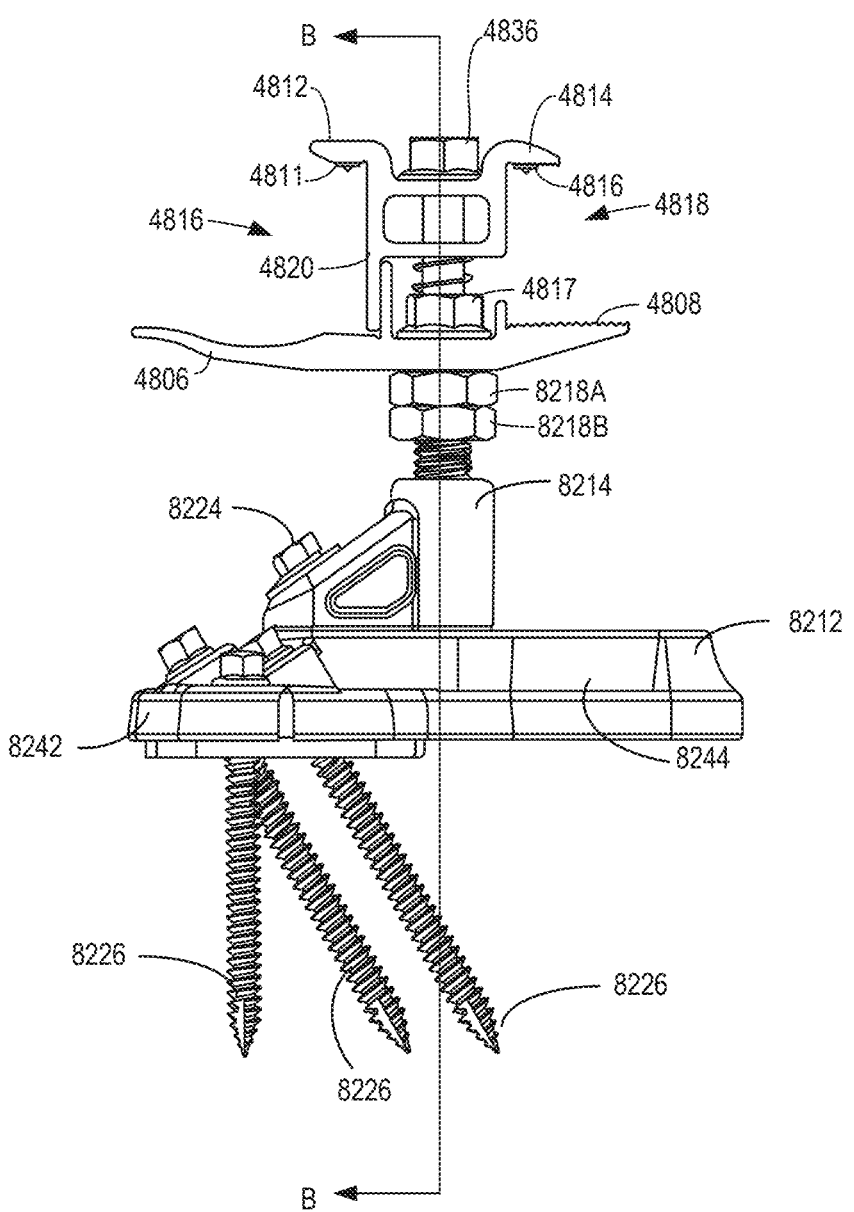
FIG. 95 is a front view of the mounting clamp and support structure of FIG. 94.

In this embodiment, the mounting fastener 8216 is fixed within the pedestal 8214 and is unable to rotate or move up and down. Similar to what is shown in FIG. 95, the pedestal 8214 used with the mounting component 10700 includes a hexagonal recess 8239 extending upward from the bottom surface of the pedestal 8214, as shown in FIG. 110. This recess 8239 receives a hexagonal head 8223 of the fastener 8216 and prevents the rotation of the fastener 8216 within the pedestal 8214. The shapes of the recess 8239 and the head 8223 are hexagonal but other shapes, such as square or any other shape, can be used so long as the recess and head have cooperating shapes that prevent movement of the fastener 8216 within the pedestal 8214. Other methods for restricting this movement are also considered such as pinning the fastener 8216 to the pedestal, cooperating threads on the aperture 8236, or chemical epoxy.

The sleeve 10744 comprises internal threads that cooperate with the threads of the mounting fastener 8216. The flanged driving head 8217 is located above the top surface of the shelf 10711, the nut portion is located below and supports the bottom surface of the center portion 10710, the upper sleeve portion is within the base 10702, the mounting fastener 8216 threadably interacts with the sleeve 10744. The driving head 8217 can be rotated using a drill or other tool, so that the upper sleeve portion 10750 rotates freely within the base 10702 and the sleeve 10744 is driven up and down on the mounting fastener 8216 thereby adjusting the height of the clamp 10700 above the base 8212 and the mounting surface.

Figure 112:
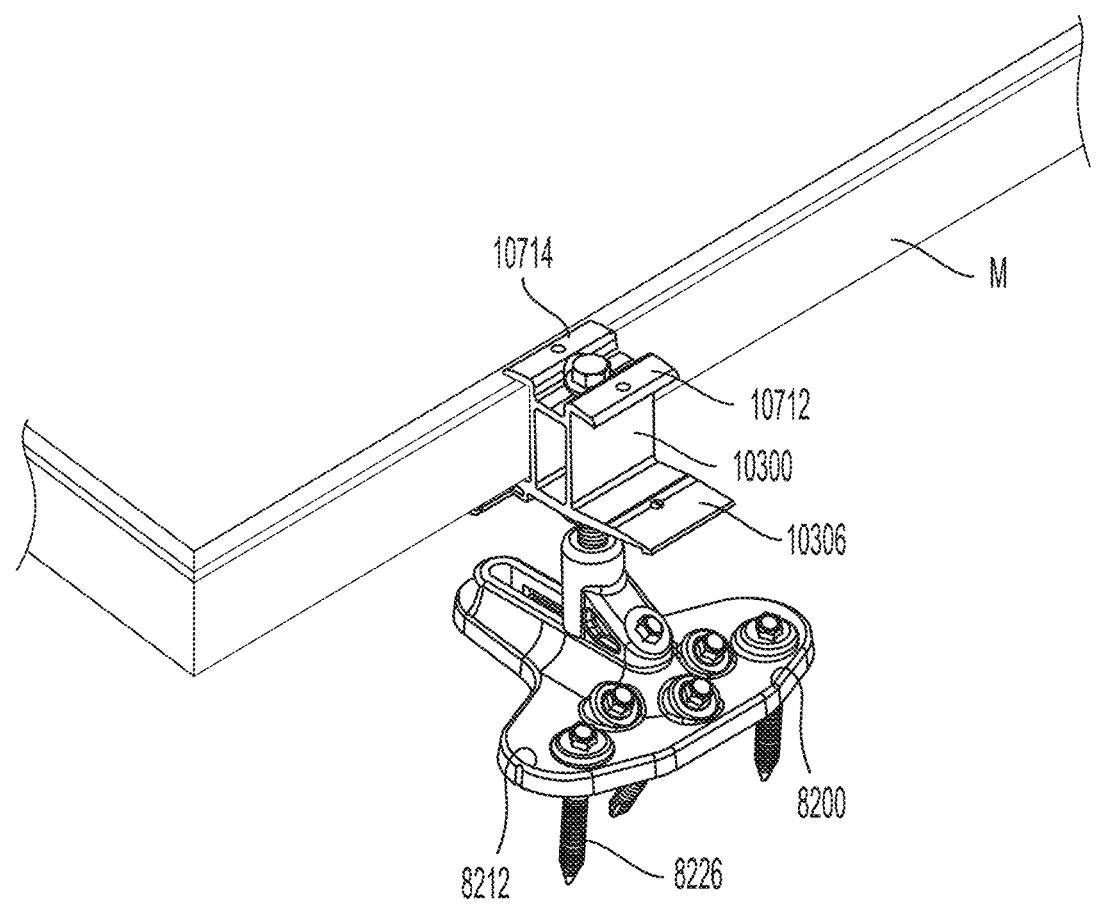
FIG. 112 is a perspective view of a single solar panel module secured to the mounting clamp and support structure of FIG. 98
Figure 113:
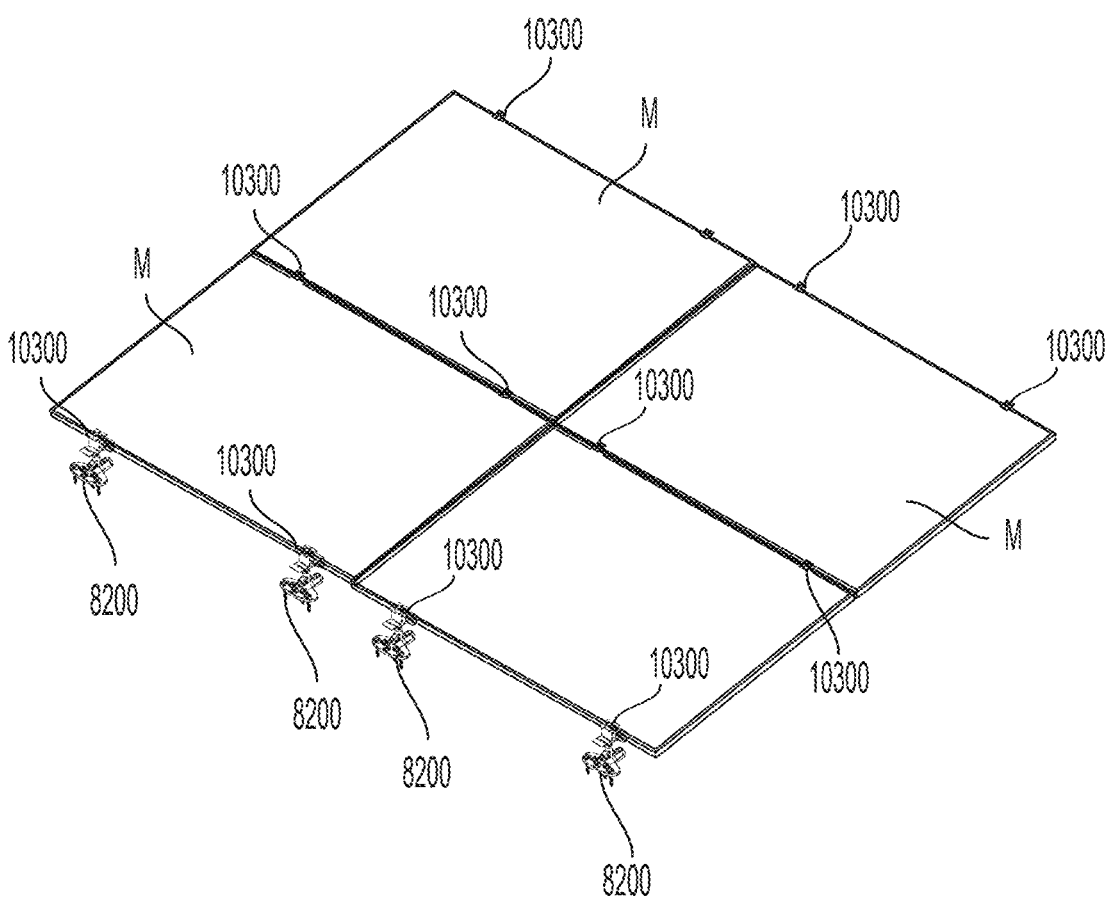
FIG. 113 is a perspective view of an array of solar panel modules secured to multiple the mounting clamps and support structures.

Exemplary methods of installing and adjusting one or more support structures 8200, mounting components 3400, 4800, 9800, 10300, 10700, and solar panel modules will now be described. FIGS. 112 and 113 show a solar panel module M connected to mounting components 9800, which are connected to support structures 8200. While only mounting component 9800 is shown, one will understand that any of the other mounting components 3400, 4800, 10300, 10700 can also be used. Typically, multiple support structures 8200 and associated mounting components 9800 are connected to a single solar panel module M to secure that module to a support surface. In one instance, four support structures 8200 and associated mounting components 9800 are used, with two disposed on opposing sides of the module M, as shown in FIG. 113. In another instance, six support structures 8200 and associated mounting components 9800 are used, with three disposed on opposing sides of the module. Whether four or six support structures 8200 and mounting components 9800 are used, the installation method of each is essentially the same. Prior to installation, the support structures 8200 are already connected to associated mounting components 3400, 4800, 9800, 10300, 10700.

In a first example, structures 8200 are arranged on a support surface at a desired location, which may be proximate the eve or a low end of a sloped roof. If the support surface is a shingled roof, the pads 8230 may be aligned within a single shingle course. Any backing on the pads 8230 is to be peeled away, so that the pads 8230 directly contact the support surface. The base fasteners 8226 are screwed into their respective base apertures 8240A, 8240B, securing the support structures 8210 to the support surface. First, the base fasteners 8226 that correspond to the orthogonal base apertures 8240B are installed, ensuring the base 8212 of the support structure 8210 is connected to the support surface. Then, the base fasteners 8226 that correspond to the angled base apertures 8240A are installed. At this point, mounting accessories, such as a skirt or wind deflector may be connected to the mounting component on one side that opposes the prepared modules. This may be the downslope side of the clamping component corresponding to the toe 8244 of the base 8212. This first row can then be aligned straight and level by using a string line. This process includes adjusting the pedestal 8214 along the slot 8222 and then adjusting the heights of the clamp bases 3402, 9802, 10302, 10702 to all align with the string pulled taught between the outside end components.

Next the first row of modules can be installed into the first row of support structures 8200 and mounting components 3400, 4800, 9800, 10300, 10700 by placing one side of the module on the upslope support flange of the mounting component 3400, 4800, 9800, 10300, 10700, tucking the top edge of the module frame under the clamp flange or by placing a mounting lip 208 on the module frame under the mounting lever 3420. 3432, and then rotating the upslope side of the module toward the roof.

As the module frame approaches the roof additional support structures 8200 and associated mounting components 3400, 4800, 9800, 10300, 10700 are installed onto the upslope frame of the module by installing the module frame into the component mounting spaces. The upslope side of the module frame, which is now secured to the additional support structures 8200 and associated mounting components 3400, 4800, 9800, 10300, 10700 can then continue to be rotated so that the bases 8212 of the support structures 8200 contact the support surface. If needed, the base 8212 can now be adjusted along the pedestal by loosening the pedestal fastener 8224 and sliding the base 8212 so that the entire waterproofing pad falls within a single course of shingles and retightening the pedestal fastener 8224. The release liner can be removed from the waterproofing pad and the support structures can be placed directly on the support surface. Next the base fasteners 8226 corresponding to the angled base apertures 8240A are installed and tightened into the roof/support surface. This snugly secures clamping component(s) against the module frame. Then the base fasteners 8226 corresponding to the orthogonal base apertures 8240B are installed and tightened into the roof/support surface securing the support structures and the modules to the roof/support surface. This process is followed across the first row of modules.

After the first row of modules is installed, subsequent rows of modules are installed by connecting support structures 8200 and mounting components 3400, 4800, 9800, 10300, 10700 to an up slope or first side of a solar panel module by clamping the module frames within mounting spaces of the mounting components 3400, 4800, 9800, 10300, 10700. The opposing, down slope or second side of the module is not yet connected to a mounting structure 8200 and mounting component 3400, 4800, 9800, 10300, 10700. This second side is pushed or rotated into place, so that it engages with the mounting components 3400, 4800, 9800, 10300, 10700 associated with the support structures 8200 that have already been mounted to the support surface. In other words, the frames of the solar panel module that are on the second side are rocked into place within the mounting spaces of the mounting components 3400, 4800, 9800, 10300, 10700 that have already been secured to the support surface. Then, the first side of the solar panel module is rotated downward until the bases 8212 of the support structures 8210 can be arranged on the support surface. Before mounting the support structures 8200 to the support surface, the bases 8212 can be moved relative to the pedestal 8214 to allow for the base 8212 to be secured so that the pad 8230 is located on a single shingle, if necessary. Any backing on the pad 8230 is to be removed prior to placing the pad 8230 against the support surface. When the base 8212 is aligned with a desired location, the pedestal 8214 is secured relative to the base 8212 by tightening the pedestal fastener 8224. When the base 8212 and pad 8230 are placed on the support structure, the base fasteners 8226 corresponding to the angled base apertures 8240A are installed first to firmly secure the mounting component 3400, 4800, 9800, 10300 against the solar panel module. Then, the base fasteners 8226 corresponding to the orthogonal apertures 8240B are installed. The height of the mounting components 8200 can be adjusted at this point by moving the mounting fastener 8216, if necessary. Because each mounting component 3400, 4800, 9800, 10300, 10700 allows for two solar panel modules to be mounted on opposing sides, the process can be repeated with a new solar panel modules until the desired number of solar panel modules are mounted within an array.

In another example, a first solar panel module can be connected to the mounting structures 8200 and associated mounting components 3400, 4800, 9800, 10300, 10700, with the module frames being engaged within the mounting spaces along two opposing sides of the solar panel module. Then, the support structures 8200 are placed at the desired location on the support surface, and the bases 8212 of the support structures 8210 are arranged, so that the base fasteners 8226 can be screwed into their respective base apertures 8240A, 8240B. If the support structure is a shingled roof, then the pads 8230 may be arranged on a single shingle course. The pedestals 8214 can slide along the slot 8222 to ensure that the pad 8230 rests on a single shingle before the base fasteners 8226 are applied to the base 8212. After the bases 8212 are secured with the base fasteners 8226, the pedestals 8214 are secured by screwing the pedestal fasteners 8224 into the pedestal apertures 8238. This secures the first solar panel module in place on the support surface. If only one solar panel is used, then the installation may stop here. To arrange a second solar panel module in an array after the first module has been mounted, mounting components 3400, 4800, 9800, 10300, 10700 are engaged with the second solar panel module along a first side, and the opposing second side is engaged with the already secured mounting components 3400, 4800, 9800, 10300, 10700 in the same manner as discussed above. These steps can be repeated until an entire solar panel array is formed by installed modules.

In another example, only one side of the first solar panel module may be engaged with support structures 8200 and associated mounting components 3400, 4800, 9800, 10300, 10700. This means that the frames on only one half of the solar panel module are initially secured within a mounting space. Then, the support structures 8200 that are connected to the solar panel module are arranged on the support surface at a desired location, and the base fasteners 8226 are installed in their respective base apertures 8240A, 8240B to secure the base 8212 of the support structure 8210 to the support surface. If the support structures are being installed on a shingled roof, then the bases 8212 may be arranged so that the pad 8230 is placed over a single shingle course. After these support structures 8210 are mounted to the support surface, additional support structures 8200 with mounting components are arranged on the other half of the solar panel module. The pedestals 8214 and mounting fasteners 8216 are adjusted as necessary, so that the base 8212 is flat on the support surface and the solar panel module frames are received within the mounting spaces. Then the base fasteners 8226 are screwed into the base apertures 8240A, 8240B. To install a second solar panel module, one side of the solar panel module is fit into the open mounting spaces, of the mounting components that have already been installed. Then, the second module is tilted or otherwise placed at a desired height so that additional mounting components 8200 and support structures can be arranged to support the other half of the second module in the same manner as just described. This process can be repeated until a desired number of solar panel modules are installed.

The adjustability of the mounting components allows for single solar panel modules to be removed and replaced within the array. This also allows for solar panel modules of different thicknesses to be used within the array. The adjustability of the pedestal 8214 and mounting fastener 8216 also allows for easy removal and replacement of a single solar panel module and for differently sized modules to be used within the array.

Additional Module Frame

Figure 114:
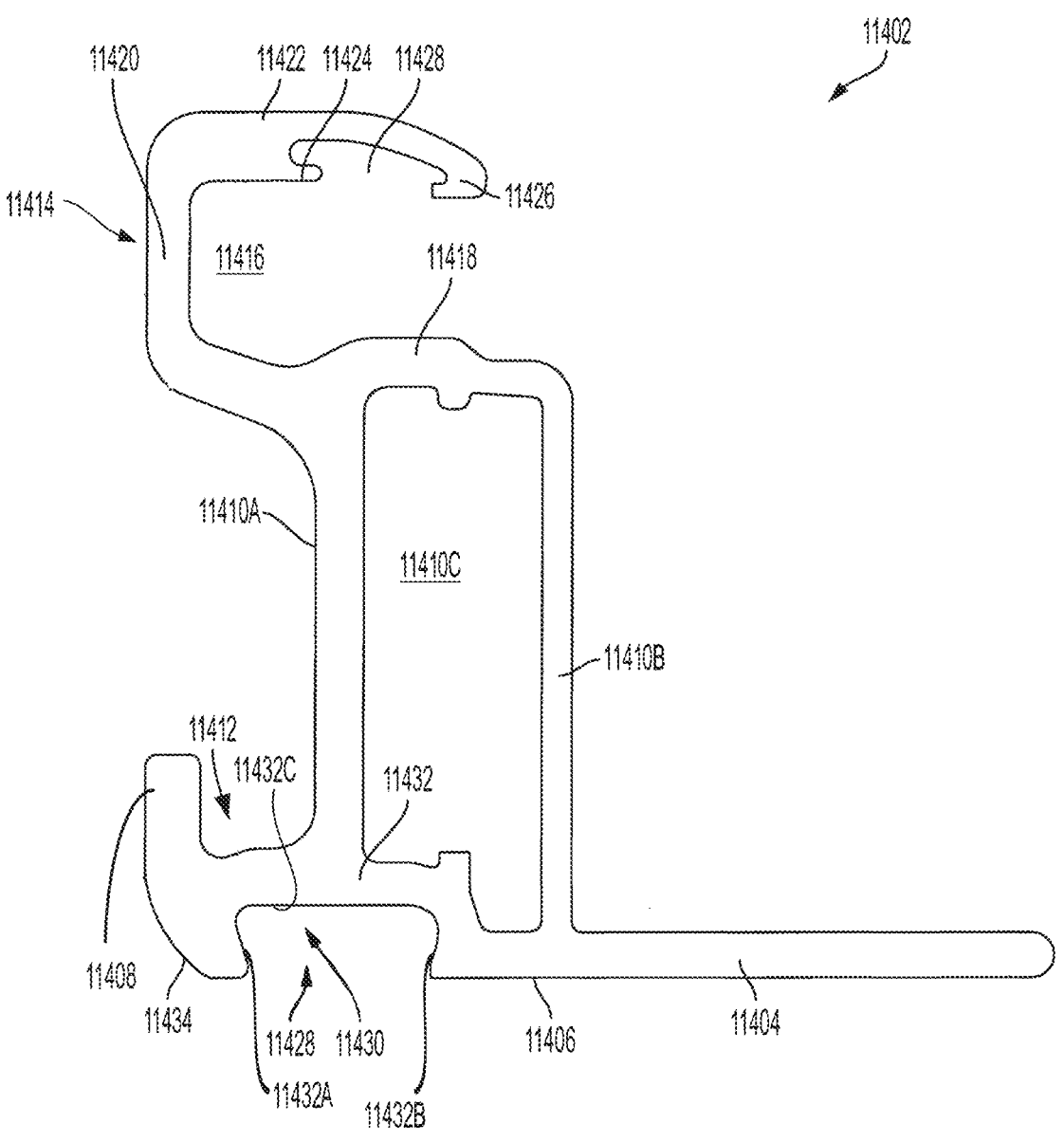
FIG. 114 is a front view of a solar panel module frame according to another embodiment or aspect of the present disclosure.
Figure 115:
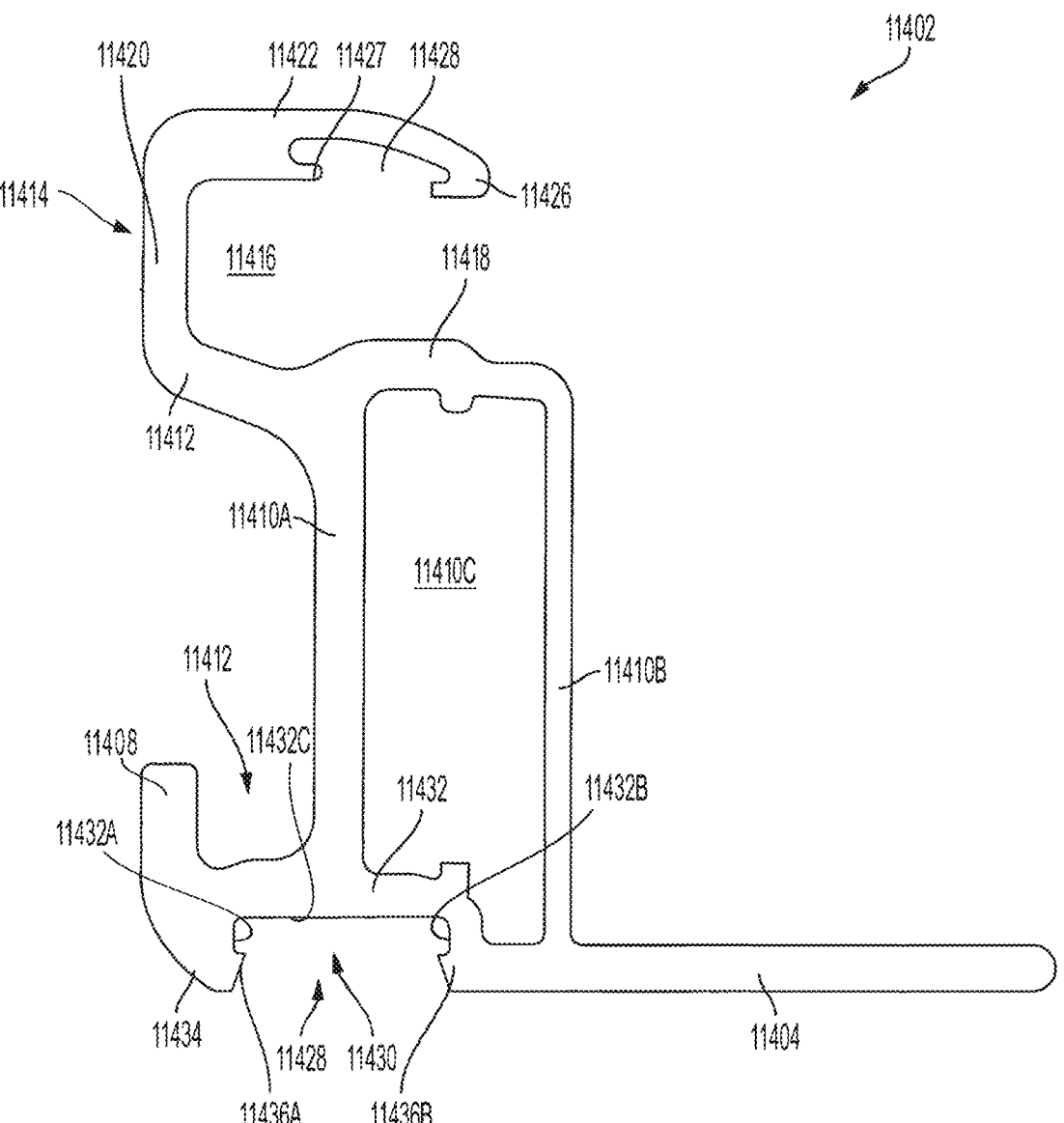
FIG. 115 is a front view of the frame of FIG. 114 according to another embodiment or aspect of the present disclosure.
Figure 116:
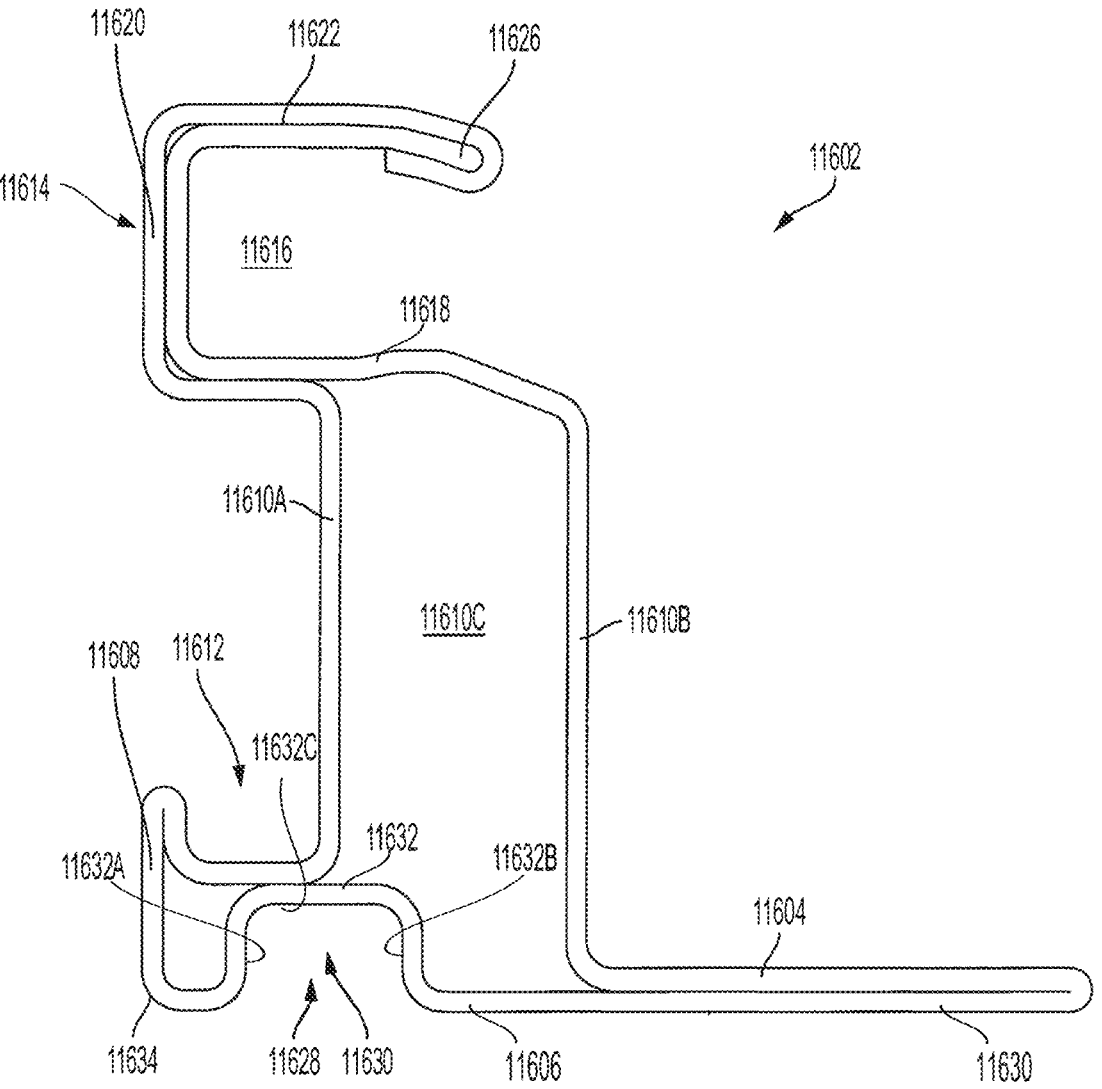
FIG. 116 is a front view of yet another solar panel module frame according to another embodiment or aspect of the present disclosure.

With reference to FIGS. 114-116, additional embodiments of a solar panel frame 11402 is shown. This frame 11402 includes the same features as the other frames 102, 202, 302, 402, described in this application, and is mounted to other clamps and accessories in a similar manner, with a clamp cavity 11412 being defined between an outer lip 11408 and a first leg 11410A. Although not described in this section, features shown in FIGS. 114-116 are similar or identical to the features shown in FIGS. 1-4 that have the same ending reference characters. The difference between the frames is that frame 11402 includes an opening 11428 along the bottom of the base 11404. The opening 11428 leads to a throat 11430 that extends along the length of the frame 11402. The throat 11430 can be used to engage with clamps, accessories, and other features to create a connection between the frame 11402 and these other features. Examples of these will be discussed in other sections below. To define the throat 11430, the frame 11402 includes an interior sidewall 11432. As shown, the interior sidewall 11432 has a first portion 11432A, a second portion 11432B, and a third portion 11432C that extends between the first portion 11432A and the second portion 11432B. As shown, the interior sidewall 11432 is shaped, so that the throat 11430 generally takes the shape of a rectangle, with the first portion 11432A, second portion 11432B, third portion 11432C, and the opening 11428 forming the four sides of the rectangle. However, other shapes are contemplated and may be used, so long as the overall functionality of the frame 11402 is maintained. For example, the interior sidewall 11432 may be trapezoidal or triangular in shape. In other examples, the interior sidewall 11432 may have more rounded edges and sidewalls than is shown in the figures. The first leg 11410A extends upward from the interior sidewall 11432. As shown, the first leg 11410A extends from approximately a midpoint of the interior sidewall 11432 located along the third portion 11432C, but the first leg 11410A may extend from other parts of the sidewall 11432, so long as the first leg 11410A adequately supports the panel support surface 11418 and adequately forms the clamp cavity 11412. The clamp cavity 11412 is formed between the first leg 11410A and the outer lip 11408. The outer lip 11408 extends from a side of the interior sidewall 11432 along the second portion 11432B and ultimately extends along a length parallel to the first leg 11410A to form the clamp cavity 11412. The arrangement of the outer lip 11408 and the interior sidewall 11432 define a curved outer surface 11434 proximate to the bottom of the frame 11402.

As shown in FIG. 115, the frame 11402 may include jaws 11436A, 11436B. The first sidewall portion 11432A and the third sidewall portion 11432B form opposing sides of the sidewall 11432 and comprise the jaws 11436A, 11436B. The jaws 11436A, 11436B extend into the opening 11428 and throat 11430 from opposing sides thereof. A first jaw 11436A extends into the opening 11428 from a part of the frame that is near the curved portion 11434, and a second jaw 11436B extends into the opening 11428 from the opposing side and extends from the base 11404. The jaws 11436A, 11436B are used to further secure parts of clamps and other accessories to the frame 11402 by providing an engagement surface onto which the clamps and other accessories can be connected. The jaws 11436A, 11436B can take different shapes and form different angles relative to the opening 11428, the throat 11430, and interior sidewall 11432 to facilitate these connections. As shown in FIG. 116, the frame 11602 is formed of rolled steel in a manner similar to that described in International Application Publication No. 2024/097312, which is incorporated by reference in its entirety herein. The features of frame 11602 are the same as those of frame 11402. The sidewall portions 11632A and 11632B do not comprise jaws and are straight and parallel and orthogonal to sidewall portion 11632C and base 11604. It is understood that frame 11402 may have sidewall portions that do not include jaws and may be straight and orthogonal and frame 11602 may have sidewalls that do comprise jaws and may not be orthogonal.

Solar panel module frames 11402 and 11602 also include the panel support portion 11414, 11614 similar to the earlier frames 102, 202, 302, 402. The panel support portion 11414, 11614 extends from and is supported by the legs 110A, 110B. The panel support portion 11414, 11614 defines a panel cavity 11416, 11616 that is configured to receive a solar panel therein. The panel support portion 11414, 11614 includes a panel support surface 11418, 11618 for resting the solar panel thereon. The body that defines the panel support portion 11414, 11614 extends across the legs 11410A and 11410B, 11610A and 11610B. The panel support surface 11418, 11618 may be uneven so as to define a lip, a recess, or a bump, which can be used to secure the solar panel within the cavity 11416, 11616. The panel support surface comprises a first portion that extends across and connects to the tops of the legs 11410A and 11410B, 11610A and 11610B and a second portion that extends outwardly from the outer leg 11410A, 11610A forming an obtuse angle with leg 11410A, 11610A. There is a curved transition between leg 11410A, 11610A and the second portion of the panel support surface 11418, 11618. A sidewall 11420, 11620 extends upwards from the panel support surface 11418, 11618. There is a curved transition between the second portion of the panel support surface and the sidewall 11420, 11620. A top wall 122 extends from the sidewall 11420, 11620 generally parallel to the panel support surface 11418, 11618. The second portion of the panel support surface 11418, 11618 can be considered a portion of the panel support surface as described here or a portion of the panel support sidewall 11420, 11620. The upper portion of the solar panel module frame 102, 202, 302, 402 is the panel support portion 114, 214, 314, 414, 11414, 11614 and is comprised of a panel support surface 118, 218, 318, 418, 11418, 11618 the panel support sidewall 120, 220, 320, 420, 11420, 11620 a top wall 122, 222, 322, 422, 11422, 11622 and defining a panel cavity 116, 216, 316, 416, 11416, 11616.

Accessories for the Additional Module Frame

With reference to FIGS. 117A-125, a mid-clamp 11700 for frame 11402, 11602 is shown. The clamp 11700 includes a top portion 11702, a middle portion 11704, and a base 11706. The top portion 11702, middle portion 11704, and base 11706 are aligned along axis A17. A fastener 11708 is used to secure the top portion 11702, middle portion 11704, and base 11706 together and is also aligned along axis A17. The connection between the fastener 11708 and the other elements of the clamp 11700 will be discussed in greater detail below.

As shown in FIGS. 117A and 118-120, the top portion 11702 includes a body 11710 that, as shown is generally in the shape of a rectangular prism. The body 11710 may take other shapes, so long as the functionality of the clamp 11700 is maintained. Extending from the top of the body 11710 are mounting lips 11712A, 11712B. The mounting lips 11712A, 11712B extend outwardly in opposing directions from the body 11710 in a direction that is perpendicular to the axis A17 of the clamp 11700. The mounting lips 11712A, 11712B, like the other mounting lips discussed in this disclosure, are configured to engage corresponding lips and cavities on solar panel frames to secure the frames to the clamp 11700. An example of the corresponding includes the mounting lip 11408 and clamp cavity 11412 of frame 11402.

Along a top surface of the body 11710 is a groove 11714, extending perpendicular to the axis A17 and parallel to the mounting lips 11712A, 11712B. In a central portion of the body 11710, along the groove 11714, a depression 11716 extends into the body 11710. Within the depression 11716, an aperture 11718 extends through the body 11710. The aperture 11718 is arranged to receive the fastener 11708 therein. The aperture 11718 may be threaded to facilitate engagement with corresponding threads on the fastener 11708, or the aperture 11718 may not have threads, and act as a clearing hole, so as to allow for some rotation of the top portion 11702 relative to the base 11706. This rotation may help to facilitate the installation of the clamp 11700, which will be discussed in greater detail below. The body 11710 also defines a hollow 11720 that extends from a bottom surface into the body 11710. The hollow 11720 is only accessible from the bottom surface and is configured to accept mating walls 11732A, 11732B, which are part of the middle portion 11704, and the channel 11742, which is part of the base 11706. This engagement helps to enable the alignment of and connection between the top portion 11702, middle portion 11704, and base 11706.

As shown in FIGS. 117A, 118, 121, and 122, the middle portion 11704 includes a body 11722. The body 11722 defines alignment flanges 11724A, 11724B and clamp support wings 11726A, 11726B. The alignment flanges 11724A, 11724B extend from opposing sides of the body 11722, and the clamp support wings 11726A, 11726B extend from the other two sides of the body 11722, also opposing each other. The alignment flanges 11724A, 11724B may be used to arrange and secure the clamp 11700 inside of a rail R, which will be discussed in greater detail below. The clamp support wings 11726A, 11726B include a flat portion 11728A, 11728B that extend straight in an outward direction. The clamp support wings 11726A, 11726B terminate with an extension 11730A, 11730B that extend upward from an end of the flat portion 11728A, 11728B. The extensions 11730A, 11730B include a vertical edge 11731A, 11731B, which extends directly upward from its respective flat portion 11728A, 11728B. The extensions 11730A, 11730B also include an angled edge 11733A, 11733B that extends between its respective flat portion 11728A, 11728B and its respective vertical edge 11731A, 11731B to define acute angles between both the flat portion 11728A, 11728B and the vertical edge 11731A, 11731B. In other embodiments, the extensions 11730A, 11730B may be rounded. The extensions 11730A, 11730B are shaped to fit within the opening 11428 and throat 11430 of the module frame 11402. During installation of the module frame 11402, audible and tactile feedback is provided when the extensions 11730A, 11730B enter the opening 11428 and make contact with the base 11404 and/or the interior sidewall 11432. In the embodiment of the frame 11402 shown in FIG. 115, the audible and tactile feedback may also be created between the extensions 11730A, 11730B and jaws 11436A, 11436B. In additional embodiments, the extensions 11730A, 11730B may be shaped to fit around or be secured against the jaws 11436A, 11436B to further facilitate the connection between the clamp 11700 and the frame 11402. This connection also helps to prevent the module 11430 from being dislodged and, and this connection also helps to ensure that the module frame 11430 is aligned properly within the array when it is being mounted to the clamp 11470.

The alignment flanges 11724A, 11724B and the clamp support wings 11726A, 11726B at least partially define an opening 11732 that extends through the body 11722. The opening 11732 is shaped to receive the channel 11742 of the base 11706 therethrough. As shown, the opening 11732 is rectangular, but other shapes can be used, so long as they can receive the channel 11742. Also defining the opening 11732 are mating walls 11734A, 11734B. The mating walls 11734A, 11734B extend vertically upward from the body 11722, perpendicular to the alignment flanges 11724A, 11724B and clamp support wings 11726A, 11726B. The mating walls 11734A, 11734B are configured to be received within the hollow 11720 of the top portion 11710 to connect the middle portion 11704 to the top portion 11710. As shown, the mating walls 11734A, 11734B are C-shaped, with mating wall 11734A appearing as a forward-facing C and mating wall 11734B appearing as a backward facing C. However, the mating walls 11734A, 11734B may take other shapes, so long as they be securely received within the hollow 11720 of the top portion 11702. One portion of each mating wall 11734A, 11734B extends along the length the adjacent alignment flange 11724A, 11724B, and two other portions of each mating wall 11734A, 11734B extend partially along the length of the opposing alignment support wings 11726A, 11726B.

As shown in FIGS. 117A, 118, 123, and 124 the base 11706 includes a body 11736. Extending from opposing sides of the body 11736 are base wings 11738A, 11738B. The ends of the base wings 11738A, 11738B define slots 11740A, 11740B. The slots 11740A, 11740B are shown with consistent depth and not arc shaped as they are shown in base 2206. However it is conceived that the slots 11740A, 11740B of clamp 11700 can be arc shaped to include the same benefits and features as the slots 2240A, 2240B of clamp 2200. The slots 11740A, 11740B are configured to engage with portions of the rail R to further stabilize the clamp 11700 within the rail R. Examples of these rail R portions may be a corresponding groove or channel located within the rail R so that the base 11706 may function as a channel nut within the rail R. Extending upwards from the base wings 11738A, 11738B is the channel 11742. The channel defines an aperture 11744 that is configured to receive the fastener 11708 to connect the top portion 11702 to the base 11706. The aperture 11744 may be threaded to further secure the fastener 11708.

The clamp 11700 fits into the rail R, similar to clamp 2200 discussed above. In the first mounting method, the clamp 11700 is aligned with the end of the rail R, so that the base wings 11738A, 11738B are aligned within the grooves G, and the clamp support wings 11726A, 11736B are aligned on top of the support surfaces S. This allows for the clamp 11700 to slide along the rail R to be put into place at its desired location. In the second mounting method, the clamp 11700 can be angled to slide into a top opening in the rail R from the vertical direction. The alignment flanges 11724A, 11724B and base wings 11738A, 11738B are shaped to rotate within the rail R and fit within and against their respective grooves G and support surfaces S to be placed into their desired location.

Figure 117A:
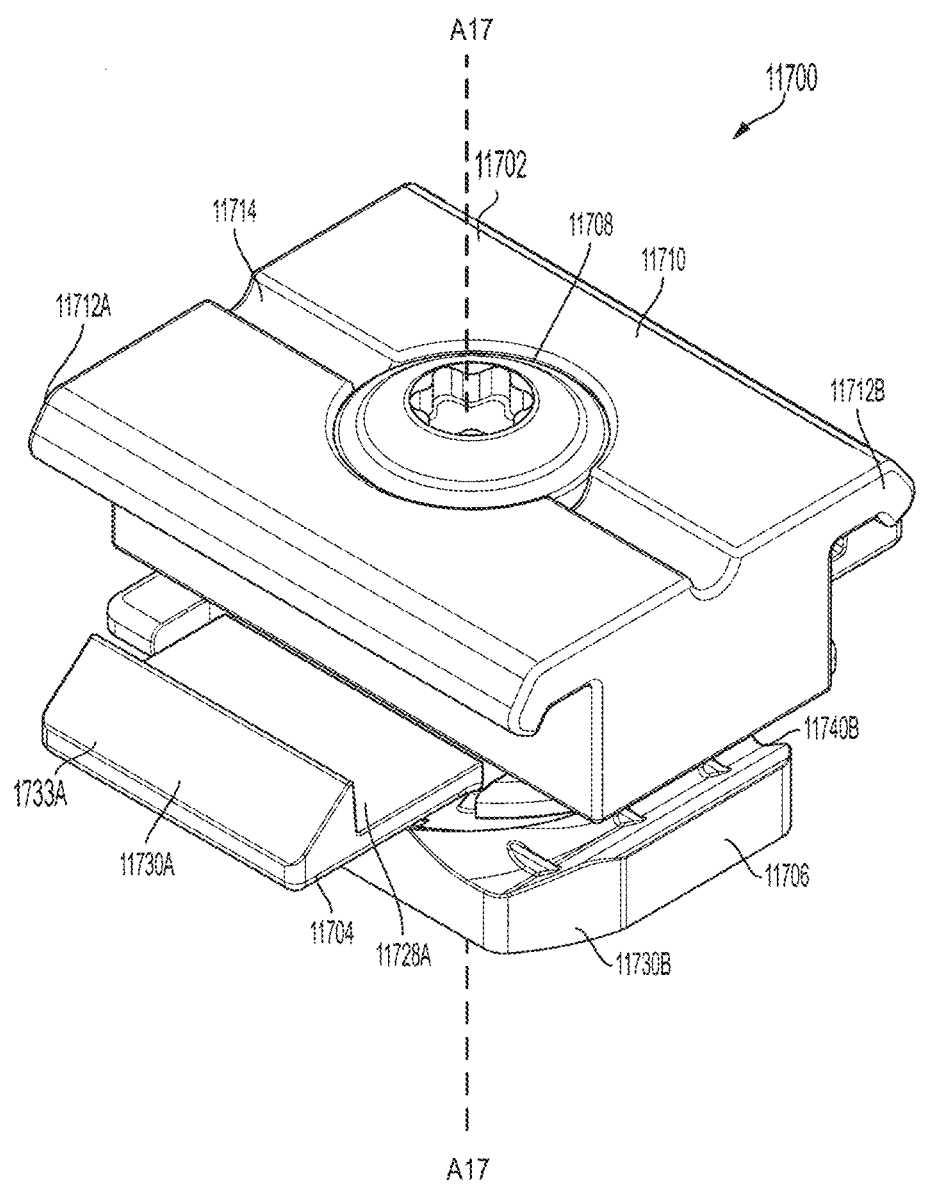
FIG. 117A is a perspective view of a mounting clamp according to one embodiment or aspect of the present disclosure.
Figure 117B:
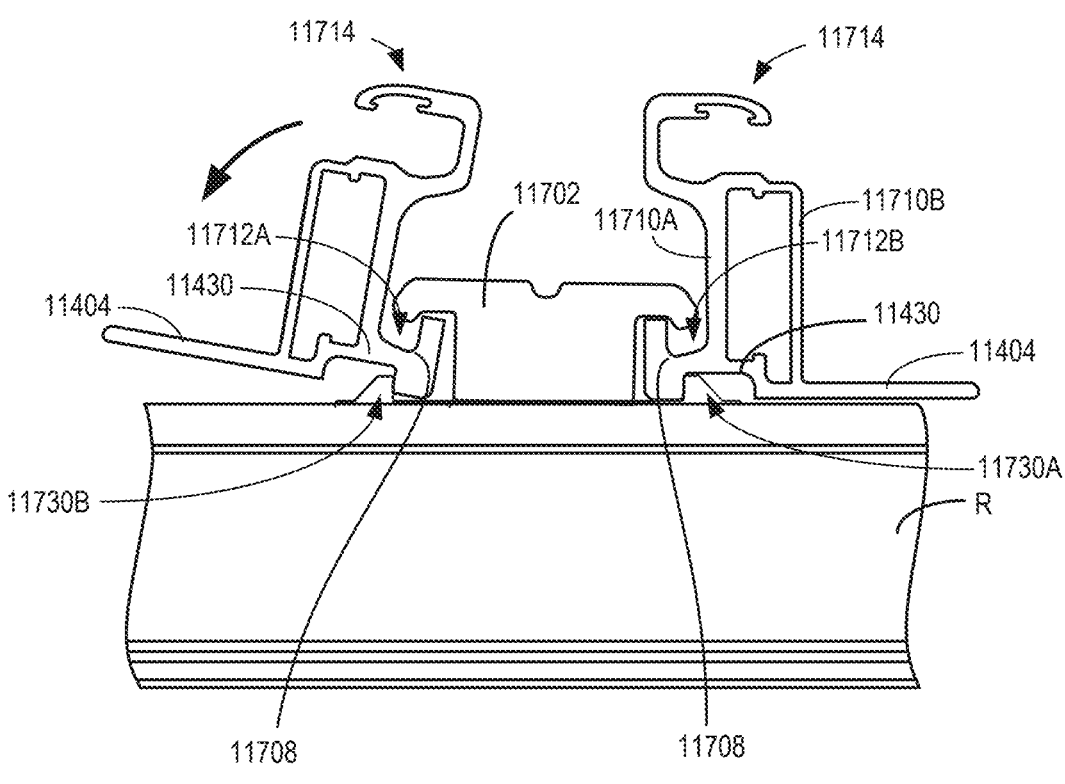
FIG. 117B is a front view of the solar panel module frame of FIG. 114 secured to the mounting clamp of 117A.
Figure 118:
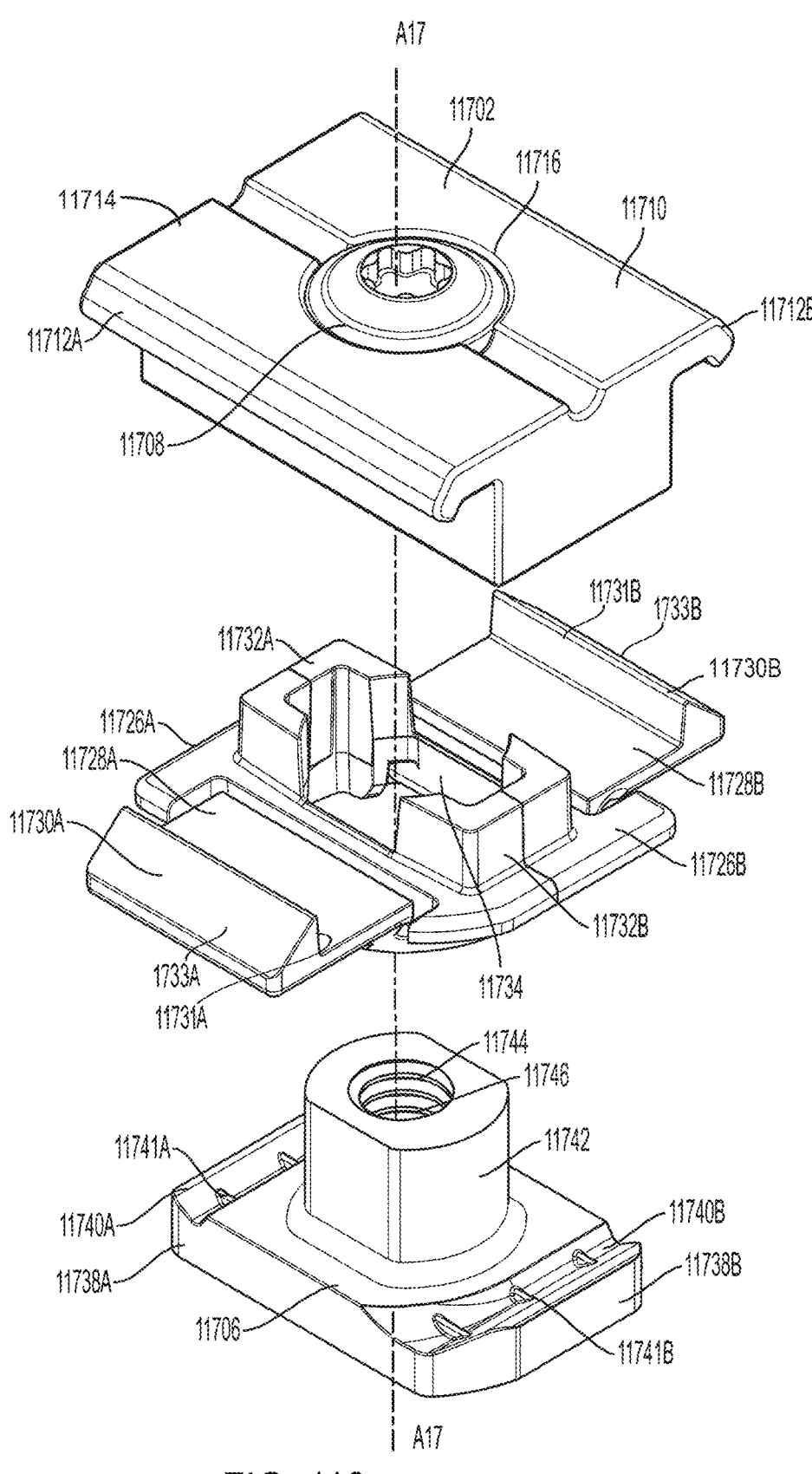
FIG. 118 is an exploded view of the mounting clamp of FIG. 117.
Figure 119:
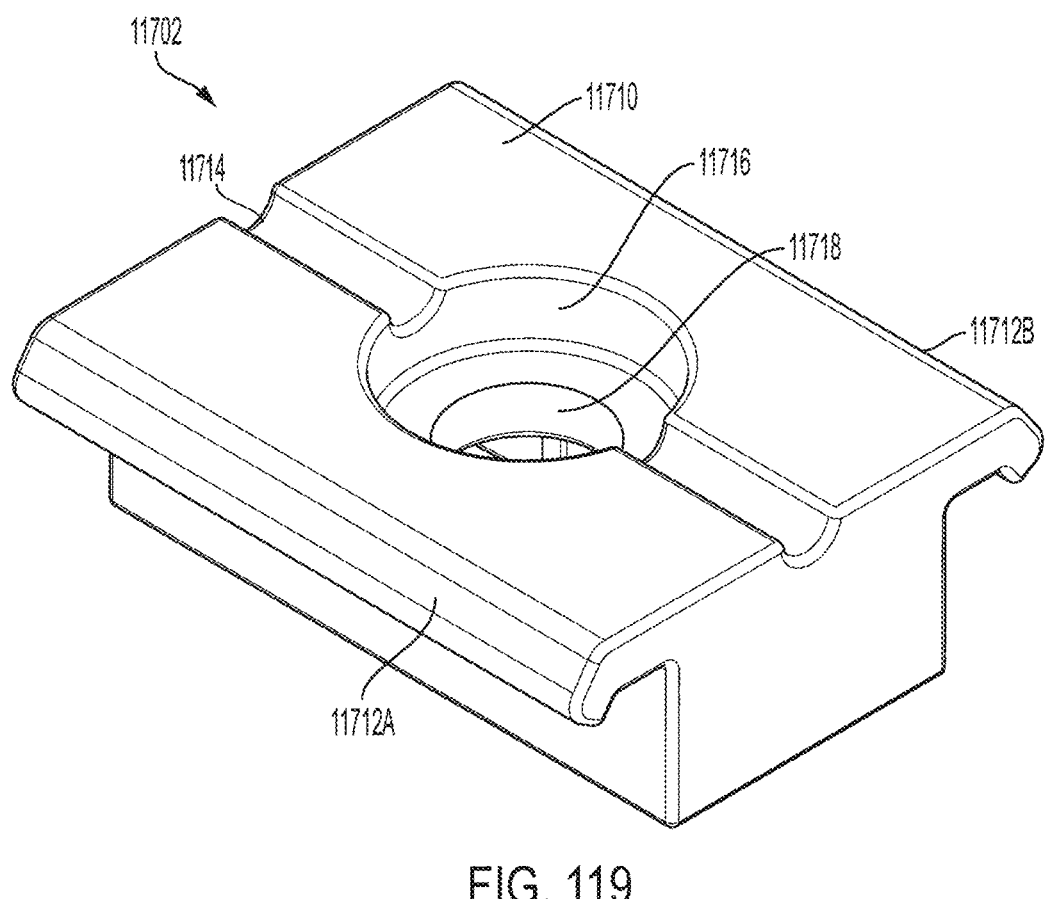
FIG. 119 is a top perspective view of a top portion of the mounting clamp of FIG. 117.
Figure 120:
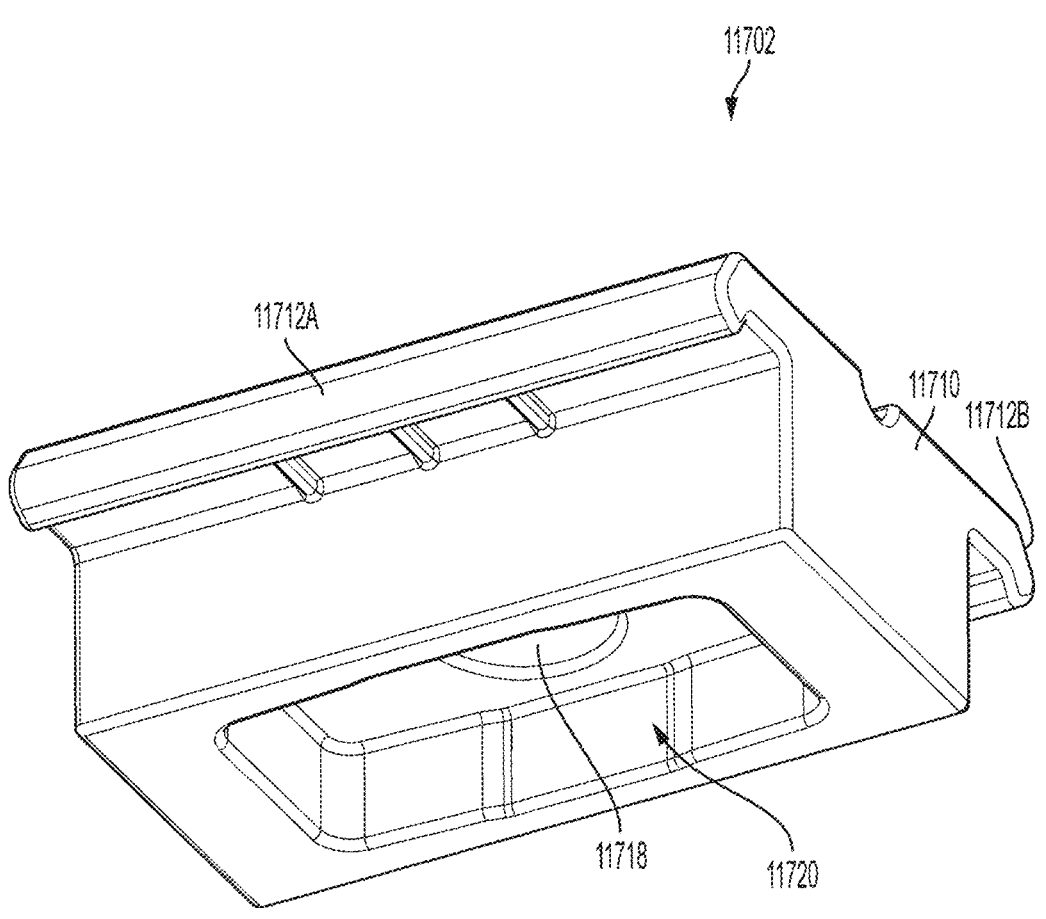
FIG. 120 is a bottom perspective view of the portion of the mounting clamp of FIG. 117.
Figure 121:
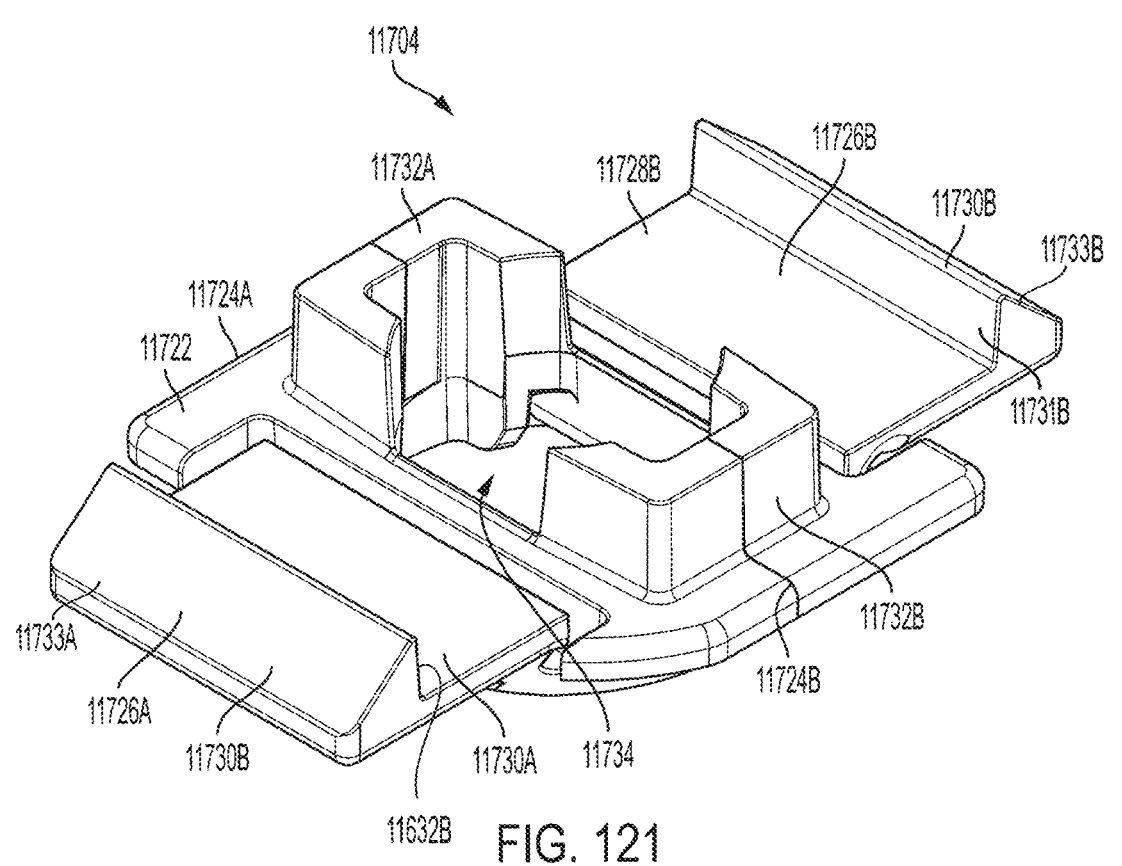
FIG. 121 is a top perspective view of the middle portion of the mounting clamp of FIG. 117.
Figure 122:
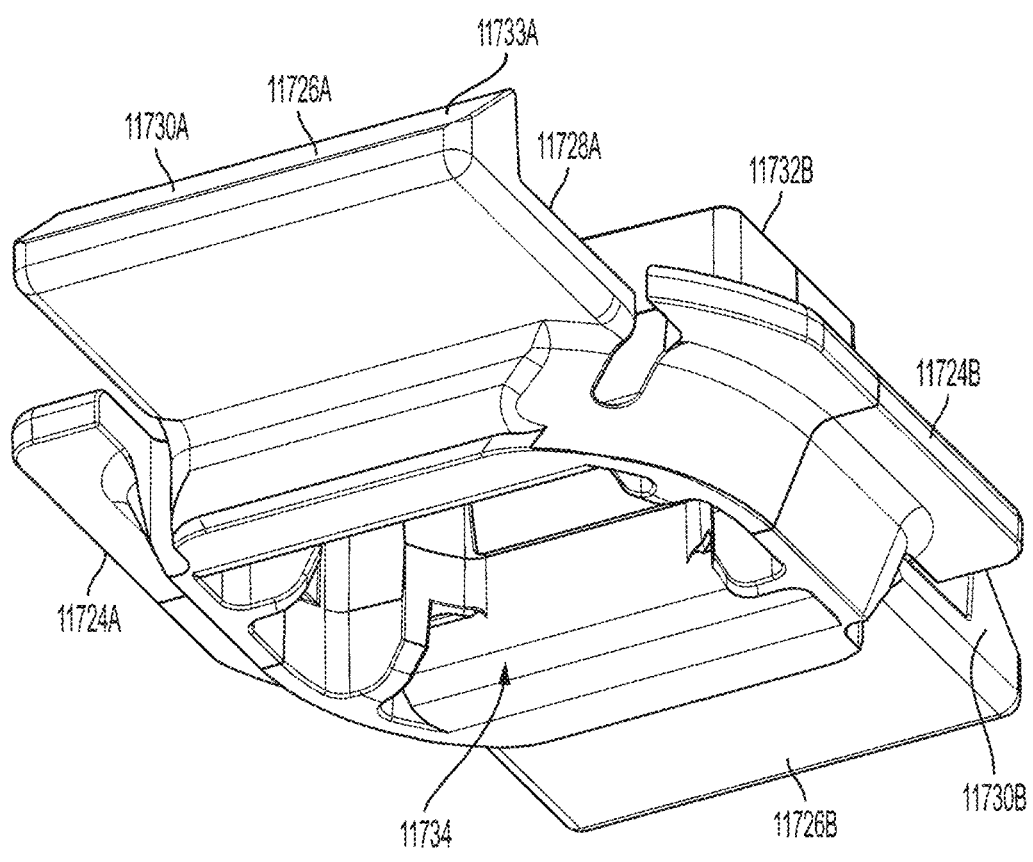
FIG. 122 is a bottom perspective view of the middle portion of the mounting clamp of FIG. 117.
Figure 123:
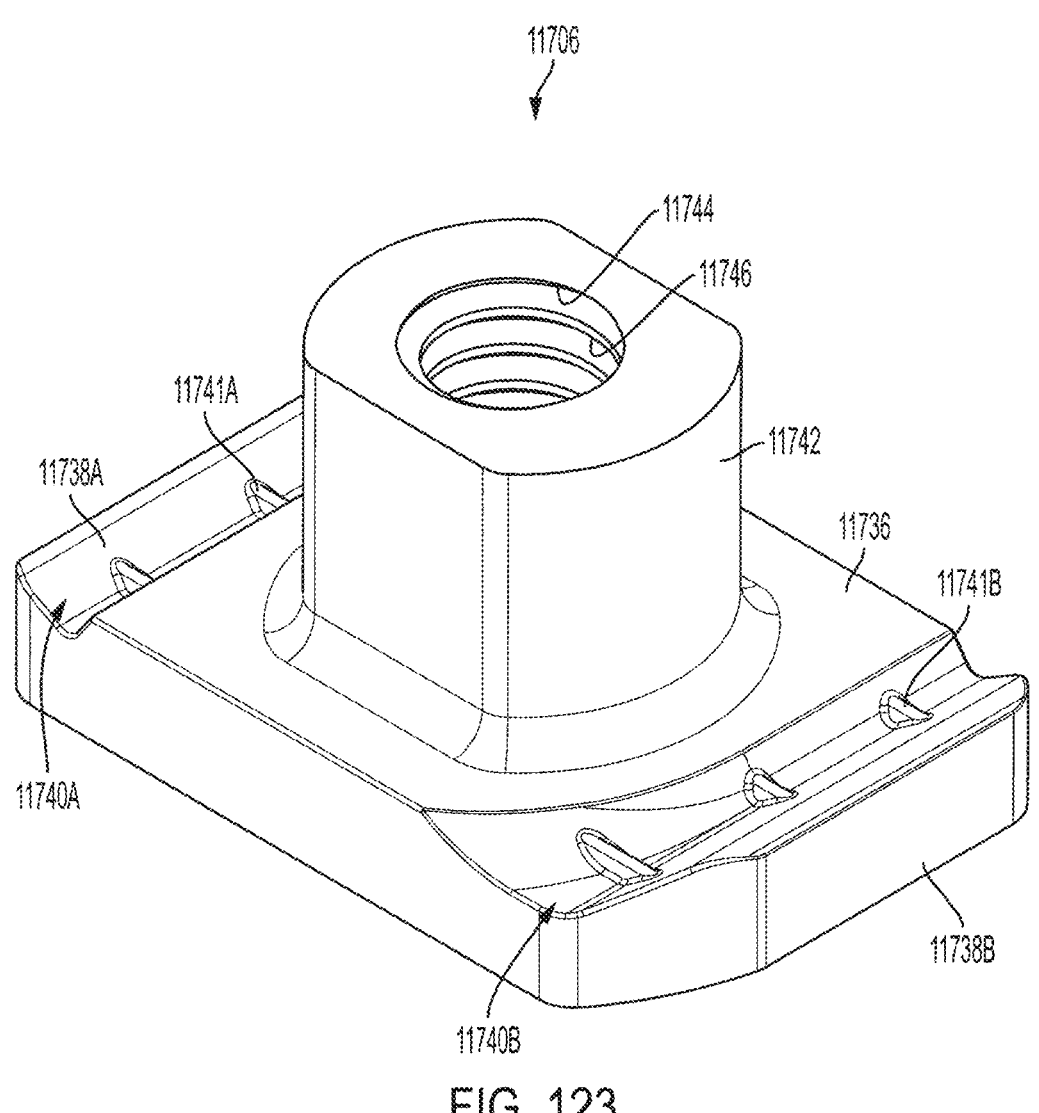
FIG. 123 is a top perspective view of a bottom portion of the mounting clamp of FIG. 117.
Figure 124:
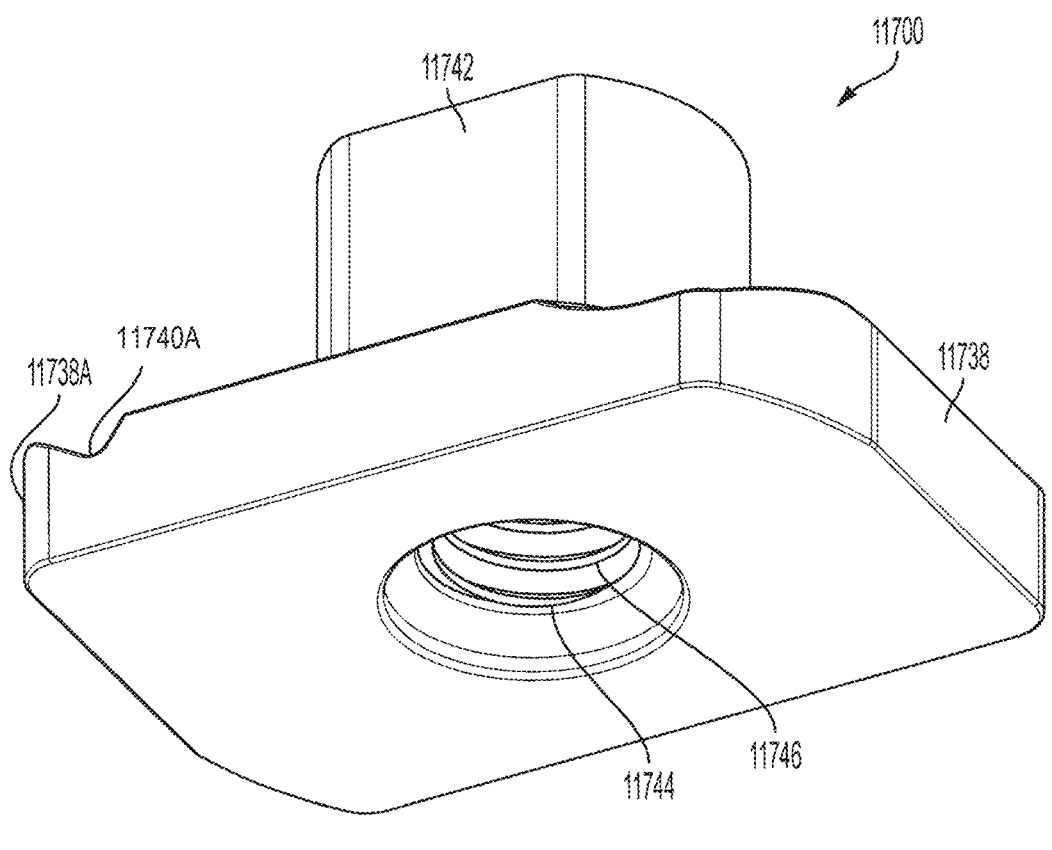
FIG. 124 is a bottom perspective view of the bottom portion of the mounting clamp of FIG. 117.

When the clamp 11700 is in its desired location, a first module frame 11402 slides into place against the clamp, so that the clamp cavity 11412 receives the first mounting lip 11712A, and the opening 11430 receives the extension 11730. After the first clamp 11700 is slid into place, a second clamp 11700 can be rocked into place, so that the second extension 11730B is received within the opening 11428 and throat 11430 of a second frame 11402, and the second mounting lip 11412B is received and engaged within clamp cavity 11412. FIG. 117B shows two module frames 11402 in the process of being mounted to the clamp 11700.

In another example, the first module frame 11402 can be rocked and/or rotated into place. When this happens, the first frame 11402 is rotated, like the other frames 102, 202, 302, 402, so that the outer lip 11408 is moved upward relative to the rail R, and the opening 11428 and throat 11430 receive the first extension 11730A. Then, the frame 11402 is rotated downward toward the rail R, so that the clamp cavity 11412 becomes engaged with the first mounting lip 11712A. When this occurs, the base 11404 is brought fully into contact with the top surface of the rail R, and the extension 11730A is fully received within the throat 11428 and opening 11430.

In both examples, after the first clamp 11700 is rocked into place, a second clamp 11700 can be rocked into place in the same manner, so that the second extension 11730B is received within the opening 11428 and throat 11430 of a second frame 11402, and the second mounting lip 11412B is received and engaged within clamp cavity 11412.

To disengage the clamp 11470 from the frames 11402, 11602, the fastener 11708 is loosened to allow the top part 11702 to be loosened or removed, which disengages the mounting lips 11712A, 11712B from their clamp cavities 11412.

In some instances, the clamp 11700 may be preassembled prior to use, meaning the fastener 11708 is arranged tightly against the top portion 11702. In this instance, the clamp 11700 is considered a toolless clamp, meaning tools are not needed to affix the clamp 11700 to the rail R and the frames 11402. In other instances, the fastener 11708 may not be completely tightened against the top portion 11702 and the base 11706. After mounting, the fastener 11708 may be tightened to further secure the connections between the mounting lips 11712A, 11712B and their respective frames 11402.

Figure 125:
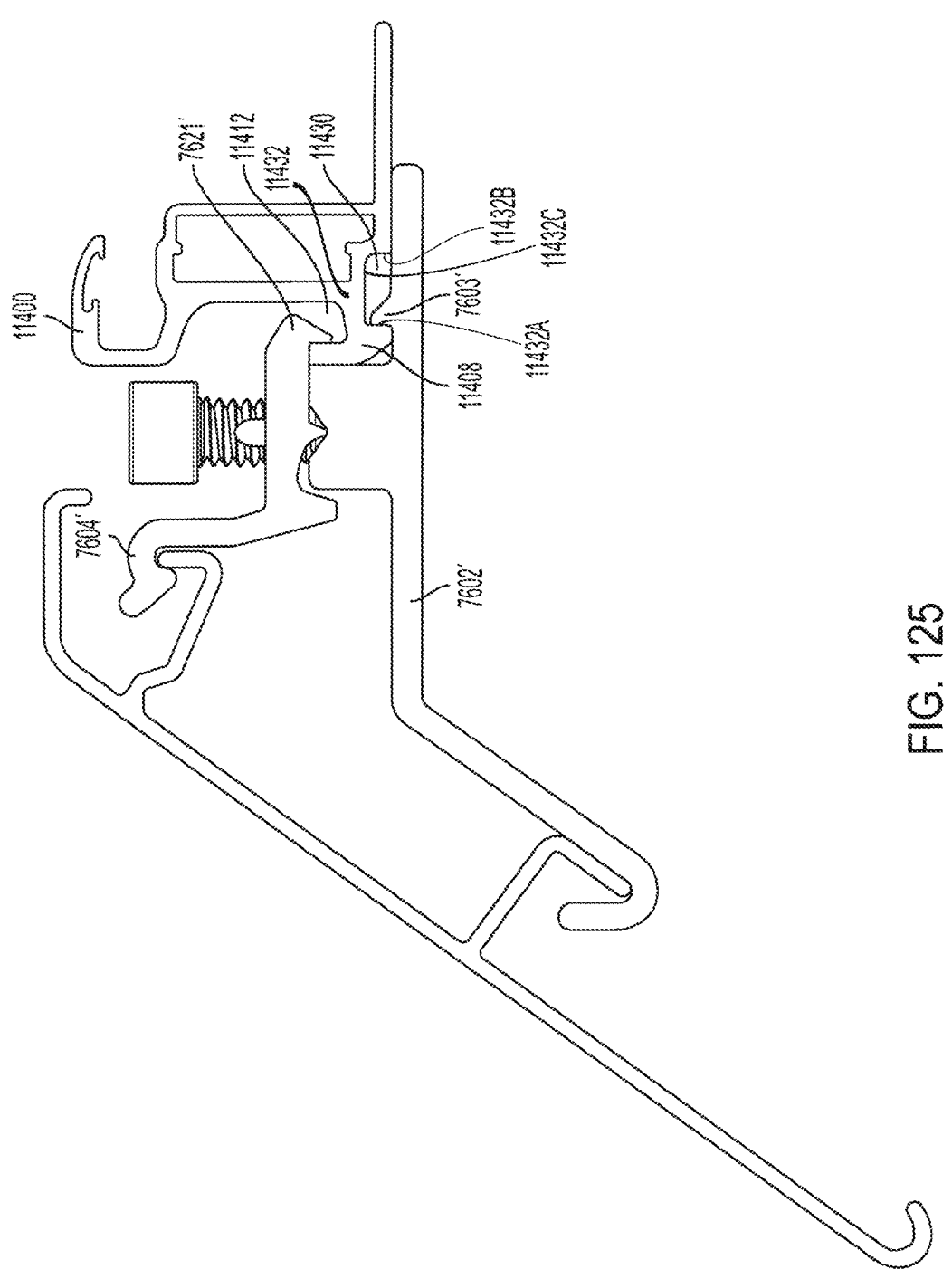
FIG. 125 is a front view of the skirt assembly of FIG. 70, modified to mount a solar panel module frame of FIGS. 114-116 thereto.

With reference to FIG. 125, frame 11402 is shown with a modified skirt assembly 6000'. The skirt assembly 6000' is nearly the same as the skirt assembly 6000 shown in FIGS. 60-65. However, the base 6002' includes an extension 6003' that engages with the opening 11428, throat 11430, and/or jaws 11436A, 11436B of the frame 11402, 11602.

Figure 126:
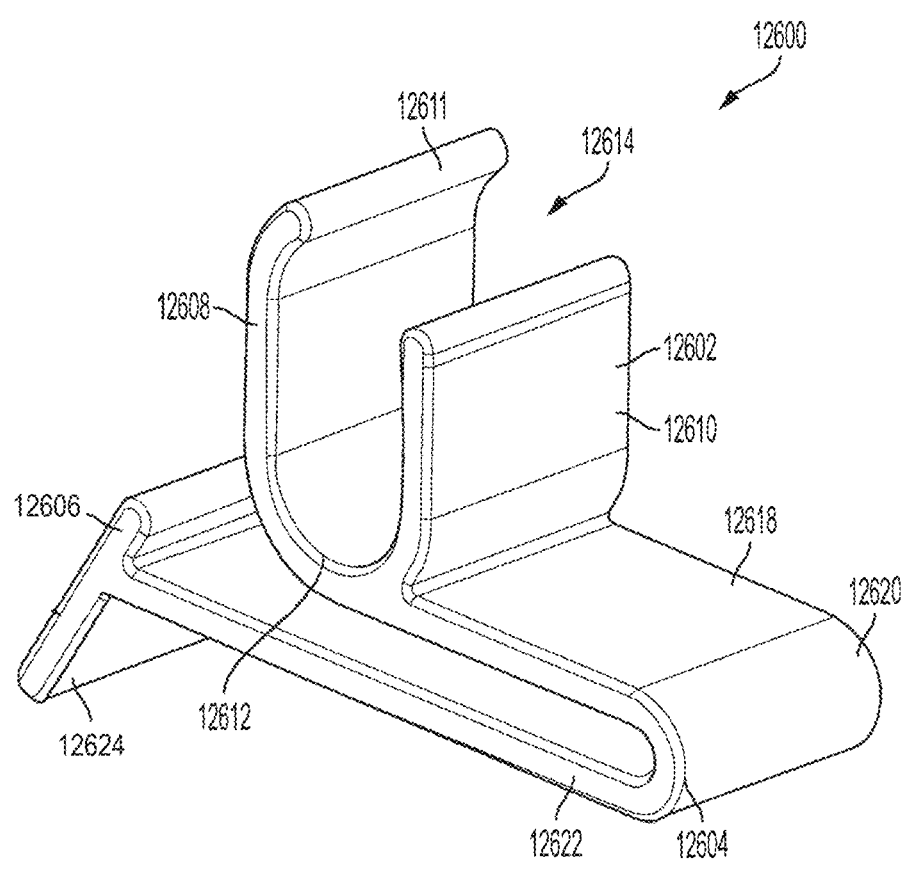
FIG. 126 is a perspective view of a wire router according to one embodiment or aspect of the present disclosure.
Figure 127:
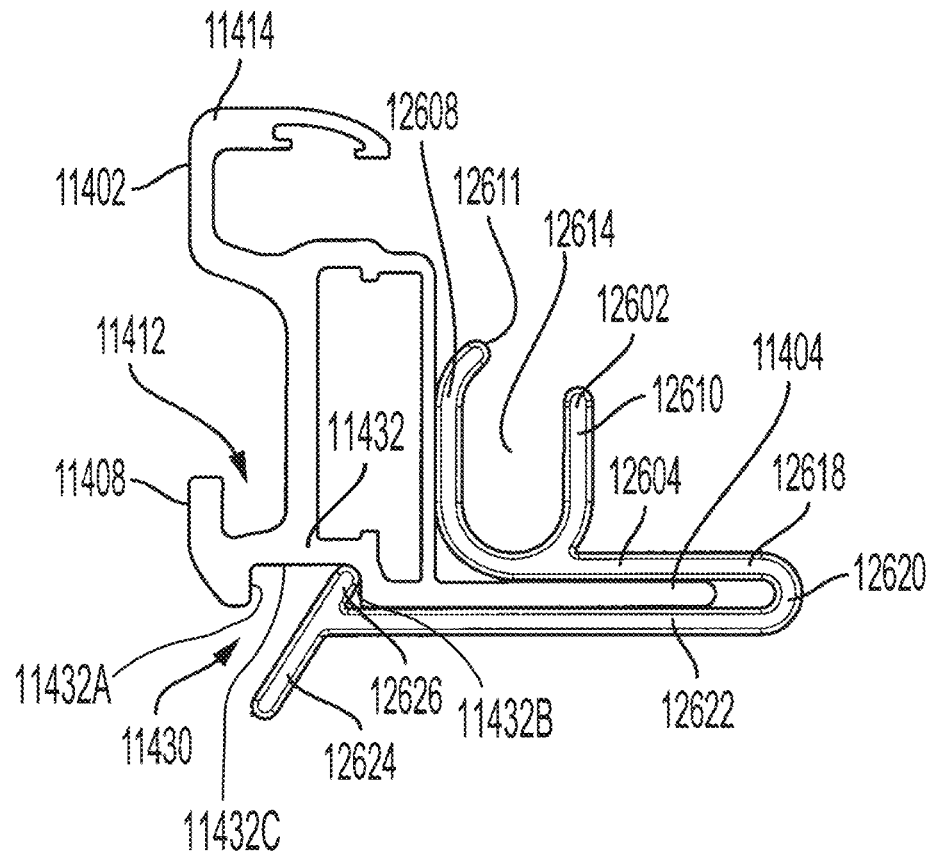
FIG. 127 is a front view of the wire router of FIG. 126 mounted to the solar panel module frame of FIG. 114.

With reference to FIGS. 126 and 127, a wire router 12600 for frame 11402 is shown. The wire router 12600 includes a wire holder 12602, an elongated body 12604, and a securing extension 12606. The wire holder 12602 holds and organizes wires W against the frame 11402. The wire holder 12602 includes a first sidewall 12608, a second sidewall 12610 opposing the first sidewall 12608, and a connecting portion 12612 that extends between and connects the first sidewall 12608 and second sidewall 12610. The first sidewall 12608, second sidewall 12610, and connecting portion 12612 define a wire holding space 12614 therein. The first sidewall 12608 extends along the second leg 11410B of the frame 11402 and ends with a curve 12611 that bends away from the second leg 11410B. The second sidewall 12610 extends generally parallel to the second leg 11410B, without having the curved 12611 of the first sidewall 12608. In other embodiments, the second sidewall 12610 may include its own curved portion, or either sidewall 12608, 12610 may take different shapes compared to what is shown, so long as wires W may be held within the holding space 12614. The entirety of the wire holder 12600 may also take a shape different from the one shown, so long as the wire holder 12600 may be secured to the frame 11402 and hold wires W therein.

The elongated body 12604 extends from a corner defined between the second sidewall 12610 and the connecting portion 12612. The elongated body 12604 includes a first straight portion 12618 that extends along the top of the base 11404, a curved portion 12618 that wraps around the end of the base 11404, a second straight portion 16222 that extends along the bottom of the base 11404, and an angled portion 12624 that extends away from the second straight portion 16222 in a direction away from the base 11404. The angled portion 12624 extends away from the second straight portion 16222 and the base 11404 at a non-perpendicular angle.

The securing extension 12606 extends upward from the angled portion 12624 in the direction of the frame 11402. The securing extension 12606 includes an upward extending portion 12626 that extends through the opening 11428 and into the throat 11430, so that it contacts part of the interior sidewall 11432. As shown, the upward extending portion 12626 contacts a corner of the sidewall 11432 between the first portion 11432A and the second portion 11432C. The contact between the upward extending portion 12626 and the rounded sidewall 11432 enhances the connection between the wire router 12600 and the frame 11402. The angled portion 12624 can act as a lever when contacted to displace the upward extending portion 12626. This is done to facilitate removal of the upward extending portion 12626 from the opening 11428 and throat 11430 in order to remove the wire router 12600 from the frame 11402. This may also be done to bend the upward extending portion 12626, so that the upward extending portion 12626 can fit into the opening 11428 and throat 11430 during installation of the wire router 12600. In instances where the frame 11402 has jaws 11436A, 11436B, the wire router 12600 can include a pressing portion 12630 that contacts the first jaw 11436A to further connect the wire router 12600 to the frame 11402. In this arrangement the securing extension 12606 may extend in a different direction, so long as its engagement with the opening 11428 and throat 11430 of the frame 11402 maintains the same functionality. Given the nature of the engagement of the wire router 12600 around the frame 11402, the wire router 12600 may be made of a bendable or resilient material. This allows for engagement, disengagement, and reuse of the wire router 12600 against the frame 11402.

Figure 128:
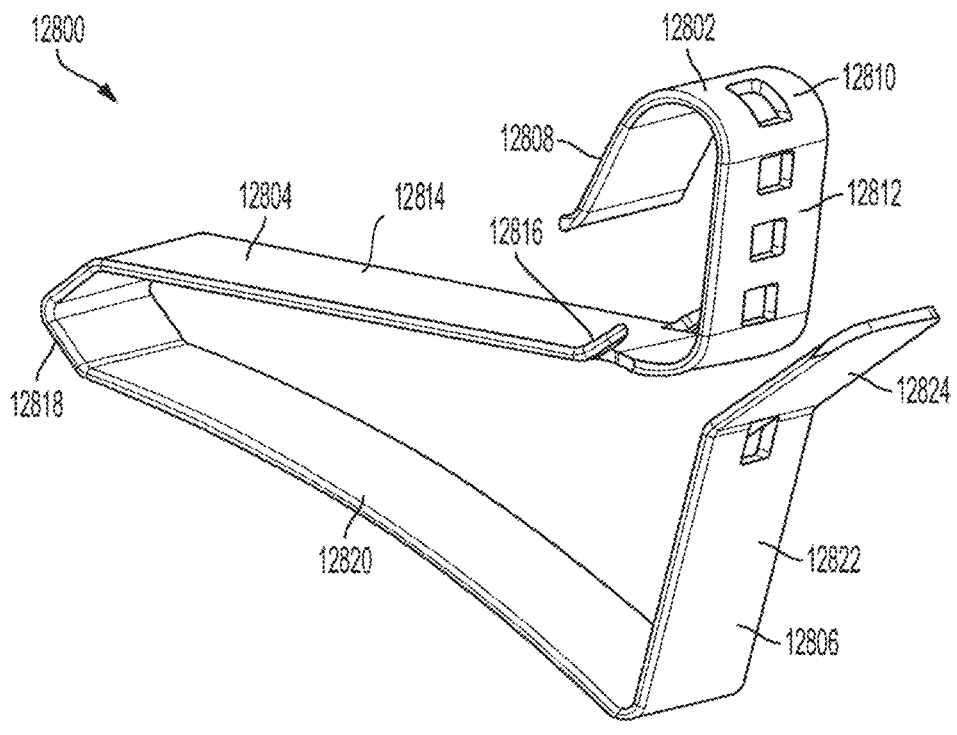
FIG. 128 is a perspective view of another wire router according to one embodiment or aspect of the present disclosure.
Figure 129:
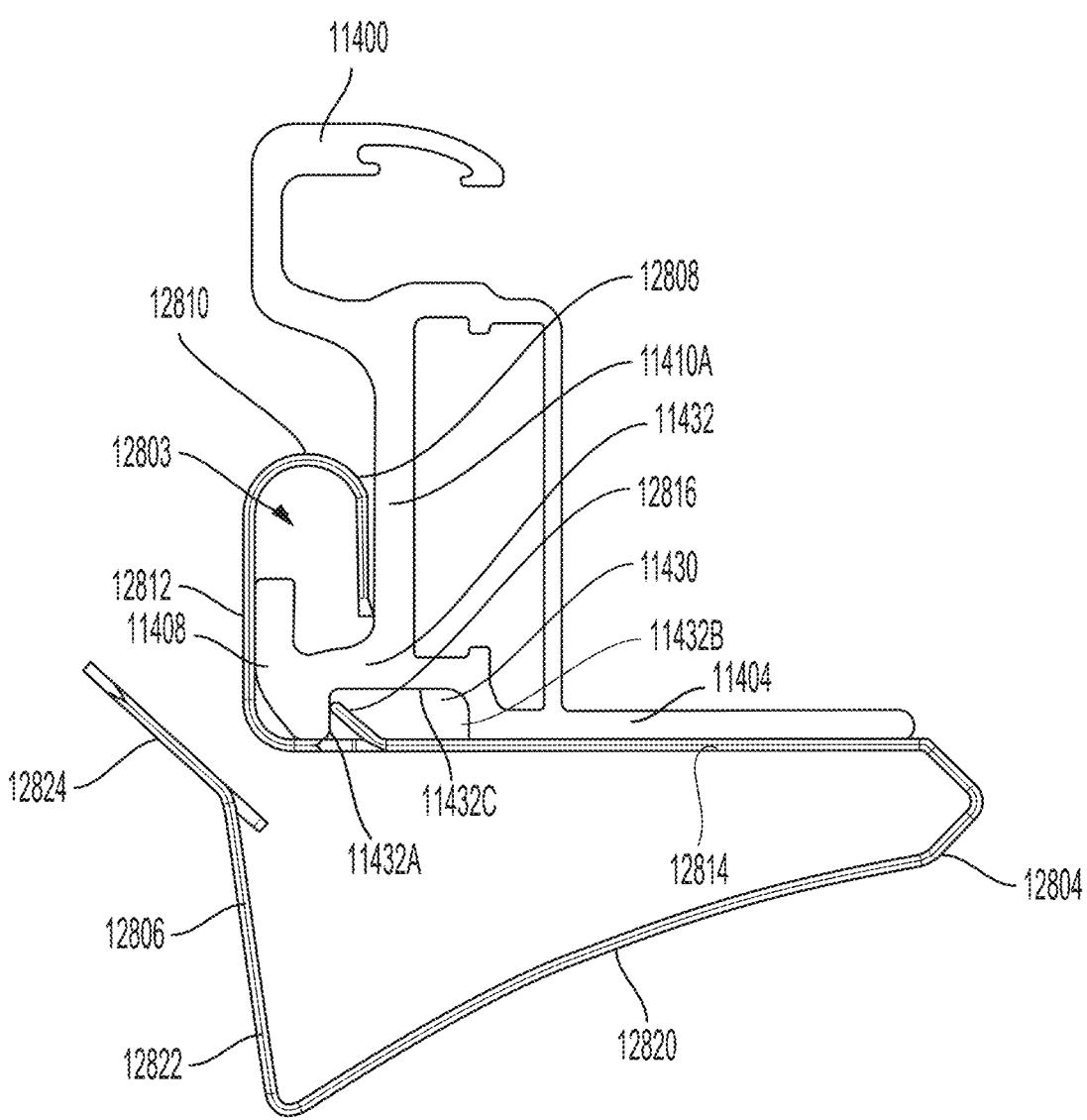
FIG. 129 is a front view of the wire router of FIG. 128 mounted to the module frame of FIG. 114.
Figure 130:
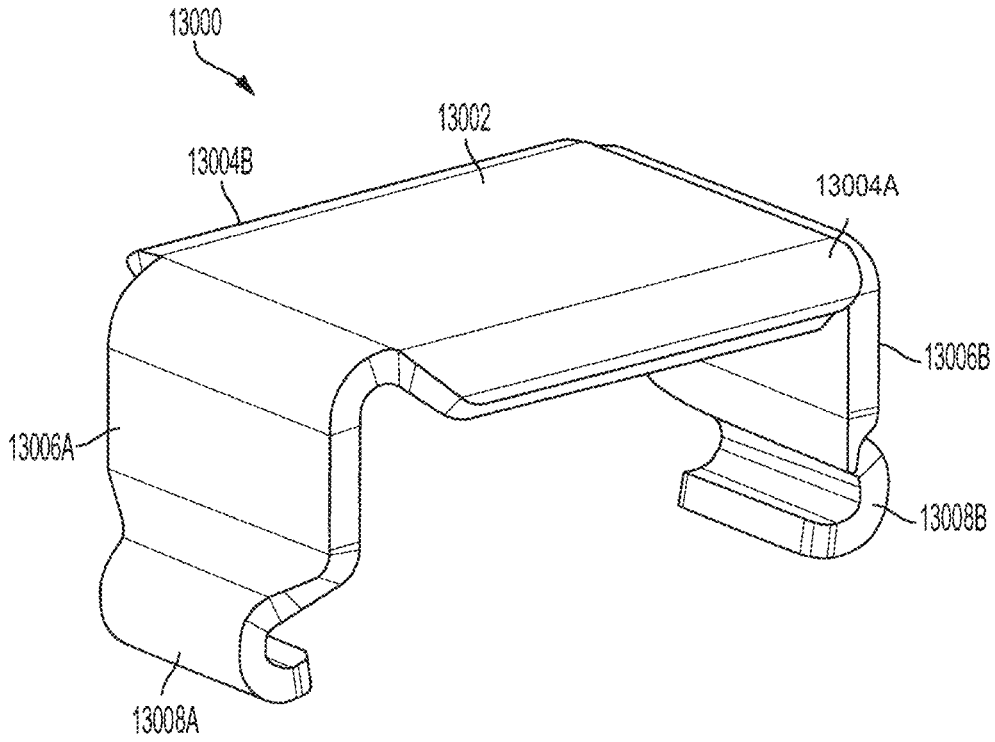
FIG. 130 is a perspective view of a one-piece mounting clamp according to one embodiment or aspect of the present disclosure.
Figure 131:
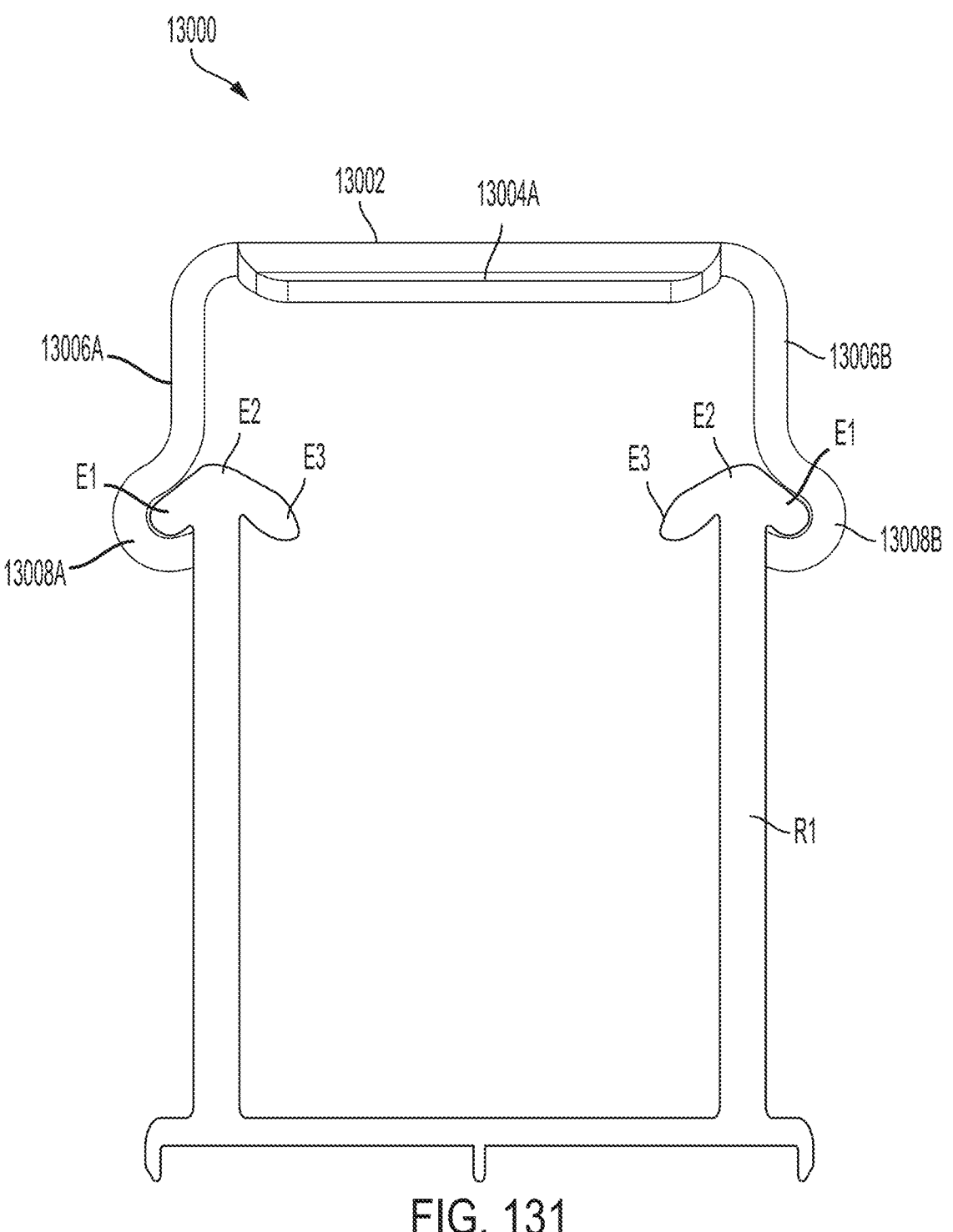
FIG. 131 is a side view of the mounting clamp of FIG. 130.
Figure 132:
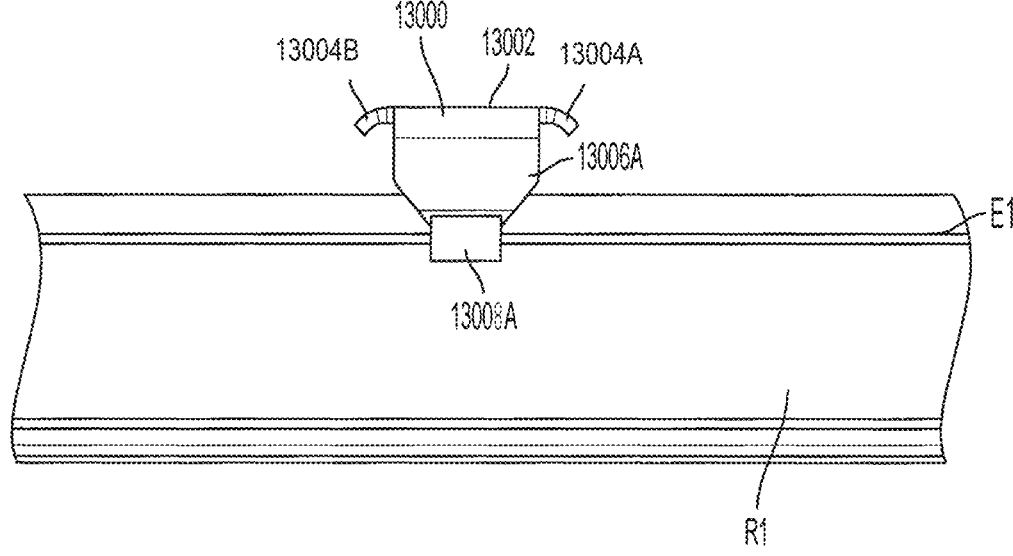
FIG. 132 is a front view of the mounting clamp of FIG. 131 mounted to a rail.

With reference to FIGS. 128 and 129, another wire router 12800 for frame 11402 is shown. The wire router 12800 is made of a bendable, resilient material, such as sheet metal, rolled steel, or plastic. This allows the wire router 12800 to be bent and curved in multiple places to fit around the frame 11402 and to define a wire holding space 12803 with the frame 11402. This also allows the wire router 12800 to be "snapped" into place against the frame 11402 and easily removed and replaced against the frame 11402.

The wire router 12800 includes a wire holding section 12802, an elongated body 12804, and a tail 12806. The wire holding section 12802 is shaped to engage with the first leg 11410A and outer lip 11408 to define the wire holding space 12803 with these features and the clamp cavity 11412. To do this, the wire holding section 12802 includes an angled sidewall 12808 that has an end that contacts the first leg 11410A. The angled sidewall 12808 extends from the first leg 11410A at a non-ninety-degree angle. A curved top 12810 extends from the angled sidewall 12808 and is displaced a distance above the clamp cavity 11412. A lip sidewall 12812 extends from the curved top 12810 and extends downward, along the outside of the lip 11408. Part of the first leg 11410A, the angled sidewall 12808, curved top 12810, part of the lip sidewall 12812, and part of the outer lip 11408 define the wire holding space 12803. Within this space, wires W can be organized relative to the frame 11402. In some embodiments, some wires W may be held within the clamp cavity 12812. The shape of the wire holding section 12802 about the clamp cavity 11412 and the contact between the angled sidewall 12808 and the first leg 11410A creates a spring force that helps to secure the wire router 12800 to the frame 11402.

The elongated body 12804 extends from a bottom end of the lip sidewall 12812. The elongated body 12804 includes a base wall 12814, a bent portion 12818, and a rounded bottom wall 12820. Specifically, the base wall 12814 extends from the end of the lip sidewall 12812 along the bottom of the frame 11402 against the opening 11428 and the base 11404. A throat extension 12816 sticks up from the base wall 12814 and extends into the opening 11428 and the throat 11430. The throat extension 12816 contacts part of the inner sidewall 11432. As shown, the throat extension 12816 contacts the second portion 11432B of the inner sidewall 11432. The bent portion 12818 extends from the base wall 12814 and bends, so that the rounded bottom 12820 extends below the frame 11402. As shown, the bent portion 12818 includes a first bend, a peak, and a second bend, defining an open-faced triangle, from which the rounded bottom 12820 extends. However, the bent portion 12818 may take different shapes, such as an open-faced square or a semi-circle, so long as the general shape and functionality of the wire router 12800 is maintained. The rounded bottom wall 12820 curves downward, away from the frame 11402. The tail 12806 extends upward and back toward the frame 11400 from an end of the rounded bottom wall 12820. Specifically, a vertical wall 12822 extends straight toward the frame 11402, and a flare 12824 extends from an end of the vertical wall 12822 at a non-ninety-degree angle as shown. One having skill in the art will understand that these features may take other shapes and angles and still maintain their functionality as described herein.

Toolless Mounting Clamps

With reference to FIGS. 130-167, different embodiments of toolless mounting clamps are shown. These clamps include similar features with similar functionalities. One having skill in the art will understand how one or more of these toolless clamps operate based on the description of similar clamps. Each of the clamps will be described in connection with a rail, R1, R2, R3. In some instances, the clamps' engagements with their respective rails R, R1, R2 will be similar, and one having ordinary skill in the art will understand that certain clamps may be used with one or more rails R1, R2, R3 described herein.

Some elements of the toolless clamps will be described in directional terms, such as upward, downward, left, and right. These terms will be described relative to the rail R1, R2, R3 on which the clamp is to be mounted.

Figure 133A:
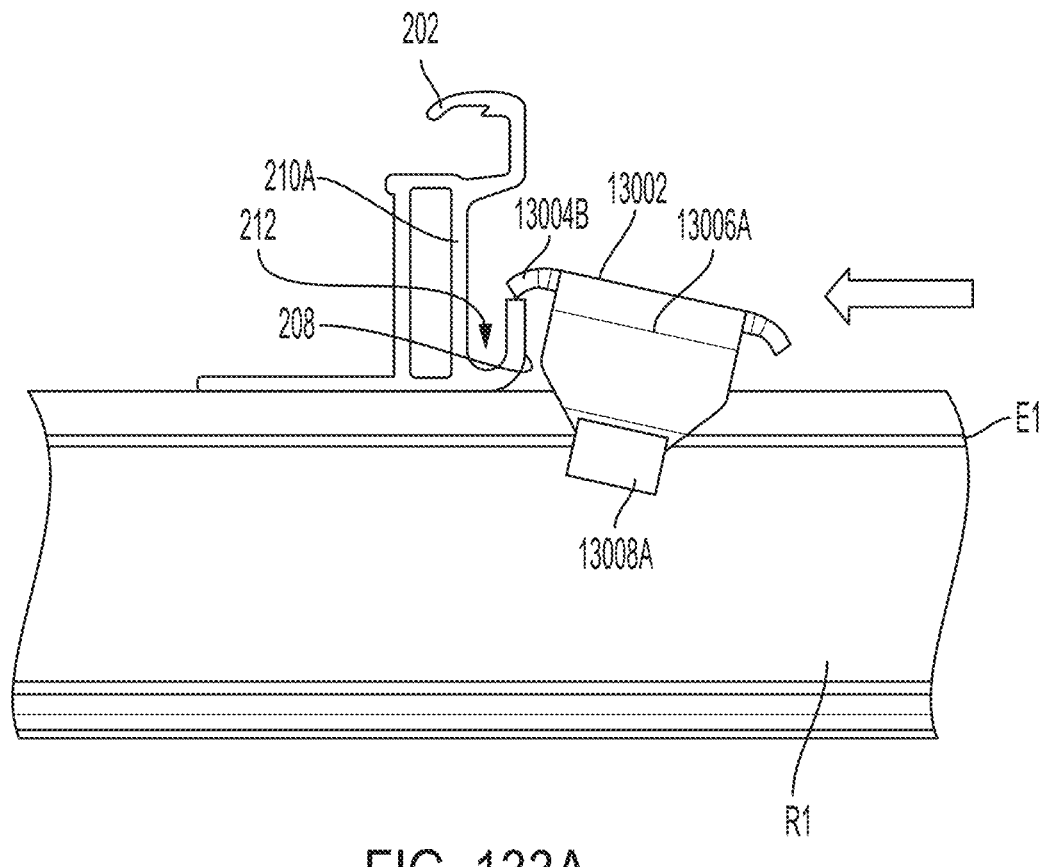
FIG. 133A is a front view of the mounting clamp of FIG. 131 in the process of mounting with a rail and a first solar module frame of FIG. 2.
Figure 133B:
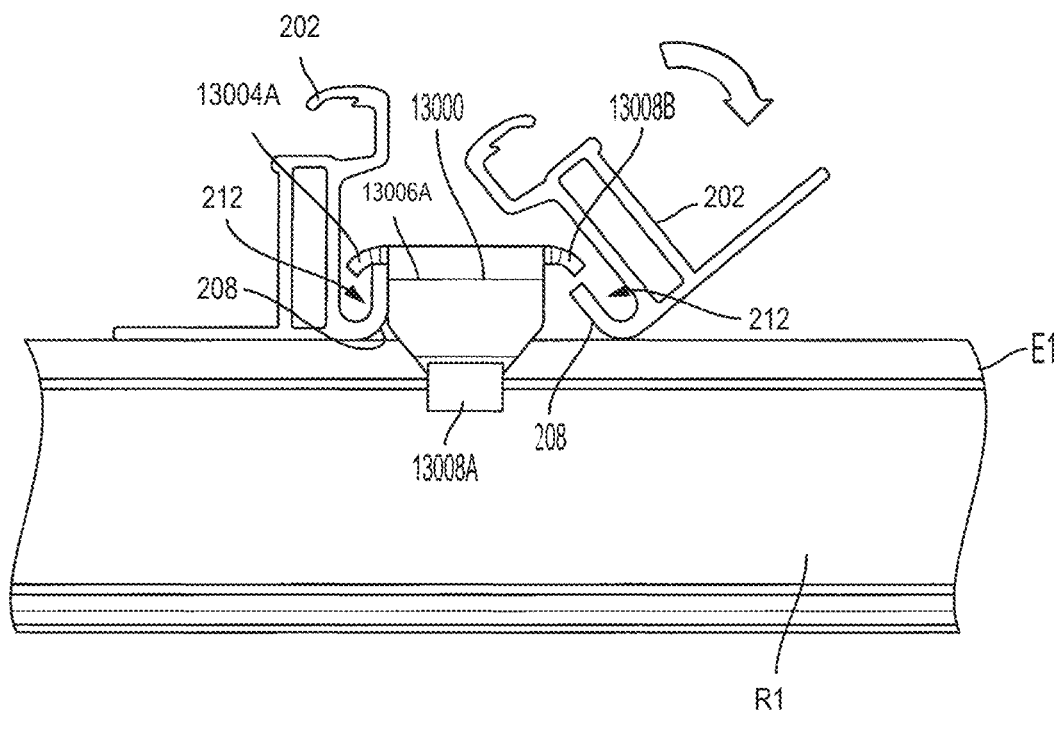
FIG. 133B is a front view of the mounting clamp of FIG. 131 in the process of having a second solar panel module frame of FIG. 2 being mounted thereto.

With reference to FIGS. 130-133B, a first one-piece midclamp 13000 is shown. The clamp 13000 may be made of sheet metal or another resilient material for use in the manner described herein. Clamp 13000 includes a body 13002 that is generally rectangular in shape. Mounting lips 13004A, 13004B extend from opposing sides of the body 13002 and are arranged to fit into the clamp cavity 112, 212, 312, 412, 11412, 11612 of a module frame 102, 202, 302, 402, 11402, 11602. Legs 13006A, 13006B extend from the other two opposing sides of the body 13002. The legs 13006A, 13006B extend downward, in the direction toward the rail R, from the body 13002 from ends of the body 13002 and generally perpendicular to the ends of the body 13002 from which the mounting lips 13004A, 13004B extend. The legs 13006A, 13006B terminate with clips 13008A, 13008B. The clips 13008A, 13008B are shaped to engage with outer edges E1 of a rail R1. The legs 13006A, 13006B are made of a resilient metal to allow for them to bend outward and snap into place against the outer edges E1 of the rail R1. The legs 13006A, 13006B are also stiff enough to keep the clamp 13000 in place against the rail R1. FIGS. 133A-133B show an example of the mounting process for the clamp 13000 and two frames 102. A first frame 102 is placed on the rail R1, and the clamp 13000 is put into place next to the frame 102. This is done by pushing the clamp 13000 downward, so that the clips 13008A, 13008B are urged outward by the edges E1 of the rail R1, and then eventually the edges E1 are received within the clips 13008A, 13008B. During this process, the clips 13008A, 13008B are snapped back into place. The legs 13006A, 13006B are then released, so the clips 13008A, 13008B snap into place against the edges E1, securing clamp 13000 to the rail R1. The clamp 13000 then slides down the rail R1, so that the mounting lip 13006A is received within and becomes engaged with the clamp cavity 112, 212, 312, 412, 11412, 11612 and the outer lip 108, 208, 308, 408, 11408, 11608. The second frame 102, 202, 302, 402, 11402, 11602 is then rocked into place, so that the clamp cavity 112, 212, 312, 412, 11412, and the outer lip 108, 208, 308, 408, 11408, 11608 of that second frame 102, 202, 302, 402, 11402, 11602 receives and engages with the second mounting lip 13004B of the clamp 13000.

In another example, the clamp 13000 may be secured at a point along the rail R1, so that the first mounting lip 13004A engages with the clamp cavity 112, 212, 312, 412, 11412, 11612 of the frame 102, 202, 302, 402, 11402, 11602 as the legs 13006A, 13006B engage with the rail R1, and the clips 13008A, 13008B snap over the rail edges. In yet another example, the clamp 13000 may first be secured against the rail R1 and then the frame 102, 202, 302, 402, 11402, 11602 is rocked and/or rotated into place to engage the clamp cavity 112, 212, 312, 412, 11412, 11612 and the outer lip 108, 208, 308, 408, 11408, 11608 with the mounting lip 13004A. In both of these examples, the second frame 102, 202, 302, 402, 11402, 11602 is rocked and/or rotated into place against the second mounting lip 13006B to engage that clamp cavity 112, 212, 312, 412,11412,11612 and the outer lip 108, 208, 308, 408, 11408, 11608, with the lip 13006B. In each of the examples provided herein, an individual frame 102, 202, 302, 402, 11402, 11602 can be removed from the clamp 13000 by rotating the frame 102, 202, 302, 402, 11402, 11602 in the opposite direction of installation. To remove the clamp 13000, the legs 13006A, 13006B are pulled away from the rail R1, so that the clips 13008A, 13008B are disengaged with their respective edges E1, and the clamp 13000 can be removed.

Figure 134:
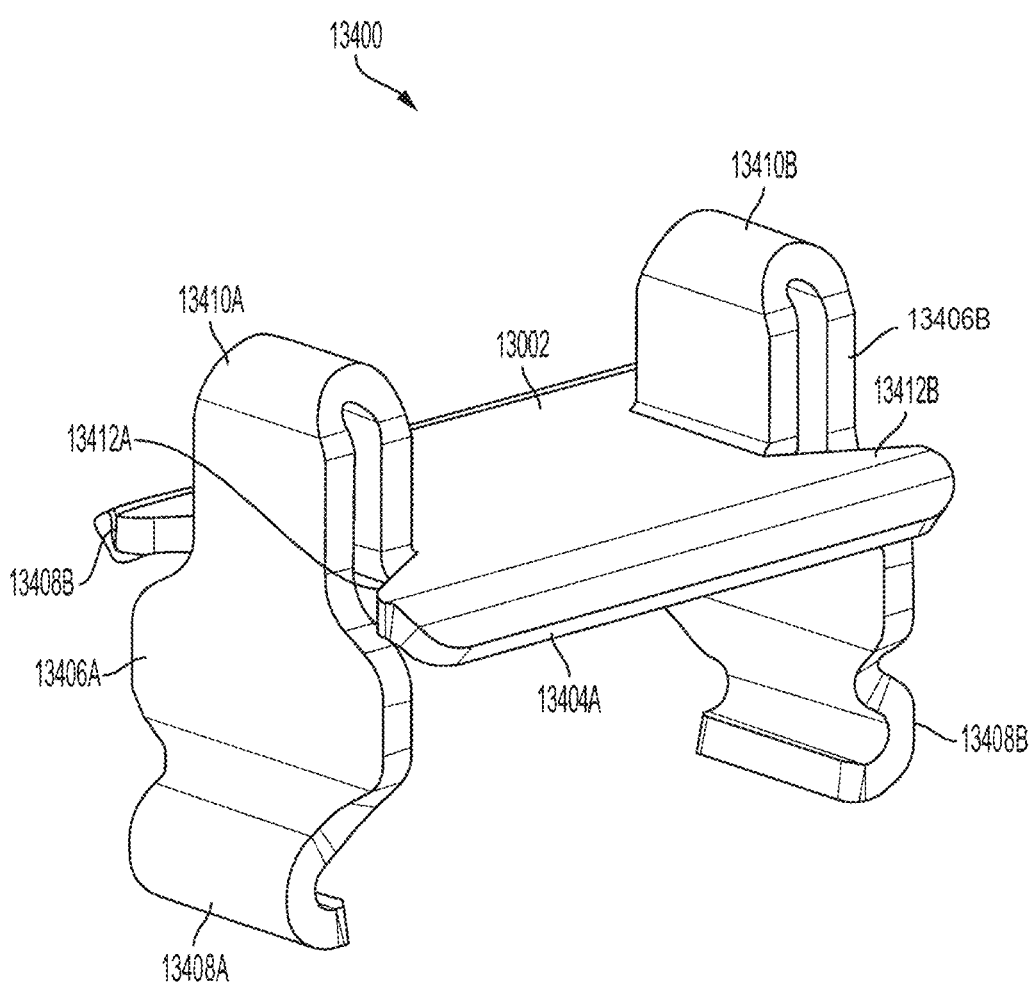
FIG. 134 is a perspective view of another one-piece mounting clamp according to another embodiment or aspect of the present disclosure.
Figure 135:
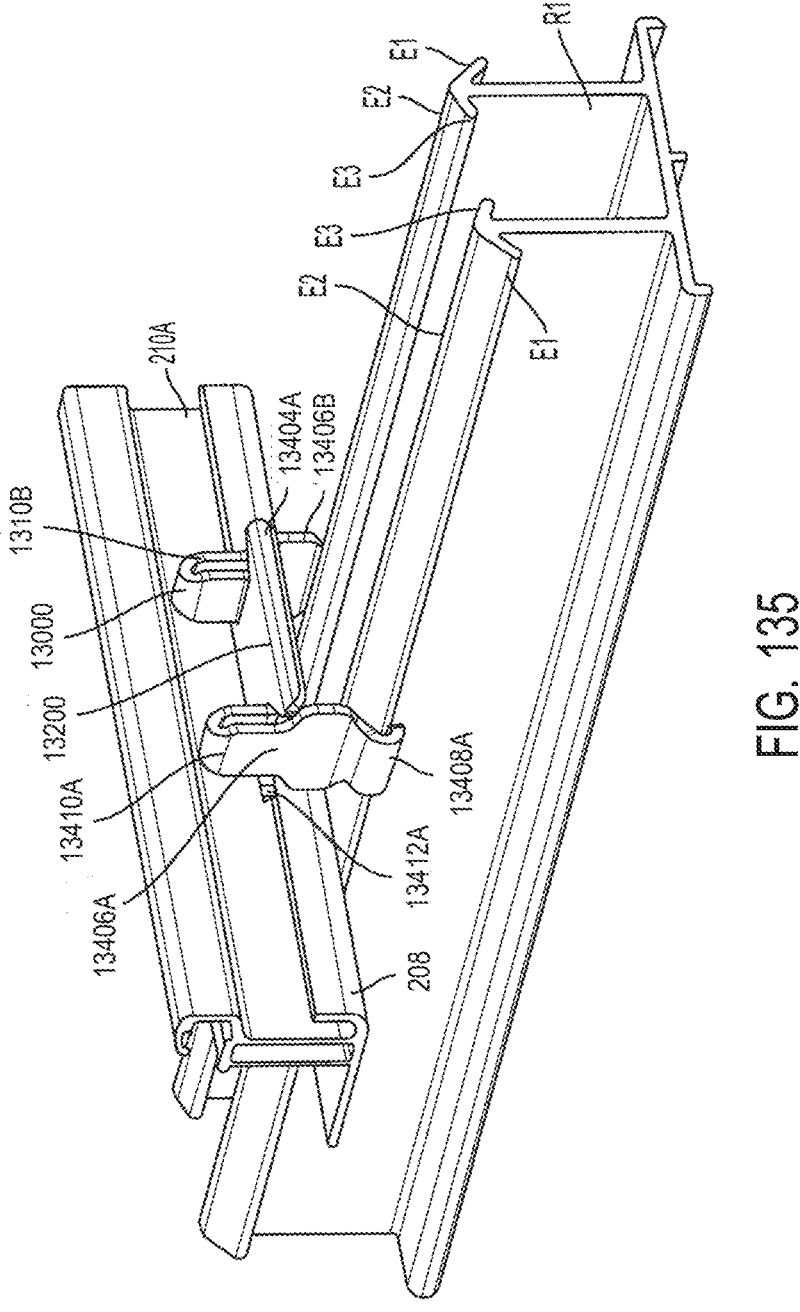
FIG. 135 is a perspective view of the mounting clamp of FIG. 134 mounted to a rail and a solar panel module frame of FIG. 2.

With reference to FIGS. 134-135, a second one-piece midclamp 13400 is shown. The clamp 13400 may also be made of sheet metal or another resilient material. The clamp 13400 has a body 13402 with mounting lips 13404A, 13404B extending from opposing sides. Legs 13406A, 13406B extend from the other two opposing sides of the body toward the rail in a direction that is perpendicular to the mounting lips 13404A, 13404B. The legs 13406A, 13406B terminate with clips 13408A, 13408B that are shaped to engage the edge E1 of a rail R1. The legs 13406A, 13406B also include wings 13410A, 13410B that first extend partially upward, in the direction away from the rail R, before being folded over to extend downward toward the rail R. The wings 13410A, 13410B provide the legs 13406A, 13406B with resiliency, which allows the clips 13408A, 13408B to more easily flex away from the outward extending edges E1 of the rail R1 and the clamp 13000 to stay in place against the rail R1. The body 13402 is shaped to define profiles 13412A, 13412B to account for the shape of the wings 13410A, 13410B. The installation of the clamp 13400 and related module frames 102 are the same as those described above in connection with clamp 13000.

Figure 136:
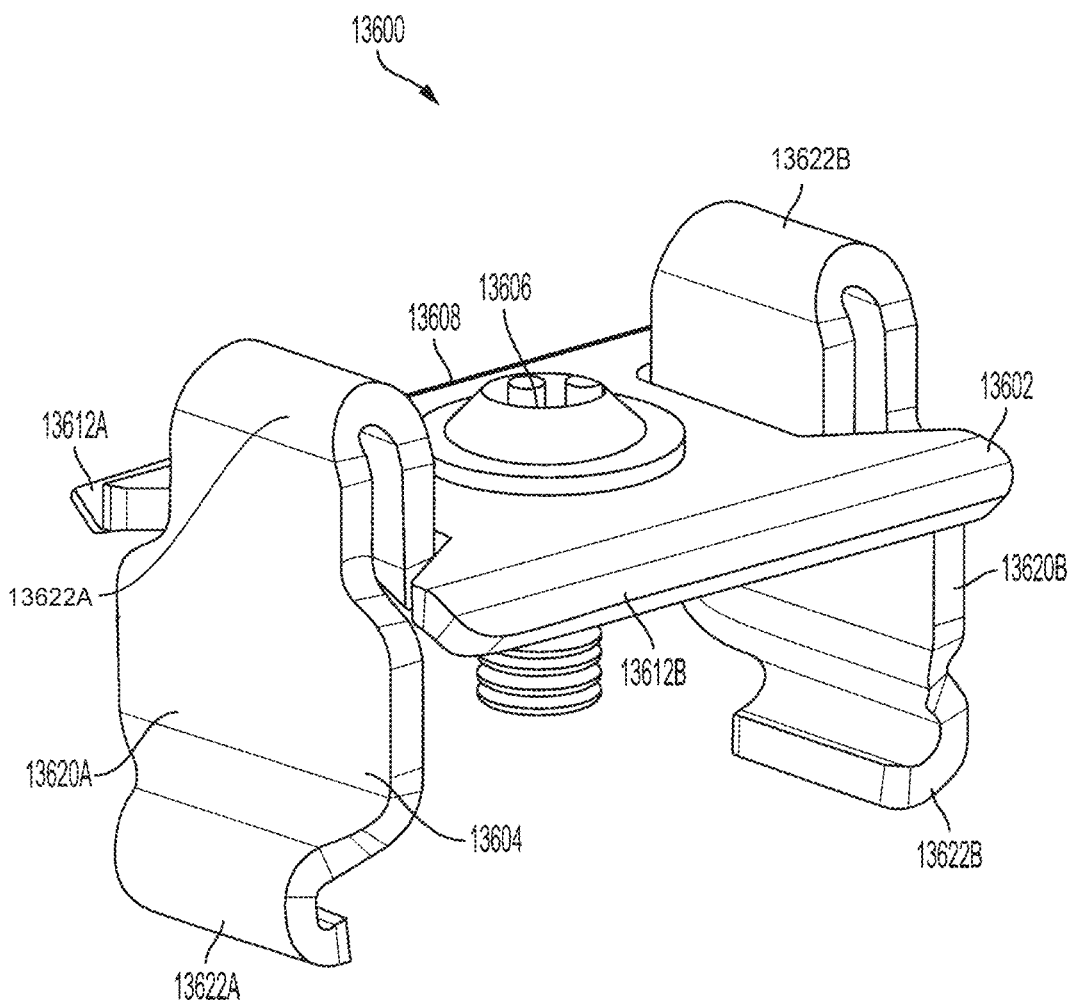
FIG. 136 is a perspective view of a two-piece mounting clamp according to another embodiment or aspect of the present disclosure.
Figure 137:
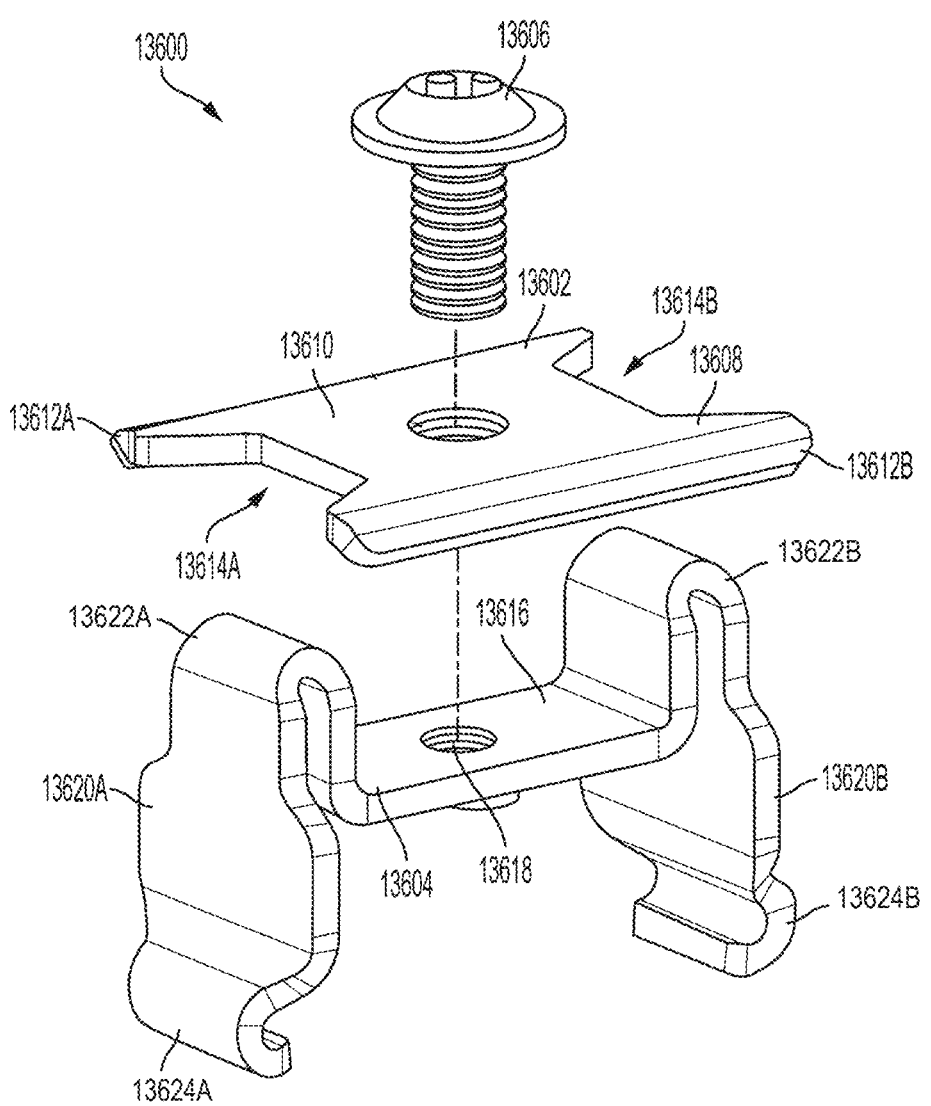
FIG. 137 is an exploded view of the mounting clamp of FIG. 136.
Figure 138:
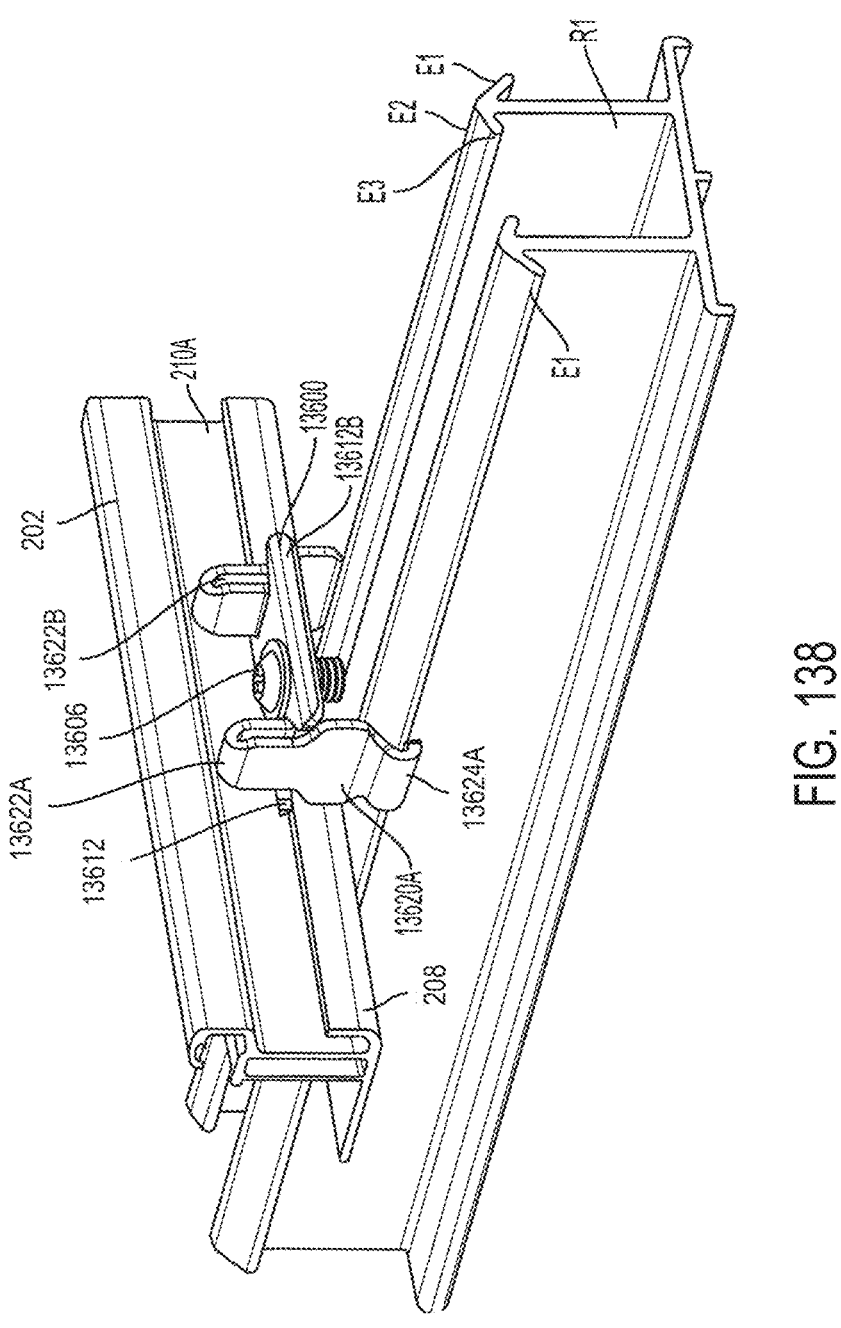
FIG. 138 is a perspective view of the mounting clamp of FIG. 136 mounted to a rail and the module frame of FIG. 2.

With reference to FIGS. 136-138, a two-piece midclamp 13600 is shown. This clamp 13600 includes a module engaging portion 13602 and a separate rail engaging portion 13604 that are connected with a fastener 13606. The module engaging portion 13602 includes a body 13610 that defines an aperture 13611 for receiving the fastener 13608. Mounting lips 13612A, 13612B extend from opposing sides of the body 13610 for engaging the solar panel frame that is to be mounted to the clamp 13600. Indentations 13614A, 13614B are formed in the other two opposing sides of the body 13610 in order to provide space for the wings 13622A, 13622B of the rail engaging portion 13604. The rail engaging portion 13604 includes a body 13616 that defines an aperture 13618 that aligns with aperture 13610. This alignment allows the module engaging portion 13602 to be secured to the rail engaging portion 13616 with the fastener 13606. Legs 13620A, 13620B extend from the body 13616 and form wings 13622A, 13622B above the body 13616, in. The wings 13622A, 13622B first extend upward, in the direction away from the rail R1, and then fold over themselves and extend downward, in the direction of the rail R1, and terminate with clips 13624A, 13624B that are configured to engage with the edge E1 of the rail R1. The use of the clamp 13600 is the same as clamp 13400, discussed above. This two-piece embodiment 13600 has the benefit of easy removal of the module engaging portion 13602 to facilitate the removal of the individual module within an array.

Figure 139:
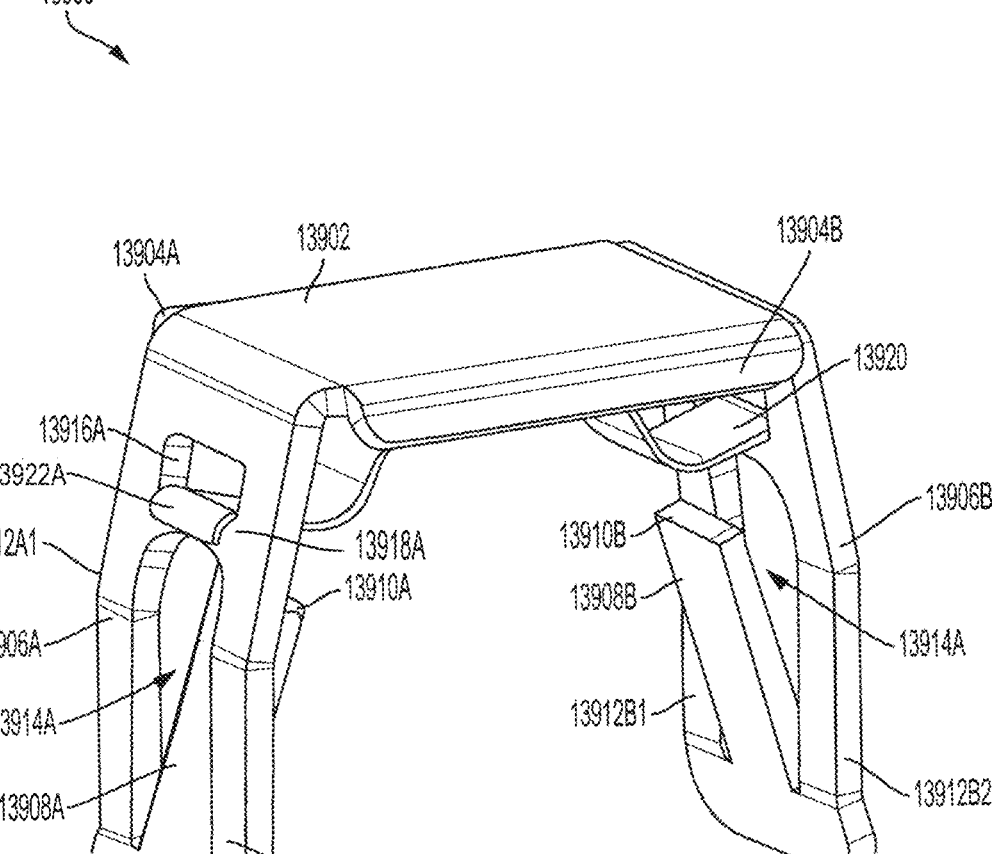
FIG. 139 is a perspective view of a mounting clamp according to another embodiment or aspect of the present disclosure.
Figure 140:
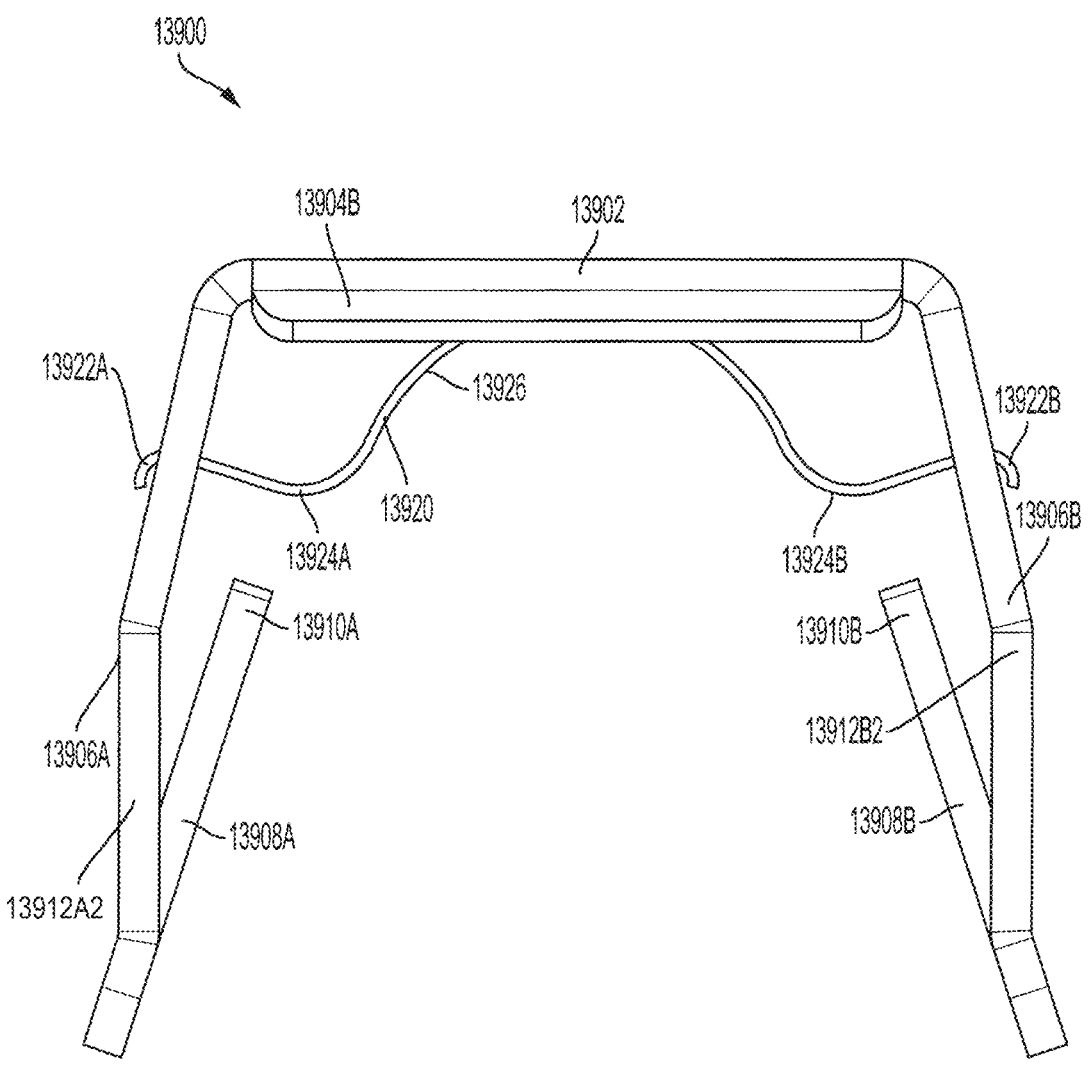
FIG. 140 is a side view of the mounting clamp of FIG. 139.
Figure 141:
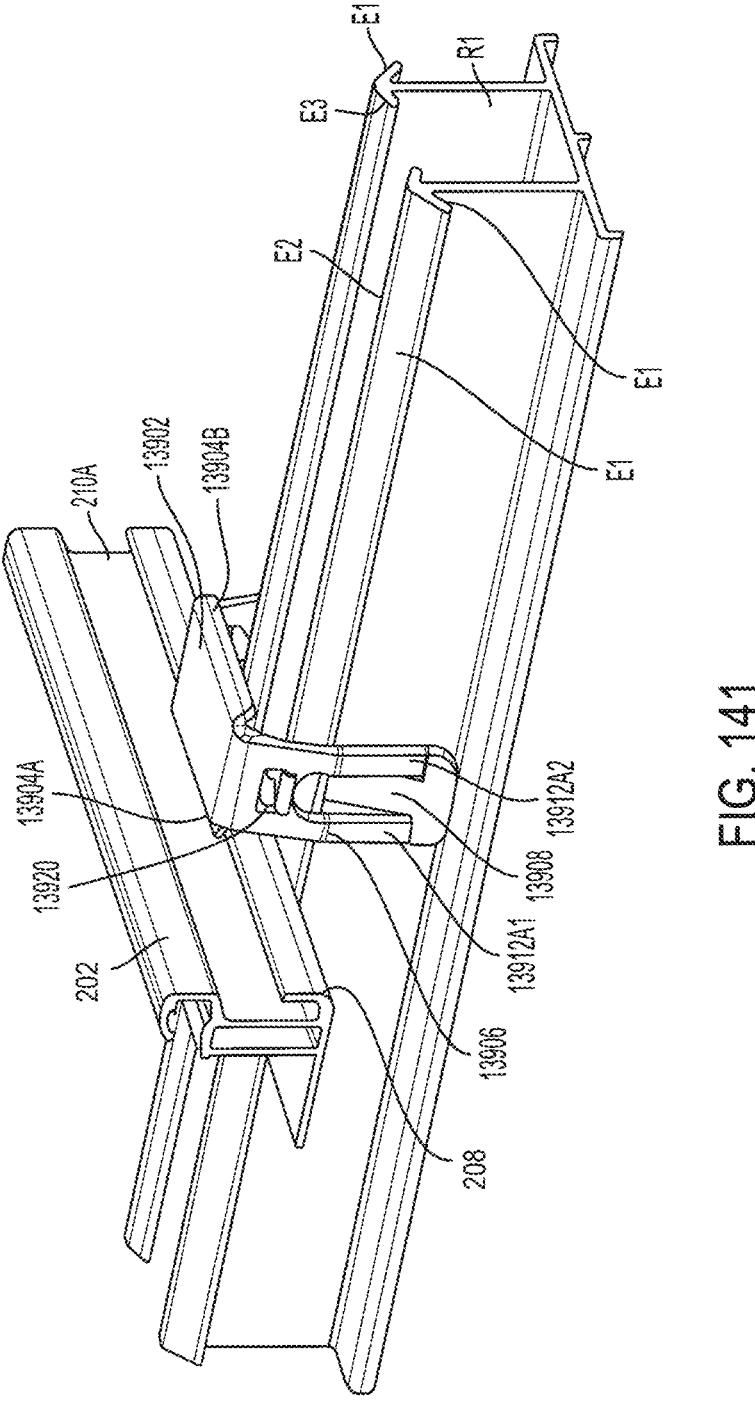
FIG. 141 is a perspective view of the mounting clamp of FIG. 139 mounted to a rail and the module frame of FIG. 2.
Figure 142:
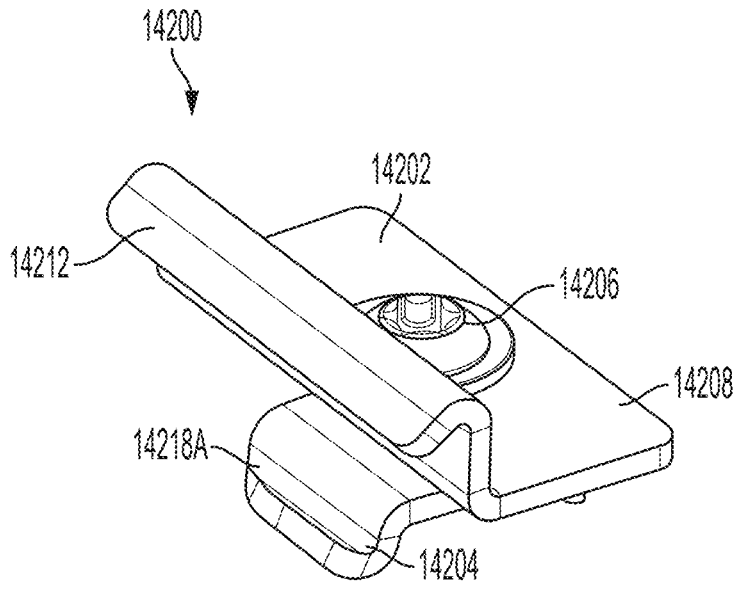
FIG. 142 is a perspective view of a two-piece end clamp according to another embodiment or aspect of the present disclosure.
Figure 143:
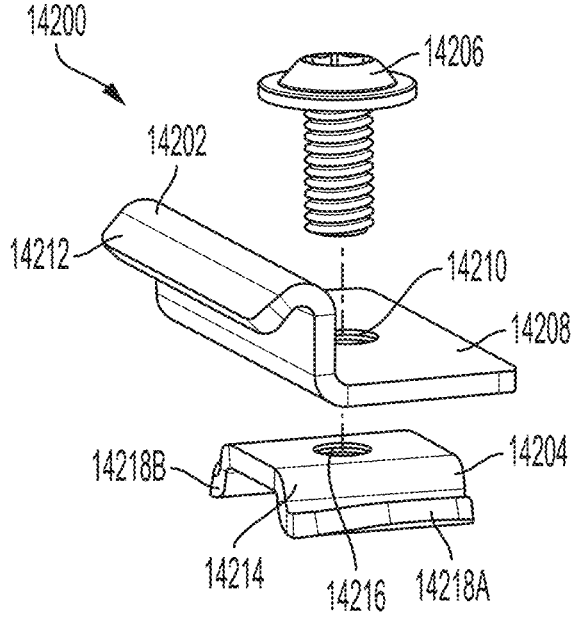
FIG. 143 is an exploded view of the end clamp of FIG. 142.
Figure 144:
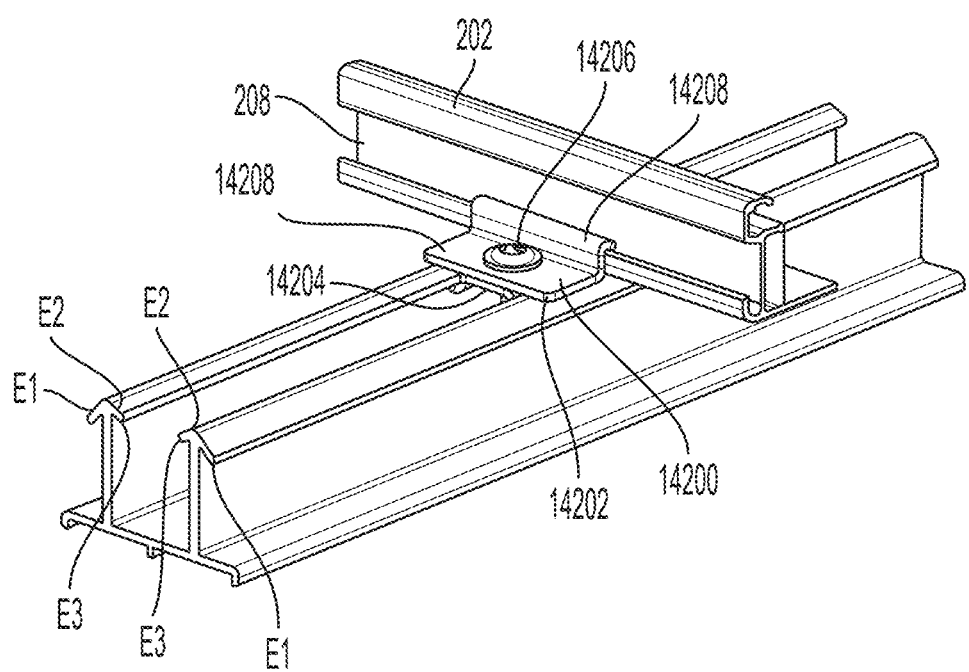
FIG. 144 is a perspective of the end clamp of FIG. 142 mounted to a rail and the module frame of FIG. 2.

With reference to FIGS. 139-141, a spring clamp 13900 is shown. Like previous toolless clamps, the spring clamp 13900 may be made out of sheet metal or another resilient material to facilitate its installation and removal from the rail R1. The spring clamp 13900 includes a body 13902 with mounting lips 13904A, 13904B extending from opposing sides of the body. with mounting lips 13904A, 13904B extending from opposing sides. Legs 13906A, 13906B extend from the other two opposing sides of the body toward the rail in a direction that is perpendicular to the mounting lips 13904A, 13904B. The legs 13906A, 13906B include tabs 13908A, 13908B that are deflected inward, in the direction toward the rail R. The tabs 13908A, 13908B terminate with ends 13910A, 13910B that are configured to be engage with an underside U1 of the edge E1 of the rail R1. The engagement between the ends 13910A, 13910B and their respective undersides U1 creates a wedging effect that helps to secure the legs 13906A, 13906B in place to affix the clamp 13900 to the rail R. The deflection of the tabs 13908A, 13908B divides the legs 13906A, 13906B, so that stilts 13912A1, 13912A2, 13912B1, 13912B2 are defined on opposing sides of the tabs 13908A, 13908B, and gaps 13914A, 13914B are defined between respective pairs of stilts 13912A1, 13912A2, 13912B1, 13912B2. The legs 13906A, 13906B define openings 13916A, 13916B above the tabs 13908A, 13908B and gaps 13914A, 13914B. Bridge portions 13918A, 13918B extend across the legs 13906A, 13906B and separate the openings 13916A, 13916B from the gaps 13914A, 13914B. The bridge portions 13918A, 13918B are used to secure a spring element 13920 on an underside of the body 13902, between the rail R1 and the body 13902.

The spring element 13920 is provided to further secure the spring clamp 13900 to the rail R1 and to keep the spring clamp 13900 in an upright position to allow for the installation of a second module frame 102, 202, 302, 402, 11402, 11602. The spring element 13920 is secured to the bridge portions 13918A, 13918B at ends 13922A, 13922B. The ends 13922A, 13922B are shaped to be hooked around the bridge portions 13918A, 13918B. Inward from the ends 13922A, 13922B are concave portions 13924A, 13924B that are round, so that they contact and are supported by a top of the surface of the rail R1 of the rail. The concave portions 13924A, 13924B then transition into a convex portion 13926 at the center of the spring element 13920. The peak of the convex portion 13926 contacts and supports an underside of the body 13902. The contact made with the top surface of the rail R1 and the underside of the body 13902 allow the spring element 13920 to support the clamp 13900 in the proper position against the rail R. The spring element 13920 is also made out of a resilient material to provide the spring force against the body 13902 and the top of the rail R1. The installation and removal of the clamp 13900 is the same as the toolless clamps already described.

Figure 145A:
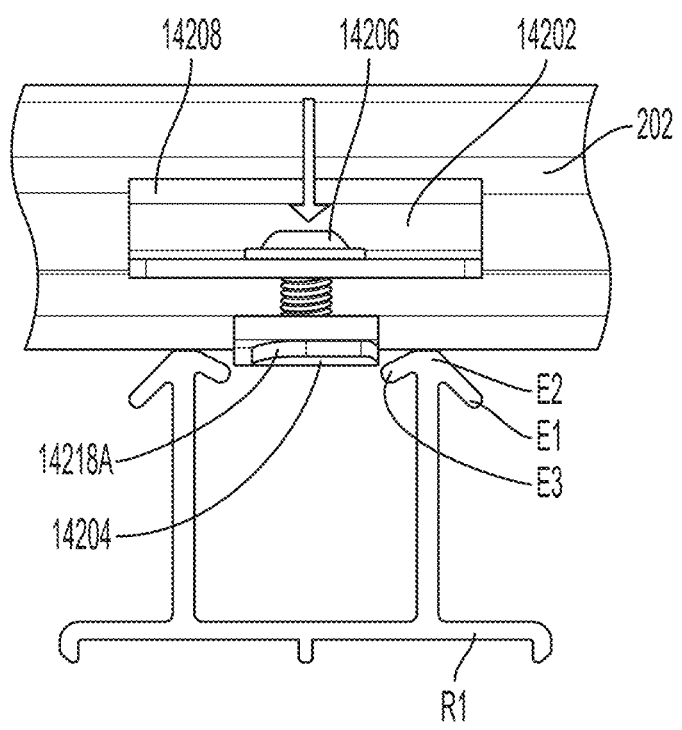
FIG. 145A is a side view of the end clamp of FIG. 142, a rail, and a solar panel module frame of FIG. 2, showing the end clamp being placed into a rail.
Figure 145B:
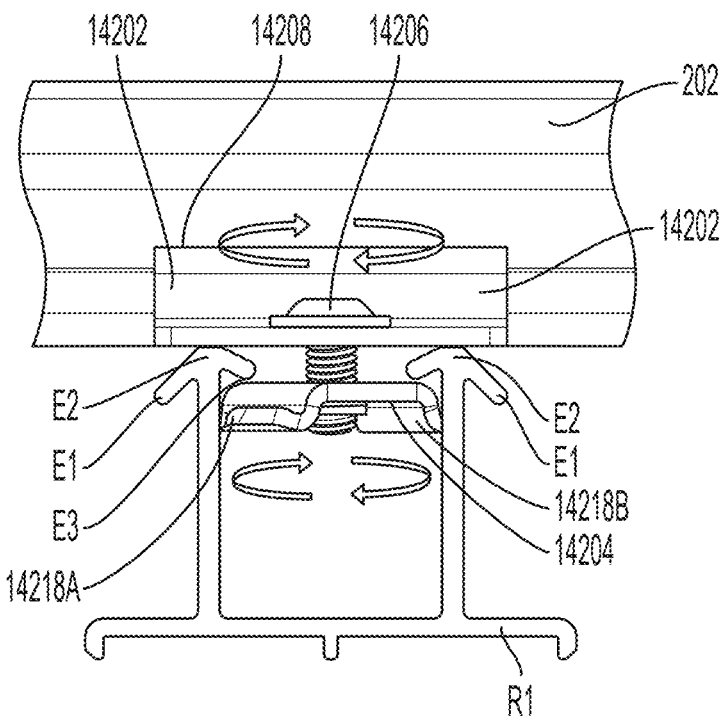
FIG. 145B is a side view of the end clamp, rail, and solar panel module frame of FIG. 145A, showing the end clamp in the process of being mounted to the rail.
Figure 145C:
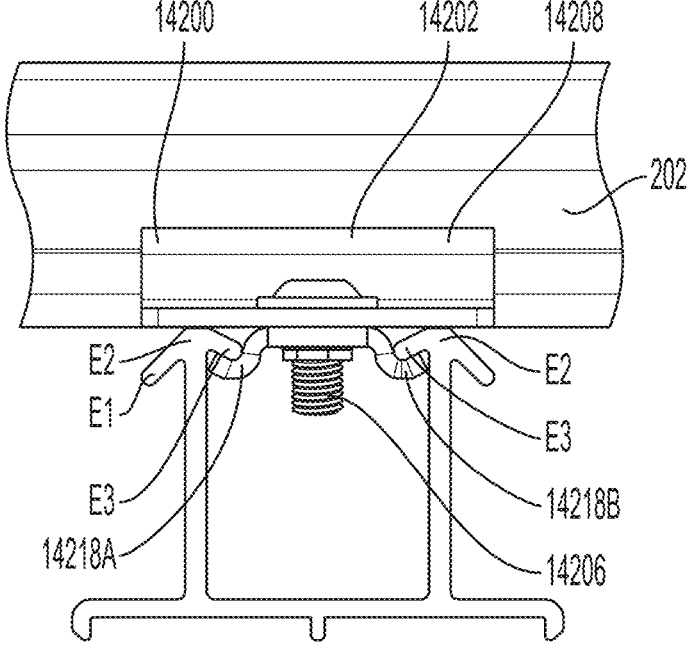
FIG. 145C is a side view of the end clamp, rail, and solar panel module frame of FIGS. 145A and 145B, showing the end clamp mounted to the rail.

With reference to FIGS. 142-145C, a two-piece end clamp 14200 is shown. The two-piece end clamp 14200 includes a module engaging portion 14202 and a rail engaging portion 14204 that connected with a fastener 14206, having threads to facilitate the connection between both portions 14202, 14204. The module engaging portion 14202 includes a body 14208 that defines a threaded aperture 14216 for receiving the fastener 14206. The body 14208 has a flat lower surface that is arranged to rest on the tops of the edges E1 of the rail R1. Only a single mounting lip 14212 extends upward from one side of the body 14208 and is arranged to engage with the clamp cavity 112, 212, 312, 412, 11412, 11612 of a module frame 102,202, 302, 402, 11402, 11602. The other side of the body 14208 lacks a mounting lip. The rail engaging portion 14204 includes a body 14214 that defines an aperture 14216 that is configured to be aligned with the aperture 14210 in the module engaging portion 14202 to receive the fastener 14206. Extending from opposing ends of the body 14214 are mounting ends 14218A, 14218B. When the clamp 14200 is fully mounted, the mounting ends 14218A, 14218B are arranged to engage with an inner edge E3 of the rail R, so that the engagement of the body 14208 with the top of the edge E1 secures the clamp 14200 to the rail R, as shown in FIG. 145C.

With reference to FIGS. 145A-145C, a method of mounting the two-piece end clamp 14200 will now be described. First, the rail engaging portion 14204 is secured to the bottom of the fastener 14206 and aligned with the module engaging portion 14202 so that one of the mounting ends 14218A, 14218B extends in the same direction as the mounting lip 14212. This is shown in FIG. 145A. Then, the clamp 14200 is placed downward into the rail R1, until the bottom surface of the body 14208 contacts the top edge E2 of the rail R1. From there, the rail engaging portion 14204 is secured into place by rotating the fastener 14206 until the mounting ends 14218A, 14218B are engaged with and tightened against the inner edges E3 of the rail. This is shown across FIGS. 145B and 145C. At this point a frame 102, 202, 302, 402,11402,11602 can be rocked into place against the mounting lip 14212. The clamp 14200 may also be secured into place along the rail R where a frame 102, 202, 302, 402, 11402, 11603 is already present, so that the clamp 14200 is secured with the mounting lip 14212 engaging with the clamp cavity 112, 212, 312, 412, 11412, 11612 and the outer lip 108, 208, 308, 408, 11408, 11608.

Figure 146:
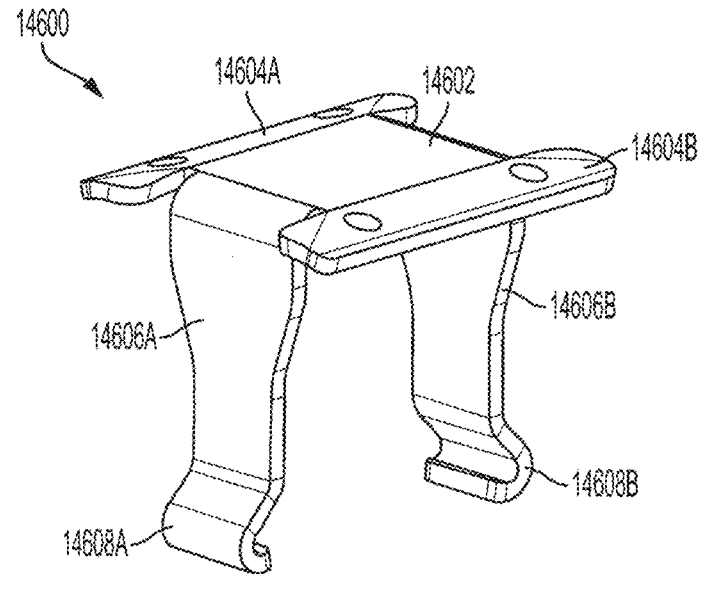
FIG. 146 is a perspective view of a mounting clamp according to another embodiment or aspect of the present disclosure.
Figure 147:
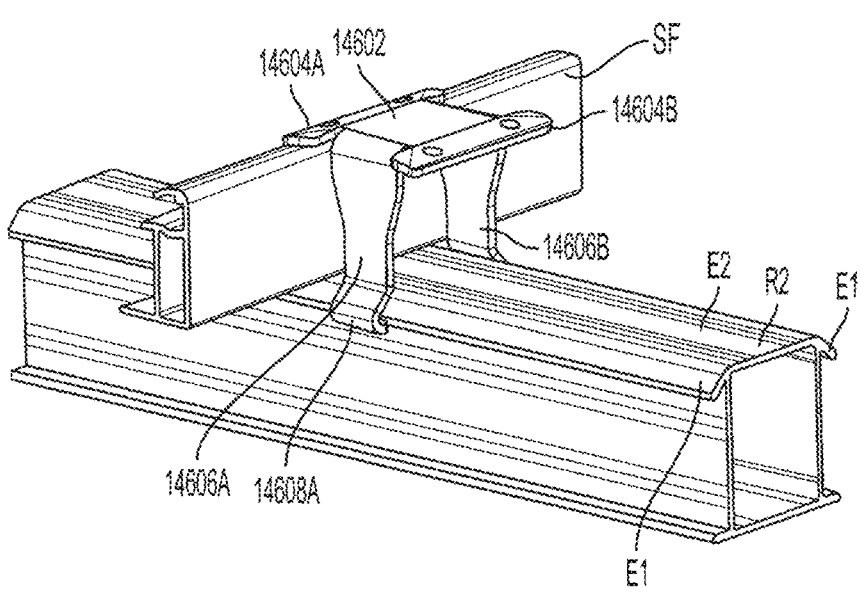
FIG. 147 is a perspective view of the mounting clamp of FIG. 146 mounted to a rail and standard solar panel module frame.

With reference to FIGS. 146 and 147, a one-piece top clamp 14600 is shown. The one-piece top clamp 14600 operates similarly to the one-piece mid clamps 13000, 13400. However, the legs 14606A, 14606B are longer, so that the mounting lips 14604A, 14604B are disposed higher above the rail R2, with bent corners to provide extra grip and bonding against the installed module frame SF. This allows a standard module frame SF to be mounted between the mounting lips 14604A. 14604B and the rail R2, with the mounting lips 14604A, 14604B engaging with a top surface of the standard module frame SF. The legs 14606A, 14606B also narrow in the direction of the rail R2 to allow for the rocking in of the standard module frame SF. The mounting lips 14604A, 14604B may be flatter than previously described mounting lips to facilitate this engagement. The mounting lips 14604A, 14604B and/or body 14602 may have sharp edges disposed along a length thereof to bond with the module frame SF when it is installed. The rail R2 may also include a flat surface across outer edges E2 to support the module frame SF.

Figure 148:
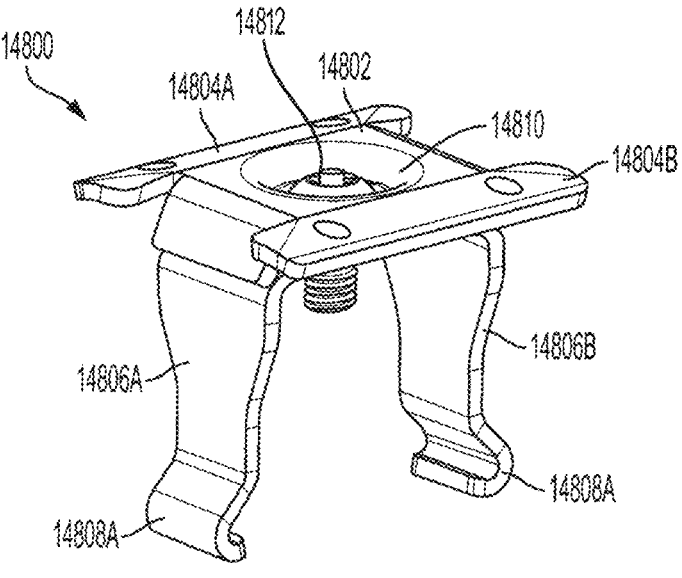
FIG. 148 is a perspective view of a two-piece mounting clamp according to another embodiment or aspect of the present disclosure.
Figure 149:
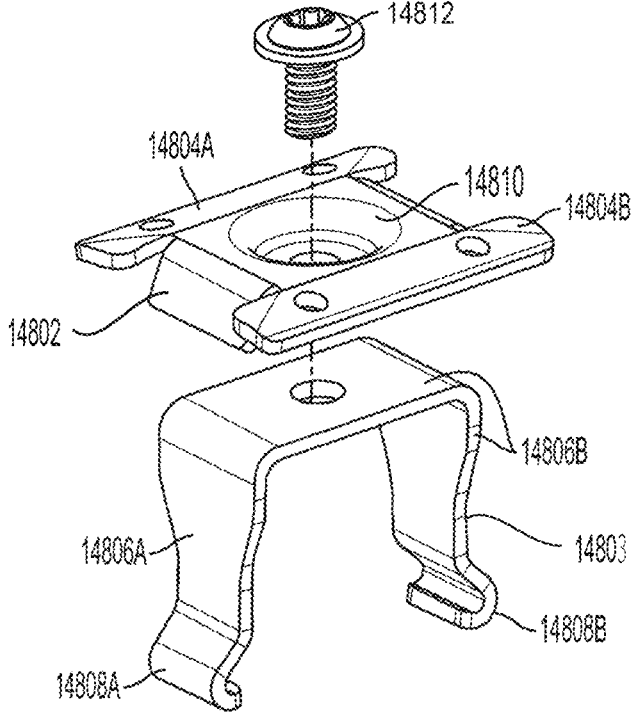
FIG. 149 is an exploded view of the mounting clamp of FIG. 148.
Figure 150:
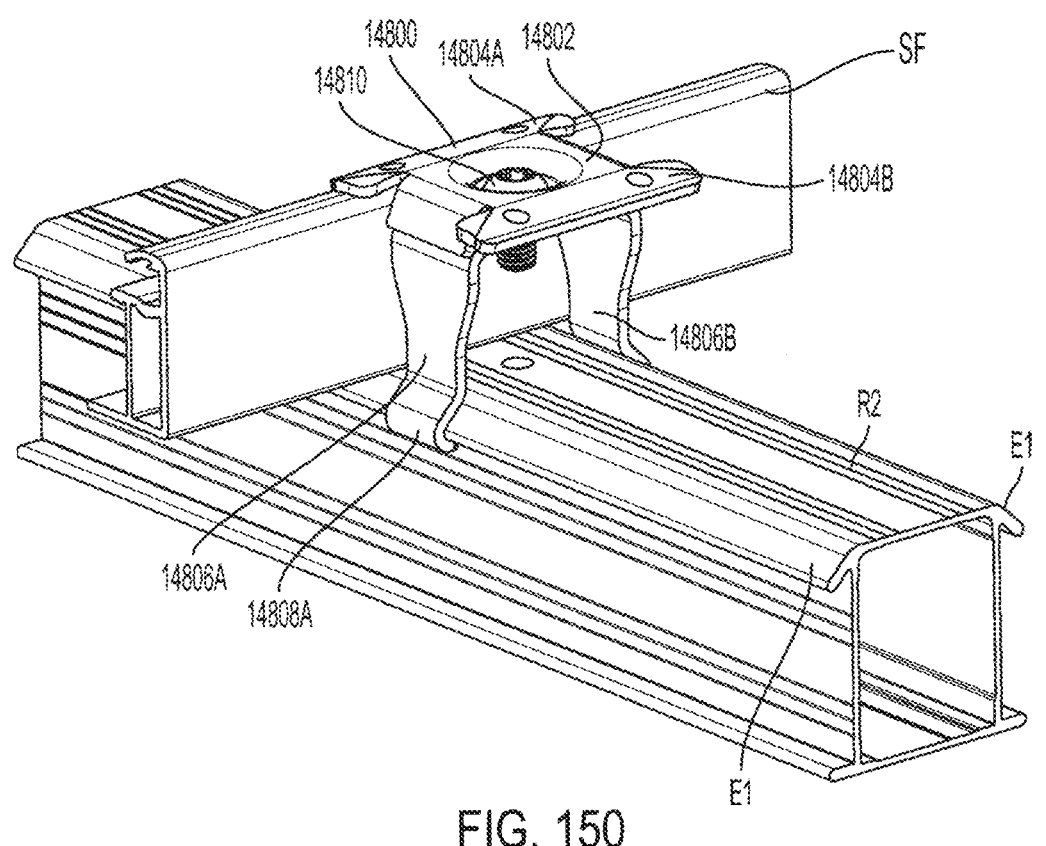
FIG. 150 is a perspective view of the mounting clamp of FIG. 148 mounted to a rail and a standard solar panel module frame.
Figure 151:
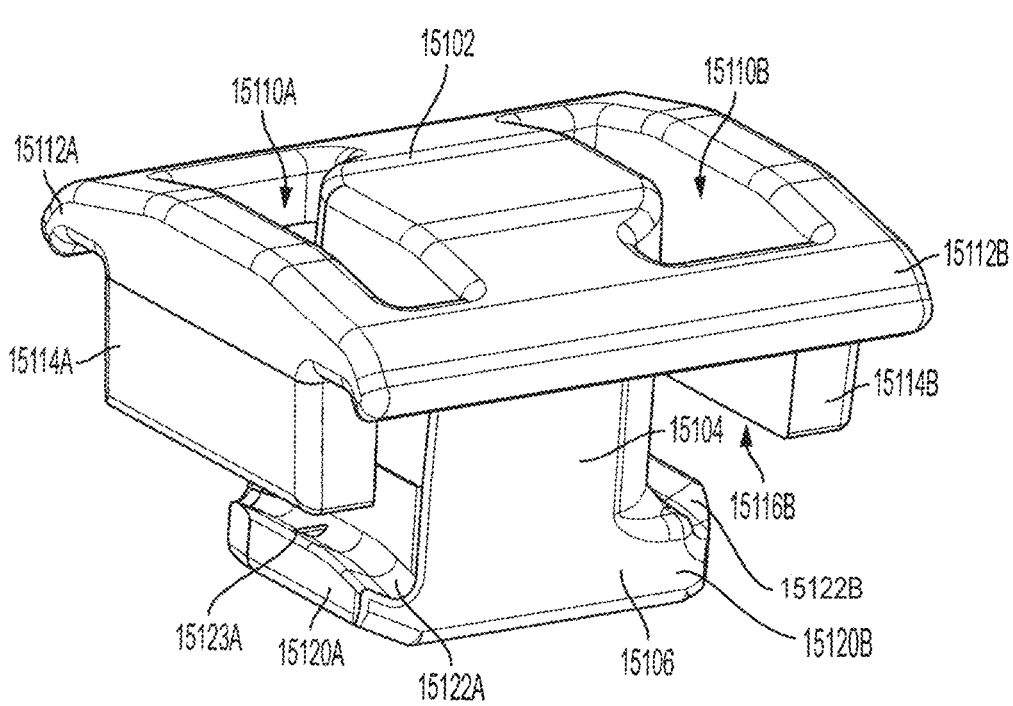
FIG. 151 is a perspective view of a mounting clamp according to another embodiment or aspect of the present disclosure.
Figure 152:
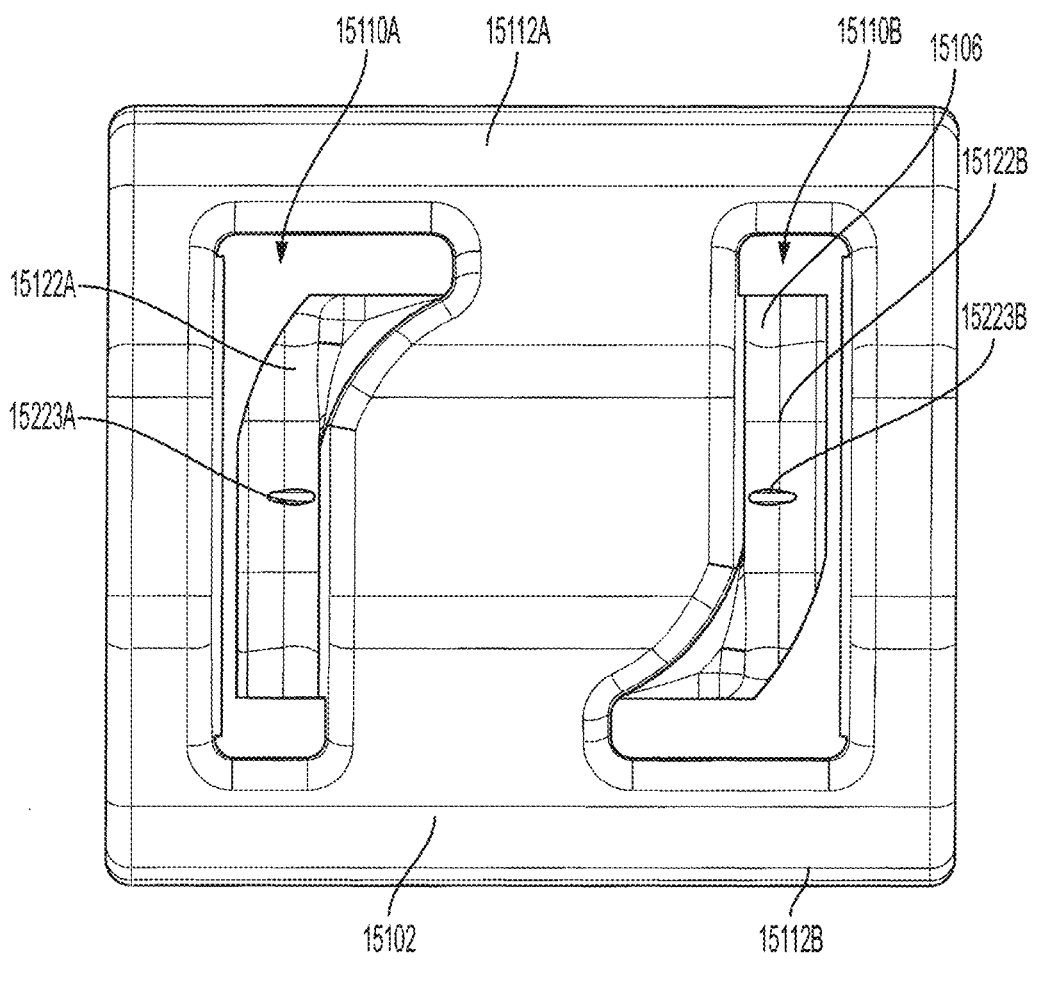
FIG. 152 is a top view of the mounting clamp of FIG. 151.
Figure 153:
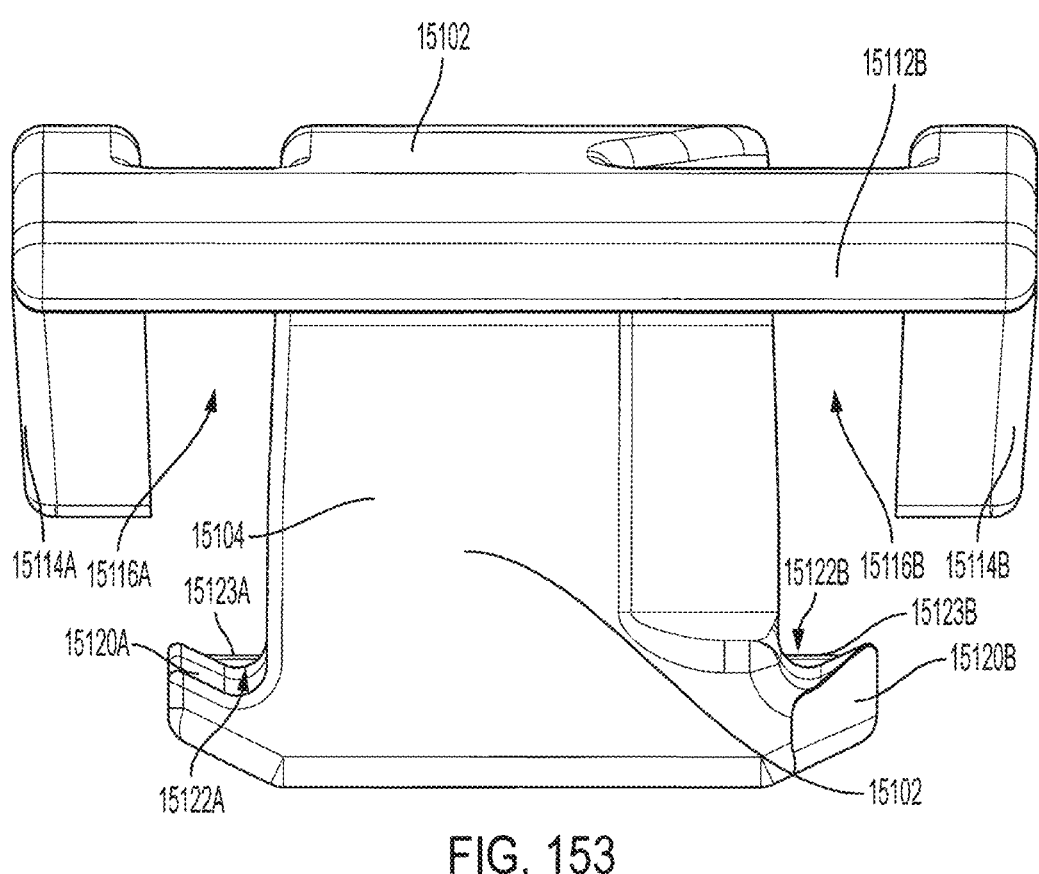
FIG. 153 is a side view of the mounting clamp of FIG. 151.
Figure 154:
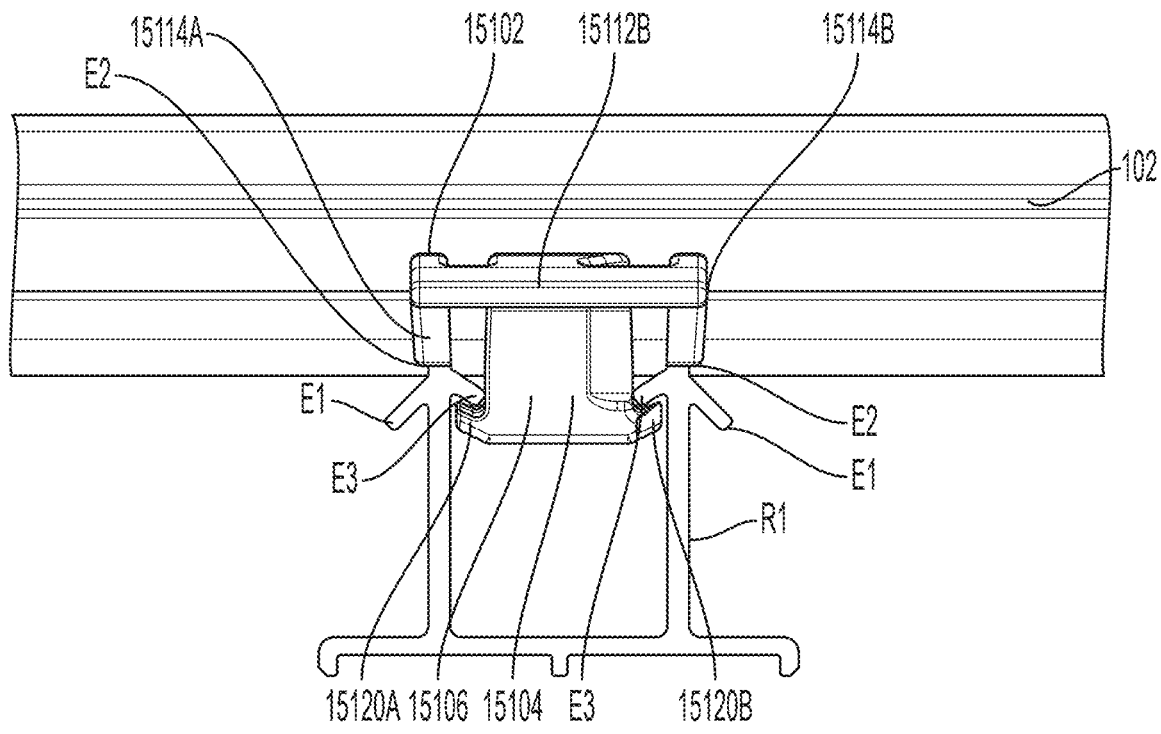
FIG. 154 is a side view of the mounting clamp of FIG. 151 mounted in a rail and a solar panel module frame of FIG. 2.

With reference to FIGS. 148-150, a two-piece top clamp 14800 is shown. The two-piece top clamp 14800 operates similarly to two-piece clamp 13600. For example, the top clamp 14800 includes a module engaging portion 14802 and a frame engaging portion 14803 that are secured together by a fastener 14812. However, the legs 14806A, 14806B are longer, so that the mounting lips 14804A, 14804B are disposed higher above the rail R2. The two-piece top clamp 14800 engages with a standard module frame SF, like one-piece top clamp 14600. The module engaging portion 14802 includes a depression 14810 to add strength to the part, and the fastener 14812 is received within the depression 14810. The mounting lips 14804A, 14804B are also bent downward to provide anti rotational forces between the module engaging portion 14802 and the rail engaging portion 14804.

With reference to FIGS. 151-155B, another one-piece clamp 15100 is shown. This clamp 15100 is also made of metal but may be formed by metal casting. The one-piece clamp 15100 includes a top portion 15102, a neck 15104, and a base 15106. The top portion 15102 includes a body 15108 that has hollowed portions 15110A, 15110B that are provided to reduce the overall weight of the clamp 15100. Mounting lips 15112A, 15112B extend from opposing sides of the top of the body 15108 to engage with solar panel frames 102, 202, 302, 402,11402, 11602 which has already been discussed herein. End walls 15114A, 15114B extend downward, in the direction of the rail R from the opposing sides of the body 15108 that are adjacent to the sides with the mounting lips 115112A, 15112B. The end walls 15114A, 15114B may contact the top surface R2 of the rial R1 to align the clamp 15100 along the rail R1 or provide support against the rail R1 and to ensure that a second module frame 102 can be mounted to the clamp 15100. The end walls 15114A, 15114B define gaps 15116A, 15116B with the neck 15104.

Figure 155A:
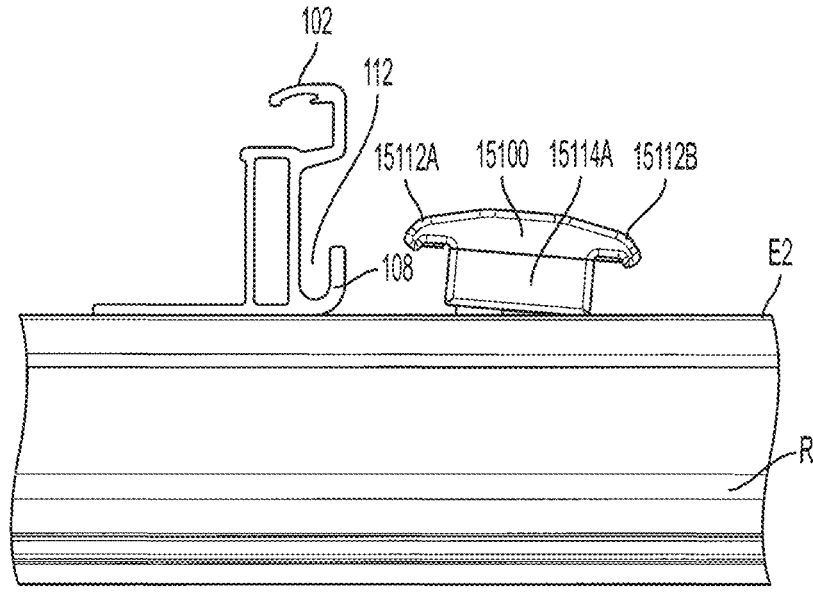
FIG. 155A is a front view of the mounting clamp of FIG. 151 mounted in a rail and in the process of securing a first solar panel module frame of FIG. 2.
Figure 155B:
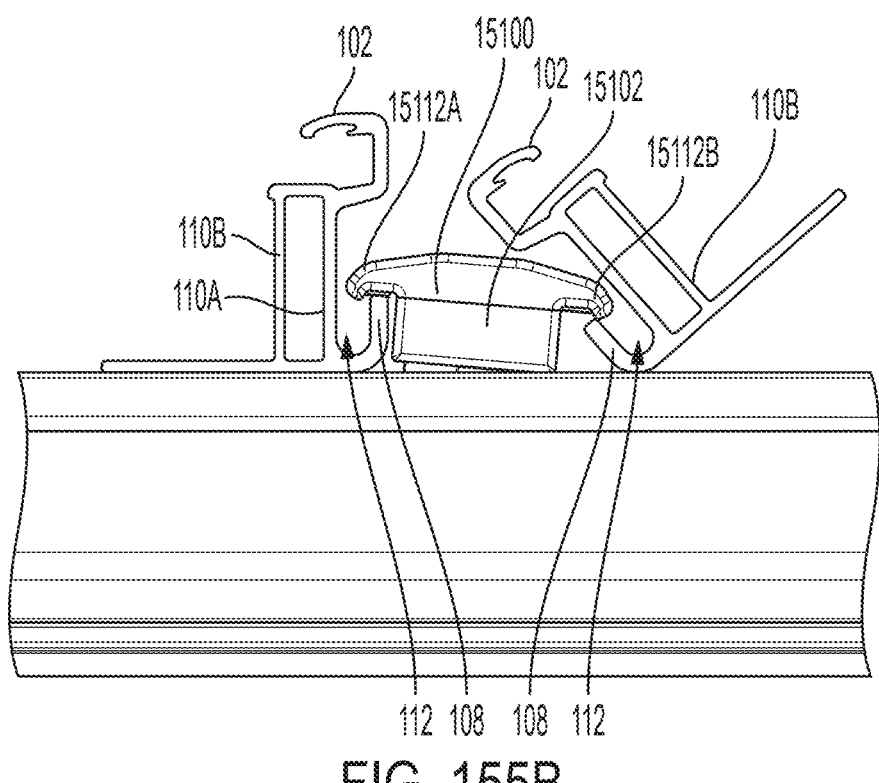
FIG. 155B is a side view of the mounting clamp of FIG. 151 mounted in a rail, and in the process of securing a second solar panel module frame of FIG. 2.

The neck 15104 connects the top portion 15102 and the base 15106 and extends along a central portion of the clamp 15100. The base 15106 includes a body 15118 with base wings 15120A, 15120B extending from opposing sides of the body 15106. The ends of the base wings 15120A, 15120B define slots 15122A, 15122B that are configured to engage with the inner end E3 of the rail R1 to further stabilize the clamp 15100 within the rail R1 and to allow the clamp 15100 to rock relative to the rail R1. As discussed above, in connection with clamps 2200, 11700, the base wings 15120A, 15120B may extend into a groove G defined within an interior of the rail, although this is not shown in FIG. 151-155B. Like clamps 2200, 11700, the clamp 15100 can slide into an end of the rail R1 and slide along a length of the rail R1, until it is placed at its desired location. The clamp 15100 may also be pressed into the rail R via the top opening and aligned once it is inside of the rail R. Then, the clamp 15100 can be engaged with solar panel module frames 102, 202, 302, 402, 11402, 11602. The engagement between the clamp 15100 and solar panel module frames 102, 202, 302, 402, 11402, 11602 is shown in FIGS. 155A-155B. This process is similar to that of clamp 13000 discussed in connection with FIGS. 133A-133C.

Figure 156:
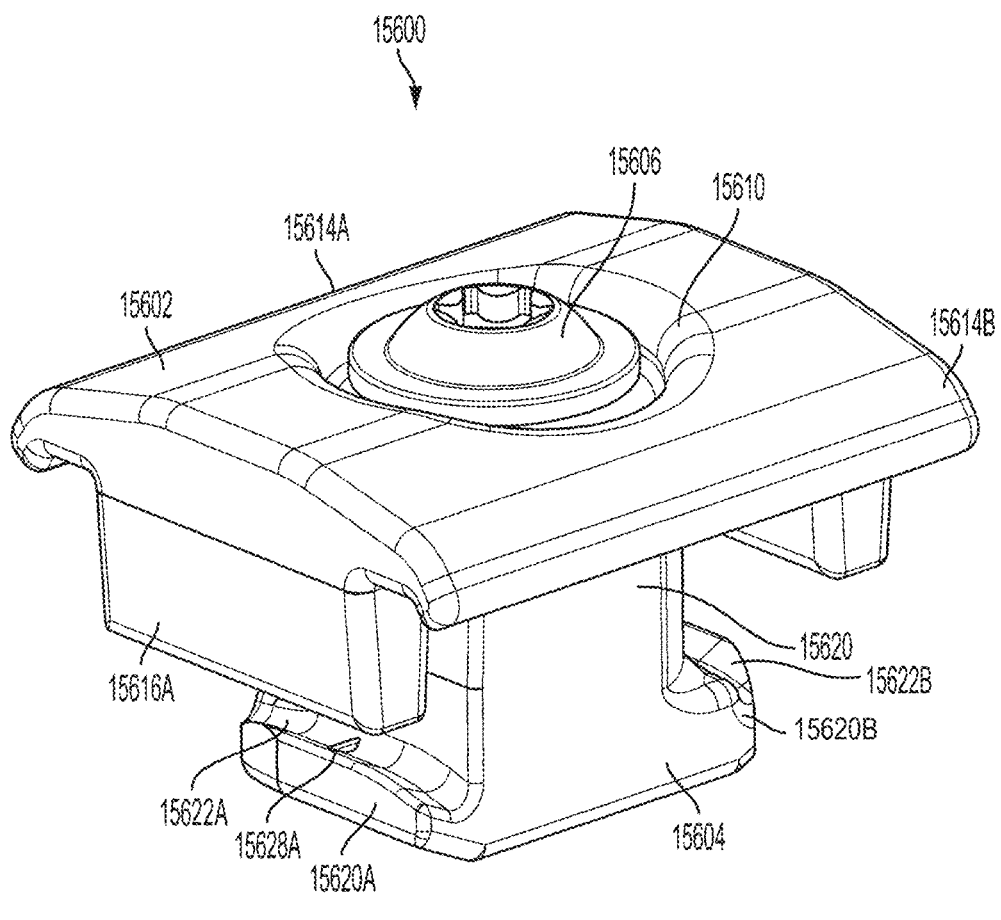
FIG. 156 is a perspective view of a mounting clamp according to another embodiment or aspect of the present disclosure.
Figure 157:
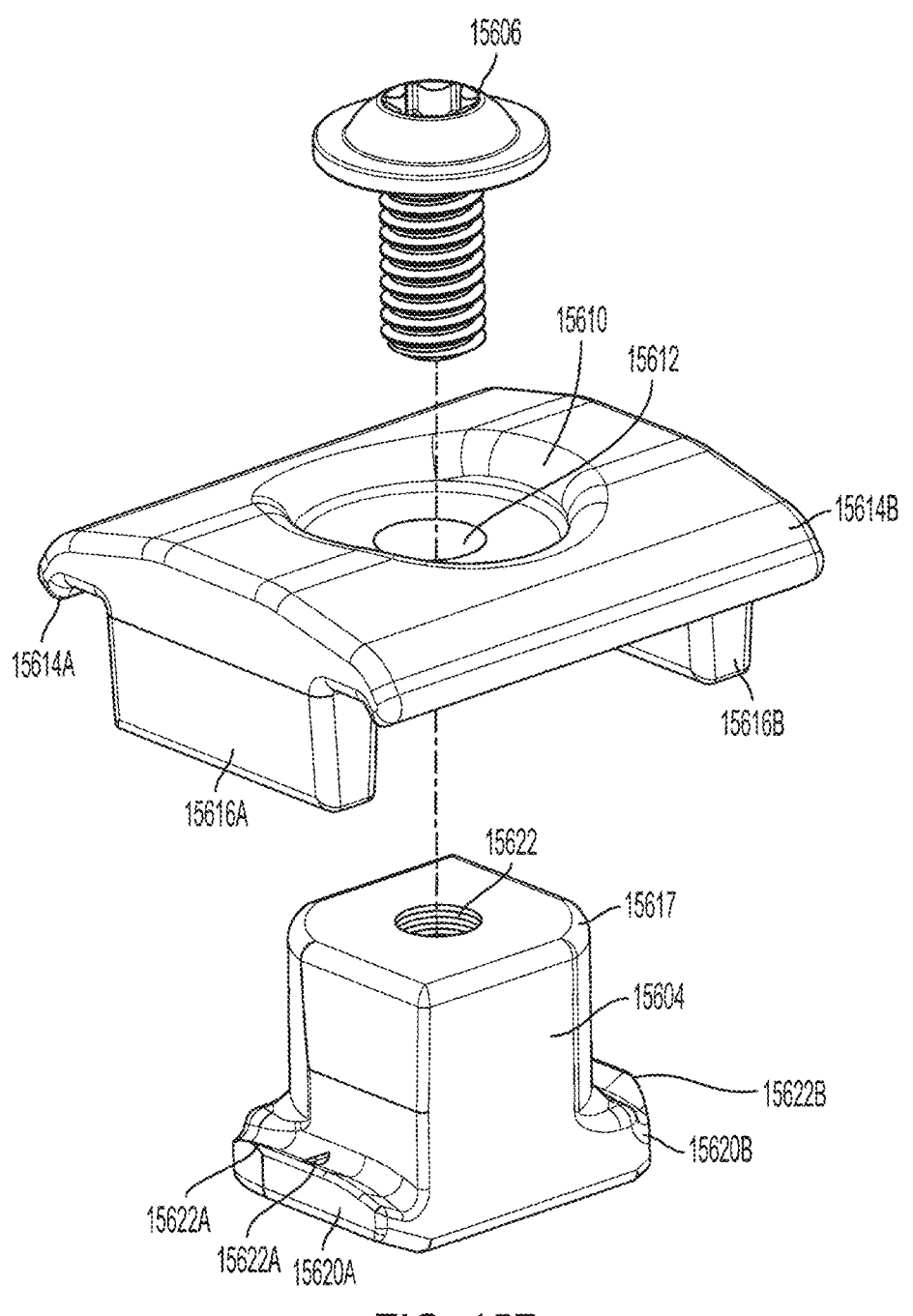
FIG. 157 is an exploded view of the mounting clamp of FIG. 156.
Figure 158:
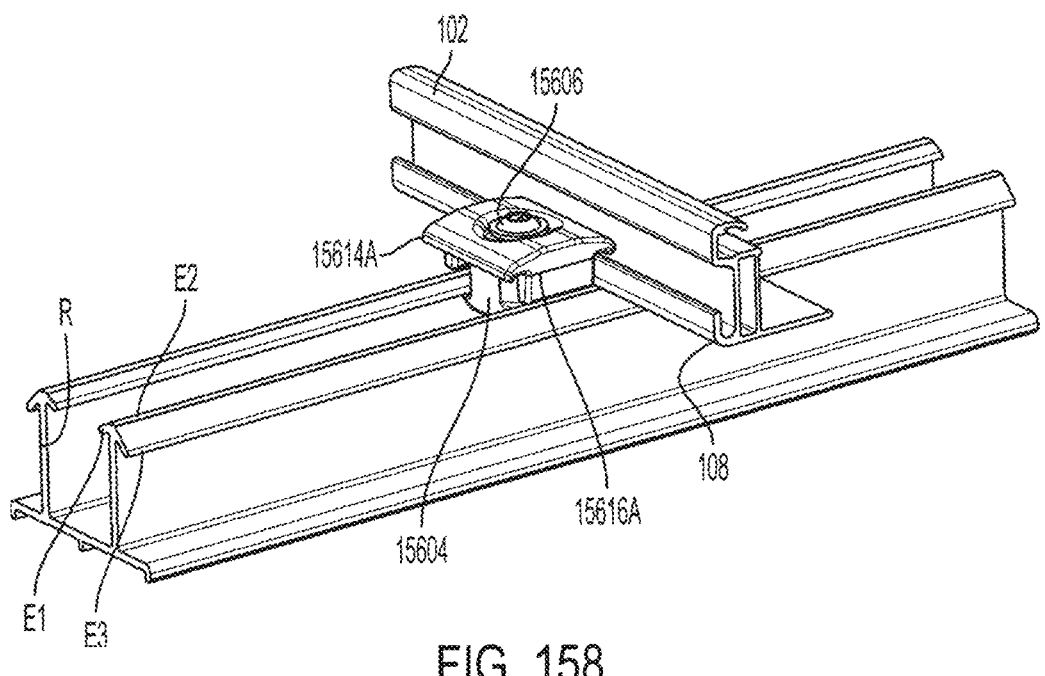
FIG. 158 is a perspective view of the mounting clamp of FIG. 156 mounted to a rail and a solar panel module frame of FIG. 2.
Figure 159:
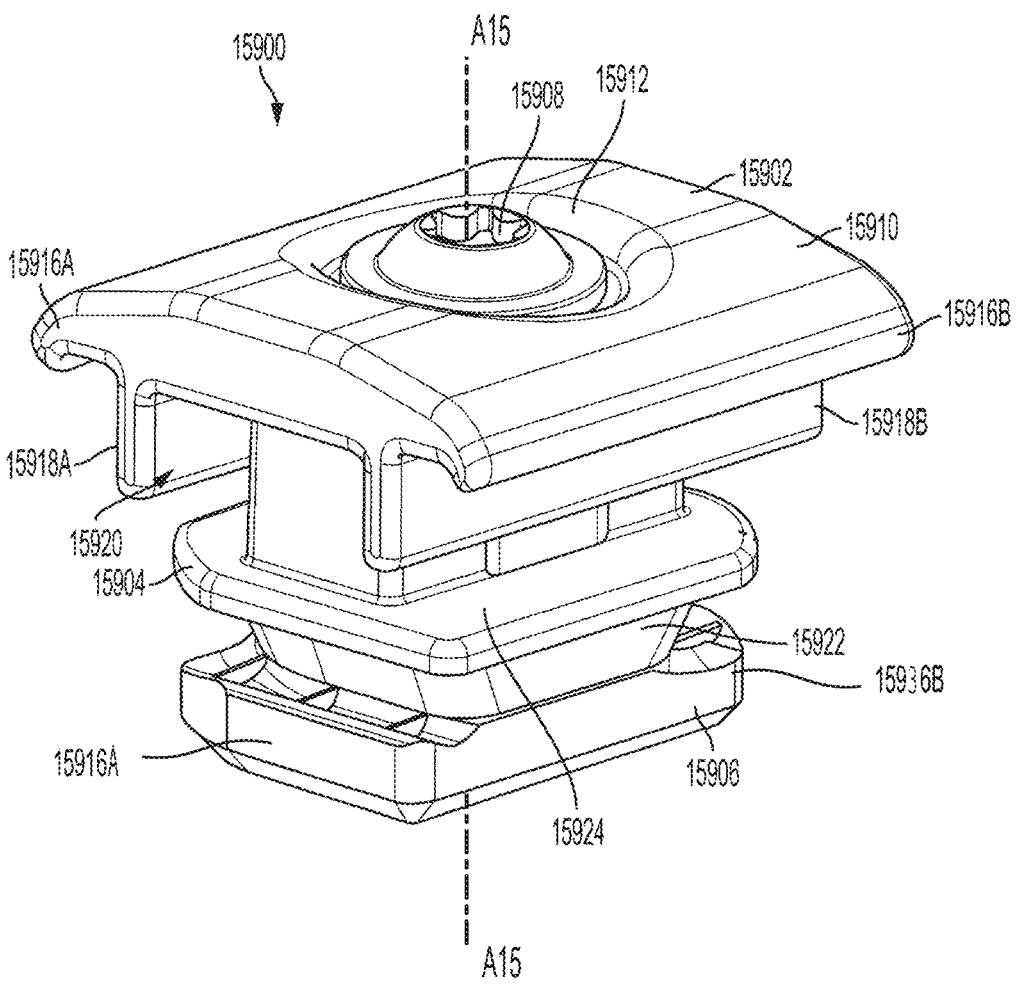
FIG. 159 is a perspective view of a mounting clamp according to another embodiment or aspect of the present disclosure.
Figure 160:
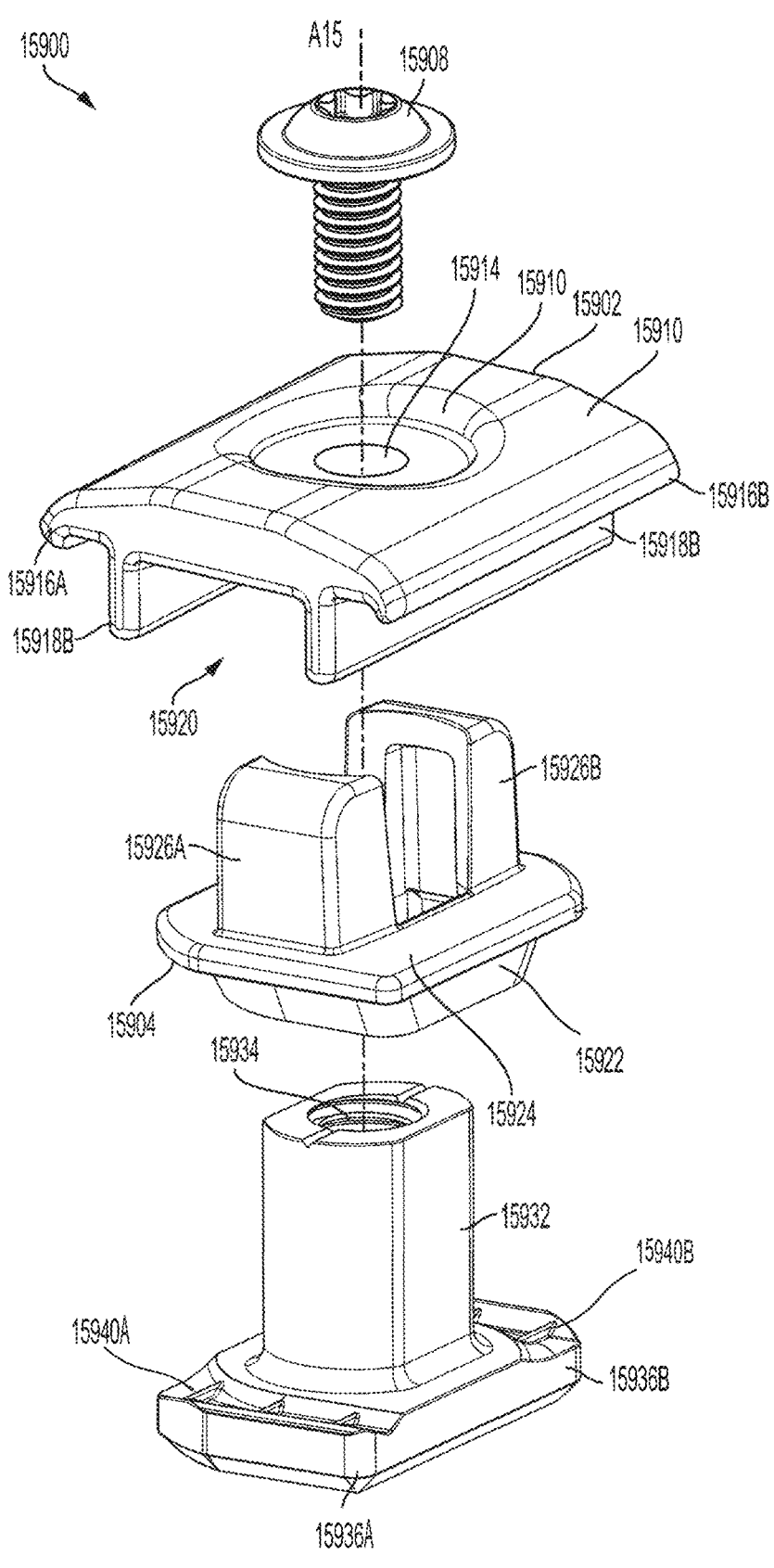
FIG. 160 is an exploded view of the mounting clamp of FIG. 159.
Figure 161:
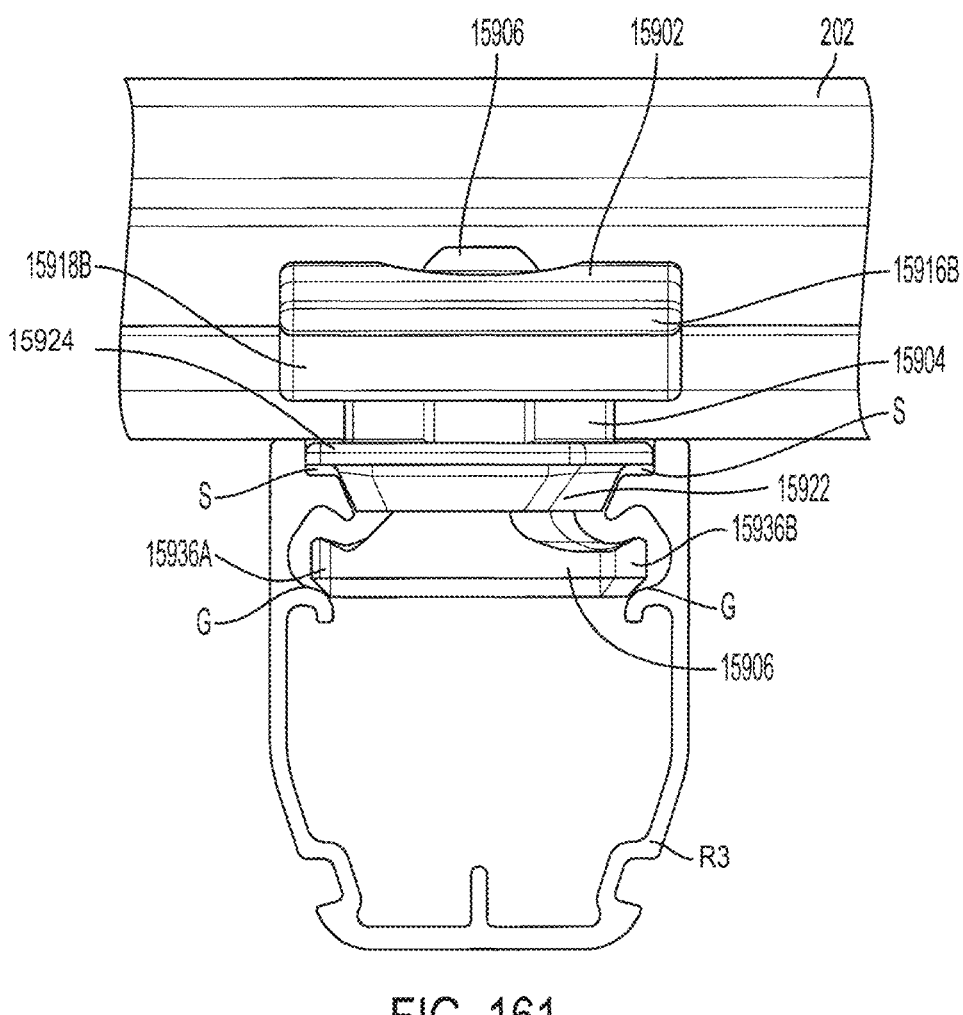
FIG. 161 is a side view of the mounting clamp of FIG. 159 mounted rail and a solar panel module frame of FIG. 2.
Figure 162:
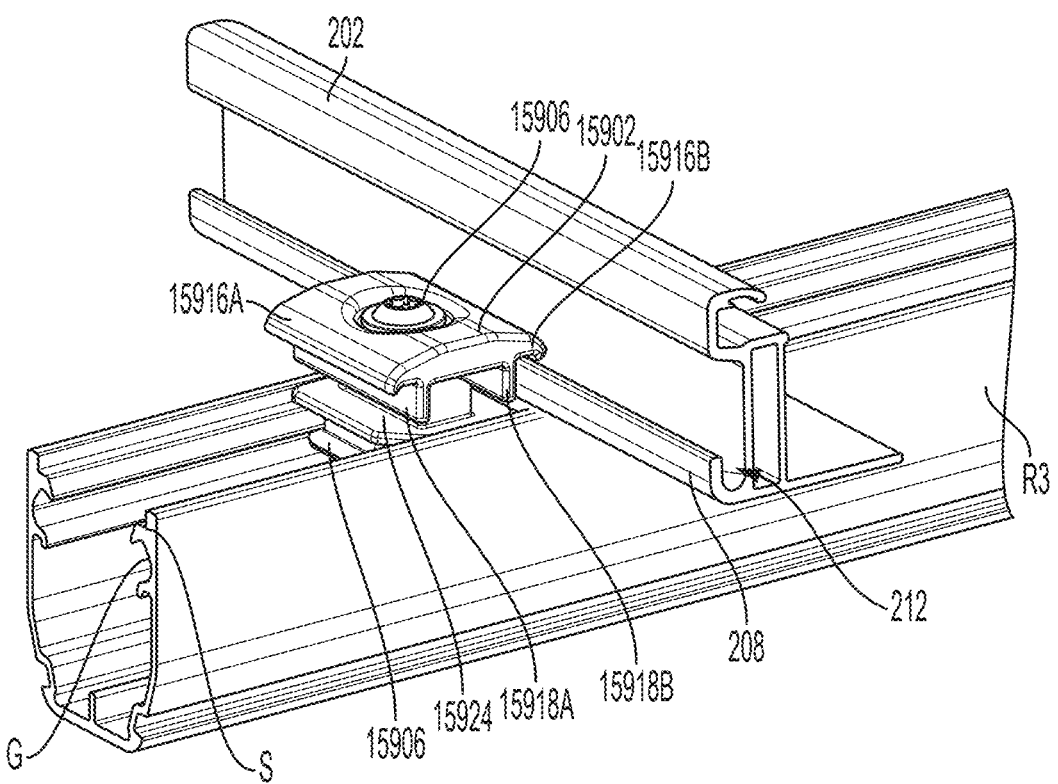
FIG. 162 is a perspective view of the mounting clamp, rail, and solar panel module frame of FIG. 161.
Figure 163:
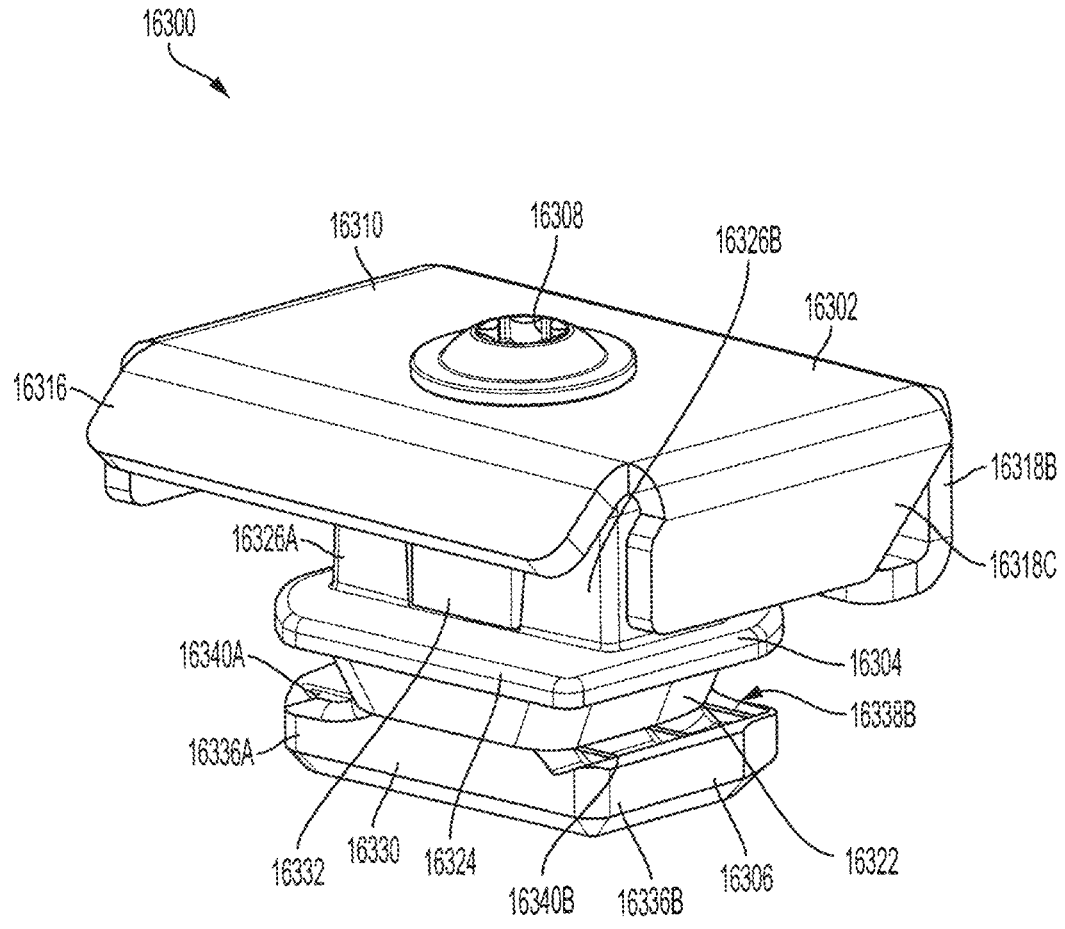
FIG. 163 is a perspective view of an end clamp according to another embodiment or aspect of the present disclosure.
Figure 164:
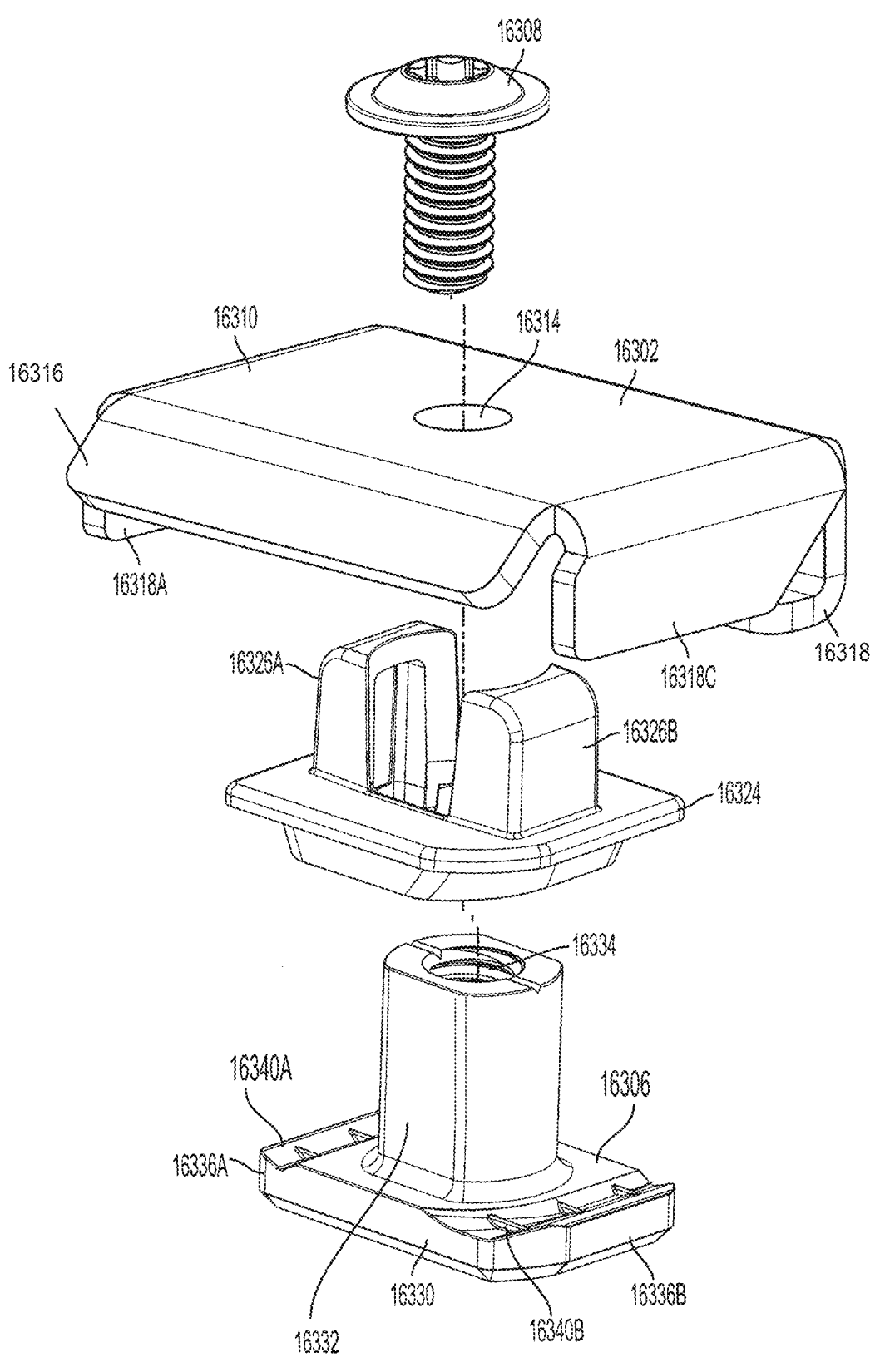
FIG. 164 is an exploded view of the end clamp of FIG. 163.
Figure 165:
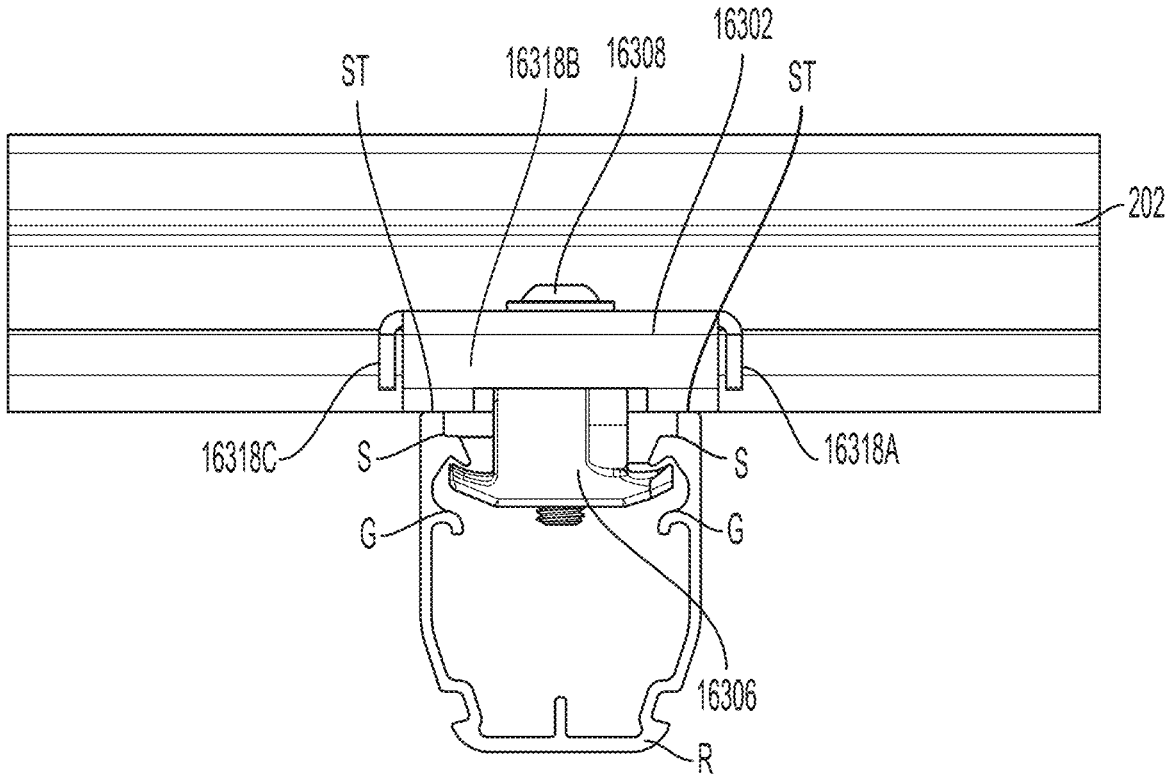
FIG. 165 is a side view of the end clamp of FIG. 163 mounted to a rail and a solar panel module frame of FIG. 2.
Figure 166:
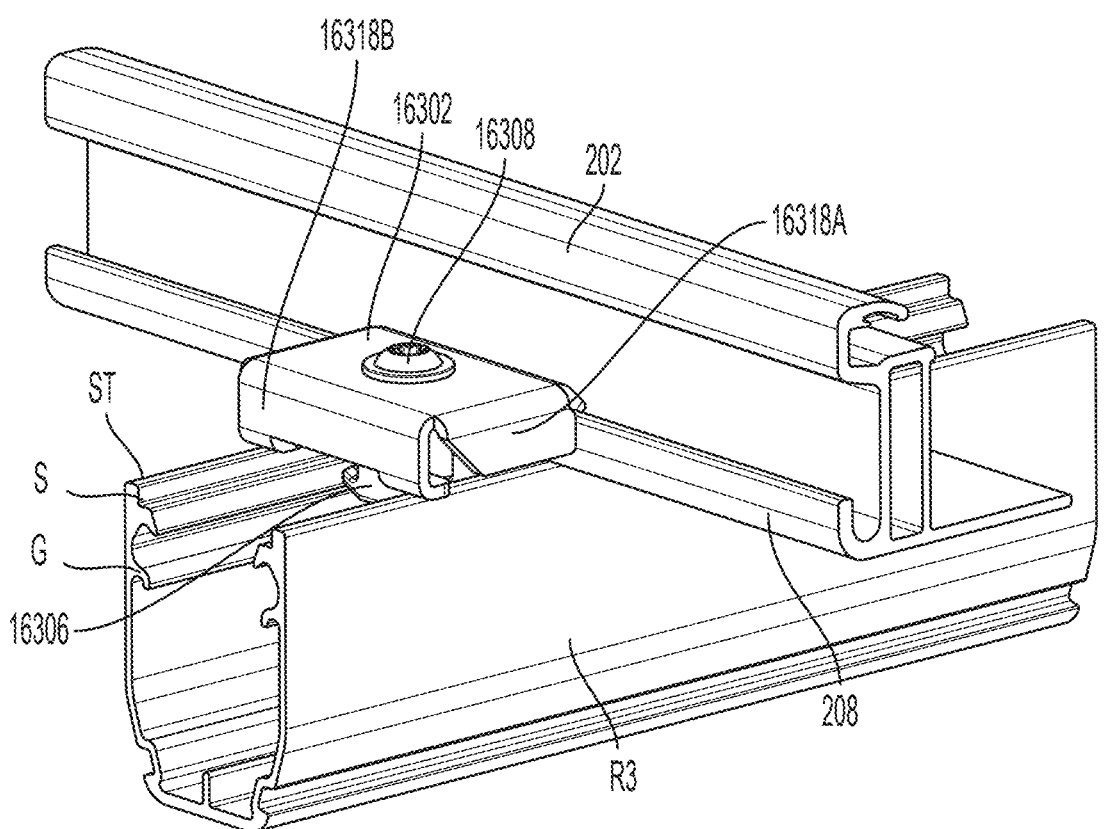
FIG. 166 is a perspective view of the end clamp, rail, and solar panel module frame of FIG. 165.
Figure 167:
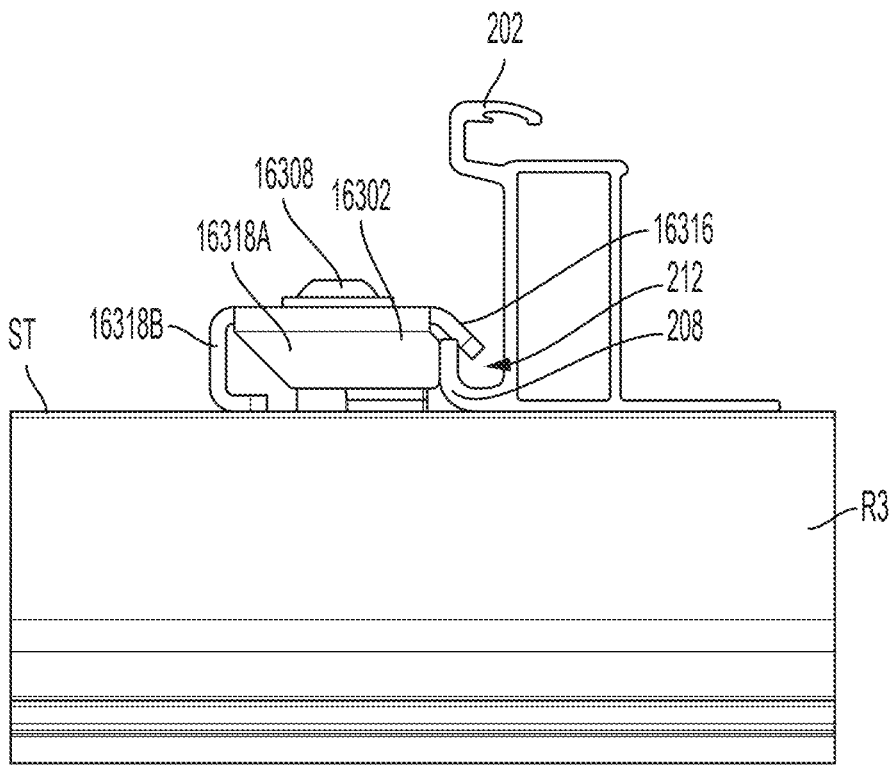
FIG. 167 is a front view of the end clamp, rail and solar panel module frame of FIG. 165.

With reference to FIGS. 156-158, a two-piece clamp 15600 is shown. This clamp 15600 is also made of metal, and may be formed by metal casting. The clamp 15600 includes a top portion 15602 and a base 15604, with a fastener 15606 connecting the two elements. Because this clamp 15600 is made of two pieces, it may be removed from the middle of a solar panel array by disconnecting the fastener 15606 and removing the top portion 15602. This allows one to remove a single solar panel module within a field of solar panel modules without removing adjacent solar panel modules.

The general shape of the clamp 15600 is similar to clamp 15100, with mounting lips 15614A, 15614B and end walls 15616A, 15616B extending from the body 15608 of the top portion 15602. The top portion 15602 defines a depression 15610 from which, an aperture 15612 extends through the top portion 15602. The aperture 15612 is aligned with a corresponding threaded aperture 15622 in the base 15604. The top portion 15602 and the base 15604 are connected with the fastener 15608 extending through the apertures 15612, 15622. The base 15604 also includes base wings 15620A, 15620B and base slots 15622A, 15622B to facilitate engagement with a rail R1. The clamp 15600 may also enter the rail R from above and twisted, once the base 15606 is inside the rail R, thereby engaging the base wings 15620A, 15620B with the grooves G in the rail R.

With reference to FIGS. 159-162, a three-piece clamp 15900 is shown. The clamp 15900 a top portion 15902, a middle portion 15904, and a base 15906. The top portion 15902, middle portion 15904, and base 15906 are aligned along axis a shared axis A15, and a fastener 15908 is used to secure these elements together. The arrangement of this clamp is similar to the rotating mounting clamp 2200, discussed above.

The top portion 15902 includes a body 15910 that has a depression 15912 centrally located. An aperture 15914 is formed in the depression and extends through the body 15910 for securing the top portion 15902 to the base portion 15906. Mounting lips 15916A, 15916B extend from opposing sides of the body 15910. Hanging walls 15918A, 15918B extend downward towards the rail R from an underside of the body 15910, proximate the mounting lips 15916A, 15916B. The hanging walls 15918A, 15918B define a mating space 15920 to receive mating walls 15926A, 15926B of the middle portion 15904.

The middle portion 15904 includes a body 15920 that defines an alignment flange 15924 extending around a perimeter of the body. The alignment flange 15924 is configured to engage with features on the rail R3, such as the support surface S. The body 15920 also includes mating walls 15926A, 15926B extending upward toward the top portion 15920 in a direction perpendicular to the alignment flange 15924. The mating walls 15926A, 15926B are shaped and sized to fit within the mating space 15920 to further secure the middle portion 15904 to the top portion 15902. The mating walls 15926A, 15926B and alignment flange 15924 define an opening 15928 through which a channel 15932 of the base 15906 extends. The body 15920 also includes a lower portion 15920 that extends downward from the alignment flange 15924 in the direction of the bottom portion 15906.

The base 15906 includes a body 15930. A channel 15932 extends from the body 15930 and defines an aperture 15934 that receives the fastener 15908 therethrough. The aperture 15934 may be threaded to facilitate this engagement. The aperture 15934 is aligned with the aperture 15914 in the top portion 15902 to secure the top portion 15902 to the bottom portion 15906 via the fastener 15908. The mating walls 15926 of the middle portion 15904 extend around and are configured to be aligned against the channel 15932 when the channel 15932 extends through the opening 15928. Like the previously discussed bases, base 15906 includes base wings 15936A, 15936B each having a base slot 15940A, 15940B that are configured to fit within and bond with a groove G in the rail R3. The clamp 15900 is mounted by sliding the base wings 15936A. 15936B into the groove G and sliding the alignment flange 15924 over the support surface S and moving the clamp 15900 into its desired position on the rail. The clamp 15900 may also enter the rail R3 from the top opening and be rotated until these engagements with the grooves G and support surfaces S occur.

With reference to FIGS. 163-167, a three-piece end clamp 16300 is shown. The end clamp 16300 includes many of the same features as clamp 15900, but there is only one mounting lip 16316. There are three, downwardly facing sidewalls 16318A, 16318B, 16318C extending from the other sides of the body 16310 of the top portion 16302. When a module frame 102, 202, 302, 402, 11402, 11602 is being mounted to the clamp 16300, the sidewalls 16318A, 16318C act as a stop for the outer lip 108, 208, 308, 408, 11408, 11608 proximate the mounting lip 16316. Although not shown, sidewalls 16318A, 16318C may be angled inward, in a direction toward the middle portion 16304 and base 16306. This strengthens the top portion 16302. The third sidewall 16318B is located on a side of the base 16306 of the top portion 16302 that opposes the mounting lip 16316. The third sidewall 16318B first extends straight downward, toward the rail R3 and then folds inward, extending toward the rest of the clamp 16300, so that the portion extending toward the clamp 16300 contacts and rests against the top surface ST of the rail R. A fastener 16308 connects the top portion 16302 to the bottom portion 16306 through respective apertures 16314, 16334, with aperture 13664 being threaded to facilitate the connection with the fastener 16308. The mounting and dismounting of this clamp 16300 relative to the rail R3 is the same as the clamp 15900 described above.

Congratulations, you made it to the end of the application!

While specific embodiments of the device of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof. It is also to be understood that any combination of the different features disclosed in the different embodiments of this disclosure may be combined in another embodiment and are not outside of the scope of this disclosure.

What is claimed is:

1. A frame for a photovoltaic module, the frame comprising:

a base portion comprising a bottom surface and an interior sidewall extending from the bottom surface, the interior sidewall defining an opening and a throat accessible via the opening, the opening and the throat extending along a length of the frame and being configured to receive a first mounting element therein;

a first leg extending from a midpoint of the interior sidewall;

a second leg extending from the base portion proximate to the interior sidewall;

an outer lip extending from the interior sidewall, the outer lip comprising:

a curved outer surface; and a vertically extending portion adjacent to the first leg; and a panel support portion comprising:

a panel support surface extending between a top of the first leg and a top of the second leg; and a panel sidewall comprising:

a first sidewall portion extending from the panel support surface and a side of the first leg; and a second sidewall portion extending vertically from the first sidewall portion to define a convex curved surface therebetween, wherein the panel support surface and the panel sidewall at least partially define a panel cavity configured to hold a solar panel therein, wherein the first sidewall portion extends from the panel support surface to define a first concave curved surface between the first sidewall portion and the panel support surface, wherein the first sidewall portion extends from the side of the first leg to define an obtuse angle with the first leg and to define a second concave curved surface between the first sidewall portion and the first leg, wherein the outer lip extends from the interior sidewall such that the curved outer surface extends from the bottom surface of the base portion proximate the opening to the vertically extending portion, and wherein the outer lip and the first leg at least partially define a cavity, the cavity being configured to receive a second mounting element therein.

2. The frame of claim 1, wherein the panel support portion further comprises a top wall extending from the second sidewall portion and over at least a portion of the panel support surface, and wherein the top wall, the panel sidewall, and at least a portion of the panel support surface define the panel cavity configured to hold a solar panel therein.

3. The frame of claim 2, wherein the top wall comprises an uppermost outer surface, and wherein the center point of the uppermost outer surface is laterally offset from a center point of the opening.

4. The frame of claim 1, wherein the throat defines a width extending between opposing sides of the interior sidewall and a height extending between the opening and a side of the interior sidewall opposite the opening.

5. The frame of claim 4, wherein the opposing sides of the interior sidewall are substantially vertical, and wherein the side of the interior sidewall opposite the opening is substantially horizontal.

6. The frame of claim 5, wherein the width of the throat is greater than the height.

7. The frame of claim 1, wherein the second sidewall portion extends from the first sidewall portion to define a convex curved surface therebetween.

8. The frame of claim 1, wherein the frame has a length extending from the bottom surface to an uppermost surface of the panel support portion, wherein the outer lip has a length extending from the bottom surface to a distal end of the outer lip, and wherein the length of the outer lip is 20-40% of the length of the frame.

9. The frame of claim 8, wherein the length of the frame is 25-40 millimeters, and wherein the length of the outer lip is 7.75-12 millimeters.

10. The frame of claim 9, wherein the length of the frame is 30-40 millimeters, and wherein the length of the outer lip is 7.75 millimeters.

11. The frame of claim 10, wherein the length of the frame is one of 30, 35, or 40 millimeters.

* * * * *